US010290180B2

(12) United States Patent
Takeda

(10) Patent No.: US 10,290,180 B2

(45) Date of Patent: May 14, 2019

(54) GAME INFORMATION ANALYSIS SYSTEM

(71) Applicant: Universal Entertainment Corporation, Koto-ku, Tokyo (JP)

(72) Inventor: Kengo Takeda, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 123 days.

(21) Appl. No.: 15/229,635

(22) Filed: Aug. 5, 2016

(65) Prior Publication Data

US 2017/0053486 A1 Feb. 23, 2017

(30) Foreign Application Priority Data

Aug. 18, 2015 (JP) ................................ 2015-161439
Aug. 18, 2015 (JP) ................................ 2015-161440
Aug. 18, 2015 (JP) ................................ 2015-161441
Aug. 18, 2015 (JP) ................................ 2015-161442
Aug. 18, 2015 (JP) ................................ 2015-161443
Aug. 18, 2015 (JP) ................................ 2015-161444
Aug. 18, 2015 (JP) ................................ 2015-161445
Aug. 18, 2015 (JP) ................................ 2015-161446
Aug. 18, 2015 (JP) ................................ 2015-161447
Aug. 18, 2015 (JP) ................................ 2015-161448
Aug. 18, 2015 (JP) ................................ 2015-161449
Aug. 18, 2015 (JP) ................................ 2015-161450
Aug. 18, 2015 (JP) ................................ 2015-161451
Aug. 18, 2015 (JP) ................................ 2015-161452
Aug. 18, 2015 (JP) ................................ 2015-161453

(51) Int. Cl.
*A63F 13/00* (2014.01)
*G07F 17/32* (2006.01)
*G07F 17/34* (2006.01)

(52) U.S. Cl.
CPC ...... *G07F 17/3225* (2013.01); *G07F 17/3206* (2013.01); *G07F 17/3211* (2013.01);
(Continued)

(58) Field of Classification Search
CPC ............... G07F 17/3227; G07F 17/323; G07F 17/3234; G07F 17/3237; G07F 17/3239
See application file for complete search history.

(56) References Cited

U.S. PATENT DOCUMENTS

2002/0152120 A1* 10/2002 Howington ............ G06Q 30/02 705/14.11
2003/0093315 A1* 5/2003 Sato .................... G06Q 10/107 705/14.14

(Continued)

*Primary Examiner* — Lawrence S Galka
(74) *Attorney, Agent, or Firm* — Potomac Law Group, PLLC; Kenneth Fagin

(57) ABSTRACT

Provided is a game information analysis system which is operable to analyze player attributes and gaming machine attributes based on operation data of gaming machines and to conduct a matching analysis on the player attributes and the machine attributes.

An analysis server 2012 of the game information analysis system 2001 receives game information from each slot machine 2014; obtains the player attributes and the machine attributes based on the game information; and conducts matching between a player and a gaming machine in response to an instruction issued by a user, thereby displaying correspondence relationship between the player attributes and the gaming machine attributes.

3 Claims, 149 Drawing Sheets

(52) U.S. Cl.
CPC ...... *G07F 17/3241* (2013.01); *G07F 17/3258* (2013.01); *G07F 17/34* (2013.01)

(56) References Cited

U.S. PATENT DOCUMENTS

2010/0298040 A1* 11/2010 Joshi ........................ G07F 17/32
463/16
2014/0087862 A1* 3/2014 Burke ................. G07F 17/3206
463/29
2014/0221083 A1* 8/2014 Okada ................. G07F 17/3237
463/25
2015/0302682 A1* 10/2015 Sareli .................... G07F 17/323
463/20

* cited by examiner

FIG. 9

SYMBOL COMBINATION TABLE

| SYMBOL COMBINATION | | | | | PAYOUT NUMBER | WINNING COMBINATION |
|---|---|---|---|---|---|---|
| FIRST REEL | SECOND REEL | THIRD REEL | FOURTH REEL | FIFTH REEL | | |
| RED | RED | RED | RED | RED | 15 | RED |
| APPLE | APPLE | APPLE | APPLE | APPLE | 12 | APPLE |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE3 |
| CHERRY | CHERRY | CHERRY | (ANY) | (ANY) | 2 | CHERRY2 |
| ORANGE | ORANGE | ORANGE | (ANY) | (ANY) | 2 | ORANGE2 |
| CHERRY | (ANY) | (ANY) | (ANY) | (ANY) | 1 | CHERRY1 |
| ORANGE | (ANY) | (ANY) | (ANY) | (ANY) | 1 | ORANGE1 |

FIG. 17

NECESSITY OF A SYSTEM FOR OPTIMIZING ADMINISTRATION OF A HALL STORE

PROBLEMS

・FOR CONTINUATION OF SOUND ADMINISTRATION OF A HALL STORE, SIMPLY PURSUING A PROFIT ON A SIDE OF THE HALL STORE IS NOT SUFFICIENT.

・IT IS IMPORTANT TO MAINTAIN DEGREES OF SATISFACTION OF A HALL STORE AND CUSTOMERS WITH AN APPROPRIATE BALANCE BEING KEPT.

・IN THE CONVENTIONAL SYSTEM, IT IS DIFFICULT TO GRASP ATTRIBUTES OF CUSTOMERS AND GAMING MACHINES AND DEGREES OF SATISFACTION THEREOF.

↓

SOLUTIONS

・THERE IS NEED OF A SYSTEM WHICH ANALYZES GAME INFORMATION FROM POINTS OF VIEW OF BOTH SIDES OF A HALL STORE AND CUSTOMERS AND PROVIDES OPTIMUM MANAGEMENT INFORMATION.

FIG. 18

AN EXPERT SYSTEM WHICH PROVIDES ADVICE AND PREDICTION SO AS TO MAKE ADMINISTRATION OF A HALL STORE OPTIMUM

FEATURES

- OPERATION DATA IS ASSOCIATED WITH PSYCHOLOGY OF CUSTOMERS, THEREBY DETERMINING ADMINISTRATION BALANCE.
- MACHINE ATTRIBUTES, CUSTOMER ATTRIBUTES, AND DEGREES OF SATISFACTION ARE CLASSIFIED BASED ON THE PAST OPERATION DATA.
- THROUGH THE COMPARISON WITH THE PAST DATA, POTENTIAL RISKS AND TREND CHANGES ARE DETECTED
- FUTURE PREDICTION AND SIMULATION OF PROFITABILITY

- THE EXISTING SYSTEM IS DEVELOPED AND A SYSTEM WHICH CAN PROVIDE ADVICE AND PREDICTION BENEFICIAL FOR HALL STORE ADMINISTRATION IS PROVIDED.

OPERATION DATA OF THE EXISTING SYSTEM IS EFFECTIVELY UTILIZED AND A COMPREHENSIVE ANALYSIS IS CONDUCTED.

FIG. 20

OPERATION FORMS OF GAME INFORMATION ANALYSIS SYSTEM

| | |
|---|---|
| ONLINE OPERATION FORM (SMALL-SCALE HALL STORE) | • REAL-TIME ACCESS TO A HALL MANAGEMENT SERVER<br>• SLOT MACHINES WHOSE NUMBER IS 1,000 OR LESS |
| ONLINE OPERATION FORM (LARGE-SCALE HALL STORE) | • REAL-TIME ACCESS TO A HALL MANAGEMENT SERVER<br>• SLOT MACHINES WHOSE NUMBER IS LARGER THAN 1,000<br>• A LOAD CAN BE SHARED AMONG A PLURALITY OF ANALYSIS SERVERS. |
| OFFLINE OPERATION FORM | • NON-REAL-TIME |
| (OPTIONS) | • A PLURALITY OF SITES<br>• A SIMPLE OPERATION (INCLUDING A SIMPLE AUTHENTICATION-COMPLIANT OPERATION)<br>• USE OF A MOBILE TERMINAL<br>• LINKAGE AMONG SYSTEMS |

SIMPLE AUTHENTICATION OF CLIENT TERMINAL

USE OF TABLET TERMINAL OR THE LIKE

SOFTWARE CONFIGURATION EXAMPLE OF GAME INFORMATION ANALYSIS SYSTEM

FIG. 28

MAIN FUNCTIONS AND FEATURES OF GAME INFORMATION ANALYSIS SYSTEM

| | |
|---|---|
| DIAGNOSIS OF A BALANCE BETWEEN CUSTOMER PSYCHOLOGY AND ADMINISTRATION | ·CUSTOMER PSYCHOLOGY ANALYSIS<br>·DIAGNOSIS OF A BALANCE BETWEEN SALES AND CUSTOMER PSYCHOLOGY |
| ANALYSIS OF ATTRIBUTES OF MACHINES AND CUSTOMERS | · ANALYSIS OF ATTRIBUTES OF MACHINES<br>·ANALYSIS OF ATTRIBUTES OF PLAYERS<br>·ANALYSIS OF ATTRIBUTES OF PLAYERS |
| DETECTION OF POTENTIAL RISKS AND TREND CHANGES | ·ANALYSIS OF MACHINE OPERATION AND PROFITABILITY<br>·FRAUDULENCE ANALYSIS<br>·FAILURE ANALYSIS<br>·POPULARITY ANALYSIS BASED ON MACHINE CLASSIFICATION AND CUSTOMER CLASSIFICATION |
| FUTURE PREDICTION AND SIMULATION OF PROFITABILITY | ·SETTING OF SALES TARGETS AND PREDICTION<br>·SIMULATION OF PROMOTION EFFECT |

CLASSIFICATION OF MACHINE ATTRIBUTES FROM ROUGHNESS OF WAVE AND WINNING PROBABILITY OR THE LIKE

CLASSIFICATION OF PLAYER ATTRIBUTES FROM INVESTMENT MONEY AMOUNT, BET PER GAME, AND NORMAL-TIME PO

FIG. 34

ANALYSIS OF SUSPECTED MACHINE, PLAYER, AND SESSION

DETERMINATION RESULT OF PLAYER A

| No | FRAUDULENCE DETERMINATION METHOD | DETERMINATION RESULT |
|---|---|---|
| 1 | DETERMINATION BASED ON LARGE BET PER GAME | OK |
| 2 | DETERMINATION BASED ON MACHINE FAILURE | OK |
| 3 | DETERMINATION BASED ON TAKING-IN-AND-OUT OF BILLS | OK |
| 4 | DETERMINATION BASED ON WINNING RATIO | OK |

DETERMINATION RESULT OF PLAYER B

| No | FRAUDULENCE DETERMINATION METHOD | DETERMINATION RESULT |
|---|---|---|
| 1 | DETERMINATION BASED ON LARGE BET PER GAME | NG |
| 2 | DETERMINATION BASED ON MACHINE FAILURE | NG |
| 3 | DETERMINATION BASED ON TAKING-IN-AND-OUT OF BILLS | NG |
| 4 | DETERMINATION BASED ON WINNING RATIO | OK |

↓

EXTRACTION OF CAUTION-NEEDED PLAYER

ANALYSIS ON WHAT CUSTOMER PREFERS WHICH MACHINE

RISK MANAGEMENT THROUGH SALES TARGETS AND PREDICTION

EXAMPLE OF SIMULATION BY COMPARING PROMOTION TARGETS

| PLAYER CATEGORY | SALES | IMPLEMENTATION OF PROMOTION | PROMOTION EFFECT |
|---|---|---|---|
| VISITING FREQUENCY (HIGH) | 1000000 | IMPLEMENTED | 100000 |
| VISITING FREQUENCY (MIDDLE) | 500000 | — | |
| VISITING FREQUENCY (LOW) | 100000 | — | |

EXAMPLE OF SIMULATION BY COMPARING PROMOTION TARGETS

| PLAYER CATEGORY | SALES | IMPLEMENTATION OF PROMOTION | PROMOTION EFFECT |
|---|---|---|---|
| VISITING FREQUENCY (HIGH) | 1000000 | — | |
| VISITING FREQUENCY (MIDDLE) | 500000 | IMPLEMENTED | 500000 |
| VISITING FREQUENCY (LOW) | 100000 | IMPLEMENTED | 500000 |

CONFIGURATION OF CLIENT TERMINAL

CONFIGURATION OF ANALYSIS SERVER

CONFIGURATION OF HALL MANAGEMENT SERVER

FUNCTIONAL BLOCKS OF CLIENT TERMINAL

FUNCTIONAL BLOCKS OF ANALYSIS SERVER

FUNCTIONAL BLOCKS OF HALL MANAGEMENT SERVER

FIG. 49

| DAILY OPERATION REPORT | FUNCTIONS AND OBJECTIVES OF REPORTS |
|---|---|
| ・OPERATION SUMMARY | ・SUMMARY OF OPERATION RELATED INDICES (WINLOSS, OPERATION RATIOS, NUMBERS OF SESSIONS, NUMBERS OF MEMBERS, AND THE LIKE) |
| ・WINLOSS ACCUMULATION | ・TARGET ACHIEVEMENT RATIOS AND PREDICTION ANALYSIS OF WINLOSS |
| ・WINLOSS COMPARISON | ・INDEX COMPARISON ANALYSIS OF WINLOSS, HOLD, AND OPERATION RATIOS |
| ・BET TRANSITION | ・TO DETECT BET FLUCTUATION RISKS |
| ・VALID SESSION TRANSITION | ・TO DETECT VALID SESSION FLUCTUATION RISKS |
| ・VALID MEMBER TRANSITION | ・TO DETECT VALID MEMBER FLUCTUATION RISKS |
| ・OPERATION UNIT TRANSITION | ・TRANSITION OF NUMBERS OF OPERATION MACHINES |
| ・OPERATION RATIO TRANSITION | ・TO DETECT MACHINE OPERATION RATIO FLUCTUATION RISKS |
| ・STOPPING RATIO TRANSITION | ・TO DETECT MACHINE STOPPING TIME FLUCTUATION RISKS |
| ・CAUTION-NEEDED SESSION TRANSITION | ・RISK MANAGEMENT OF CAUTION-NEEDED SESSIONS |
| ・TRANSITION DETAILS | ・TIME SERIES LISTS OF OPERATION RELATED INDICES |

FIG. 50

| DAILY FINANCIAL REPORT | FUNCTIONS AND OBJECTIVES OF REPORT |
|---|---|
| ·WINLOSS TRANSITION | ·TIME SERIES TRANSITION OF FUNDS BY WINLOSS |
| ·TRANSITION OF CURRENCY | ·TIME SERIES TRANSITION OF CURRENCY IN A CASHBOX |
| ·TRANSITION OF EACH CURRENCY | ·TIME SERIES TRANSITION OF EACH CURRENCY IN A CASHBOX |
| ·TRANSITION OF CASHLESS TRANSACTIONS | ·TIME SERIES TRANSITION OF CASHLESS TRANSACTIONS |
| ·CASHLESS CATEGORY | ·A BALANCE OF CASHLESS TRANSACTIONS BY COMPOSITION RATIOS OF CATEGORIES OF CASHLESS TRANSACTIONS (WAT, A COUPON, AND A TICKET) |
| ·TRANSITION OF POINTS | ·A BALANCE OF POINTS |

FIG. 51

| MONTHLY OPERATION REPORT | FUNCTIONS AND OBJECTIVES OF REPORT |
|---|---|
| ·OPERATION SUMMARY | ·SUMMARY OF OPERATION RELATED INDICES (WINLOSS, OPERATION RATIOS, NUMBERS OF SESSIONS, NUMBERS OF MEMBERS, AND THE LIKE) |
| · WINLOSS ACCUMULATION | ·TARGET ACHIEVEMENT RATIOS AND PREDICTION ANALYSIS OF WINLOSS |
| ·WINLOSS COMPARISON | ·INDEX COMPARISON ANALYSIS OF WINLOSS, HOLD, AND OPERATION RATIOS |
| ·BET TRANSITION | ·TO DETECT BET FLUCTUATION RISKS |
| ·VALID SESSION TRANSITION | ·TO DETECT VALID SESSION FLUCTUATION RISKS |
| ·VALID MEMBER TRANSITION | ·TO DETECT VALID MEMBER FLUCTUATION RISKS |
| ·OPERATION UNIT TRANSITION | TRANSITION OF NUMBERS OF OPERATION MACHINES |
| ·OPERATION RATIO TRANSITION | ·TO DETECT MACHINE OPERATION RATIO FLUCTUATION RISKS |
| ·STOPPING RATIO TRANSITION | ·TO DETECT MACHINE STOPPING TIME FLUCTUATION RISKS |
| ·CAUTION-NEEDED SESSION TRANSITION | ·RISK MANAGEMENT OF CAUTION-NEEDED SESSIONS |
| ·TRANSITION DETAILS | ·TIME SERIES LISTS OF OPERATION RELATED INDICES |

FIG. 52

| MONTHLY FINANCIAL REPORT | FUNCTIONS AND OBJECTIVES OF REPORT |
|---|---|
| • WINLOSS TRANSITION | • TIME SERIES TRANSITION OF FUNDS BY WINLOSS |
| • TRANSITION OF CURRENCY | • TIME SERIES TRANSITION OF CURRENCY IN A CASHBOX |
| • TRANSITION OF EACH CURRENCY | • TIME SERIES TRANSITION OF EACH CURRENCY IN A CASHBOX |
| • TRANSITION OF CASHLESS TRANSACTIONS | • TIME SERIES TRANSITION OF CASHLESS TRANSACTIONS |
| • CASHLESS CATEGORY | • A BALANCE OF CASHLESS TRANSACTIONS BY COMPOSITION RATIOS OF CATEGORIES OF CASHLESS TRANSACTIONS (WAT, A COUPON, AND A TICKET) |
| • TRANSITION OF POINTS | • A BALANCE OF POINTS |

FIG. 53

| MONTHLY DIAGNOSIS REPORT | FUNCTIONS AND OBJECTIVES OF REPORT |
|---|---|
| ・BALANCE BETWEEN DEGREES OF SATISFACTION | ・ADMINISTRATION BALANCE DIAGNOSIS IN CONSIDERATION OF A DEGREE OF SATISFACTION OF CUSTOMERS |
| TRANSITION OF A BALANCE BETWEEN DEGREES OF SATISFACTION | ・TIME SERIES DETAILS OF AN ADMINISTRATION BALANCE IN CONSIDERATION OF THE DEGREE OF SATISFACTION OF CUSTOMERS |
| ・POPULARITY MATCHING | ・MACHINE POPULARITY MATCHING VIEWED FROM A MACHINE COMPOSITION RATIO AND A PLAYING TIME PERIOD RATIO |
| ・ATTRIBUTE MATCHING | ・MACHINE ATTRIBUTE MATCHING VIEWED FROM THE MACHINE COMPOSITION RATIO AND THE PLAYING TIME PERIOD RATIO |
| ・FEATURE ATTRIBUTE MATCHING | ・MACHINE FEATURE ATTRIBUTE MATCHING VIEWED FROM THE MACHINE COMPOSITION RATIO AND THE PLAYING TIME PERIOD RATIO |

FIG. 55

| DAILY MACHINE OPERATION REPORT | FUNCTIONS AND OBJECTIVES OF REPORT |
| --- | --- |
| ・OPERATION SUMMARY | ・SUMMARY OF OPERATION RELATED INDICES (WINLOSS/UNIT, PLAYING TIME PERIOD/UNIT, AND THE LIKE) |
| ・WINLOSS COMPARISON | ・INDEX COMPARISON ANALYSIS OF THE WINLOSS/UNIT AND THE BET/UNIT |
| ・BET TRANSITION | ・TO DETECT BET/UNIT FLUCTUATION RISKS |
| ・STOPPING TIME RANKING | ・STOPPING TIME RANKING OF MACHINES |
| ・CAUTION-NEEDED SESSION RANKING | ・RANKING OF THE MACHINES OF CAUTION-NEEDED SESSIONS |

FIG. 56

| MONTHLY MACHINE OPERATION REPORT | FUNCTIONS AND OBJECTIVES OF REPORT |
|---|---|
| ・OPERATION SUMMARY | ・SUMMARY OF OPERATION RELATED INDICES (WINLOSS/UNIT, PLAYING TIME PERIOD/UNIT, AND THE LIKE) |
| ・WINLOSS COMPARISON | ・INDEX COMPARISON ANALYSIS OF THE WINLOSS/UNIT AND THE BET/UNIT |
| ・BET TRANSITION | ・TO DETECT BET/UNIT FLUCTUATION RISKS |
| ・STOPPING TIME RANKING | ・STOPPING TIME RANKING OF MACHINES |
| ・CAUTION-NEEDED SESSION RANKING | ・RANKING OF THE MACHINES OF CAUTION-NEEDED SESSIONS |

FIG. 57

| MONTHLY MACHINE POPULARITY REPORT | FUNCTIONS AND OBJECTIVES OF REPORT |
|---|---|
| • BET THEME RANKING | • BET THEME RANKING |
| • GAME TYPE ATTRIBUTES | • BET RATIOS OF GAME TYPES |
| • DENOMINATION ATTRIBUTES | • BET RATIOS OF DENOMINATIONS |
| • THEME ATTRIBUTES | • BET RATIOS OF THEMES |
| • VENDOR ATTRIBUTES | • BET RATIOS OF MAKERS |
| • BASE PO ATTRIBUTES | • BET RATIOS OF BASE POS |
| • MATCHING CLASS ATTRIBUTES | • BET RATIOS OF MACHINE ATTRIBUTE CLASSES |
| • POPULARITY DEGREES OF GAME TYPES | • MEMBER RATIOS OF GAME TYPES |
| • POPULARITY DEGREES OF DENOMINATIONS | • MEMBER RATIOS OF DENOMINATIONS |
| • POPULARITY DEGREES OF THEMES | • MEMBER RATIOS OF THEMES |
| • POPULARITY DEGREES OF VENDORS | • MEMBER RATIOS OF MAKERS |
| • POPULARITY DEGREES OF BASE POS | • MEMBER RATIOS OF BASE POS |
| • DEGREES OF POPULARITY OF MATCHING CLASSES | • MEMBER RATIOS OF MACHINE ATTRIBUTE CLASSES |

FIG. 58

| MONTHLY MACHINE DIAGNOSIS REPORT | FUNCTIONS AND OBJECTIVES OF REPORT |
|---|---|
| ・OPERATION BALANCE SUMMARY | ・OPERATION BALANCE SUMMARY OF AN OPERATION RATIO AND A PROFITABILITY (BET/H) |
| ・OPERATION BALANCE TRANSITION | ・TIME SERIES DETAILS OF AN OPERATION BALANCE OF THE OPERATION RATIO AND THE PROFITABILITY (BET/H) |
| ・SATISFACTION DEGREE BALANCE SUMMARY | ・A BALANCE BETWEEN A DEGREE OF SATISFACTION OF A HALL STORE AND A DEGREE OF SATISFACTION OF CUSTOMERS BY USING A NUMBER-OF-MACHINES DISTRIBUTION |
| ・TRANSITION OF A BALANCE BETWEEN DEGREES OF SATISFACTION | ・THE BALANCE BETWEEN A DEGREE OF SATISFACTION OF A HALL STORE AND A DEGREE OF SATISFACTION OF CUSTOMERS BY USING TIME SERIES DETAILS OF THE NUMBER-OF-MACHINES DISTRIBUTION |
| ・A DEGREE OF SATISFACTION OF MACHINES | ・MACHINE DISTRIBUTION OF THE BALANCE BETWEEN DEGREES OF SATISFACTION OF A HALL STORE AND CUSTOMERS |

FIG. 60

| DAILY PLAYER OPERATION REPORT | FUNCTIONS AND OBJECTIVES OF REPORT |
|---|---|
| • OPERATION SUMMARY | • SUMMARY OF OPERATION RELATED INDICES (WINLOSS/SESSION, PLAYING TIME PERIOD (MINUTES)/SESSION, AND THE LIKE) |
| • WINLOSS COMPARISON | • AN INDEX COMPARISON ANALYSIS OF THE WINLOSS/SESSION AND THE PLAYING TIME PERIOD (MINUTES)/SESSION |
| • BET TRANSITION | • TO DETECT BET/SESSION FLUCTUATION RISKS |
| • CAUTION-NEEDED SESSION RANKING | • WINLOSS RANKING OF CAUTION-NEEDED SESSIONS |

FIG. 61

| MONTHLY PLAYER OPERATION REPORT | FUNCTIONS AND OBJECTIVES OF REPORT |
|---|---|
| ・OPERATION SUMMARY | ・SUMMARY OF OPERATION RELATED INDICES (WINLOSS/SESSION, PLAYING TIME PERIOD (MINUTES)/SESSION, AND THE LIKE) |
| ・WINLOSS COMPARISON | ・AN INDEX COMPARISON ANALYSIS OF THE WINLOSS/SESSION AND THE PLAYING TIME PERIOD (MINUTES)/SESSION |
| ・BET TRANSITION | ・TO DETECT BET/SESSION FLUCTUATION RISKS |
| ・CAUTION-NEEDED SESSION RANKING | ・WINLOSS RANKING OF CAUTION-NEEDED SESSIONS |

FIG. 62

| MONTHLY PLAYER ATTRIBUTE REPORT | FUNCTIONS AND OBJECTIVES OF REPORT |
|---|---|
| • PLAYER-TYPE BET RANKING | • PLAYER-TYPE BET RANKING |
| • PLAYER-TYPE ATTRIBUTES | • PLAYER-TYPE BET RATIOS |
| • MATCHING CLASS ATTRIBUTES | • PLAYER-ATTRIBUTE BET RATIOS |
| • PLAYER-TYPE DEGREE OF POPULARITY | • PLAYER-TYPE RATIOS OF A SLOT GAME AND A TABLE GAME |
| • MATCHING CLASS DEGREE OF POPULARITY | • PLAYER-ATTRIBUTE RATIOS OF A SLOT GAME AND A TABLE GAME |

FIG. 63

| MONTHLY PLAYER DIAGNOSIS REPORT | FUNCTIONS AND OBJECTIVES OF REPORT |
| --- | --- |
| • WINLOSS SESSION RATIO TRANSITION | • TIME SERIES DETAILS OF SESSION WINNING-AND-LOSING RATIOS |
| • CANDLESTICK RATIO TRANSITION | • TIME SERIES DETAILS OF CANDLE SHAPES IN SESSIONS |

FIG. 65

| DAILY MEMBER OPERATION REPORT | FUNCTIONS AND OBJECTIVES OF REPORT |
|---|---|
| • OPERATION SUMMARY | • SUMMARY OF OPERATION RELATED INDICES (WINLOSS/SESSION, PLAYING TIME PERIOD (MINUTES)/SESSION, AND THE LIKE) |
| • WINLOSS COMPARISON | • AN INDEX COMPARISON ANALYSIS OF THE WINLOSS/ SESSION AND THE PLAYING TIME PERIOD (MINUTES)/SESSION |
| • BET TRANSITION | • TO DETECT BET/SESSION FLUCTUATION RISKS |
| • CAUTION-NEEDED SESSION RANKING | • WINLOSS RANKING OF CAUTION-NEEDED SESSIONS |

FIG. 66

| MONTHLY MEMBER OPERATION REPORT | FUNCTIONS AND OBJECTIVES OF REPORT |
|---|---|
| ·OPERATION SUMMARY | ·SUMMARY OF OPERATION RELATED INDICES (WINLOSS/SESSION, PLAYING TIME PERIOD (MINUTES)/SESSION, AND THE LIKE) |
| ·WINLOSS COMPARISON | ·AN INDEX COMPARISON ANALYSIS OF THE WINLOSS/SESSION AND THE PLAYING TIME PERIOD (MINUTES)/SESSION |
| ·BET TRANSITION | ·TO DETECT BET/SESSION FLUCTUATION RISKS |
| ·CAUTION-NEEDED SESSION RANKING | ·WINLOSS RANKING OF CAUTION-NEEDED SESSIONS |

FIG. 67

| MONTHLY MEMBER ATTRIBUTE REPORT | FUNCTIONS AND OBJECTIVES OF REPORT |
|---|---|
| • BY-NATIONALITY BET RANKING | • BY-NATIONALITY BET RANKING |
| • BY-NATIONALITY ATTRIBUTES | • BY-NATIONALITY BET RATIOS |
| • BY-SEX ATTRIBUTES | • BY-SEX BET RATIOS |
| • BY-AGE ATTRIBUTES | • BY-AGE BET RATIOS |
| • BY-STORE-VISITING-INTERVAL ATTRIBUTES | • BY-STORE-VISITING-INTERVAL BET RATIOS |
| • BY-VISITING-FREQUENCY AND BY-BET-AMOUNT ATTRIBUTES | • BY-VISITING-FREQUENCY AND BY-USED-BET-AMOUNT BET RATIOS |
| • BY-NATIONALITY POPULARITY DEGREE | • BY-NATIONALITY RATIOS OF A SLOT GAME AND A TABLE GAME |
| • BY-SEX POPULARITY DEGREE | • BY-SEX RATIOS OF A SLOT GAME AND A TABLE GAME |
| • BY-AGE POPULARITY DEGREE | • BY-AGE RATIOS OF A SLOT GAME AND A TABLE GAME |
| • BY-STORE-VISITING-INTERVAL POPULARITY DEGREE | • BY-STORE-VISITING-INTERVAL RATIOS OF A SLOT GAME AND A TABLE GAME |
| • BY-VISITING-FREQUENCY AND BY-BET-AMOUNT POPULARITY DEGREE | • BY-VISITING-FREQUENCY AND BY-USED-BET-AMOUNT RATIOS OF A SLOT GAME AND A TABLE GAME |

FIG. 68

| MONTHLY MEMBER DIAGNOSIS REPORT | FUNCTIONS AND OBJECTIVES OF REPORT |
|---|---|
| ▪PLAYER SATISFACTION DEGREE SCORE RANKING | ▪RANKING OF DEGREES OF SATISFACTION OF CUSTOMERS |

FIG. 70

| REAL TIME MONITORING | FUNCTIONS AND OBJECTIVES OF REPORT |
|---|---|
| ・SESSION | ・A STORE VISITING STATE OF A PLAYER AND AN ALERT RELATED TO A CAUTION-NEEDED SESSION |
| ・EVENT | ・MACHINE STATUSES (STATES OF A STACKER, A JACKPOT, A HAND PAY, AND MAINTENANCE) |
| ・METER | ・TO DETECT A CAUTION-NEEDED MACHINE BY METER DATA |
| ・TEMPERATURE | ・DISTRIBUTION OF MACHINE TEMPERATURES |
| ・HUMIDITY | ・DISTRIBUTION OF MACHINE HUMIDITY |
| ・VOLTAGE | ・DISTRIBUTION OF MACHINE VOLTAGES |
| ・PHONE CALL | ・PHONE CALL STATUSES |
| ・CAMERA ANGLE (OPTION) | ・MONITORING CAMERAS AND RANGES OF VISION |
| ・TEMPERATURE EVALUATION (OPTION) | ・TEMPERATURE MAP OF THE WHOLE FLOOR |
| ・PHONE CALL LINE (OPTION) | ・IMAGE OF PHONE CALL LINES |

FIG. 71

| REAL TIME REPORT | FUNCTIONS AND OBJECTIVES OF REPORT |
| --- | --- |
| ・SUMMARY | ・SUMMARY OF OPERATION INDICES (FOR THAT DAY) |
| ・CHART | ・TIME SCALE CHART (WINLOSS, BETS, SESSIONS, MEMBERS, AND OPERATION RATIOS) |

FIG. 73

| PLAYER PSYCHOLOGICAL ANALYSIS | FUNCTIONS AND OBJECTIVES OF REPORT |
|---|---|
| •PSYCHOLOGY SUMMARY | •MONTHLY PSYCHOLOGICAL ATTRIBUTE MACHINE LIST |
| •PSYCHOLOGY TIME SERIES LIST | •BY-MACHINE MONTHLY PSYCHOLOGICAL ATTRIBUTE LIST |
| •CANDLESTICK CHARTS | •MONTHLY AND BY-MACHINE PSYCHOLOGICAL ANALYSIS CANDLESTICK CHARTS |

FIG. 74A

| MACHINE WAVE MOTION ANALYSIS | FUNCTIONS AND OBJECTIVES OF REPORT |
| --- | --- |
| ・WAVE MOTION SUMMARY | ・GAME ATTRIBUTE MACHINE LIST |
| ・WAVE MOTION CHART | ・BY-MACHINE WINLOSS/BET WAVE MOTION CHART |

FIG. 74B

| FAILURE ANALYSIS | FUNCTIONS AND OBJECTIVES OF REPORT |
| --- | --- |
| ・FAILURE SUMMARY | ・MACHINE LIST OF MONTHLY NUMBERS OF TIMES OF FAILURE |
| ・DETAILS OF NUMBERS OF TIMES OF FAILURE | ・DETAILED LIST OF MONTHLY AND BY-MACHINE NUMBERS OF TIMES OF FAILURE |

FIG. 75A

| FRAUDULENCE ANALYSIS | FUNCTIONS AND OBJECTIVES OF REPORT |
|---|---|
| ▪FRAUDULENCE SUMMARY | ▪MONTHLY CAUTION-NEEDED SESSION LIST, CAUTION-NEEDED MACHINE LIST, AND CAUTION-NEEDED MEMBER LIST |

FIG. 75B

| CORRELATION ANALYSIS | FUNCTIONS AND OBJECTIVES OF REPORT |
|---|---|
| ▪CORRELATION SUMMARY AND DETAILS | ▪INDEX-AND-CATEGORY-CORRELATION COEFFICIENT SUMMARY AND DETAILS |

FIG. 77A

| AD HOC REPORT TOOL | FUNCTIONS AND OBJECTIVES OF REPORT |
|---|---|
| ・REPORT SELECTION | ・REPORT SELECTION |
| ・REPORT REFERENCE | ・REPORT REFERENCE |
| ・AD HOC REPORT TOOL | ・CUSTOMIZED REPORT CREATION TOOL |

FIG. 77B

| MACHINE ANALYSIS | FUNCTIONS AND OBJECTIVES OF REPORT |
|---|---|
| ・MACHINE LIST | ・MACHINE LIST (A BASE, OPERATION STATUSES, ATTRIBUTES, AND FAILURE) |

FIG. 78A

| MEMBER ANALYSIS | FUNCTIONS AND OBJECTIVES OF REPORT |
| --- | --- |
| ▪MEMBER LIST | ▪MEMBER LIST (INDIVIDUALS, A BASE, AND CATEGORIES) |

FIG. 78B

| SIMULATION TOOL | FUNCTIONS AND OBJECTIVES OF REPORT |
| --- | --- |
| ▪SIMULATION TOOL | ▪SIMULATION FOR PROMOTION<br>▪SIMULATION RELATED TO AN OPERATION |

USE CASE RELATED TO OWNER

FIG. 81

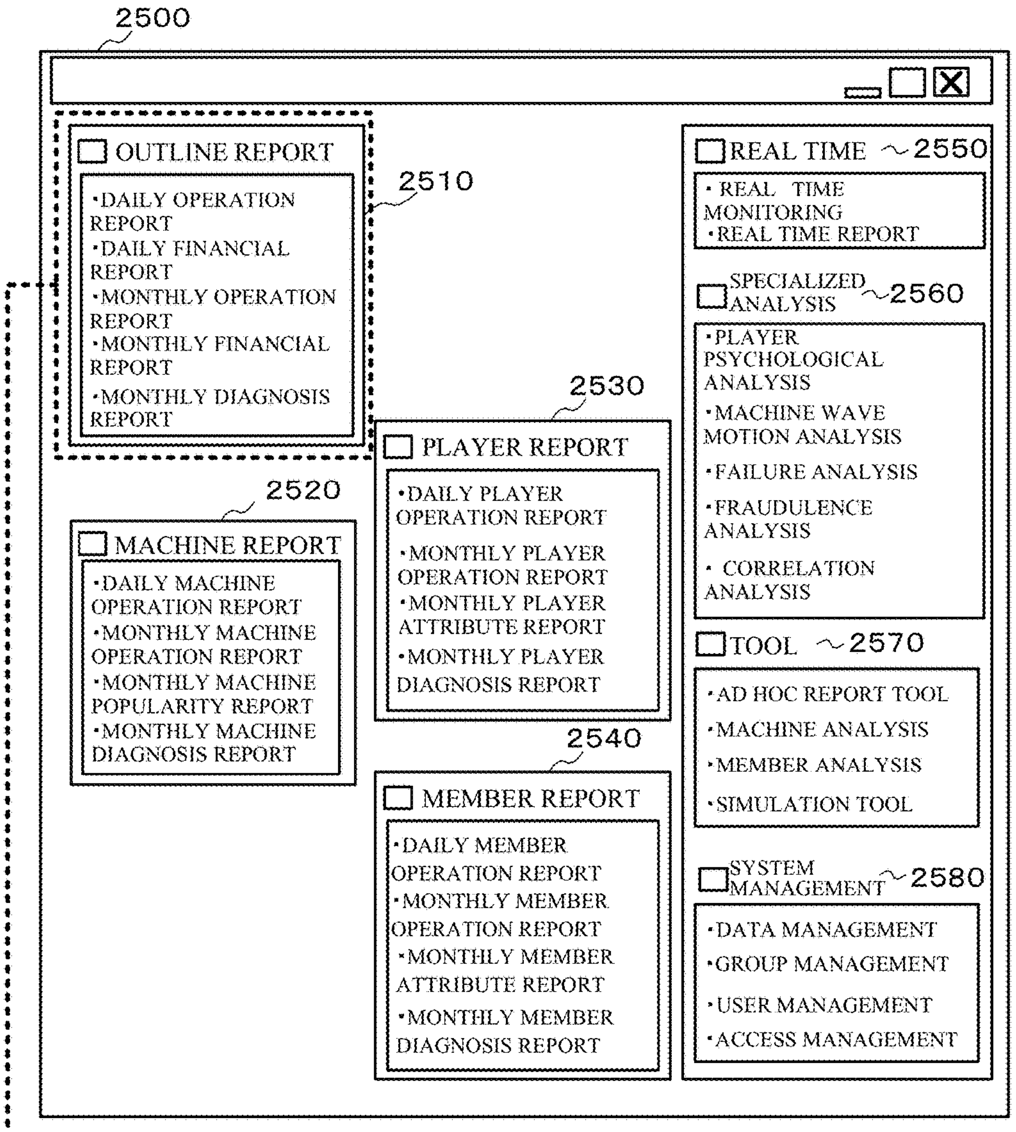

<USE CASE RELATED TO OWNER>

MANAGEMENT OF OPERATION INDICES

·CONFIRMATION OF INDICES RELATED TO SALES, OPERATION, AND VISITORS

SALES RISK MANAGEMENT

·RISK MANAGEMENT THROUGH CONFIRMATION OF AN ACTUAL ACHIEVEMENT VALUE AND A PREDICTIVE VALUE WITH RESPECT TO A TARGET VALUE

ADMINISTRATION BALANCE DIAGNOSIS

·BALANCE DIAGNOSIS OF AN ADMINISTRATION STATE FROM A POINT OF VIEW OF CUSTOMERS

FIG. 82

OPERATION SUMMARY (DAILY)

ITEM SUMMARY

OCTOBER 21, 2014

| ITEM | ACTUAL NUMERICAL VALUE | AVERAGE VALUE IN COMPARISON TARGET TIME PERIOD | CHANGE RATIO (%) | BUDGET | BUDGET USE RATIO (%) |
|---|---|---|---|---|---|
| **Winloss** | 283, 021. 83 | 435, 104. 70 | −34. 95 | 500, 000. 00 | 56. 60 |
| TOTAL OF BETS | 9, 027, 148. 50 | 9, 722, 330. 92 | −7. 15 | — | — |
| TOTAL OF PAYOUTS | 8, 705, 305. 35 | 9, 248, 185. 02 | −5. 87 | — | — |
| JACKPOT | 38, 821. 32 | 39, 041. 20 | −0. 56 | — | — |
| HOLD (%) | 3. 14 | 4. 54 | −30. 87 | — | — |
| OPERATION RATIO (%) | 19. 83 | 19. 32 | 2. 65 | — | — |
| PLAYING TIME PERIOD (H) | 842. 27 | 859. 08 | −1. 96 | — | — |
| NUMBER OF GAMES | 399, 830 | 402, 137 | −0. 57 | — | — |
| NUMBER OF UNITS | 177 | 185 | −4. 43 | — | — |
| NUMBER OF SESSIONS | 2, 161 | 2, 214 | −2. 37 | — | — |
| NUMBER OF MEMBERS | 36 | 48 | −24. 53 | — | — |

FIG. 88

STOPPING TIME RANKING OF MACHINES (MONTHLY)

STOPPING TIME RANKING OF MACHINES

OCTOBER IN 2014

| RANKING | MACHINE ID | TOTAL STOPPING TIME/UNIT |
|---|---|---|
| 1 | 0085<br>0. 50<br>THEME A1<br>COMPANY A | 543. 27 |
| 2 | 0043<br>1. 00<br>THEME B4<br>COMPANY B | 543. 26 |
| 3 | 0053<br>THEME A3<br>COMPANY A | 541. 12 |

FIG. 89

FRAUDULENCE SUMMARY

STATISTICS OF CAUTION-NEEDED SESSIONS

TO GRASP A MONEY AMOUNT PAID OUT IN EACH SESSION WHOSE RATIO WITH RESPECT TO SALES HAS BECOME ABNORMAL IS DETERMINED AS A CAUTION-NEEDED SESSION AMONG SESSIONS, IN EACH OF WHICH WINNING HAS OCCURRED

| | CAUTION-NEEDED SESSION |
|---|---|
| NUMBER OF SESSIONS | 59 |
| TOTAL OF BETS | 3, 450, 801. 00 |
| Winloss | −633, 987. 00 |

LIST OF ABNORMAL SESSIONS

USED TO DETERMINE WHETHER PLAYERS GRASPED FROM A LIST OF SUSPECTED SESSIONS ARE PRESENT

LIST OF CAUTION-NEEDED SESSIONS | LIST OF CAUTION-NEEDED MACHINES | LIST OF CAUTION-NEEDED MEMBERS

| START DATE AND TIMES | TERMINATION DATE AND TIME | IDENTIFICATION ID | PLAYER ID | MACHINE ID | MAKER | THEME | PLAYING TIME PERIOD (H) | TOTAL OF BETS | Winloss | BET/Game |
|---|---|---|---|---|---|---|---|---|---|---|
| 2014-10-09 7:31:42 | 2014-10-09 8:00:29 | 2276533 | | 0202 | COMPANY A | A1 | 0.43 | 285,275.00 | −79,050.00 | 973.63 |
| 2014-10-09 6:03:41 | 2014-10-09 6:23:38 | 2276911 | | 0011 | COMPANY A | A3 | 0.3[illegible] | 246,950.00 | −69,950.00 | 976.09 |
| 2014-10-09 6:25:00 | 2014-10-09 6:42:36 | 2276413 | | 0012 | COMPANY A | A2 | 0.29 | 96,750.00 | −43,760.00 | 948.53 |
| 2014-10-15 4:41:56 | 2014-10-15 4:50:01 | 2282920 | | 0160 | COMPANY B | B1 | 0.13 | 20,325.00 | −41,975.00 | 290.36 |
| 2014-10-08 10:38:17 | 2014-10-08 12:18:55 | 2275316 | | 0231 | COMPANY C | C1 | 1.67 | 331,345.00 | −31,737.00 | 2,808.01 |
| 2014-10-16 4:41:27 | 2014-10-16 4:52:43 | 2288765 | | 0159 | COMPANY B | B3 | 0.19 | 12,000.00 | −24,225.00 | 203.39 |
| 2014-10-08 10:05:23 | 2014-10-08 10:34:19 | 2275310 | | 0231 | COMPANY C | C1 | 0.48 | 94,405.00 | −24,002.00 | 2,776.62 |
| 2014-10-08 14:28:53 | 2014-10-08 15:10:31 | 2275970 | | 0230 | COMPANY C | C1 | 0.69 | 74,650.00 | −17,003.00 | 1,555.21 |
| 2014-10-10 7:02:11 | 2014-10-10 10:52:40 | 8838 | 179 | 0210 | COMPANY A | A1 | 3.84 | 512,948.00 | −17,000.00 | 223.21 |
| 2014-10-03 0:54:40 | 2014-10-03 1:04:08 | 2259759 | | 0217 | COMPANY A | A4 | 0.1[illegible] | 21,050.00 | −15,388.00 | 228.80 |
| 2014-10-07 10:48:22 | 2014-10-07 17:22:07 | 8838 | 179 | 0202 | COMPANY A | A1 | 6.56 | 885,303.00 | −14,500.00 | 220.94 |

USE CASE RELATED TO MARKETER

NUMBER OF GAMES - THEME

| SUMMARY | NUMBER OF GAMES |
|---|---|
| SUM | 9, 294, 694. 00 |
| AVG | 104, 434. 76 |
| MIN | 5. 00 |
| MAX | 818, 092. 00 |
| STD | 161, 754. 73 |

| THEME | NUMBER OF GAMES |
|---|---|
| A1 | 13, 174 |
| A2 | 28, 746 |
| B3 | 5, 237 |
| C2 | 36, 935 |

THEME POPULARITY DEGREE (CLASSIFIED BY AGES)

| SUMMARY | TOTAL OF BETS |
|---|---|
| SUM | 20, 131, 502. 00 |
| AVG | 1, 549, 977. 08 |
| MIN | 5, 690. 00 |
| MAX | 8, 925, 230. 00 |
| STD | 2, 360, 491. 24 |

FIG. 97
OPERATION DAYS OF WEEK CLASSIFIED BY MEMBER TYPES
| SUMMARY | TOTAL OF BETS |
|---|---|
| SUM | 81, 650, 959. 00 |
| AVG | 2, 333, 170. 64 |
| MIN | 101. 620. 00 |
| MAX | 8, 186, 138. 00 |
| STD | 2, 335, 425. 10 |
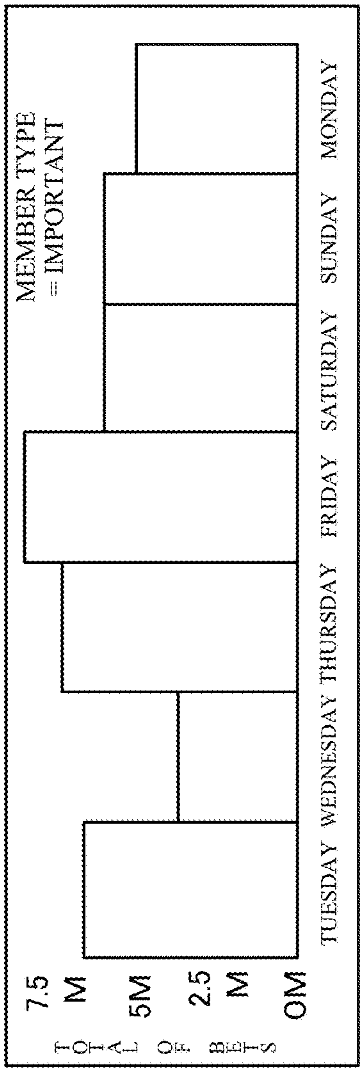
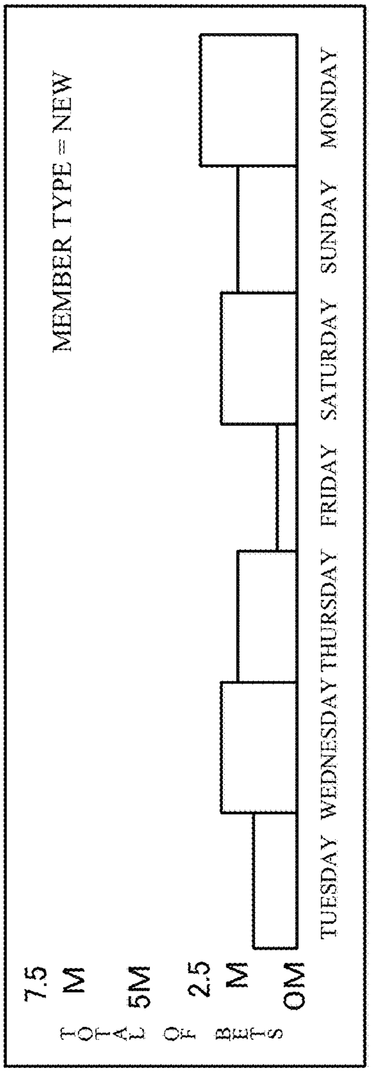

USE CASE RELATED TO OPERATOR

<USE CASE RELATED TO OPERATOR>

MONITORING OF OPERATION INDICES

·CONFIRMATION OF SALES AND STATES OF VISITORS FOR THAT DAY

MONITORING OF STATES OF VISITORS

·CONFIRMATION OF PLAYERS PLAYING GAMES ON A FLOOR MAP

MONITORING OF MACHINE OPERATION

·CONFIRMATION OF MALFUNCTIONING MACHINES ON A FLOOR MAP

FIG. 101

LIST OF MENU OF BASIC FUNCTION

| BASIC FUNCTION | MENU | DESCRIPTION |
|---|---|---|
| OUTLINE REPORT | — | ANALYSIS REPORT TARGETED FOR THE WHOLE HALL STORE |
| | DAILY OPERATION REPORT | REPORT OF AN OPERATION STATE OF THE WHOLE HALL STORE |
| | DAILY FINANCIAL REPORT | REPORT OF A FINANCIAL STATE OF THE WHOLE HALL STORE |
| | MONTHLY OPERATION REPORT | REPORT OF AN OPERATION STATE OF THE WHOLE HALL STORE |
| | MONTHLY FINANCIAL REPORT | REPORT OF A FINANCIAL STATE OF THE WHOLE HALL STORE |
| | MONTHLY DIAGNOSIS REPORT | REPORT OF AN ADMINISTRATION STATE OF THE WHOLE HALL STORE |
| MACHINE REPORT | — | ANALYSIS REPORT TARGETED FOR MACHINES |
| | DAILY MACHINE OPERATION REPORT | REPORT OF AN OPERATION STATE OF MACHINES |
| | MONTHLY MACHINE OPERATION REPORT | REPORT OF AN OPERATION STATE OF MACHINES |
| | MONTHLY MACHINE POPULARITY REPORT | REPORT OF A POPULARITY STATE OF MACHINES |
| | MONTHLY MACHINE DIAGNOSIS REPORT | REPORT OF AN ADMINISTRATION STATE OF MACHINES |
| PLAYER REPORT | — | ANALYSIS REPORT TARGETED FOR THE WHOLE PLAYERS |
| | DAILY PLAYER OPERATION REPORT | REPORT OF AN OPERATION STATE OF THE WHOLE PLAYERS |
| | MONTHLY PLAYER OPERATION REPORT | REPORT OF AN OPERATION STATE OF THE WHOLE PLAYERS |
| | MONTHLY PLAYER ATTRIBUTE REPOR | REPORT OF BEHAVIOR ATTRIBUTES OF THE WHOLE PLAYERS |
| | MONTHLY PLAYER DIAGNOSIS REPORT | REPORT OF A PSYCHOLOGICAL STATE OF THE WHOLE PLAYERS |
| MEMBER REPORT | — | ANALYSIS REPORT TARGETED FOR THE WHOLE MEMBERS |
| | DAILY MEMBER OPERATION REPORT | REPORT OF AN OPERATION STATE OF MEMBERS |
| | MONTHLY MEMBER OPERATION REPORT | REPORT OF AN OPERATION STATE OF MEMBERS |
| | MONTHLY MEMBER ATTRIBUTE REPORT | REPORT OF BEHAVIOR ATTRIBUTES OF MEMBERS |
| | MONTHLY MEMBER DIAGNOSIS REPORT | REPORT OF A PSYCHOLOGICAL STATE OF MEMBERS |

FIG. 102

LIST OF MENU OF ACCESSORY FUNCTION

| BASIC FUNCTION | MENU | DESCRIPTION |
|---|---|---|
| REAL TIME | — | GRASPING OF STATES OF A HALL STORE ON THAT DAY IN REAL TIME |
| | REAL TIME MONITORING | REPORTING AN OPERATION STATE OF THE WHOLE HALL STORE IN REAL TIME |
| | REAL TIME REPORT | MONITORING OF OPERATION STATES OF MACHINES AND CUSTOMERS ON A FLOOR MAP IN REAL TIME |
| SPECIALIZED ANALYSIS | — | HIGHLY SPECIALIZED ANALYSES CLASSIFIED BY OBJECTIVES |
| | PLAYER PSYCHOLOGICAL ANALYSIS | A FUNCTION OF CLASSIFYING WINNING AND LOSING PATTERNS OF CUSTOMERS (SESSIONS) FROM MACHINE OPERATION DATA AND CLASSIFYING PSYCHOLOGICAL STATES OF CUSTOMERS |
| | MACHINE WAVE MOTION ANALYSIS | A FUNCTION OF TOTALIZING INDICES INDICATING GAME ATTRIBUTES FROM MACHINE OPERATION DATA AND CLASSIFYING GAME PROPERTY PATTERNS |
| | FAILURE ANALYSIS | A FUNCTION OF TOTALIZING NUMBERS OF TIMES OF FAILURE CLASSIFIED BY CAUSES FROM A MACHINE EVENT LOG AND CALCULATING STOPPING TIME |
| | FRAUDULENCE ANALYSIS | A FUNCTION OF EXTRACTING EACH CUSTOMER (SESSION) WHO IS SUSPECTED OF COMMITTING A FRAUDULENT ACT (IN WHICH A FRAUDULENT ACT IS SUSPECTED) FROM MACHINE OPERATION DATA |
| | CORRELATION ANALYSIS | A FUNCTION OF EXTRACTING EACH COMBINATION OF AN INDEX AND A CATEGORY AMONG INDICES AND AMONG CATEGORIES, WHOSE CORRELATIVE RELATIONSHIP IN TIME SERIES CHANGE IS HIGH |
| TOOL | — | ANALYSIS TOOL BY A USER HIMSELF OR HERSELF |
| | AD HOC REPORT TOOL | A FUNCTION OF ALLOWING A USER HIMSELF OR HERSELF TO OUTPUT AN ARBITRARY REPORT BY USING A DATABASE |
| | MACHINE LIST | A FUNCTION OF DISPLAYING A LIST OF ALL MACHINES |
| | MEMBER LIST | A FUNCTION OF DISPLAYING A LIST OF ALL MEMBERS |
| | SIMULATION TOOL | A FUNCTION OF MAKE A TRIAL CALCULATION FOR SALES/NUMBER OF MEMBERS OR THE LIKE WHEN PARAMETERS ARE CHANGED WITH REFERENCE TO THE PAST ACTUAL ACHIEVEMENT DATA |
| SYSTEM MANAGEMENT | — | A FUNCTION RELATED TO SYSTEM OPERATIONAL MANAGEMENT |
| | DATA MANAGEMENT | A FUNCTION OF CONDUCTING MAINTENANCE FOR DATA AND ALGORITHM BY A USER |
| | GROUP MANAGEMENT | A FUNCTION OF DEFINING AUTHORIZATION FOR UTILIZING A SYSTEM |
| | USER MANAGEMENT | A FUNCTION OF REGISTERING A USER UTILIZING A SYSTEM |
| | ACCESS MANAGEMENT | A FUNCTION OF DISPLAYING AN ACCESS HISTORY OF A USER UTILIZING A SYSTEM |

FIG. 103

BASIC INDICES

| INDEX NAME | DESCRIPTION | OBTAINMENT AND TOTALIZATION METHOD |
|---|---|---|
| INPUT MONEY AMOUNT (IN) | A MONEY AMOUNT INPUTTED BY A PLAYER | OBTAINED FROM A HALL MANAGEMENT SERVER |
| TO-BE-PAID-OUT MONEY AMOUNT (OUT) | A MONEY AMOUNT PAID OUT BY A SLOT MACHINE | OBTAINED FROM A HALL MANAGEMENT SERVER |
| JACKPOT MONEY AMOUNT (JP) | A JACKPOT MONEY AMOUNT PAID OUT BY A SLOT MACHINE | OBTAINED FROM A HALL MANAGEMENT SERVER |
| PLAY SALES MONEY AMOUNT (WINLOSS) | SALES MONEY AMOUNT BASED ON A DIFFERENCE BETWEEN AN INPUT MONEY AMOUNT AND A PAID-OUT MONEY AMOUNT | IN−(OUT+JP) |
| NUMBER OF GAMES (GAMES) | A NUMBER OF GAMES | OBTAINED FROM A HALL MANAGEMENT SERVER OR CALCULATED FROM INFORMATION OBTAINED FROM THE HALL MANAGEMENT SERVER |
| PLAYING TIME PERIOD | A TIME PERIOD FROM GAME START TO GAME TERMINATION | CALCULATED FROM TIME INFORMATION OBTAINED FROM THE HALL MANAGEMENT SERVER |
| NUMBER OF SESSIONS | A NUMBER OF SESSIONS | CALCULATED FROM IDENTIFICATION INFORMATION OBTAINED FROM THE HALL MANAGEMENT SERVER |

FIG. 104

MACHINE BASIC INDICES

| INDEX NAME | DESCRIPTION | OBTAINMENT AND TOTALIZATION METHOD |
|---|---|---|
| OPERATION RATIO | A MACHINE OPERATION RATIO | A PLAYING TIME PERIOD/BUSINESS HOURS |
| STOPPING TIME | A SERVICE STOPPING TIME OTHER THAN A FAILURE TOPPING TIME | RESTART EVENT OCCURRING TIME – STOP EVENT OCCURRING TIME |
| FAILURE TIME | A SERVICE STOPPING TIME BY MACHINE FAILURE | FROM-FAILURE-RECOVERY EVENT OCCURRING TIME (OR SESSION START TIME) – FAILURE EVENT OCCURRING TIME |
| HAND PAY TIME | A MANUAL HAND PAY TIME | A MANUAL HAND PAY FINISHING TIME – A MANUAL HAND PAY OCCURRING TIME |
| OTHER STOPPING TIME | A STOPPING TIME EXCLUDING A FAILURE TIME AND A HAND PAY TIME | A STOPPING TIME – A FAILURE TIME – A HAND PAY TIME |
| NUMBER OF OPERATION DAYS/MACHINE | A NUMBER OF VALID INSTALLED MACHINES | OBTAINED FROM A HALL MANAGEMENT SERVER |
| NUMBER OF MACHINES (REGISTERED NUMBER) | A NUMBER OF REGISTERED MACHINES | |
| ACTUALLY MEASURED POS | A PO RATIO IN A TIME PERIOD OR A GAME SECTION | (OUT+JP)/IN×100 |
| AVERAGE BET PER GAME | A BET AMOUNT PER GAME | Bet/Games |
| NUMBER OF TIMES OF A FAILURE EVENT | A NUMBER OF TIMES OF A FAILURE EVENT | A PREDETERMINED RECORD NUMBER OBTAINED FROM THE HALL MANAGEMENT SERVER |
| NUMBER OF TIMES OF A NON-FAILURE EVENT | A NUMBER OF TIMES OF A NON-FAILURE EVENT | A NUMBER OF TIMES OF EVENTS WHICH ARE NOT FAILURE EVENTS |
| HOLD RATIO (HOLD (%)) | A HOLD RATIO (HOLD (%)) | (1−(OUT+JP)/IN)×100 |

FIG. 105

PLAYER BASIC INDICES

| INDEX NAME | DESCRIPTION | OBTAINMENT AND TOTALIZATION METHOD |
|---|---|---|
| NUMBER OF MEMBERS | A NUMBER OF MEMBERS | |
| NUMBER OF TIMES OF STORE VISITING | A NUMBER OF TIMES OF STORE VISITING | |
| INTERVALS OF STORE VISITING | A NUMBER OF DAYS AT AN INTERVAL OF STORE VISITING | A NUMBER OF DAYS AT AN INTERVAL OF STORE VISITING = A NUMBER OF TIMES OF STORE VISITING/(A NUMBER OF DAYS BETWEEN THE INITIAL STORE VISITING DAY AND THE LATEST STORE VISITING DAY) (VALID IN A CASE WHERE A NUMBER OF DAYS ELAPSED FROM THE LAST STORE VISITING DAY IS A GHOST MEMBER THRESHOLD VALUE OR LESS) |
| NUMBER OF DAYS ELAPSED FROM THE LATEST STORE VISITING DAY | A NUMBER OF DAYS ELAPSED FROM THE LATEST STORE VISITING DAY | A NUMBER OF DAYS BETWEEN THE INITIAL STORE VISITING DAY AND THE LATEST STORE VISITING DAY |
| NUMBER OF STORE VISITING MEMBERS | A NUMBER OF STORE VISITING MEMBERS | |
| MEMBER RATIO (%) | A PERCENTAGE OF A NUMBER OF MEMBERS TO A TOTAL NUMBER OF PLAYERS IN A HALL STORE BASED ON BASIC INDEX VALUES | A NUMBER OF MEMBERS/A TOTAL NUMBER OF PLAYERS IN A HALL STORE 100 |
| CUSTOMER SATISFACTION DEGREE SCORE | A CUSTOMER SATISFACTION DEGREE SCORE (MONTHLY) | |

FIG. 106

BALANCE DETERMINATION INDICES (1)

| INDEX NAME | DESCRIPTION | EVALUATION DETERMINATION | DETERMINATION THRESHOLD VALUES | TOTALIZATION METHOD AND REMARKS |
|---|---|---|---|---|
| SATISFACTION DEGREE RANK | MAGNITUDES OF DEGREES OF SATISFACTION OBTAINED BY SYNTHESIZING DEGREES OF SATISFACTION OF A HALL STORE AND CUSTOMERS | 1. VERY DISSATISFIED<br>2. DISSATISFIED<br>3. MEDIUM<br>4. SATISFIED<br>5. VERY SATISFIED | THRESHOLD VALUES, SHOWN BY 1/4 FAN SHAPES WITH THE ORIGIN (0, 0) OF DEGREES OF SATISFACTION OF A HALL STORE AND CUSTOMERS AND WITH RADIUS SIZE<br>1. 0≦VERY DISSATISFIED<30×$\sqrt{2}$<br>2. 30×$\sqrt{2}$≦DISSATISFIED<40×$\sqrt{2}$<br>3. 40×$\sqrt{2}$≦MEDIUM<60×$\sqrt{2}$<br>4. 60×$\sqrt{2}$≦SATISFIED<70×$\sqrt{2}$<br>5. 70×$\sqrt{2}$≦VERY SATISFIED≦100×$\sqrt{2}$ | SATISFACTION DEGREE RANKS AND SATISFACTION DEGREE BALANCE |
| BALANCE BETWEEN DEGREES OF SATISFACTION | BIASING OF DEGREES OF SATISFACTION OBTAINED BY SYNTHESIZING DEGREES OF SATISFACTION OF A HALL STORE AND CUSTOMERS | 1. HALL STORE STRONGER<br>2. BIASED IN FAVOR OF A HALL STORE<br>3. MEDIUM<br>4. BIASED IN FAVOR OF CUSTOMERS<br>5. CUSTOMERS STRONGER | THRESHOLD VALUES, SHOWN BY 1/4 FAN SHAPES WITH THE ORIGIN (0, 0) OF DEGREES OF SATISFACTION OF A HALL STORE AND CUSTOMERS AND WITH RADIUS SIZES<br>1. 0≦HALL STORE STRONGER<15<br>2. 15≦BIASED IN FAVOR OF A HALL STOR<45<br>3. 45≦MEDIUM<55<br>4. 55≦BIASED IN FAVOR OF CUSTOMER<75<br>5. 75≦CUSTOMERS STRONGER≦90 | SATISFACTION DEGREE RANKS AND SATISFACTION DEGREE BALANCE |
| HALL STORE SATISFACTION DEGREE SCORE | STANDARDIZED SCORES OF WINLOSS/DAY/ MACHINE | MIN/MAX: 0/100<br><br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | HALL STORE SATISFACTION DEGREE SCORES |
| CUSTOMER SATISFACTION DEGREE SCORE | STANDARDIZED SCORES OF SYNTHESIZED VALUES OF PSYCHOLOGY DEGREES AND EXPECTED VALUES | MIN/MAX: 0/100<br><br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | CUSTOMER SATISFACTION DEGREE SCORES |

FIG. 107

BALANCE DETERMINATION INDICES (2)-1

| INDEX NAME | DESCRIPTION | EVALUATION DETERMINATION | DETERMINATION THRESHOLD VALUES | TOTALIZATION METHOD AND REMARKS |
|---|---|---|---|---|
| SHAPE PSYCHOLOGY SCORE | A CANDLE SHAPE SCORE IN EACH SESSION | MIN/MAX: 0/5000<br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | PSYCHOLOGY DEGREE ADDING METHOD |
| REVENUE AND EXPENDITURE PSYCHOLOGY SCORE | AN INCOME VALUE OF A PLAYER IN EACH SESSION | MIN/MAX: —/—<br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | PSYCHOLOGY DEGREE ADDING METHOD |
| SHADOW PSYCHOLOGY SCORE | A LENGTH OF EACH SHADOW IN EACH SESSION BEING 50% | MIN/MAX: 0/—<br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | PSYCHOLOGY DEGREE ADDING METHOD |
| VOLUME PSYCHOLOGY SCORE | A NUMBER OF GAMES IN EACH SESSION | MIN/MAX: 0/—<br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | PSYCHOLOGY DEGREE ADDING METHOD |
| WIN SESSION EXPECTED VALUE SCOR | AN AVERAGE AMOUNT OF AMOUNTS OBTAINED IN WINNING SESSIONS FOR ONE MONTH | MIN/MAX: 0/—<br>Low<br>Normal<br>High | Low: LESS THAN A VALUE OF AN AVERAGE VALUE - 1.5<br>Normal: WITHIN A VALUE OF AN AVERAGE VALUE ± 1.5<br>High: LARGER THAN A VALUE OF AN AVERAGE VALUE + 1.5<br>σ = STANDARD DEVIATION | PSYCHOLOGY DEGREE ADDING METHOD |

FIG. 108

BALANCE DETERMINATION INDICES (2)-2

| INDEX NAME | DESCRIPTION | EVALUATION DETERMINATION | DETERMINATION THRESHOLD VALUES | TOTALIZATION METHOD AND REMARKS |
|---|---|---|---|---|
| OPERATION BALANCE SCORE | AN AVERAGE OF AN OPERATION SCORE AND A REVENUE SCORE | 1. VERY BAD<br>2. BAD<br>3. MEDIUM<br>4. GOOD<br>5. VERY GOOD | THRESHOLD VALUES, SHOWN BY 1/4 FAN SHAPES WITH THE ORIGIN (0, 0) OF A BALANCE BETWEEN VALUES OF AN OPERATION AND A REVENUE AND WITH RADIUS SIZES<br>1. $0 \leqq$ VERY BAD $< 20 \times \sqrt{2}$<br>2. $20 \times \sqrt{2} \leqq$ BAD $< 40 \times \sqrt{2}$<br>3. $40 \times \sqrt{2} \leqq$ MEDIUM $< 60 \times \sqrt{2}$<br>4. $60 \times \sqrt{2} \leqq$ GOOD $< 80 \times \sqrt{2}$<br>5. $80 \times \sqrt{2} \leqq$ VERY GOOD $\leqq 100 \times \sqrt{2}$ | OPERATION BALANCE DETERMINATION |
| OPERATION SCORE | STANDARDIZED SCORES OF OPERATION RATIO | 1. VERY BAD<br>2. BAD<br>3. MEDIUM<br>4. GOOD<br>5. VERY GOOD | 1. $0 \leqq$ VERY BAD $< 20$<br>2. $20 \leqq$ BAD $< 40$<br>3. $40 \leqq$ MEDIUM $< 60$<br>4. $60 \leqq$ GOOD $< 80$<br>5. $80 \leqq$ VERY GOOD $\leqq 100$ | OPERATION SCORE |
| REVENUE SCORE | STANDARDIZED SCORES OF INPUT MONEY AMOUNT/ TIME | 1. VERY BAD<br>2. BAD<br>3. MEDIUM<br>4. GOOD<br>5. VERY GOOD | 1. $0 \leqq$ VERY BAD $< 20$<br>2. $20 \leqq$ BAD $< 40$<br>3. $40 \leqq$ MEDIUM $< 60$<br>4. $60 \leqq$ GOOD $< 80$<br>5. $80 \leqq$ VERY GOOD $\leqq 100$ | REVENUE SCORE |
| MEMBER SCORE | STANDARDIZED SCORES OF BET RATIOS OF MEMBERS | 1. VERY BAD<br>2. BAD<br>3. MEDIUM<br>4. GOOD<br>5. VERY GOOD | 1. $0 \leqq$ VERY BAD $< 20$<br>2. $20 \leqq$ BAD $< 40$<br>3. $40 \leqq$ MEDIUM $< 60$<br>4. $60 \leqq$ GOOD $< 80$<br>5. $80 \leqq$ VERY GOOD $\leqq 100$ | MEMBER SCORE |

FIG. 109

PSYCHOLOGY INDICES-1

| INDEX NAME | DESCRIPTION | EVALUATION DETERMINATION | DETERMINATION THRESHOLD VALUES | TOTALIZATION METHOD AND REMARKS |
|---|---|---|---|---|
| SATISFACTION DEGREE CLASS | SATISFACTION DEGREE RANKS OBTAINED BY USING DATA FROM EACH MACHINE | 1. VERY BAD<br>2. BAD<br>3. MEDIUM<br>4. GOOD<br>5. VERY GOOD | THRESHOLD VALUES, SHOWN BY 1/4 FAN SHAPES WITH THE ORIGIN (0, 0) OF DEGREES OF SATISFACTION OF A HALL STORE AND CUSTOMERS AND WITH RADIUS SIZE<br>1. $0 \leqq$ VERY DISSATISFIED $< 30 \times \sqrt{2}$<br>2. $30 \times \sqrt{2} \leqq$ DISSATISFIED $< 40 \times \sqrt{2}$<br>3. $40 \times \sqrt{2} \leqq$ MEDIUM $< 60 \times \sqrt{2}$<br>4. $60 \times \sqrt{2} \leqq$ SATISFIED $< 70 \times \sqrt{2}$<br>5. $70 \times \sqrt{2} \leqq$ VERY SATISFIED $\leqq 100 \times \sqrt{2}$ | SATISFACTION DEGREE RANKS AND SATISFACTION DEGREE BALANCE |
| LOSING 1 (RATIO) | B1 : A RATIO OF BLACK BAR MARUBOZU PATTERNS | MIN/MAX : 0/100<br>Low/Normal/High | — | PSYCHOLOGY DEGREE ADDING METHOD |
| LOSING 2 (RATIO) | B2 : A RATIO OF BLACK BAR HAMMER PATTERNS | MIN/MAX : 0/100<br>Low/Normal/High | — | PSYCHOLOGY DEGREE ADDING METHOD |
| LOSING 3 (RATIO) | B3 : A RATIO OF BLACK BAR INVERTED HAMMER PATTERNS | MIN/MAX : 0/100<br>Low/Normal/High | — | PSYCHOLOGY DEGREE ADDING METHOD |
| LOSING 4 (RATIO) | B4 : A RATIO OF BLACK BAR DOJI PATTERNS | MIN/MAX : 0/100<br>Low/Normal/High | — | PSYCHOLOGY DEGREE ADDING METHOD |
| WINNING 1 (RATIO) | W1 : A RATIO OF WHITE BAR MARUBOZU PATTERNS | MIN/MAX : 0/100<br>Low/Normal/High | — | PSYCHOLOGY DEGREE ADDING METHOD |
| WINNING 2 (RATIO) | W2 : A RATIO OF WHITE BAR HAMMER PATTERN | MIN/MAX : 0/100<br>Low/Normal/High | — | PSYCHOLOGY DEGREE ADDING METHOD |
| WINNING 3 (RATIO) | W3 : A RATIO OF WHITE BAR INVERTED HAMMER PATTERNS | MIN/MAX : 0/100<br>Low/Normal/High | — | PSYCHOLOGY DEGREE ADDING METHOD |
| WINNING 4 (RATIO) | W4 : A RATIO OF WHITE BAR DOJI PATTERNS | MIN/MAX : 0/100<br>Low/Normal/High | — | PSYCHOLOGY DEGREE ADDING METHOD |
| DRAW (RATIO) | C1 : DOJI CROSS | MIN/MAX : 0/100<br>Low/Normal/High | — | PSYCHOLOGY DEGREE ADDING METHOD |

FIG. 110

PSYCHOLOGY INDICES-2

| INDEX NAME | DESCRIPTION | EVALUATION DETERMINATION | DETERMINATION THRESHOLD VALUES | TOTALIZATION METHOD AND REMARKS |
|---|---|---|---|---|
| ACCUMULATED SALES MONEY AMOUNT (OPEN) | ACCUMULATION OF WINLOSS OPEN VALUES | — | — | ACCUMULATION OF WINLOSS OPEN VALUES |
| ACCUMULATED SALES MONEY AMOUNT (HIGH) | ACCUMULATED SALES HIGH VALUES OF SESSIONS, TOTALIZED FOR EACH MACHINE ID | — | — | ACCUMULATION OF WINLOSS HIGH VALUES |
| ACCUMULATED SALES MONEY AMOUNT (LOW) | ACCUMULATED SALES LOW VALUES OF SESSIONS, TOTALIZED FOR EACH MACHINE ID | — | — | ACCUMULATION OF WINLOSS LOW VALUES |
| ACCUMULATED SALES MONEY AMOUNT (CLOSE) | ACCUMULATED SALES CLOSE VALUES OF SESSIONS, TOTALIZED FOR EACH MACHINE ID | — | — | ACCUMULATION OF WINLOSS CLOSE VALUES |
| ACCUMULATED SALES MONEY AMOUNT BB + 3 | A 25-PERIOD MOVING AVERAGE OF ACCUMULATED SALES CLOSE VALUES OF SESSIONS, TOTALIZED FOR EACH MACHINE ID, + 3 | — | — | ACCUMULATION OF VALUES OF MA + 3 (W/B) |
| ACCUMULATED SALES MONEY AMOUNT BB - 3 | A 25-PERIOD MOVING AVERAGE OF ACCUMULATED SALES CLOSE VALUES OF SESSIONS, TOTALIZED FOR EACH MACHINE ID, - 3 | — | — | ACCUMULATION OF VALUES OF MA - 3 (W/B) |
| CANDLE SHAPE CODES (PSYCHOLOGY SCORES) | SESSION STICKS | W1, W2, W3, W 4, B1, B2, B3, B4, C1 | — | SESSIONS |
| MEMBER SESSION RATIOS | RATIOS OF SESSIONS OF MEMBERS | — | — | NUMBER OF SESSIONS OF MEMBERS/NUMBER OF ALL SESSIONS 100 |
| WINNING PERCENTAGES (SESSIONS) | WINNING SESSIONS/TOTAL SESSIONS | — | — | SESSIONS |

FIG. 111

WAVE MOTION ATTRIBUTE INDICES (1)-1

| INDEX NAME | DESCRIPTION | EVALUATION DETERMINATION | DETERMINATION THRESHOLD VALUES | TOTALIZATION METHOD AND REMARKS |
|---|---|---|---|---|
| Win/Bet | Winloss/Bet | — | — | — |
| WIN/BET ACCUMULATION | WINLOSS/BET ACCUMULATED VALUES | — | — | — |
| WIN/BET ACCUMULATION (THEORETICAL VALUES) | AN IDEAL VALUE STRAIGHT LINE CALCULATED FROM WINLOSS IN ALL SECTIONS | — | — | AN AVERAGE OF ACCUMULATED VALUES OF WINLOSS/BET |
| SECTION DETERMINATION | DISCHARGE SECTIONS, IN EACH OF WHICH MANY WINS BY A PLAYER HAVE OCCURRED, AND NORMAL SECTIONS OTHER THAN THE DISCHARGE SECTIONS ARE DETERMINED FROM WINLOSS/BET MOVING AVERAGE VALUES. | NORMAL SECTIONS<br>DISCHARGE SECTIONS | MOVING AVERAGE<br>LESS THAN A MOVING AVERAGE: NORMAL SECTION<br>EQUAL TO OR GREATER THAN A MOVING AVERAGE: DISCHARGE SECTION<br>INITIAL THRESHOLD VALUE: -0.5<br>INITIAL MOVING AVERAGE: 5 SECTIONS | SECTION MODE DETERMINATION |
| WINLOSS/BET BIG HIT INTERVALS CLASSIFIED BY MULTIPLIERS IN ALL SECTIONS | WINLOSS/BET BIG HIT INTERVALS CLASSIFIED BY MULTIPLIERS | LESS THAN 1 TIME<br>LESS THAN 2 TIMES<br>....<br>LESS THAN 8 TIMES<br>LESS THAN 9 TIMES<br>LESS THAN 10 TIMES<br>LESS THAN 20 TIMES<br>....<br>LESS THAN 80 TIMES<br>LESS THAN 90 TIMES<br>LESS THAN 100 TIMES<br>LESS THAN 200 TIMES<br>LESS THAN 500 TIMES<br>LESS THAN 1000 TIMES<br>GREATER THAN 1000 TIMES<br>SYNTHESIZED VALUES | — | JACKPOT ATTRIBUTES |

FIG. 112

WAVE MOTION ATTRIBUTE INDICES (1)-2

| INDEX NAME | DESCRIPTION | EVALUATION DETERMINATION | DETERMINATION THRESHOLD VALUES | TOTALIZATION METHOD AND REMARKS |
|---|---|---|---|---|
| WINLOSS/BET HIT INTERVALS CLASSIFIED BY MULTIPLIERS IN NORMAL SECTIONS | WINLOSS/BET BIG HIT INTERVALS CLASSIFIED BY MULTIPLIERS IN NORMAL SECTIONS | LESS THAN 1 TIME<br>LESS THAN 2 TIMES<br>....<br>LESS THAN 8 TIMES<br>LESS THAN 9 TIMES<br>LESS THAN 10 TIMES<br>LESS THAN 20 TIMES<br>....<br>LESS THAN 80 TIMES<br>LESS THAN 90 TIMES<br>LESS THAN 100 TIMES<br>LESS THAN 200 TIMES<br>LESS THAN 500 TIMES<br>LESS THAN 1000 TIMES<br>GREATER THAN 1000 TIMES<br>SYNTHESIZED VALUES | — | JACKPOT ATTRIBUTES |
| WINLOSS/BET BIG HIT INTERVALS CLASSIFIED BY MULTIPLIERS IN DISCHARGE SECTIONS | WINLOSS/BET JACKPOT INTERVALS CLASSIFIED BY MULTIPLIERS IN DISCHARGE SECTIONS | DITTO | — | JACKPOT ATTRIBUTES |
| ALL-SECTION WINLOSS/BET DEVIATION | WINLOSS/BET DEVIATIONS | — | — | |
| NORMAL-SECTION WINLOSS/BET DEVIATION | DISCHARGE-SECTION WINLOSS/BET DEVIATIONS | — | — | |
| DISCHARGE-SECTION WINLOSS/BET DEVIATIONS | WINLOSS/BET DEVIATIONS IN DISCHARGE SECTIONS | — | — | |
| DISCHARGE TIME RATIOS (%) | A PERCENTAGE AT WHICH SECTIONS, IN EACH OF WHICH MANY WINS BY A PLAYER HAVE OCCURRED, ARE DETERMINED FROM WINLOSS/BET MOVING AVERAGE VALUES. | — | — | SECTION MODE DETERMINATION |

FIG. 113

WAVE MOTION ATTRIBUTE INDICES (2)-1

| INDEX NAME | DESCRIPTION | EVALUATION DETERMINATION | DETERMINATION THRESHOLD VALUES | TOTALIZATION METHOD AND REMARKS |
|---|---|---|---|---|
| NUMBER OF TIMES OF OCCURRENCE OF FEATURE GAMES CLASSIFIED BY MULTIPLIERS | A NUMBER OF TIMES OF OCCURRENCE OF FEATURE GAMES, EACH OF WHICH IS DETERMINED FROM A MAGNITUDE OF A PLAYING TIME PERIOD, CLASSIFIED BY MAGNITUDES OF WINLOSS/BET | 5 TIMES OR MORE TO<br>LESS THAN 6 TIMES<br>LESS THAN 7 TIMES<br>LESS THAN 8 TIMES<br>LESS THAN 9 TIMES<br>LESS THAN 10 TIMES<br>LESS THAN 20 TIMES<br>····<br>LESS THAN 80 TIMES<br>LESS THAN 90 TIMES<br>LESS THAN 100 TIMES<br>LESS THAN 200 TIMES<br>LESS THAN 500 TIMES<br>LESS THAN 1000 TIMES<br>GREATER THAN 1000 TIMES<br>SYNTHESIZED VALUES | — | DETERMINATION OF FREE GAMES/FEATURE GAMES |
| FEATURE GAME PO | FEATURE GAME POS | — | — | FEATURE GAME OUT/ TOTAL IN 100 |
| AVERAGE BET PER GAME | A BET AMOUNT PER GAME | — | — | Bet/Games |
| ATTRIBUTES INTERVALS OF HIT OF × 100 TIMES OR MORE | INTERVALS OF JACKPOT GAMES (INTERVALS OF JACKPOT GAMES OF WIN/BET × 100) | LongintervalBonus<br>MiddleintervalBonus<br>ShortintervalBonus | THRESHOLD VALUE L: 1500 OR MORE<br>THRESHOLD VALUE M: LESS THAN 1500 AND 1000 OR MORE<br>THRESHOLD VALUE S: LESS THAN 100 | INTERVALS OF JACKPOT GAMES OF × 100 OR MORE |
| ATTRIBUTES AN AVERAGE MULTIPLIER OF ×100 TIMES OR MORE | JACKPOT AVERAGE MULTIPLIER (AVERAGE VALUE OF WIN/BET OF WIN/BET 100 OR MORE) | HighVolatility<br>MediumVolatility<br>LowVolatility | THRESHOLD VALUE L: LESS THAN -230<br>THRESHOLD VALUE M: -230 OR MORE AND LESS THAN -200<br>THRESHOLD VALUE S: -200 OR MORE | AN AVERAGE VALUE OF JACKPOT MULTIPLIERS OF 100 TIMES OR MORE |

FIG. 114

WAVE MOTION ATTRIBUTE INDICES (2)-2

| INDEX NAME | DESCRIPTION | EVALUATION DETERMINATION | DETERMINATION THRESHOLD VALUES | TOTALIZATION METHOD AND REMARKS |
|---|---|---|---|---|
| ATTRIBUTES PO AT THE TIME OF LOW MULTIPLIERS | AT-NORMAL-TIME POS EXCLUDING JACKPOTS (A RATIO OF POS OF WIN/BET LESS THAN 100) | LateProfit<br>NormalProfit<br>FastProfit | THRESHOLD VALUE F: 82 OR MORE<br>THRESHOLD VALUE M: LESS THAN 82 AND 75 OR MORE<br>THRESHOLD VALUE S: LESS THAN 75 | OUT/IN100 OUT/IN 100 OR MORE EXCLUDING JACKPOTS OF 100 OR MORE) |
| NUMBER OF OCCURRENCE OF PROGRESSIVE JACKPOTS | A NUMBER OF OCCURRENCE OF PROGRESSIVE JACKPOTS | — | — | — |
| NUMBER OF OCCURRENCE OF JACKPOTS | A NUMBER OF OCCURRENCE OF JACKPOTS | — | — | — |
| NUMBER-OF-GAME RATIO BY MEMBERS | A NUMBER-OF-GAME RATIO BY MEMBERS | — | — | — |
| INTERVALS OF FEATURE GAME HITS | FEATURE GAME GAME-NUMBER-INTERVAL | LongIntervalFeature<br>MiddleIntervalFeature<br>ShortIntervalFeature | THRESHOLD VALUE 1: 180 OR MORE<br>THRESHOLD VALUE 2: LESS THAN 180 AND 130 OR MORE<br>THRESHOLD VALUE 3: LESS THAN 130 | NUMBER OF GAMES/NUMBER OF OCCURRENCE OF FEATURE GAMES |
| AVERAGE MULTIPLIER OF FEATURE GAMES | AN AVERAGE VALUE OF HIT MULTIPLIERS OF FEATURE GAMES | HighVolatilityFeature<br>MediumVolatilityFeature<br>LowVolatilityFeature | THRESHOLD VALUE 1: 60 OR MORE<br>THRESHOLD VALUE 2: LESS THAN 60 AND 40 OR MORE<br>THRESHOLD VALUE 3: LESS THAN 40 | FEATURE GAME MULTIPLIER TOTAL/NUMBER OF OCCURRENCE OF FEATURE GAMES |
| NORMAL PO | POS EXCLUDING POS IN FEATURE GAMES | HighNormalPO<br>MiddleNormalPO<br>LowNormalPO | THRESHOLD VALUE 1: 65% OR MORE<br>THRESHOLD VALUE 2: LESS THAN 60% AND 55% OR MORE<br>THRESHOLD VALUE 3: LESS THAN 55% | (OUT – FEATURE OUT)/IN |

FIG. 115

SESSION ATTRIBUTE INDICES

| INDEX NAME | DESCRIPTION | EVALUATION DETERMINATION | DETERMINATION THRESHOLD VALUES | REMARKS |
|---|---|---|---|---|
| SLOT<br>INVESTMENT MONEY AMOUNT (LOSING SESSION) | INVESTMENT MONEY AMOUNT (LOSING SESSION) | LongintervalBonus<br>MiddleintervalBonus<br>ShortintervalBonus | THRESHOLD VALUE L: 1000 OR MORE<br>THRESHOLD VALUE M: 500 OR MORE AND LESS THAN 1000<br>THRESHOLD VALUE S: LESS THAN 500 | LOSS MONEY AMOUNT IN EACH SESSION |
| TABLE<br>INVESTMENT MONEY AMOUNT (LOSING SESSION) | INVESTMENT MONEY AMOUNT (LOSING SESSION) | LongintervalBonus<br>MiddleintervalBonus<br>ShortintervalBonus | THRESHOLD VALUE L: 1000 OR MORE<br>THRESHOLD VALUE M: 500 OR MORE AND LESS THAN 1000<br>THRESHOLD VALUE S: LESS THAN 500 | LOSS MONEY AMOUNT IN EACH SESSION |
| SLOT<br>AVERAGE BET PER GAME | WAGER | HighVolatility<br>MediumVolatility<br>LowVolatility | THRESHOLD VALUE L: 25 OR MORE<br>THRESHOLD VALUE M: 15 OR MORE AND LESS THAN 25<br>THRESHOLD VALUE S: LESS THAN 15 | AN AVERAGE BET PER GAME IN EACH SESSION |
| TABLE<br>AVERAGE BET PER GAME | WAGER | HighVolatility<br>MediumVolatility<br>LowVolatility | THRESHOLD VALUE L: 200 OR MORE<br>THRESHOLD VALUE M: 100 OR MORE AND LESS THAN 200<br>THRESHOLD VALUE S: LESS THAN 100 | AN AVERAGE BET PER GAME IN EACH SESSION |
| AT-NORMAL-TIME POS EXCLUDING POS OF BIG HIT (A RATIO OF POS OF WIN/BET LESS THAN 100 IN EACH MACHINE PLAYED) | INTAKE SPEED | LateProfit<br>NormalProfit<br>FastProfit | THRESHOLD VALUE F: 82 OR MORE<br>THRESHOLD VALUE M: LESS THAN 82 AND 75 OR MORE<br>THRESHOLD VALUE S: LESS THAN 75 | |
| NORMAL POS (NORMAL POS IN EACH MACHINE PLAYED) | SUCTION SPEED | HighNormalPO<br>MeddleNormalPO<br>LowNormalPO | THRESHOLD VALUE 1: 65% OR MORE<br>THRESHOLD VALUE 2: LESS THAN 65% AND 55% OR MORE<br>THRESHOLD VALUE 3: LESS THAN 55% | |

FIG. 116

CALENDAR INDICES

| INDEX NAME | DESCRIPTION | EVALUATION DETERMINATION | DETERMINATION THRESHOLD VALUE | REMARKS |
| --- | --- | --- | --- | --- |
| USER ARBITRARY DATA | ARBITRARY NUMERICAL VALUE DATA ASSOCIATED WITH DATES | — | — | CSV IMPORT |

FIG. 117

MACHINE CATEGORY 1

| INDEX NAME | CLASSIFICATION DEFINITION | REMARKS |
|---|---|---|
| DENOMINATION | DENOMINATIONS | FROM A HALL MANAGEMENT SERVER |
| THEME | THEMES | FROM A HALL MANAGEMENT SERVER |
| VENDOR | VENDORS | FROM A HALL MANAGEMENT SERVER |
| LOCATION | LOCATIONS | FROM A HALL MANAGEMENT SERVER |
| SET PAYOUT RATIO (%) | SET POS | FROM A HALL MANAGEMENT SERVER |
| THE LATEST OPERATION DAY | THE FINAL DAY WITH DATA | |
| GAME TYPE CLASS (GAME KIND) | SLOT (NONE), TABLE (T-CA-BAC, T-RO-RO, OR THE LIKE) | |
| GAME TYPE CLASS (WITH AND WITHOUT A LINK) | STAND-ALONE (ST), LINK (LI), MULTIPLE (MUL) | |
| GAME TYPE CLASS (WITH AND WITHOUT PROGRESSIVE) | NON-PROGRESSIVE (NONE), PROGRESSIVE (PRO) | |
| GAME TYPE CLASS (DISPLAY SHAPE) | NON-VIDEO (MC), VIDEO (VI) | |
| GAME TYPE CLASS (NUMBER OF REELS) | ONE REEL (1R), THREE REELS (3R), FIVE REELS (5R), AND THE LIKE | |
| GAME TYPE CLASS (NUMBER OF LINES) | S, M, L | S: 30 LINES OR LESS<br>M: 31 TO 60 LINES OR LESS<br>L: 61 LINES OR MORE |
| GAME TYPE CLASS (NUMBER OF BETS PER LINE) | S, M, L | S: 10 BETS OR LESS<br>M: 11 TO 24 BETS OR LESS<br>L: 24 BETS OR MORE |
| GAME TYPE CLASS (BONUS ATTRIBUTES) | NON-LARGE-WINS (NONE), LARGE-WINS (LM) | |
| GAME TYPE CLASS (TABLE GAME KIND) | ROULETTE, CARD GAMES (BACCARAT), AND THE LIKE | |

FIG. 118

MACHINE CATEGORY 2

| INDEX NAME | CLASSIFICATION DEFINITION | REMARKS |
|---|---|---|
| GAME TYPE CLASS | SYNTHESIZING | FROM A HALL MANAGEMENT SERVER |
| BIG HIT INTERVAL CLASS<br>INTERVAL BETWEEN JACKPOTS OF 100 TIMES OR MORE | LongIntervalBonus<br>MiddleIntervalBonus<br>ShortIntervalBonus | WITH REFERENCE TO WAVE MOTION ATTRIBUTE INDICES |
| BIG HIT AVERAGE MULTIPLIER CLASS<br>JACKPOT AVERAGE MULTIPLIER OF 100 TIMES OR MORE | HighVolatility<br>MediumVolatility<br>LowVolatility | WITH REFERENCE TO WAVE MOTION ATTRIBUTE INDICES |
| LOW MULTIPLIER PO CLASS<br>POS EXCLUDING POS OF JACKPOTS OF 100 TIMES OR MORE | LateProfit<br>NormalProfit<br>FastProfit | WITH REFERENCE TO WAVE MOTION ATTRIBUTE INDICES |
| FEATURE HIT INTERVAL CLASS | LongIntervalFeature<br>MiddleIntervalFeature<br>ShortIntervalFeature | WITH REFERENCE TO WAVE MOTION ATTRIBUTE INDICES |
| FEATURE AVERAGE MULTIPLIER CLASS | HighVolatilityFeature<br>MediumVolatilityFeature<br>LowVolatilityFeature | WITH REFERENCE TO WAVE MOTION ATTRIBUTE INDICES |
| NORMAL PO CLASS | HighNormalPO<br>MiddleNormalPO<br>LowNormalPO | WITH REFERENCE TO WAVE MOTION ATTRIBUTE INDICES |
| MACHINE USER DEFINITION | ARBITRARY SETTIN ON AN EDIT DISPLAY SCREEN | WITH REFERENCE TO ATTRIBUTE INDICES |

FIG. 119

PLAYER CATEGORY

| INDEX NAME | CLASSIFICATION DEFINITION | REMARKS |
|---|---|---|
| PLAYER TYPES (MEMBERS/ NON-MEMBERS) | MEMBER/NON-MEMBER | FROM A HALL MANAGEMENT SERVER OR THE LIKE |
| PLAYER RANK | PLAYER RANKS | FROM A HALL MANAGEMENT SERVER OR THE LIKE |
| SEX | SEX | FROM A HALL MANAGEMENT SERVER OR THE LIKE |
| NATIONALITY | NATIONALITIES | FROM A HALL MANAGEMENT SERVER OR THE LIKE |
| AGE | CLASSIFIED BY EACH 10 YEARS BASED ON DATES OF BIRTH (THEIR 20'S, 30'S, AND THE LIKE) | |
| THE LATEST OPERATION DATA | THE FINAL DAY WITH DATA | |
| MEMBER CLASSIFICATION | ACTIVE MEMBERS<br>DORMANT MEMBERS<br>GHOST MEMBERS | ACTIVE MEMBER: A MEMBER WHO VISITED A HALL STORE ONE TIME OR MORE WITHIN THE PAST SIX MONTHSDORMANT MEMBER: A MEMBER WHO DID NOT VISIT A HALL STORE EVEN ONE TIME WITHIN THE PAST SIX MONTHS<br>GHOST MEMBER: A MEMBER WHO HAS NO PLAY HISTORY OF EVEN ONE TIME |
| GAME TYPE | GOOD MEMBERS<br>HIGHLY BETTING MEMBERS<br>HIGHLY FREQUENTLY STORE VISITING MEMBERS<br>ESTRANGED MEMBERS<br>NEW MEMBERS | GOOD MEMBER: A MEMBER WHOSE AVERAGE BET AMOUNT PER VISIT IS 30,000 OR MORE AND WHOSE STORE VISITING FREQUENCY IS ONE TIME OR MORE IN ONE MONTH<br><br>HIGHLY BETTING MEMBER: A MEMBER WHOSE AVERAGE BET AMOUNT PER VISIT IS 30,000 OR MORE<br>HIGHLY FREQUENTLY STORE VISITING MEMBER A MEMBER WHOSE STORE VISITING FREQUENCY IS ONE TIME OR MORE IN ONE MONTH<br><br>ESTRANGED MEMBER: A MEMBER WHOSE AVERAGE BET AMOUNT PER VISIT IS LESS THAN 30,000 AND WHOSE STORE VISITING FREQUENCY IS LESS THAN ONE TIME IN ONE MONTH |
| MEMBER USER DEFINITION | ARBITRARY SETTING ON AN EDIT DISPLAY SCREEN | |

FIG. 120

CALENDAR CATEGORY

| INDEX NAME | CLASSIFICATION DEFINITION | REMARKS |
|---|---|---|
| USER ARBITRARY CATEGORIES | ARBITRARY CATEGORY DATA ASSOCIATED WITH DATES | CVS IMPORT |

FIG. 123

| GAME NO. | PLAYER INVESTMENT MONEY AMOUNT | SLOT MACHINE PAYOUT AMOUNT | GAME START DATE AND TIME | GAME TERMINATION DATE AND TIME | MEMBER IDENTIFICATION CODE | MACHINE IDENTIFICATION CODE |
|---|---|---|---|---|---|---|
| 1 | 5 | 0 | 20150707 15:04:04 | 20150707 15:04:10 | — | 0202 |
| 2 | 5 | 5 | 20150707 15:04:15 | 20150707 15:04:20 | — | 0202 |
| 3 | 5 | 0 | 20150707 15:04:26 | 20150707 15:04:31 | — | 0202 |
| 4 | 5 | 0 | 20150707 15:04:36 | 20150707 15:04:42 | — | 0202 |
| 5 | 5 | 5 | 20150707 15:04:48 | 20150707 15:04:54 | — | 0202 |
| 6 | 5 | 0 | 20150707 15:05:01 | 20150707 15:05:09 | — | 0202 |
| 7 | 5 | 0 | 20150707 15:05:15 | 20150707 15:05:20 | — | 0202 |
| 8 | 5 | 0 | 20150707 15:05:26 | 20150707 15:05:31 | — | 0202 |
| 9 | 5 | 0 | 20150707 15:05:40 | 20150707 15:05:46 | — | 0202 |
| 10 | 5 | 10 | 20150707 15:05:52 | 20150707 15:05:58 | — | 0202 |
| 11 | 5 | 0 | 20150707 15:06:04 | 20150707 15:06:10 | — | 0202 |
| 12 | 5 | 5 | 20150707 15:06:17 | 20150707 15:06:23 | — | 0202 |
| 13 | 5 | 5 | 20150707 15:06:20 | 20150707 15:06:27 | — | 0202 |
| 14 | 5 | 5 | 20150707 15:06:33 | 20150707 15:06:39 | — | 0202 |
| 15 | 5 | 0 | 20150707 15:06:46 | 20150707 15:06:51 | — | 0202 |
| 16 | 5 | 15 | 20150707 15:06:57 | 20150707 15:07:03 | — | 0202 |
| 17 | 5 | 5 | 20150707 15:07:14 | 20150707 15:07:24 | — | 0202 |
| 18 | 5 | 40 | 20150707 15:07:30 | 20150707 15:08:38 | — | 0202 |
| 19 | 5 | 10 | 20150707 15:08:45 | 20150707 15:08:55 | — | 0202 |
| 20 | 5 | 10 | 20150707 15:09:02 | 20150707 15:09:08 | — | 0202 |
| 21 | 5 | 5 | 20150707 15:09:16 | 20150707 15:09:24 | — | 0202 |
| 22 | 5 | 0 | 20150707 15:09:34 | 20150707 15:09:45 | — | 0202 |
| 23 | 5 | 0 | 20150707 15:09:51 | 20150707 15:09:57 | — | 0202 |
| 24 | 5 | 0 | 20150707 15:10:03 | 20150707 15:10:08 | — | 0202 |
| 25 | 5 | 0 | 20150707 15:10:15 | 20150707 15:10:21 | — | 0202 |
| 26 | 5 | 0 | 20150707 15:10:27 | 20150707 15:10:33 | — | 0202 |
| 27 | 5 | 0 | 20150707 15:10:38 | 20150707 15:10:44 | — | 0202 |
| 28 | 5 | 10 | 20150707 15:10:50 | 20150707 15:10:58 | — | 0202 |
| 29 | 5 | 0 | 20150707 15:11:08 | 20150707 15:11:14 | — | 0202 |
| 30 | 5 | 0 | 20150707 15:11:20 | 20150707 15:11:29 | — | 0202 |

FIG. 124A

| GAME NO. | PLAYER INVESTMENT MONEY AMOUNT (IN) | SLOT MACHINE PAYOUT AMOUNT (OUT) | PO (%) IN EACH GAME | Winloss | Winloss/Bet | MOVING AVERAGE OF WINLOSS/ BET VALUES IN 5 GAMES | |
|---|---|---|---|---|---|---|---|
| 1 | 5 | 0 | 0 | 5 | 1 | | |
| 2 | 5 | 20 | 400 | −15 | −3 | | |
| 3 | 5 | 0 | 0 | 5 | 1 | 0 | NORMAL SECTION |
| 4 | 5 | 5 | 100 | 0 | 0 | −0. 4 | |
| 5 | 5 | 0 | 0 | 5 | 1 | 0. 4 | |
| 6 | 5 | 10 | 200 | −5 | −1 | 0. 4 | |
| 7 | 5 | 0 | 0 | 5 | 1 | 0. 6 | |
| 8 | 5 | 0 | 0 | 5 | 1 | 0. 2 | |
| 9 | 5 | 0 | 0 | 5 | 1 | 0. 6 | |
| 10 | 5 | 10 | 200 | −5 | −1 | −9. 4 | DISCHARGE SECTION |
| 11 | 5 | 0 | 0 | 5 | 1 | −17. 4 | |
| 12 | 5 | 250 | 5000 | −245 | −49 | −18. 6 | |
| 13 | 5 | 200 | 4000 | −195 | −39 | −22. 2 | |
| 14 | 5 | 30 | 600 | −25 | −5 | −42. 2 | |
| 15 | 5 | 100 | 2000 | −95 | −19 | −44. 2 | |
| 16 | 5 | 500 | 10000 | −495 | −99 | −84. 2 | |
| 17 | 5 | 300 | 6000 | −295 | −59 | −107 | |
| 18 | 5 | 1200 | 24000 | −1195 | −239 | −113 | |
| 19 | 5 | 600 | 12000 | −595 | −119 | −97. 8 | |
| 20 | 5 | 250 | 5000 | −245 | −49 | −87 | |
| 21 | 5 | 120 | 2400 | −115 | −23 | −39 | |
| 22 | 5 | 30 | 600 | −25 | −5 | −15 | |
| 23 | 5 | 0 | 0 | 5 | 1 | −5 | |
| 24 | 5 | 0 | 0 | 5 | | 0. 2 | |
| | 5 | 0 | | | | | |

FIG. 124B

| | | | | | | | |
|---|---|---|---|---|---|---|---|
| | | | | 25 | −5 | [illegible] | |
| 23 | 5 | 0 | 0 | 5 | 1 | −5 | |
| 24 | 5 | 0 | 0 | 5 | 1 | −0. 2 | NORMAL SECTION |
| 25 | 5 | 0 | 0 | 5 | 1 | 0. 2 | NORMAL SECTION |
| 26 | 5 | 0 | 0 | 5 | 1 | 0. 2 | NORMAL SECTION |
| 27 | 5 | 20 | 400 | −15 | −3 | 0. 2 | NORMAL SECTION |
| 28 | 5 | 0 | 0 | 5 | 1 | −0. 2 | NORMAL SECTION |
| 29 | 5 | 0 | 0 | 5 | 1 | −0. 2 | NORMAL SECTION |
| 30 | 5 | 10 | 200 | −5 | −1 | 0. 6 | NORMAL SECTION |
| 31 | 5 | 0 | 0 | 5 | 1 | 0. 6 | NORMAL SECTION |
| 32 | 5 | 0 | 0 | 5 | 1 | 0. 6 | NORMAL SECTION |
| 33 | 5 | 0 | 0 | 5 | 1 | 1 | NORMAL SECTION |
| 34 | 5 | 0 | 0 | 5 | 1 | −0. 2 | NORMAL SECTION |
| 35 | 5 | 0 | 0 | 5 | 1 | −0. 4 | NORMAL SECTION |
| 36 | 5 | 30 | 600 | −25 | −5 | −0. 4 | NORMAL SECTION |
| 37 | 5 | 5 | 100 | 0 | 0 | −0. 6 | DISCHARGE SECTION |
| 38 | 5 | 0 | 0 | 5 | 1 | −14. 6 | DISCHARGE SECTION |
| 39 | 5 | 5 | 100 | 0 | 0 | −33. 4 | DISCHARGE SECTION |
| 40 | 5 | 350 | 7000 | −345 | −69 | −41. 2 | DISCHARGE SECTION |
| 41 | 5 | 500 | 10000 | −495 | −99 | −49. 2 | DISCHARGE SECTION |
| 42 | 5 | 200 | 4000 | −195 | −39 | −49 | DISCHARGE SECTION |
| 43 | 5 | 200 | 4000 | −195 | −39 | −35 | DISCHARGE SECTION |
| 44 | 5 | 0 | 0 | 5 | 1 | −15 | DISCHARGE SECTION |
| 45 | 5 | 0 | 0 | 5 | 1 | −7 | DISCHARGE SECTION |
| 46 | 5 | 0 | 0 | 5 | 1 | 0. 2 | NORMAL SECTION |
| 47 | 5 | 0 | 0 | 5 | 1 | 0. 2 | NORMAL SECTION |
| 48 | 5 | 20 | 400 | −15 | −3 | 0. 2 | NORMAL SECTION |
| 49 | 5 | 0 | 0 | 5 | 1 | 0 | NORMAL SECTION |
| 50 | 5 | 0 | 0 | 5 | 1 | −0. 2 | NORMAL SECTION |
| ... | ... | ... | ... | ... | ... | ... | |

FIG. 126A

| GAME NO. | PLAYER INVESTMENT MONEY AMOUNT | SLOT MACHINE PAYOUT AMOUNT | PO (%) IN EACH GAME | MOVING AVERAGE OF WINLOSS/ BET VALUES IN 3 GAMES |
|---|---|---|---|---|
| 1 | 5 | 0 | 0 | — |
| 2 | 5 | 5 | 100 | 33. 3 |
| 3 | 5 | 0 | 0 | 100 |
| 4 | 5 | 10 | 200 | 100 |
| 5 | 5 | 5 | 100 | 100 |
| 6 | 5 | 0 | 0 | 33. 3 |
| 7 | 5 | 0 | 0 | 0 |
| 8 | 5 | 0 | 0 | 800 |
| 9 | 5 | 120 | 2400 | 866. 7 |
| 10 | 5 | 10 | 200 | 866. 7 |
| 11 | 5 | 0 | 0 | 100 |
| 12 | 5 | 5 | 100 | 66. 7 |
| 13 | 5 | 5 | 100 | 100 |
| 14 | 5 | 5 | 100 | 66. 7 |
| 15 | 5 | 0 | 0 | 700 |
| 16 | 5 | 100 | 2000 | 700 |
| 17 | 5 | 5 | 100 | 2366. 7 |
| 18 | 5 | 250 | 5000 | 5366. 7 |
| 19 | 5 | 550 | 11000 | 7333. 3 |
| 20 | 5 | 300 | 6000 | 6333. 3 |
| 21 | 5 | 100 | 2000 | 2866. 7 |
| 22 | 5 | 30 | 600 | 4200 |
| 23 | 5 | 500 | 10000 | 11533. 3 |
| 24 | 5 | 1200 | 24000 | 15333. 3 |
| 25 | 5 | 600 | 12000 | 12000 |
| 26 | 5 | 0 | 0 | 4000 |
| 27 | 5 | 0 | 0 | 66. 7 |
| 28 | 5 | 10 | 200 | 66. 7 |
| 29 | 5 | 0 | [illegible] | [illegible] |
| [illegible] | 5 | | | |

BONUS GAME STATE CANDIDATE (1) (games 8–10)

BONUS GAME STATE CANDIDATE (2) (games 17–26)

FIG. 126B

| | | | | |
|---|---|---|---|---|
| [illegible] | [illegible] | 0 | 0 | 66. 7 |
| 30 | 5 | 0 | 0 | 0 |
| 31 | 5 | 0 | 0 | 1000 |
| 32 | 5 | 150 | 3000 | 1000 |
| 33 | 5 | 0 | 0 | 1033. 3 |
| 34 | 5 | 5 | 100 | 33. 3 |
| 35 | 5 | 0 | 0 | 33. 3 |
| 36 | 5 | 0 | 0 | 66. 7 |
| 37 | 5 | 10 | 200 | 66. 7 |
| 38 | 5 | 0 | 0 | 66. 7 |
| 39 | 5 | 0 | 0 | 100 |
| 40 | 5 | 15 | 300 | 100 |
| 41 | 5 | 0 | 0 | 100 |
| 42 | 5 | 0 | 0 | 66. 7 |
| 43 | 5 | 10 | 200 | 66. 7 |
| 44 | 5 | 0 | 0 | 100 |
| 45 | 5 | 5 | 100 | 33. 3 |
| 46 | 5 | 0 | 0 | 100 |
| 47 | 5 | 10 | 200 | 66. 7 |
| 48 | 5 | 0 | 0 | 400 |
| 49 | 5 | 50 | 1000 | 333. 3 |
| 50 | 5 | 0 | 0 | 333. 3 |

BONUS GAME STATE CANDIDATE (3)

FIG. 131

| GAME NO. | PLAYER INVESTMENT MONEY AMOUNT | SLOT MACHINE PAYOUT AMOUNT | PLAYER INVESTMENT MONEY AMOUNT (ACCUMULATION) | PLAYER REVENUE AND EXPENDITURE MONEY AMOUNT |
|---|---|---|---|---|
| — | 0 | 0 | 0 | 0 |
| 1 | 5 | 0 | 5 | −5 |
| 2 | 5 | 5 | 10 | −5 |
| 3 | 5 | 0 | 15 | −10 |
| 4 | 5 | 0 | 20 | −15 |
| 5 | 5 | 5 | 25 | −15 |
| 6 | 5 | 0 | 30 | −20 |
| 7 | 5 | 0 | 35 | −25 |
| 8 | 5 | 0 | 40 | −30 |
| 9 | 5 | 0 | 45 | −35 |
| 10 | 5 | 10 | 50 | −30 |
| 11 | 5 | 0 | 55 | −35 |
| 12 | 5 | 5 | 60 | −35 |
| 13 | 5 | 5 | 65 | −35 |
| 14 | 5 | 5 | 70 | −35 |
| 15 | 5 | 0 | 75 | −40 |
| 16 | 5 | 15 | 80 | −30 |
| 17 | 5 | 5 | 85 | −30 |
| 18 | 5 | 40 | 90 | 5 |
| 19 | 5 | 10 | 95 | 10 |
| 20 | 5 | 10 | 100 | 15 |
| 21 | 5 | 5 | 105 | 15 |
| 22 | 5 | 0 | 110 | 10 |
| 23 | 5 | 0 | 115 | 5 |
| 24 | 5 | 0 | 120 | 0 |
| 25 | 5 | 0 | 125 | −5 |
| 26 | 5 | 0 | 130 | −10 |
| 27 | 5 | 0 | 135 | −15 |
| 28 | 5 | 10 | 140 | −10 |
| 29 | 5 | 0 | 145 | −15 |
| 30 | 5 | 0 | 150 | −20 |
| 31 | 5 | 0 | 155 | −25 |
| 32 | 5 | 0 | 160 | −30 |
| 33 | 5 | 0 | 165 | −35 |

SESSION (games 1–33)

REVENUE AND EXPENDITURE UPON STARTING (row —)

MINIMUM REVENUE AND EXPENDITURE (row 15)

MAXIMUM REVENUE AND EXPENDITURE (row 20)

REVENUE AND EXPENDITURE UPON TERMINATION (row 33)

FIG. 141

| | | |
|---|---|---|
| MACHINE ATTRIBUTES | CANDLESTICK CHART RELATED PSYCHOLOGY SCORE | GAME INFORMATION |
| | CUSTOMER SATISFACTION DEGREE SCORE | |
| | HALL STORE SATISFACTION DEGREE SCORE | |
| | BALANCE BETWEEN DEGREES OF SATISFACTION | |
| | SATISFACTION DEGREE RANKS | |
| | JACKPOT GAME-NUMBER-INTERVAL | |
| | JACKPOT AVERAGE MULTIPLIER (VOLATILITY) | |
| | BET MONEY AMOUNT | |
| | BET MONEY AMOUNT/GAME | |
| | PLAYING TIME PERIOD | |
| | NUMBER OF PLAYED GAMES | |
| | WINLOSS/BET (ALL SECTIONS) | |
| | WINLOSS/BET (NORMAL SECTION) | |
| | WINLOSS/BET (DISCHARGE SECTION) | |
| | MACHINE ID | REGISTRATION DATA |
| | THEME (GAME CONTENT) | |
| | VENDOR (MAKER) | |

FIG. 142

| | | |
|---|---|---|
| PLAYER ATTRIBUTES | CANDLESTICK CHART RELATED PSYCHOLOGY SCORE | GAME INFORMATION |
| | CUSTOMER SATISFACTION DEGREE SCORE | |
| | HALL STORE SATISFACTION DEGREE SCORE | |
| | BALANCE BETWEEN DEGREES OF SATISFACTION | |
| | SATISFACTION DEGREE RANKS | |
| | BET MONEY AMOUNT | |
| | BET MONEY AMOUNT/GAME | |
| | PLAYING TIME PERIOD | |
| | NUMBER OF PLAYED GAMES | |
| | MEMBER ID | REGISTRATION DATA |
| | NATIONALITY | |
| | AGE | |
| | SEX | |
| | CLASSIFICATION OF MEMBERS | REGISTRATION DATA/GAME INFORMATION (HISTORY) |
| | MEMBER TYPE | |

FIG. 143

MACHINE USE HISTORY DATA

| PLAYER INVESTMENT MONEY AMOUNT | SLOT MACHINE PAYOUT AMOUNT | GAME START DATE AND TIME | GAME TERMINATION DATE AND TIME | MEMBER ID | MACHINE ID |
|---|---|---|---|---|---|
| 5 | 0 | 20150707 15:04:04 | 20150707 15:04:10 | 1011 | 0202 |
| 5 | 5 | 20150707 15:04:11 | 20150707 15:04:18 | 5050 | 0023 |
| 10 | 0 | 20150707 15:04:21 | 20150707 15:04:31 | — | 1002 |
| 5 | 200 | 20150707 15:04:36 | 20150707 15:04:55 | — | 4950 |
| 100 | 5 | 20150707 15:04:48 | 20150707 15:04:54 | 5050 | 0023 |
| 15 | 0 | 20150707 15:05:38 | 20150707 15:05:48 | — | 4950 |
| 5 | 1000 | 20150707 15:05:15 | 20150707 15:05:20 | — | 1002 |
| 20 | 0 | 20150707 15:05:26 | 20150707 15:05:31 | 1011 | 0202 |
| 5 | 0 | 20150707 15:05:42 | 20150707 15:05:48 | 5050 | 0023 |
| 20 | 10 | 20150707 15:05:52 | 20150707 15:05:58 | — | 1002 |
| 30 | 300 | 20150707 15:06:07 | 20150707 15:06:15 | 1011 | 0202 |
| 5 | 5 | 20150707 15:06:17 | 20150707 15:06:23 | 1011 | 0202 |
| 100 | 4000 | 20150707 15:06:23 | 20150707 15:06:30 | 5050 | 0023 |
| 5 | 5 | 20150707 15:06:33 | 20150707 15:06:39 | — | 4950 |

FIG. 144

MEMBER-MACHINE
CORRESPONDENCE TABLE

| MEMBER ID | MACHINE ID |
|---|---|
| 1011 | 0202 |
| 1011 | 9807 |
| ••• | ••• |
| 5050 | 0023 |
| 5050 | 9899 |
| ••• | ••• |

FIG. 145

SESSION-MACHINE CORRESPONDENCE TABLE

| SESSION | MACHINE ID |
|---|---|
| 1 | 0202 |
| 2 | 0023 |
| 3 | 1002 |
| 4 | 4950 |
| ... | ... |
| ... | ... |

FIG. 147

MACHINE FAILURE ANALYSIS (REAL TIME)

| STATUS | MACHINE ID | MAKER | THEME | NUMBER OF SESSIONS | NUMBER OF GAMES | PLAYING TIME PERIOD (H) | FAILURE OCCURRENCE SIGNAL | NON-FAILURE SIGNAL | TOTAL STOPPING TIME (H) |
|---|---|---|---|---|---|---|---|---|---|
| ●○○ | 0202 | COMPANY A | A1 | 890 | 2390 | 0. 89 | 0 | 0 | 0. 44 |
| ●○○ | 0011 | COMPANY A | A3 | 200 | 3455 | 12. 50 | 0 | 0 | 0 |
| ○●○ | 0012 | COMPANY A | A2 | 1200 | 13454 | 11. 12 | 210 | 20 | 0. 22 |
| ○○● | 0160 | COMPANY B | B1 | 110 | 3200 | 7. 88 | 322 | 870 | 1. 09 |
| ○●○ | 0231 | COMPANY C | C1 | 243 | 6033 | 4. 56 | 23 | 99 | 0. 22 |
| ○●○ | 0159 | COMPANY B | B3 | 55 | 1560 | 3. 22 | 45 | 320 | 0. 19 |
| ●○○ | 0038 | COMPANY C | C1 | 670 | 2930 | 3. 77 | 0 | 2 | 0. 50 |
| ○○● | 0230 | COMPANY C | C1 | 1220 | 18990 | 9. 43 | 227 | 230 | 1. 22 |
| ○●○ | 0210 | COMPANY A | A1 | 340 | 12000 | 9. 49 | 45 | 22 | 0. 44 |
| ○○● | 0217 | COMPANY A | A4 | 44 | 550 | 0. 12 | 1290 | 345 | 0 |
| ○●○ | 0005 | COMPANY A | A1 | 590 | 8709 | 14. 56 | 23 | 82 | 0 |

GAME INFORMATION ANALYSIS SYSTEM

CROSS-REFERENCE TO RELATED APPLICATION

This application claims the benefit of Japanese Patent Applications No. 2015-161439, No. 2015-161440, No. 2015-161441, No. 2015-161442, No. 2015-161443, No. 2015-161444, No. 2015-161445, No. 2015-161446, No. 2015-161447, No. 2015-161448, No. 2015-161449, No. 2015-161450, No. 2015-161451, No. 2015-161452, No. 2015-161453, each filed on Aug. 18, 2015, which applications are incorporated herein by reference in their entirety.

FIELD OF THE INVENTION

The present invention relates to a game information analysis system which performs an analysis with respect to game information obtained from gaming machines.

BACKGROUND OF THE INVENTION

In a hall store or the like where gaming machines such as slot machines are installed and players play games thereon, it is important to enhance store visiting ratios of players and to boost investment amounts of players by introducing gaming machines on which players can obtain advantageous game outcomes and which have customer attractive power.

However, in order to continue sound management in a hall store, it is required to enhance not only degrees of satisfaction of customers but also a degree of satisfaction of a hall store by ensuring profits of a hall store. In other words, it is more important to maintain appropriate balance between the degrees of satisfaction of customers and the degree of satisfaction of a hall store.

In addition, the degrees of satisfaction of customers are not determined only by money amounts of revenue and expenditure and are influenced by various factors such as revenue and expenditure in each game and transition of games. Therefore, it is desirable to evaluate the degrees of satisfaction of customers by taking psychological states of customers into consideration.

However, the psychological states of customers are pertinent to mental issues of customers, and it is difficult to effectively evaluate the psychological states of customers by using data which a computer system can manage.

On the other hand, a game information system for managing operation data of gaming machines in a hall store has so far been proposed. For example, in Japanese Patent Application Laid-Open Publication No. 2012-080936, a game information integration system which totalizes and analyzes consumption number data, payout number data, winning count number data, and the like transmitted from gaming machines is disclosed.

In addition, in Japanese Patent Application Laid-Open Publication No. 11-207001, a managing device for an amusement arcade which totalizes and manages operation data of pachinko game apparatuses is disclosed.

As described above, it is desirable to evaluate the degrees of satisfaction of customers also by taking the psychological states of customers into consideration. However, the game information integration system as disclosed in Japanese Patent Application Laid-Open Publication No. 2012-080936 analyzes the degree of satisfaction of a store side based on the operation data and the like of the gaming machines, and an idea that the degrees of satisfaction of customers are analyzed from the psychological states of players is not shown therein.

Accordingly, the game information integration system as disclosed in Japanese Patent Application Laid-Open Publication No. 2012-080936 does not disclose at all a technology in which the psychological states of players are effectively represented by using data which a computer system can manage.

In addition, the managing device for an amusement arcade as disclosed in Japanese Patent Application Laid-Open Publication No. 11-207001 totalizes the operation data of the pachinko game apparatuses, and through the totalization processing, it can be determined whether set values or the like in service time are appropriate. However, this device also does not have the idea that the degrees of satisfaction of customers are analyzed from the psychological states of players. Accordingly, the technology in which the psychological states of players are effectively represented by using the data which the computer system can manage is not disclosed at all therein.

In addition, there may be a case where in the computer system managing a hall store, only limited operation data (game information) such as player investment money amounts and gaming machine payout amounts are obtained. Even in such a case, there have been the needs for a game information analysis system which is operable to analyze the degrees of satisfaction of customers. However, such a system has not so far been proposed.

In addition, a function with which based on degrees of satisfaction of customers or other information, player attributes of respective players and machine attributes of respective gaming machines are analyzed, and matching between the player attributes and the machine attributes (in other words, attributes related to an aggregate of gaming machines used by players having predetermined attributes are grasped, or attributes related to an aggregate of players using gaming machines having predetermined attributes are grasped) is analyzed has not been realized although there have been so far the needs for this function.

In addition, the player attributes indicating attributes of players and the machine attributes indicating attributes of gaming machines are displayed so as to be associated with each other (for example, in accordance with the attributes of one of the player attributes and the gaming machine attributes, a state of distribution or the like of the attributes of the other of the player attributes and the machine attributes is displayed), and each correspondence relationship therebetween is analyzed, thereby allowing, for example, player attribute ratios of popular machines and ratios of attributes of machines which target customers are fond of to be grasped. However, in Japanese Patent Application Laid-Open Publication No. 2012-080936 and Japanese Patent Application Laid-Open Publication No. 11-207001, such an idea that the player attributes and the machine attributes are displayed so as to be associated with each other is not disclosed.

As a specific example of the display in which the player attributes and the machine attributes are associated with each other, for example, cited is display in which for each theme of gaming machines, ratios of playing periods of time of players are displayed and further, these are displayed along transition of years and months. Through the above-mentioned display, transition of popular machines and trend changes can be grasped and further, from the above-mentioned information, trends of future popular machines can also be predicted.

In addition, there have been the needs for risk display reports related to gaming machines which could determine and display failure risks indicating the possibility of occurrence of failure in gaming machines based on the machine attributes indicating attributes of the gaming machines and based on failure signals transmitted from the gaming machines and could determine and display fraudulence risks indicating the possibility of fraudulent acts against the gaming machines from the above-mentioned failure signals and information of IN/OUT related to the gaming machines. However, the existing system has not so far realized these.

In addition, in a case where promotion in which coupons or the like are distributed in accordance with values of player attributes indicating attributes of players is conducted, there have been the needs related to a tool for conducting previous simulation for a result of the promotion. However, the existing system has not so far realized it.

Further, there have been the needs related to a tool which is operable to display attributes of players and attributes of gaming machines in a graph so as to be associated with each other. By using the above-mentioned tool, a user can specify output items and display modes and for example, can display a report showing counts (frequencies) classified by numbers of games, a report showing degrees of popularity (Bet amounts) classified by themes and ages, and a report showing operation days of the week classified by member types (important members, new members, and the like) on a display of a client terminal 2011. However, the existing system has not so far realized the above-mentioned tool.

Accordingly, an object of the present invention is to provide a game information analysis system which is operable to evaluate a psychological state of a player by using simplified and effective representation based on operation data of a gaming machine.

In addition, another object of the present invention is to provide a game information analysis system which is operable to analyze attributes of players and attributes of gaming machines based on operation data of gaming machines and to conduct a matching analysis between the player attributes and the machine attributes.

In addition, further another object of the present invention is to provide a game information analysis system which is operable to display attributes of players and attributes of gaming machines so as to be associated with each other based on operation data of gaming machines.

In addition, still another object of the present invention is to provide a game information analysis system which is operable to determine and display a failure risk and a fraudulence risk related to gaming machines based on operation data of gaming machines and the like.

In addition, yet another object of the present invention is to provide a game information analysis system which is operable to conduct previous simulation for a result of promotion in a case where promotion in which coupons or the like are distributed in accordance with values of player attributes indicating attributes of players is conducted.

Further, still further another object of the present invention is to provide a game information analysis system which is operable to display attributes of players and attributes of gaming machines so as to be associated with each other in a graph in response to an instruction issued by a user.

BRIEF SUMMARY OF THE INVENTION

The present invention provides a game information analysis system as described below.

The game information analysis system according to a first aspect of the present invention has the below-described configuration.

The game information analysis system (for example, a game information analysis system 2001) including an analysis server (for example, an analysis server 2012), the analysis server including:

a game information reception part (for example, a game information reception part 2254 shown in FIG. 44) for receiving, from a gaming machine (for example, a plurality of slot machines 2014), game information including pieces of information pertinent to an investment money amount and a payout money amount; and a game information analysis part (for example, a game information analysis part 2255 shown in FIG. 44) for conducting an analysis process based on the game information, the game information analysis part, in response to an instruction issued by a user (for example, in response to an instruction issued by a user via a client terminal 2011), generating data (for example, generating HTML data or the like for displaying a graph shown in FIG. 32) for displaying correspondence relationship between player attributes indicating attributes of a player (for example, player attributes shown in FIG. 142) and gaming machine attributes indicating attributes of the gaming machine (for example, machine attributes shown in FIG. 141) by matching the player and the gaming machine, the matching being conducted by associating based on predetermined relationship between the player and the gaming machine, the predetermined relationship being obtained from the game information.

By employing the above-described configuration of the present invention, based on operation data of gaming machines, attributes of players and attributes of gaming machines are analyzed, and the matching based on the player attributes and the machine attributes is conducted, thereby allowing the correspondence relationship between the player attributes and the machine attributes to be grasped.

In the first aspect, the game information analysis system according to another aspect of the present invention has the below-described configuration.

in the matching, the player is classified by the player attributes and the gaming machine is classified by the gaming machine attributes (for example, as shown in the graph in FIG. 32, gaming machines are classified into rough-wave machines and small-wave machines, and players are classified into players whose each bet amount per game is large and players whose each bet amount per game is small).

By employing the above-described configuration of the present invention, the classification is made based on the attributes of players and the attributes of the gaming machines, and as a result of the matching, the correspondence relationship can be thereby grasped through the classification based on the player attributes and the classification of the machine attributes.

In the first aspect, the game information analysis system according to another aspect of the present invention has the below-described configuration.

The predetermined relationship includes a relation (for example, the relation shown by a member-machine correspondence table shown in FIG. 144) in which the player has played games by using the gaming machine. It is to be noted that as the predetermined relationship, a relation other than the above-mentioned use-related relation is also considered. For example, a player can be associated with a gaming machine (including a gaming machine which the player has not used) which is manufactured by the same maker manufacturing a gaming machine which the player often uses.

By employing the above-described configuration of the present invention, the matching based on the player attributes and the gaming machine attributes is associated with the actual act of playing games on a gaming machine by a player.

In the first aspect, the game information analysis system according to another aspect of the present invention has the below-described configuration.

The game information analysis part evaluates a psychological state of the player based on a transition pattern (for example, each shape pattern as shown in FIG. 135 and FIG. 136) of the investment money amount and the payout money amount, the game information analysis part calculates a customer satisfaction degree score based on the psychological state of the player (for example, based on a shape pattern of a candlestick chart, a candlestick chart related psychology score is calculated (FIG. 137 and FIG. 138)), and the game information analysis part stores the customer satisfaction degree score in a storage device as corresponding player attributes of the player (for example, the customer satisfaction degree score is stored as one of the player attributes in a storage device of the analysis server so as to be associated with a member ID) and stores the customer satisfaction degree score in the storage device as corresponding gaming machine attributes of the gaming machine (for example, the customer satisfaction degree score is stored as one of the machine attributes in the storage device of the analysis server so as to be associated with a machine ID).

By employing the above-described configuration of the present invention, the matching based on the player attributes and the machine attributes is conducted with respect to the customer satisfaction degree score, thereby allowing the correspondence relationship between the player attributes and the machine attributes to be grasped from the perspective of satisfaction of customers.

In addition, the present invention provides a game information analysis system as described below.

The game information analysis system according to a second aspect of the present invention has the below-described configuration.

The game information analysis system (for example, a game information analysis system 2001) including an analysis server (for example, an analysis server 2012), the analysis server including:

a game information reception part (for example, a game information reception part 2254 shown in FIG. 44) for receiving, from a gaming machine (for example, a plurality of slot machines 2014), game information including pieces of information pertinent to an investment money amount and a payout money amount; and a game information analysis part (for example, a game information analysis part 2255 shown in FIG. 44) for conducting an analysis process based on the game information, the game information analysis part, in response to an instruction issued by a user (for example, in response to an instruction issued by a user via a client terminal 2011), generating data (for example, generating HTML data or the like for displaying a graph shown in FIG. 146) for conducting correspondence display in which player attributes indicating attributes of a player (for example, player attributes shown in FIG. 142) and gaming machine attributes indicating attributes of the gaming machine (for example, machine attributes shown in FIG. 141) are associated with each other, the correspondence display being conducted by displaying, in accordance with the attributes of one of the player attributes and the gaming machine attributes, a totalized value of values of the attributes of the other of the player attributes and the gaming machine attributes (for example, as show in FIG. 146, totalized values of playing periods of time of a player are displayed with respect to respective themes of gaming machines).

By employing the above-described configuration of the present invention, based on operation data of gaming machines, the associating between the player attributes and the machine attributes is displayed, thereby allowing the correspondence relationship related to the attributes of the players and the gaming machines to be grasped. It is to be noted that as the totalized attributes, in addition to the playing periods of time on each of the gaming machines, a variety of indices such as Bet money amounts, values of Bet money amount/game, numbers of games, numbers of users, and numbers of machines are included.

In the second aspect, the game information analysis system according to another aspect of the present invention has the below-described configuration.

The correspondence display is conducted by displaying the totalized value by a time ratio (for example, as shown in FIG. 146, the totalized values of the playing periods of time of the player are displayed with respect to the respective themes, and the playing periods of time are displayed by the time ratios, with a playing period of time of all themes being 100).

By employing the above-described configuration of the present invention, the correspondence relationship related to the attributes between the player and the gaming machine is displayed by the relative time ratios, thereby allowing the correspondence relationship to be more specifically grasped. It is to be noted that in a case where besides the playing periods of time of each of the gaming machines, the totalized attributes are Bet money amounts, values of Bet money amount/game, numbers of games, numbers of users, or numbers of machines, a ratio of each of the values to the total number is displayed.

In the second aspect, the game information analysis system according to another aspect of the present invention has the below-described configuration.

The correspondence display is conducted by displaying the totalized value in a time-series manner (for example, as shown in FIG. 146, the totalized values of the playing periods of time of the player are displayed with respect to the respective themes, the totalization of the playing periods of time is conducted with respect to each month, and the totalization in each of December in 2013 to October in 2014 is individually displayed).

By employing the above-described configuration of the present invention, the correspondence relationship related to the attributes between the player and the gaming machine is displayed in the time-series manner, thereby allowing trends or the like and transition of the correspondence relationship to be grasped.

In addition, the present invention provides a game information analysis system as described below.

The game information analysis system according to a third aspect of the present invention has the below-described configuration.

The game information analysis system (for example, a game information analysis system 2001) including an analysis server (for example, an analysis server 2012), the analysis server including:

a game information reception part (for example, a game information reception part 2254 shown in FIG. 44) for receiving, from a gaming machine (for example, a plurality of slot machines 2014), game information including pieces of information pertinent to an investment money amount and a payout money amount; and a game information analysis part (for example, a game information analysis part 2255 shown in FIG. 44) for conducting an analysis process based on the game information, the game information including a failure signal indicating occurrence of failure of each gaming machine (for example, failure occurrence signals indicating occurrence of failure of gaming machines), the game information analysis part totalizing values of machine attributes indicating attributes of the gaming machine from the game information (for example, numbers of sessions, numbers of games, playing periods of time, total stopping periods of time, and the like), the game information analysis part determining a failure risk indicating possibility of the occurrence of failure related to the gaming machine based on the failure signal and the values of the attributes, the game information analysis part determining a phased-sign based on the failure risk and generating data (for example, generating HTML data or the like for displaying a report shown in FIG. 147) for displaying a report (for example, the report shown in FIG. 147 in which machine states are shown through signal display in three phases in accordance with failure risks) showing said determined sign so as to be associated with the corresponding gaming machine.

By employing the above-described configuration of the present invention, based on operation data of gaming machines, the failure risks related to the gaming machines are displayed, thereby allowing the possibility of failure of the gaming machines to be early and effectively grasped.

In the third aspect, the game information analysis system according to another aspect of the present invention has the below-described configuration.

The game information analysis part determines a fraudulence risk indicating possibility of a fraudulent act against the gaming machine from the information pertinent to the investment money amount and the payout money amount (for example, information indicating the relationship of IN/OUT such as POs) included in the game information, and the game information analysis part determines the phased-sign based on the failure risk and the fraudulence risk.

By employing the above-described configuration of the present invention, based on operation data of gaming machines, the failure risks and the fraudulence risks related to the gaming machines are displayed, thereby allowing the possibility of failure and the possibility of fraudulent acts of the gaming machines to be early and effectively grasped.

In the third aspect, the game information analysis system according to another aspect of the present invention has the below-described configuration.

The game information includes a non-failure signal (for example, which is a signal transmitted as a signal indicating an event not being failure but includes a signal indicating notification related to substantial failure) being likely to indicate occurrence of substantial failure, and when the gaming machine is selected, the report shows information pertinent to the failure signal related to the selected gaming machine and information pertinent to the non-failure signal related to the selected gaming machine, with respect to each function part of the gaming machine (for example, respective parts of each of the gaming machines such as a bill validator, a card dispenser, a cabinet, and a communication controller).

By employing the above-described configuration of the present invention, based on failure signals and the like of the gaming machines, the failure information with respect to the function parts of each of the gaming machines is displayed, thereby allowing the possibility of failure to be grasped for the function parts of each of the gaming machines.

In addition, the present invention provides a game information analysis system as described below.

The game information analysis system according to a fourth aspect of the present invention has the below-described configuration.

The game information analysis system (for example, a game information analysis system 2001) including an analysis server (for example, an analysis server 2012), the analysis server including:

a game information reception part (for example, a game information reception part 2254 shown in FIG. 44) for receiving, from a gaming machine (for example, a plurality of slot machines 2014), game information including pieces of information pertinent to an investment money amount and a payout money amount; and a game information analysis part (for example, a game information analysis part 2255 shown in FIG. 44) for conducting an analysis process based on the game information, the game information analysis part totalizing values of player attributes indicating attributes of a player (for example, player attributes shown in FIG. 142) from the game information, the game information analysis part determining a target for promotion in accordance with the values of the player attributes (for example, as shown in FIG. 38, promotion is implemented, targeted for players whose store-visiting frequencies of player attributes are high), the game information analysis part simulating a result of the promotion (for example, as shown in FIG. 38, a result of the simulation conducted with respect to sales values is shown).

By employing the above-described configuration of the present invention, with respect to the promotion in accordance with the attributes of players, the previous simulation can be conducted, thereby allowing the effect of the promotion to be predicted.

In the fourth aspect, the game information analysis system according to another aspect of the present invention has the below-described configuration.

The game information analysis part evaluates a psychological state of the player based on a transition pattern of the investment money amount and the payout money amount (for example, from a transition pattern of the player investment money amount and the slot machine payout money amount, a corresponding candlestick chart is determined (FIG. 135 and FIG. 136)), and based on the candlestick charts or a combination of the candlestick charts, a candlestick chart related psychology score is calculated (FIG. 138)), the game information analysis part stores a customer satisfaction degree score being obtained based on the psychological state of the player in a storage device so as to be associated with the player (for example, the customer satisfaction degree score is stored in a storage device of the analysis server 2012), and the game information analysis part determines a target for promotion in accordance with a result of classification of the player based on the customer satisfaction degree score (for example, promotion is implemented, targeted for players whose customer satisfaction degrees are low).

By employing the above-described configuration of the present invention, with respect to the promotion in accordance with the customer satisfaction degree scores of players obtained based on operation data of gaming machines, the previous simulation can be conducted, thereby allowing the effect of the promotion to be predicted.

In the fourth aspect, the game information analysis system according to another aspect of the present invention has the below-described configuration.

When a right (for example, coupons distributed to players, points provided onto member cards, and the like) which the player is allowed to exercise has been provided, the right yielding a profit to the player, the game information analysis part analyzes a state of exercising the right with respect to the determined target for the promotion so as to be associated with the player attributes.

By employing the above-described configuration of the present invention, the state of exercising the right provided to the player can be grasped, thereby allowing the effect of the promotion, which includes the player attributes and the state of exercising the right, to be predicted.

Further, the present invention provides a game information analysis system as described below.

The game information analysis system according to a fifth aspect of the present invention has the below-described configuration.

The game information analysis system (for example, a game information analysis system 2001) including an analysis server (for example, an analysis server 2012), the analysis server including:

a game information reception part (for example, a game information reception part 2254 shown in FIG. 44) for receiving, from a gaming machine (for example, a plurality of slot machines 2014), game information including pieces of information pertinent to an investment money amount and a payout money amount; and a game information analysis part (for example, a game information analysis part 2255 shown in FIG. 44) for conducting an analysis process based on the game information, the game information analysis part totalizing, from the game information, values of attributes including player attributes indicating attributes of a player (for example, player attributes shown in FIG. 142) and gaming machine attributes indicating attributes of the gaming machine (for example, machine attributes shown in FIG. 141), upon specifying an output item from among the attributes by a user (for example, as shown in FIG. 94, in a case where indices (player attributes and the like) are specified in a column in which display targets are specified), the game information analysis part developing a graph (for example, developing a graph shown in each of FIG. 95 to FIG. 97) so as to associate the output item with other attributes specified by the user, the game information analysis part generating data (for example, generating HTML data or the like for displaying a graph shown in FIG. 146) for displaying a report including the graph.

By employing the above-described configuration of the present invention, in accordance with the specifying by a user, the attributes of players and the attributes of gaming machines can be displayed in the graph so as to be associated with each other, thereby allowing the game information to be analyzed from viewpoints which a user desires.

In the fifth aspect, the game information analysis system according to another aspect of the present invention has the below-described configuration.

Attributes specified as the output item are classified into a plurality of categories based on predetermined criteria in accordance with values of the attributes and are developed in the graph (for example, as shown in FIG. 95, numbers of games are classified into a plurality of categories, or as shown in FIG. 97, player attributes are classified into playing days of the week in accordance with playing dates).

By employing the above-described configuration of the present invention, in response to the instruction issued by a user, based on the attributes of players and the attributes of gaming machines, distribution and the like of other attributes can be displayed with respect to each of the categories of the predetermined attributes, thereby allowing easy visualization of the game information to be realized.

In the fifth aspect, the game information analysis system according to another aspect of the present invention has the below-described configuration.

In the player attributes, a customer satisfaction degree score is included, the game information analysis part evaluates a psychological state of the player based on a transition pattern of the investment money amount and the payout money amount (for example, each shape pattern as shown in FIG. 135 and FIG. 136), the game information analysis part calculates the customer satisfaction degree score based on the psychological state of the player (for example, based on a shape pattern of a candlestick chart, a candlestick chart related psychology score is calculated (FIG. 137 and FIG. 138)), and the game information analysis part stores the calculated customer satisfaction degree score so as to be associated with the player (for example, the customer satisfaction degree score is stored as one of the player attributes in a storage device of the analysis server so as to be associated with a member ID), the storing being conducted so as to be associated with each player.

By employing the above-described configuration of the present invention, with respect to the attributes indicating the psychological state of a player, in response to the instruction issued by a user, distribution and the like of the attributes can be displayed, thereby allowing the customer satisfaction degree of a player to be analyzed so as to be associated with other attributes.

By the game information analysis system according to the present invention, the degree of satisfaction of a customer based on the psychological state of a player can be obtained.

By the game information analysis system according to the present invention, based on operation data of gaming machines, the attributes of a player and the attributes of a gaming machine are analyzed and the matching between the player attributes and the machine attributes is conducted, thereby allowing the correspondence relationship between the player attributes and the machine attributes to be grasped.

By the game information analysis system according to the present invention, based on operation data of gaming machines, the attributes of a player and the attributes of a gaming machine can be displayed so as to be associated with each other.

By the game information analysis system according to the present invention, based on operation data of gaming machines or the like, the failure risks related to the gaming machines are displayed, thereby allowing the possibility of failure of the gaming machines to be early and effectively grasped.

By the game information analysis system according to the present invention, in accordance with the specifying by a user, the attributes of a player and the attributes of a gaming machine can be displayed in a graph so as to be associated with each other, thereby allowing the game information to be analyzed from viewpoints which a user desires.

BRIEF DESCRIPTION OF THE DRAWINGS

FIG. 9 is a diagram showing an example of a symbol combination table which the slot machine according to the one embodiment of the present invention includes;

FIG. 17 is a diagram explaining a background in which the game information analysis system according to the present invention is needed;

FIG. 18 is a diagram explaining features of the game information analysis system according to the present invention;

FIG. 20 is a diagram showing variations of operation forms of the game information analysis system according to one embodiment of the present invention;

FIG. 28 is a diagram explaining outlines of main functions and features of the game information analysis system according to the one embodiment of the present invention;

FIG. 34 is a diagram showing an example in which with respect to a fraudulent act analysis, a suspected machine, a suspected player, and a suspected session are analyzed in the game information analysis system according to the one embodiment of the present invention;

FIG. 49 is a diagram explaining the outline report of the menu screen displayed in the game information analysis system according to the one embodiment of the present invention;

FIG. 50 is a diagram explaining the outline report of the menu screen displayed in the game information analysis system according to the one embodiment of the present invention;

FIG. 51 is a diagram explaining the outline report of the menu screen displayed in the game information analysis system according to the one embodiment of the present invention;

FIG. 52 is a diagram explaining the outline report of the menu screen displayed in the game information analysis system according to the one embodiment of the present invention;

FIG. 53 is a diagram explaining the outline report of the menu screen displayed in the game information analysis system according to the one embodiment of the present invention;

FIG. 55 is a diagram explaining the machine report of the menu screen displayed in the game information analysis system according to the one embodiment of the present invention;

FIG. 56 is a diagram explaining the machine report of the menu screen displayed in the game information analysis system according to the one embodiment of the present invention;

FIG. 57 is a diagram explaining the machine report of the menu screen displayed in the game information analysis system according to the one embodiment of the present invention;

FIG. 58 is a diagram explaining the machine report of the menu screen displayed in the game information analysis system according to the one embodiment of the present invention;

FIG. 60 is a diagram explaining the player report of the menu screen displayed in the game information analysis system according to the one embodiment of the present invention;

FIG. 61 is a diagram explaining the player report of the menu screen displayed in the game information analysis system according to the one embodiment of the present invention;

FIG. 62 is a diagram explaining the player report of the menu screen displayed in the game information analysis system according to the one embodiment of the present invention;

FIG. 63 is a diagram explaining the player report of the menu screen displayed in the game information analysis system according to the one embodiment of the present invention;

FIG. 65 is a diagram explaining the member report of the menu screen displayed in the game information analysis system according to the one embodiment of the present invention;

FIG. 66 is a diagram explaining the member report of the menu screen displayed in the game information analysis system according to the one embodiment of the present invention;

FIG. 67 is a diagram explaining the member report of the menu screen displayed in the game information analysis system according to the one embodiment of the present invention;

FIG. 68 is a diagram explaining the member report of the menu screen displayed in the game information analysis system according to the one embodiment of the present invention;

FIG. 70 is a diagram explaining the real time of the menu screen displayed in the game information analysis system according to the one embodiment of the present invention;

FIG. 71 is a diagram explaining the real time of the menu screen displayed in the game information analysis system according to the one embodiment of the present invention;

FIG. 73 is a diagram explaining the specialized analysis of the menu screen displayed in the game information analysis system according to the one embodiment of the present invention;

FIGS. 74A and 74B are diagrams explaining the specialized analysis of the menu screen displayed in the game information analysis system according to the one embodiment of the present invention;

FIGS. 75A and 75B are diagrams explaining the specialized analysis of the menu screen displayed in the game information analysis system according to the one embodiment of the present invention;

FIGS. 77A and 77B are diagrams explaining the tool of the menu screen displayed in the game information analysis system according to the one embodiment of the present invention;

FIGS. 78A and 78B are diagrams explaining the tool of the menu screen displayed in the game information analysis system according to the one embodiment of the present invention;

FIG. 81 is a diagram exemplifying the menu screen and the relationship of the use case related to the owner in the game information analysis system according to the one embodiment of the present invention;

FIG. 82 is a diagram showing a report displayed by the outline report in details in the game information analysis system according to the one embodiment of the present invention;

FIG. 88 is a diagram showing a report in details displayed by the machine report in the game information analysis system according to the one embodiment of the present invention;

FIG. 89 is a diagram showing a report in details displayed by the specialized analysis in the game information analysis system according to the one embodiment of the present invention;

FIG. 97 is a diagram showing a report in details displayed by the tool in the game information analysis system according to the one embodiment of the present invention;

FIG. 101 is a diagram showing a table as a list of reports related to basic functions in the game information analysis system according to the one embodiment of the present invention;

FIG. 102 is a diagram showing a table as a list of reports related to an accessory function in the game information analysis system according to the one embodiment of the present invention;

FIG. 103 is a table organized as a list explaining basic indices in the game information analysis system according to the one embodiment of the present invention;

FIG. 104 is a table organized as a list explaining machine basic indices in the game information analysis system according to the one embodiment of the present invention;

FIG. 105 is a table organized as a list explaining player basic indices in the game information analysis system according to the one embodiment of the present invention;

FIG. 106 is a table organized as a list explaining balance determination indices (1) in the game information analysis system according to the one embodiment of the present invention;

FIG. 107 is a table organized as a list explaining balance determination indices (2) in the game information analysis system according to the one embodiment of the present invention;

FIG. 108 is a table organized as a list explaining balance determination indices (2) in the game information analysis system according to the one embodiment of the present invention;

FIG. 109 is a table organized as a list explaining psychology indices in the game information analysis system according to the one embodiment of the present invention;

FIG. 110 is a table organized as a list explaining the psychology indices in the game information analysis system according to the one embodiment of the present invention;

FIG. 111 is a table organized as a list explaining wave motion attribute indices (1) in the game information analysis system according to the one embodiment of the present invention;

FIG. 112 is a table organized as a list explaining wave motion attribute indices (1) in the game information analysis system according to the one embodiment of the present invention;

FIG. 113 is a table organized as a list explaining wave motion attribute indices (2) in the game information analysis system according to the one embodiment of the present invention;

FIG. 114 is a table organized as a list explaining wave motion attribute indices (2) in the game information analysis system according to the one embodiment of the present invention;

FIG. 115 is a table organized as a list explaining session attribute indices in the game information analysis system according to the one embodiment of the present invention;

FIG. 116 is a table organized as a list explaining calendar indices in the game information analysis system according to the one embodiment of the present invention;

FIG. 117 is a table organized as a list explaining machine categories in the game information analysis system according to the one embodiment of the present invention;

FIG. 118 is a table organized as a list explaining machine categories in the game information analysis system according to the one embodiment of the present invention;

FIG. 119 is a table organized as a list explaining player categories in the game information analysis system according to the one embodiment of the present invention;

FIG. 120 is a table organized as a list explaining calendar categories in the game information analysis system according to the one embodiment of the present invention;

FIG. 121 is a flowchart showing an outline of a procedure of a bonus game state detection process in the game information analysis system according to the one embodiment of the present invention;

FIG. 122 is a graph exemplifying transition of a game revenue and expenditure on a slot machine according to the one embodiment of the present invention;

FIG. 123 is a table showing data used for displaying a graph showing transition of the game revenue and expenditure on the slot machine according to the one embodiment of the present invention;

FIGS. 124A and 124B show a table explaining in details a process related to calculation of a normal-time PO in the game information analysis system according to the one embodiment of the present invention;

FIG. 125 is a graph exemplifying transition of the game revenue and expenditure on the slot machine according to the one embodiment of the present invention;

FIGS. 126A and 126B show a table showing data including game information corresponding to the graph shown in FIG. 125;

FIG. 127 is a flowchart showing a procedure related to detection of bonus game state candidates in the game information analysis system according to the one embodiment of the present invention;

FIG. 128 is a flowchart showing procedures related to re-evaluation of candidates and detection of a bonus game state in the game information analysis system according to the one embodiment of the present invention;

Figure 129A:
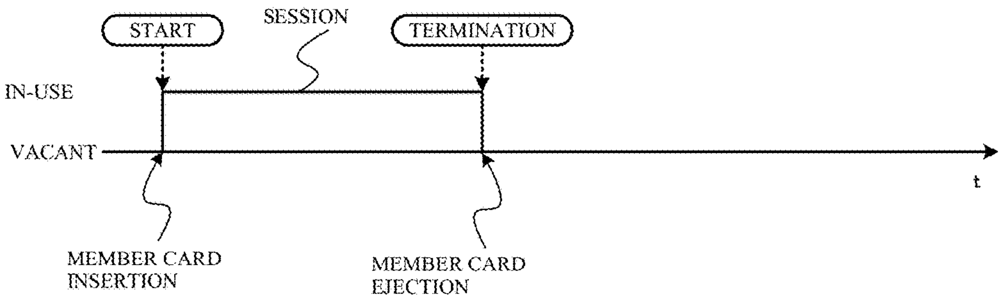
Figure 129B:
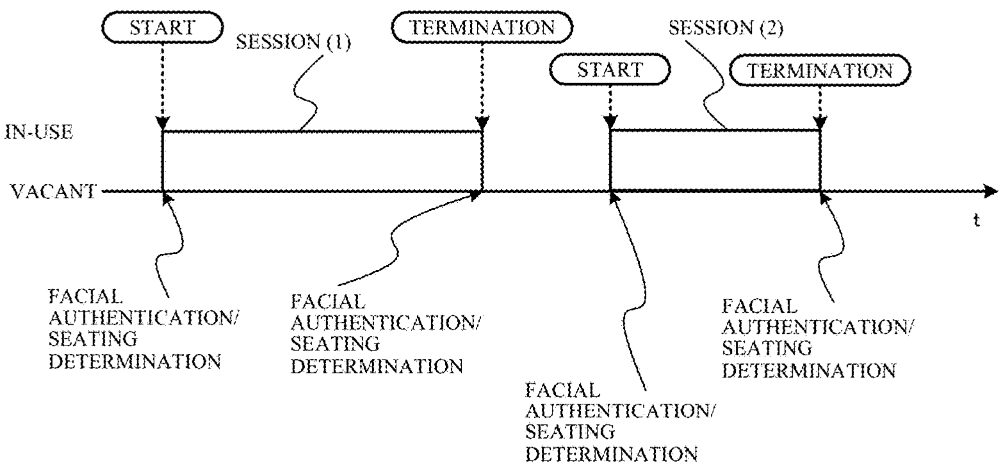
Figure 129C:
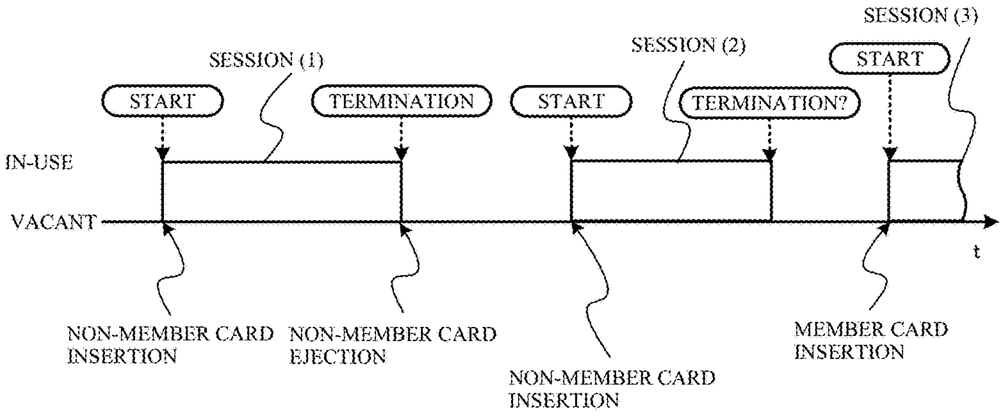
Figure 130A:
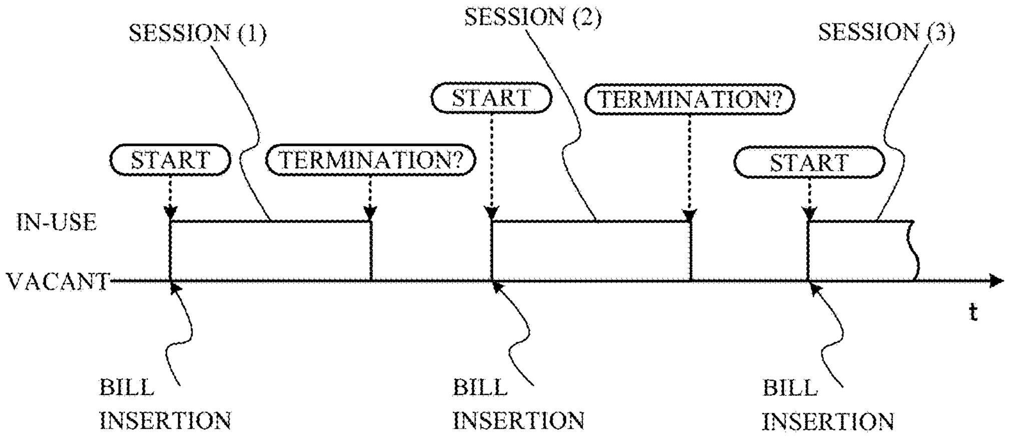
Figure 130B:
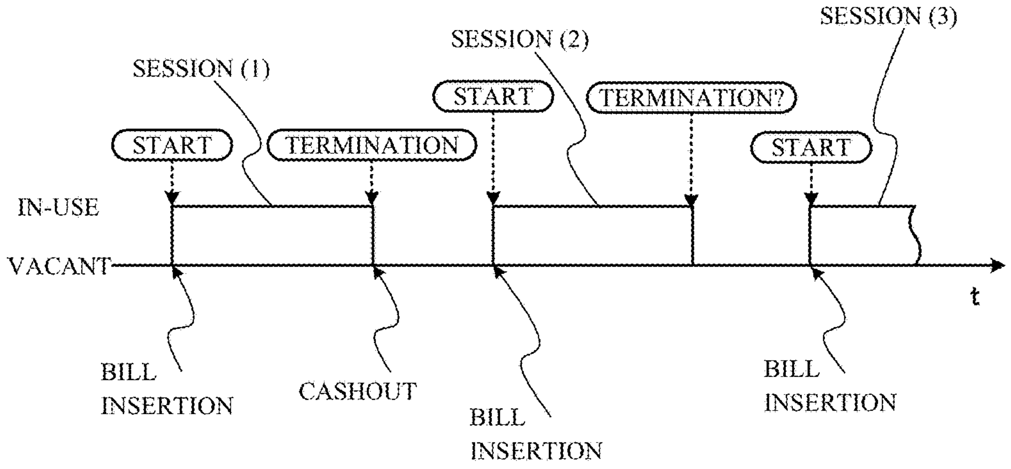
Figure 132:
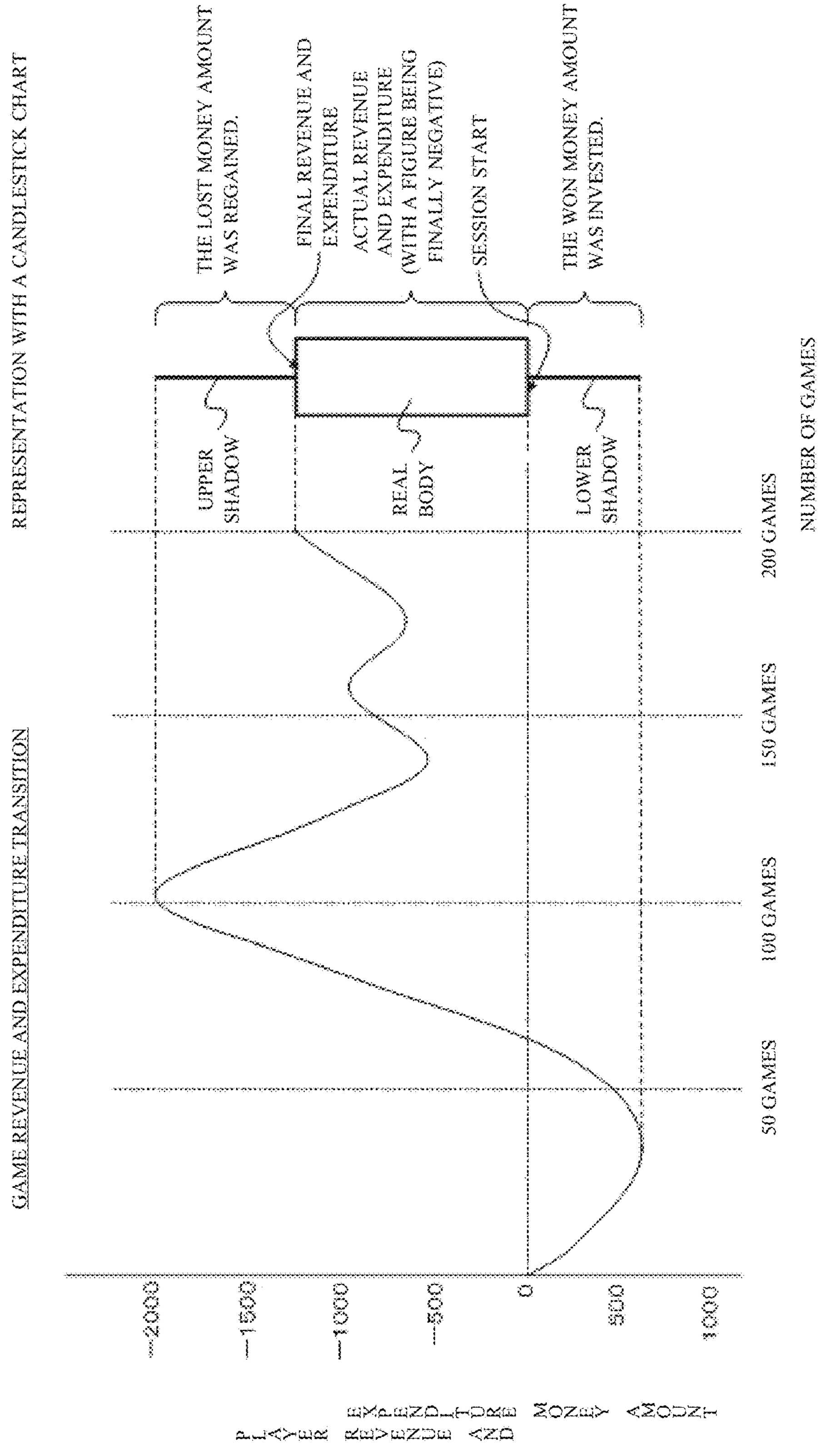
Figure 133:
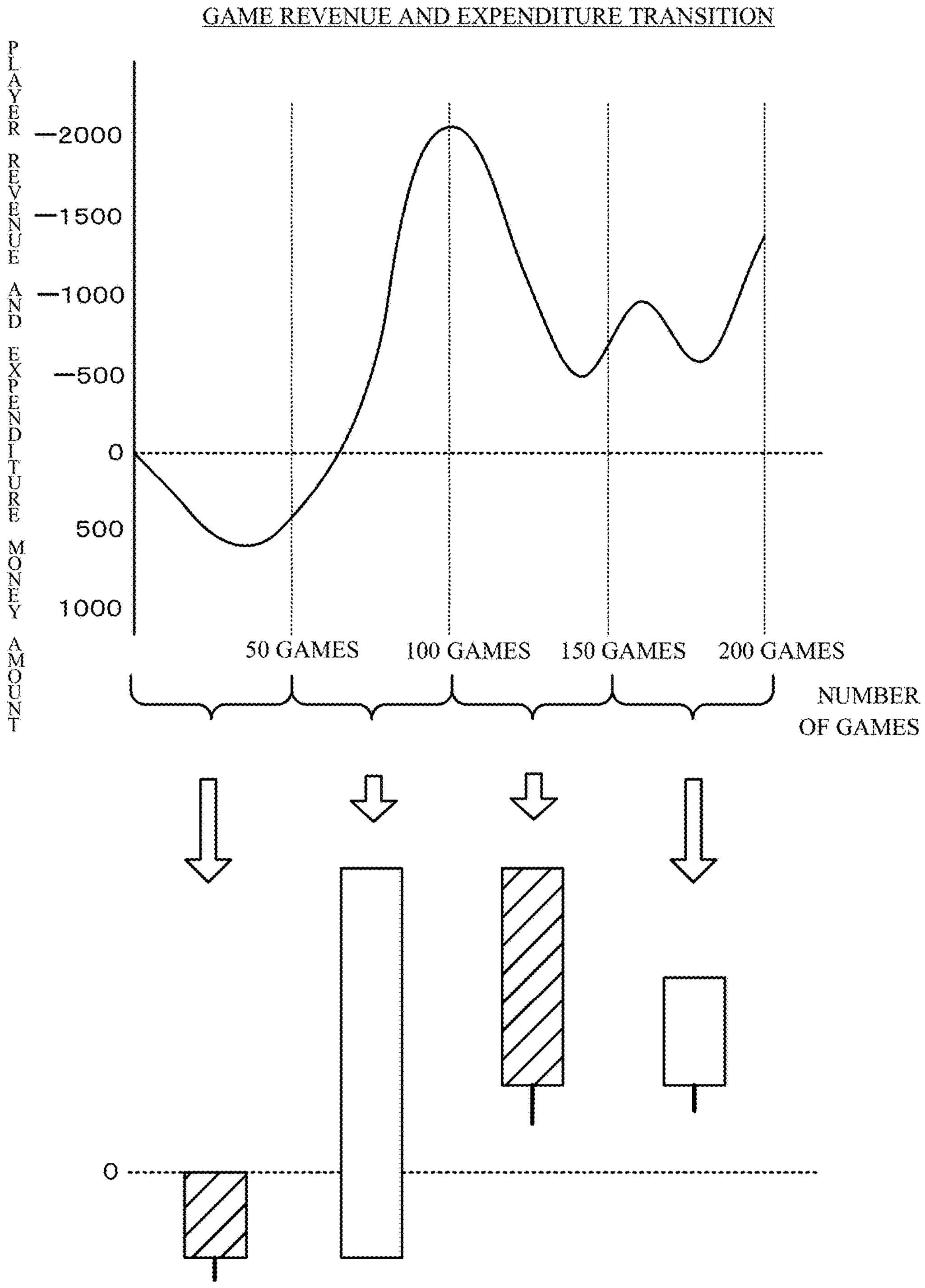
Figure 134:
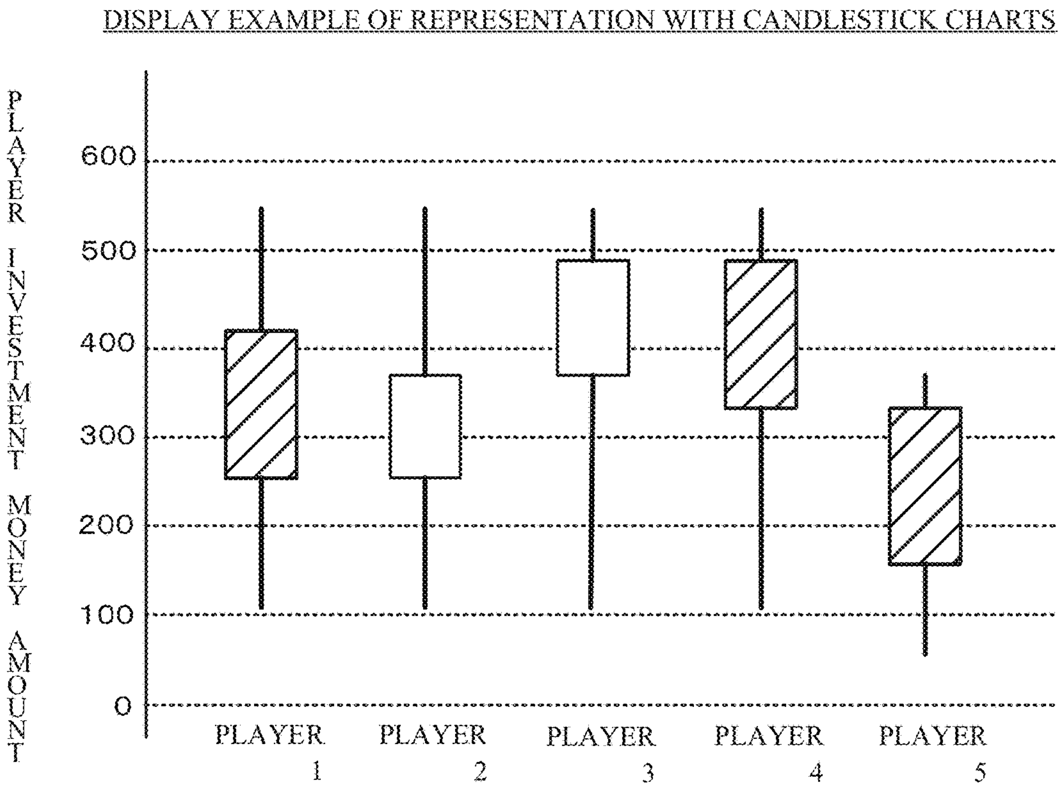
Figure 135:
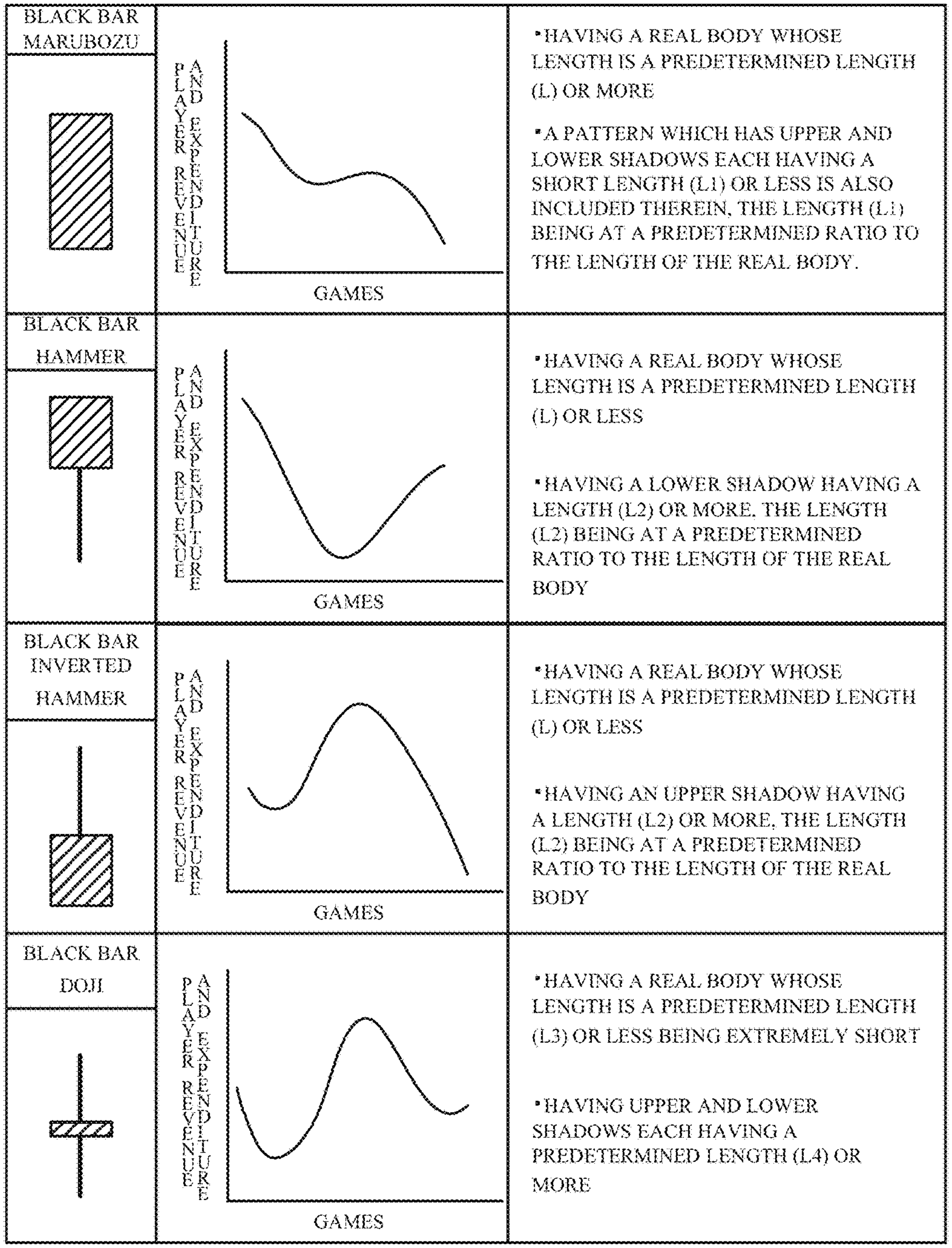
Figure 136:
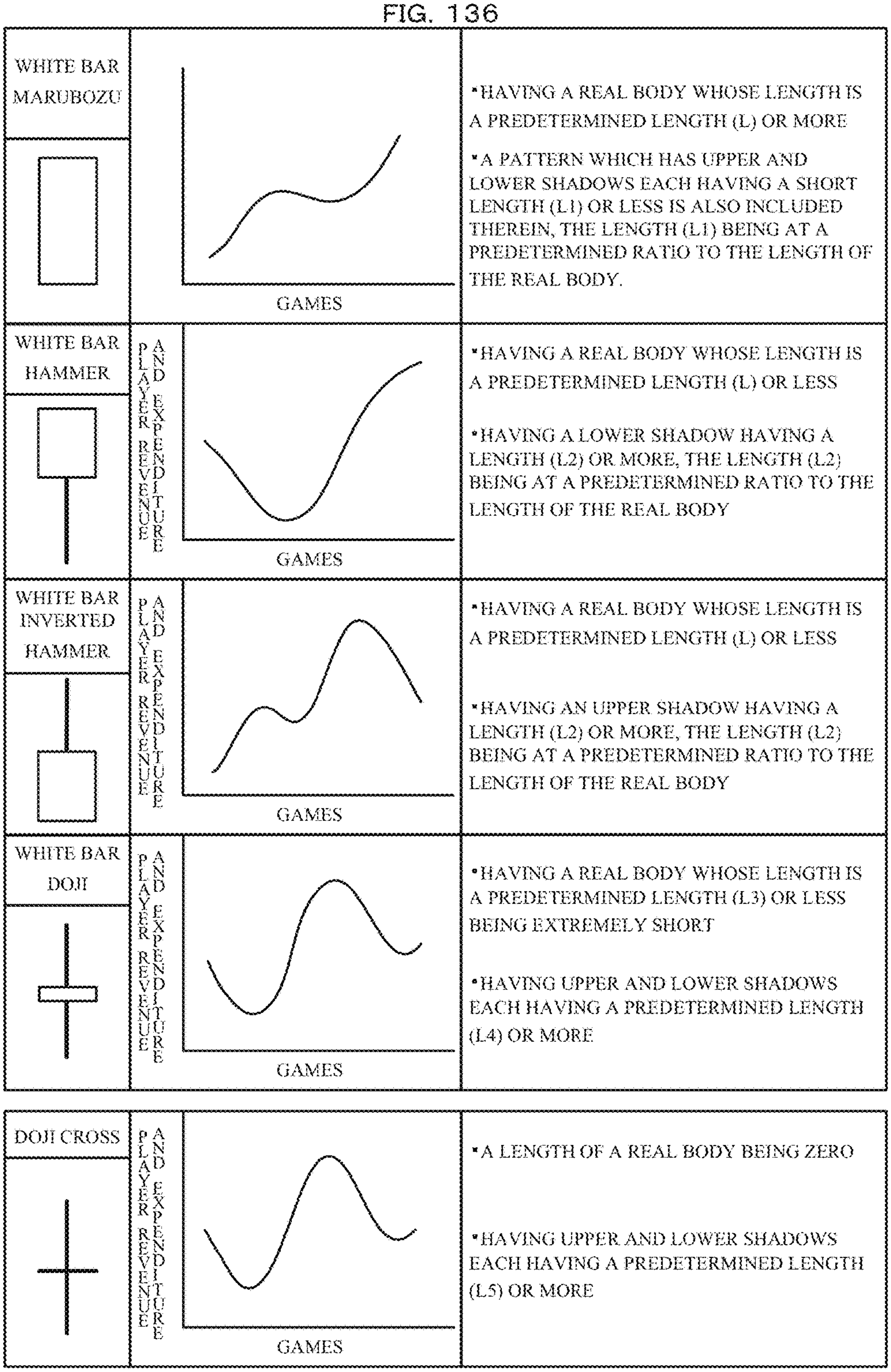
Figure 137:
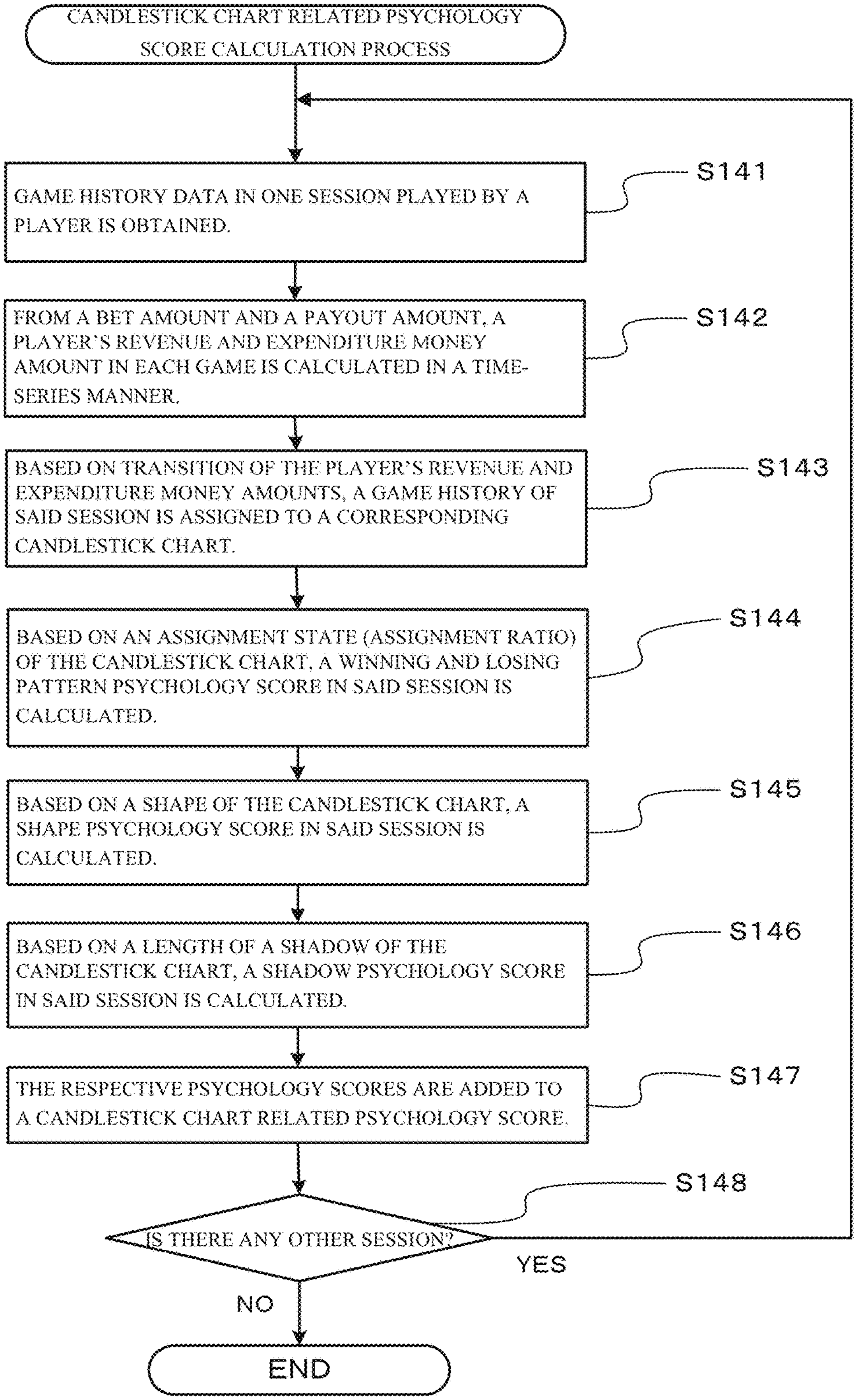
Figure 138:
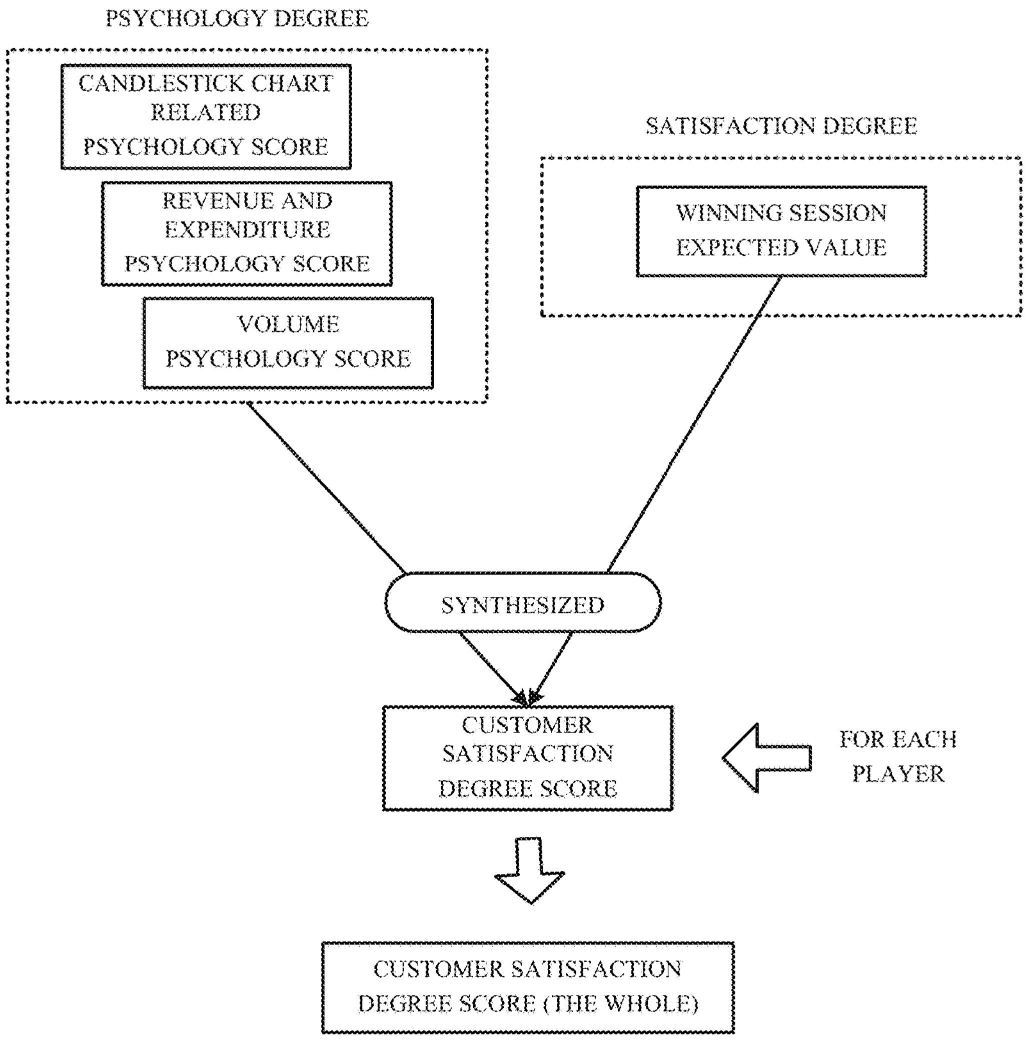
Figure 139:
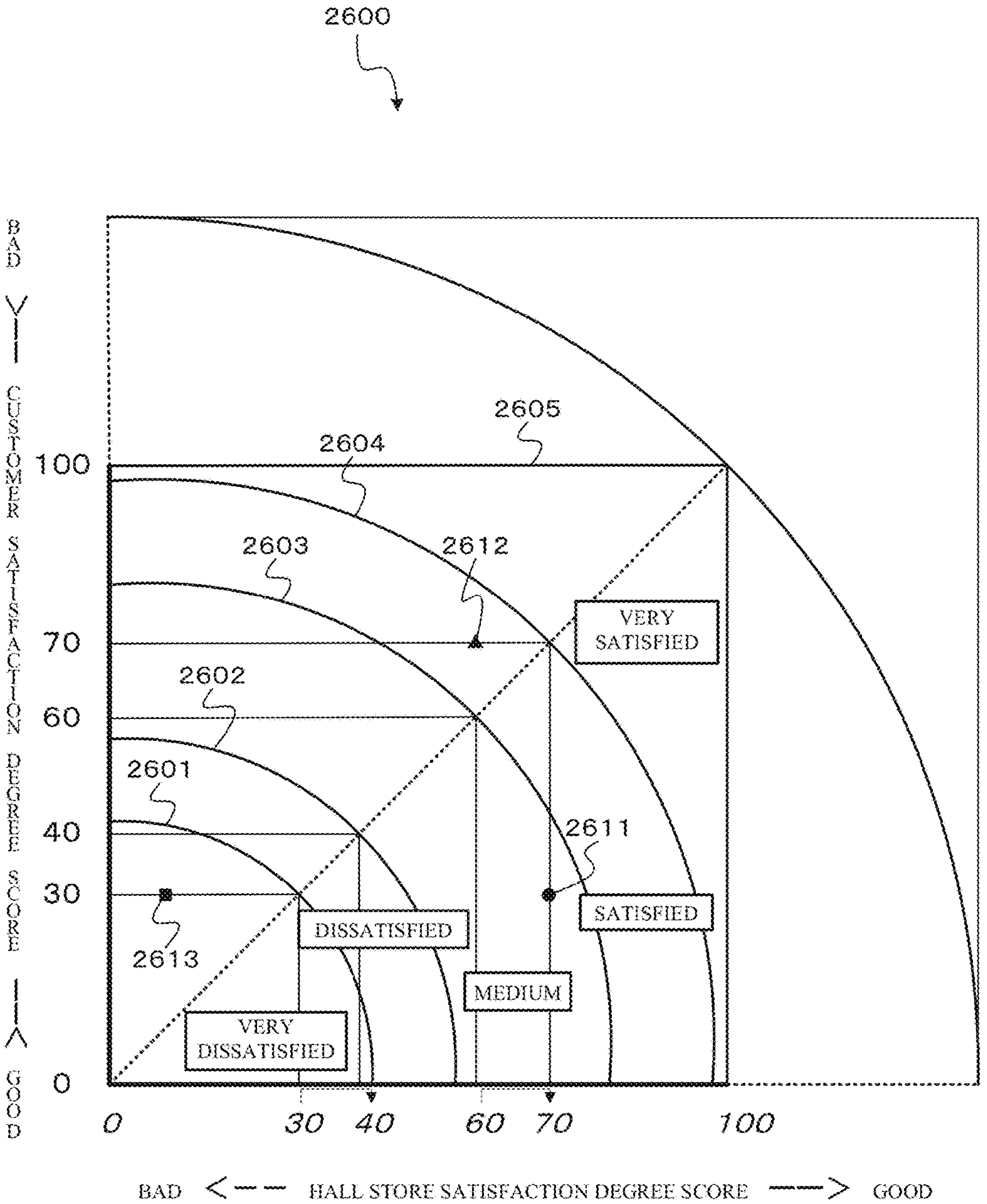
Figure 140:
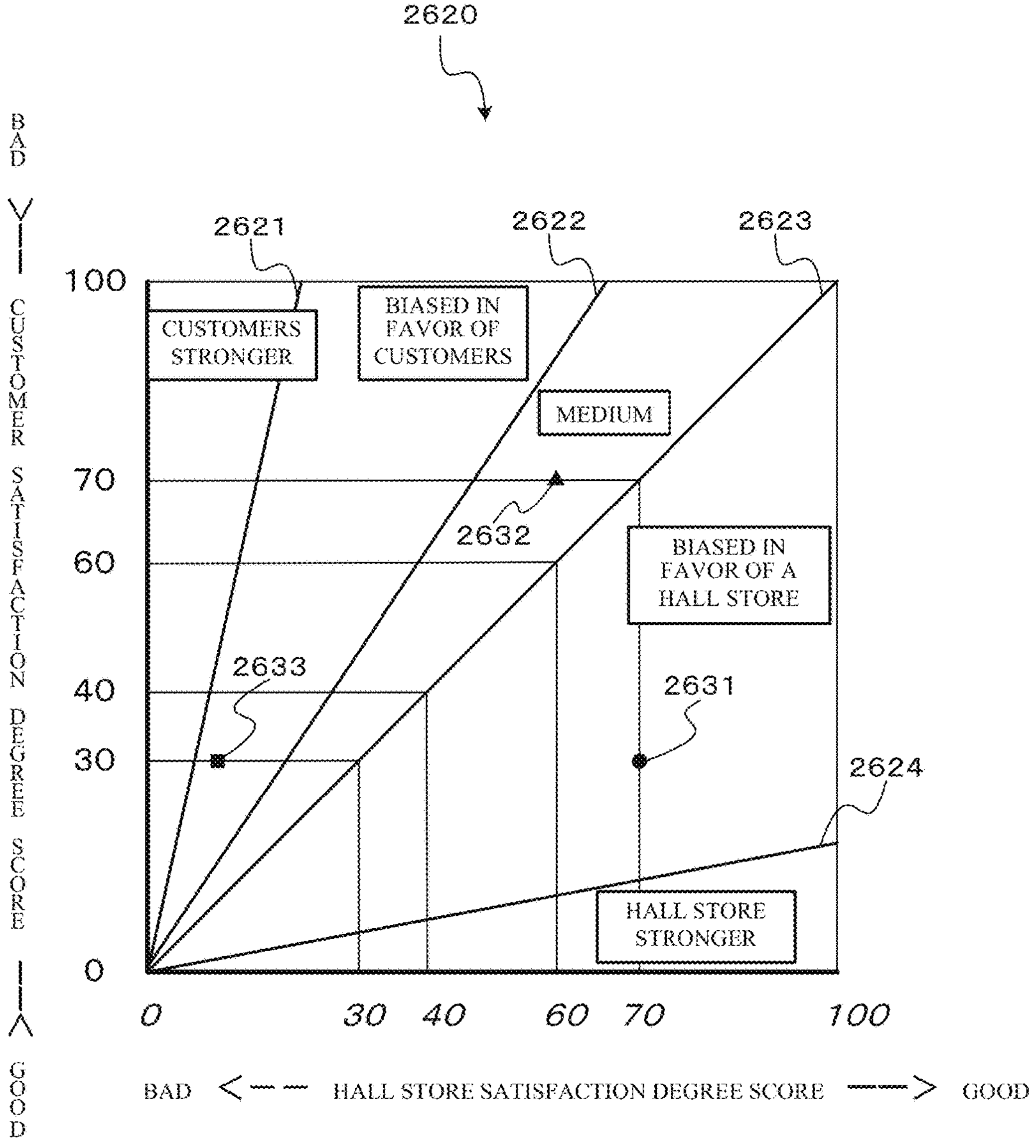
Figure 146:
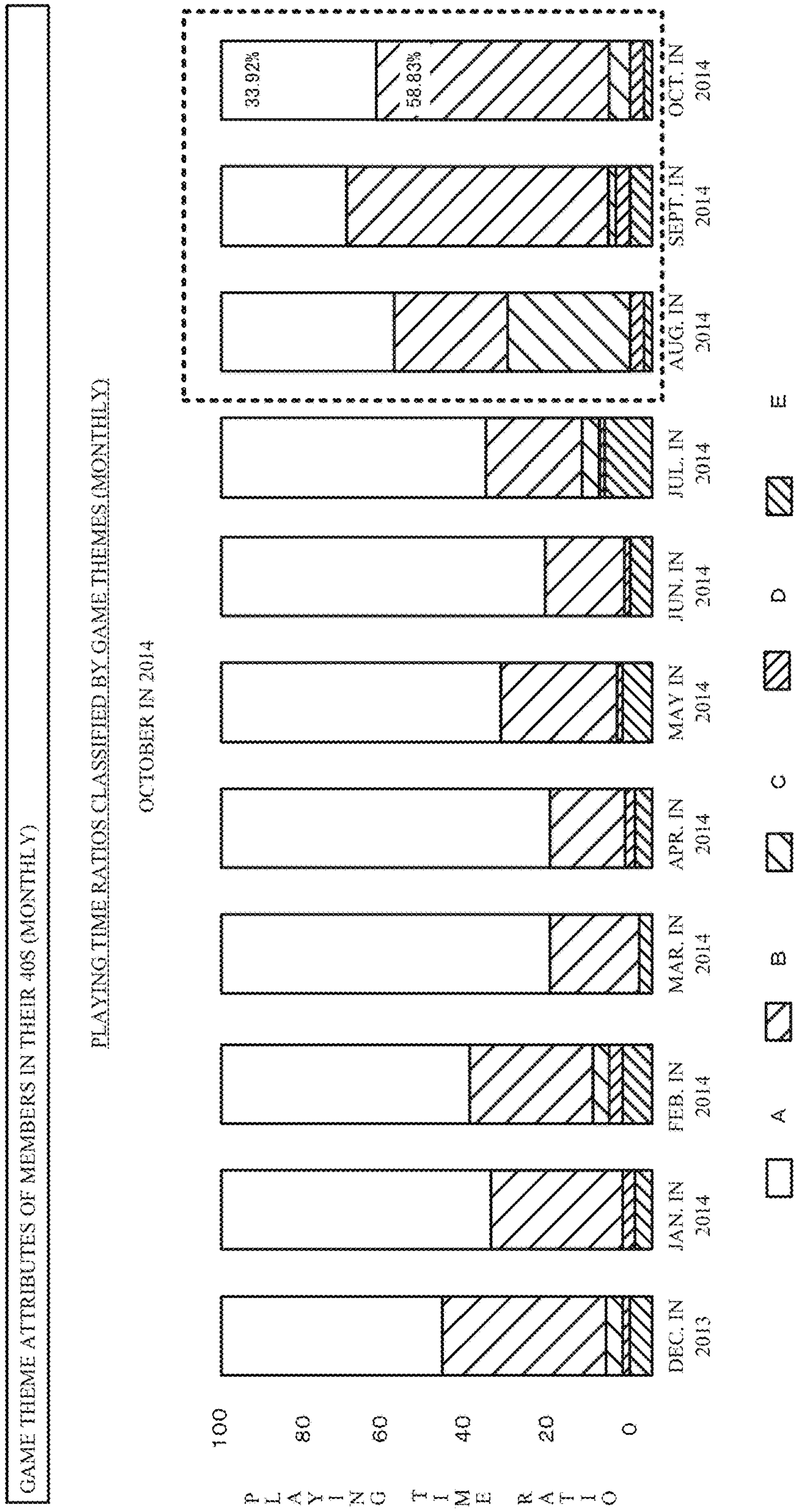

FIGS. 129A, 129B, and 129C are diagrams showing some patterns of game start and termination on one slot machine;

FIGS. 130A and 130B are diagrams showing some patterns of game start and termination on one slot machine;

FIG. 131 a table showing data which indicates transition of a game revenue and expenditure in the game information analysis system according to the one embodiment of the present invention;

FIG. 132 is a diagram showing game revenue and expenditure amounts of a player with respect to another session which is different from the session shown in FIG. 131;

FIG. 133 is a diagram in which the player revenue and expenditure amounts shown in FIG. 132 are further subdivided by each 50 games to be represented as candlestick charts;

FIG. 134 is a diagram exemplifying representation of candlestick charts related respective players in the game information analysis system according to the one embodiment of the present invention;

FIG. 135 is a diagram showing representative patterns with respect to a candlestick chart (black bar) and explaining criteria of pattern recognition to determine such patterns in the game information analysis system according to the one embodiment of the present invention;

FIG. 136 is a diagram showing representative patterns with respect to a candlestick chart (white bar) and explaining criteria of pattern recognition to determine such patterns in the game information analysis system according to the one embodiment of the present invention;

FIG. 137 is a flowchart showing a procedure of a candlestick chart related psychology score calculation process in which based on a candlestick chart, a psychological state of a player is represented as a score in the game information analysis system according to the one embodiment of the present invention;

FIG. 138 is a diagram showing an outline of processing in which a customer satisfaction degree score (the whole) is obtained in the game information analysis system according to the one embodiment of the present invention;

FIG. 139 is a graph showing ranks of degrees of satisfaction of customers in the game information analysis system according to the one embodiment of the present invention;

FIG. 140 is a graph showing balances of the degrees of satisfaction of customers in the game information analysis system according to the one embodiment of the present invention;

FIG. 141 is a diagram showing representative machine attributes used in the game information analysis system according to the one embodiment of the present invention;

FIG. 142 is a diagram showing representative player attributes used in the game information analysis system according to the one embodiment of the present invention;

FIG. 143 is a diagram explaining a process of matching between the machine attributes and the player attributes in the game information analysis system according to the one embodiment of the present invention;

FIG. 144 is a diagram explaining the process of matching between the machine attributes and the player attributes in the game information analysis system according to the one embodiment of the present invention;

FIG. 145 is a diagram explaining the process of matching between the machine attributes and the player attributes in the game information analysis system according to the one embodiment of the present invention;

FIG. 146 is a diagram showing an example of a monthly member attribute report in the game information analysis system according to the one embodiment of the present invention; and FIG. 147 is a diagram showing an example of a report related to a machine failure risk analysis in the game information analysis system according to the present invention.

DETAILED DESCRIPTION OF THE PREFERRED EMBODIMENT

One embodiment of the present invention will be described with reference to the accompanying drawings.

[Description of Outline of Game System]

Figure 1:
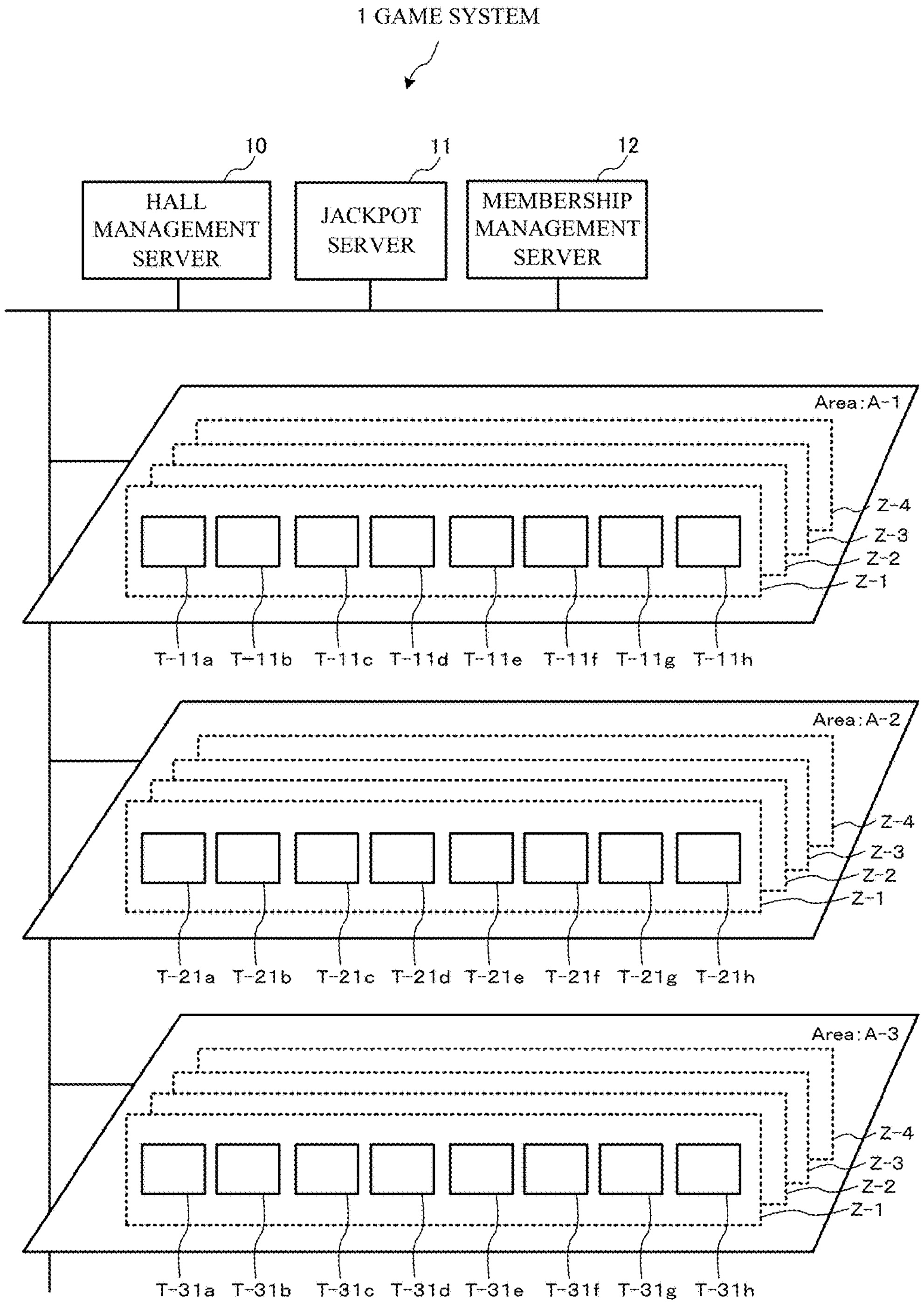
FIG. 1 is a diagram schematically illustrating a game system according to one embodiment of the present invention.

First, with reference to FIG. 1, an outline of a game system will be described. FIG. 1 is a schematic diagram schematically illustrating an overview of a game system 1 according to one embodiment of the present invention.

The game system 1 includes a hall management server 10, a jackpot server 11, a membership management server 12, and a plurality of gaming machines. Each of the gaming machines is, for example, a slot machine.

The hall management server 10 totalizes and manages a flow of money within a hall (game facility), prepares a balance sheet and the like, and manages the other servers. In addition, the hall management server 10 obtains, from the respective gaming machines, accounting information which includes timing at which each of the gaming machines starts a unit game; timing at which each of the gaming machines terminates the unit game; a drawing result in the unit game; and the like and accumulates the accounting information.

The jackpot server 11 manages accumulation and paying-out of jackpot amounts for a jackpot. For the jackpot, a part of coins which a player consumes on each of the gaming machines is accumulated as a jackpot amount, and in a case where a jackpot trigger has been established on any of the gaming machines, coins corresponding to the accumulated jackpot amounts are paid out to that gaming machine. In this case, each of the gaming machines calculates an accumulated amount (an accumulation amount) as the jackpot amount each time a game is played and transmits the calculated accumulated amount to the jackpot server 11 which is an external control device. The jackpot server 11 accumulates the accumulation amounts transmitted from the slot machines to the jackpot amount.

The membership management server 12 is a server which stores and manages personal information of members, membership card (IC card) information, the past game outcomes of the members, and the like. Issuance of membership cards (IC cards) is made by, for example, a membership card issuing terminal. The personal information of the members, inputted upon member registration, is stored on the membership management server 12 together with identification codes of the membership cards. In addition, the membership card issuing terminal is provided with a camera which allows also shooting of a face of a player for which an IC card is issued upon issuing of a membership card. The shot image is stored on the membership management server 12 so as to be associated with an identification code.

As shown in FIG. 1, the gaming machines are installed in a plurality of areas (for example, as shown in FIG. 1, A-1 to A-3). Here, the areas correspond to, for example, one floor of a hall or areas within the floor. In this example, although the areas from A-1 to A-3 are shown, this is merely one example.

Further, the gaming machines are installed in each zone (for example, as shown in FIG. 1, in Z-1 to Z-4) within each of the areas. Here, each of the zones corresponds to specific space within each of the areas. In this example, although the four zones (Z-1 to Z-4) are provided in each of the areas, respectively, this is also merely one example. In addition, in this example, although eight gaming machines are installed in each one of the zones, respectively, this is also merely one example, and various numbers of the gaming machines can be installed.

As shown in FIG. 1, in the zone Z-1 of the area A-1, eight gaming machines of T-11A to T-11H are installed; similarly, in the zone Z-2 of the area A-1, eight gaming machines of T-12A to T-12H are installed (thereinafter, not shown); in the zone Z-3 of the area A-1, eight gaming machines of T-13A to T-13H are installed; and in the zone Z-4 of the area A-1, eight gaming machines of T-14A to T-14H are installed.

Further, as shown in FIG. 1, in the zone Z-1 of the area A-2, eight gaming machines of T-21A to T-21H are installed; similarly, in the zone Z-2 of the area A-2, eight gaming machines of T-21A to T-22H are installed (thereinafter, not shown); in the zone Z-3 of the area A-2, eight gaming machines of T-23A to T-23H are installed; and in the zone Z-4 of the area A-2, eight gaming machines of T-24A to T-24H are installed. In addition, in the zone Z-1 of the area A-3, eight gaming machines of T-31A to T-31H are installed; similarly, in the zone Z-2 of the area A-3, eight gaming machines of T-32A to T-32H are installed (thereinafter, not shown); in the zone Z-3 of the area A-3, eight gaming machines of T-33A to T-33H are installed; and in the zone Z-4 of the area A-3, eight gaming machines of T-34A to T-34H are installed.

It is to be noted that as shown in FIG. 1, the respective gaming machines are connected to the hall management server 10, the jackpot server 11, and the membership management server 12 via a LAN connection, for example, by Ethernet (a registered trademark).

In addition, each of the gaming machines is provided with a unique identifier, and the hall management server 10 or the like identifies transmission sources of data transmitted from the respective gaming machines by using the identifiers. In addition, also in a case where the hall management server 10 or the like transmits data to the gaming machines, based on the identifiers, transmission destinations are specified. Although as the identifiers, for example, network addresses such as IP addresses can be used, identifiers other than the network addresses may be provided, thereby allowing the individual gaming machines to be managed.

It is to be noted that the game system 1 may be constructed within one hall (game facility) where various games can be conducted or may be constructed over a plurality of game facilities. In addition, when the game system 1 is constructed in a single game facility, the game system 1 may be constructed in each floor or section of the game facility. A communication line for connecting the servers and the gaming machines may be a wired or wireless line and can adopt the Internet (for example, used as a secret line using a VPN), a dedicated line, an exchange line, or the like.

[Description of Outline of Gaming Machine]

Figure 2:
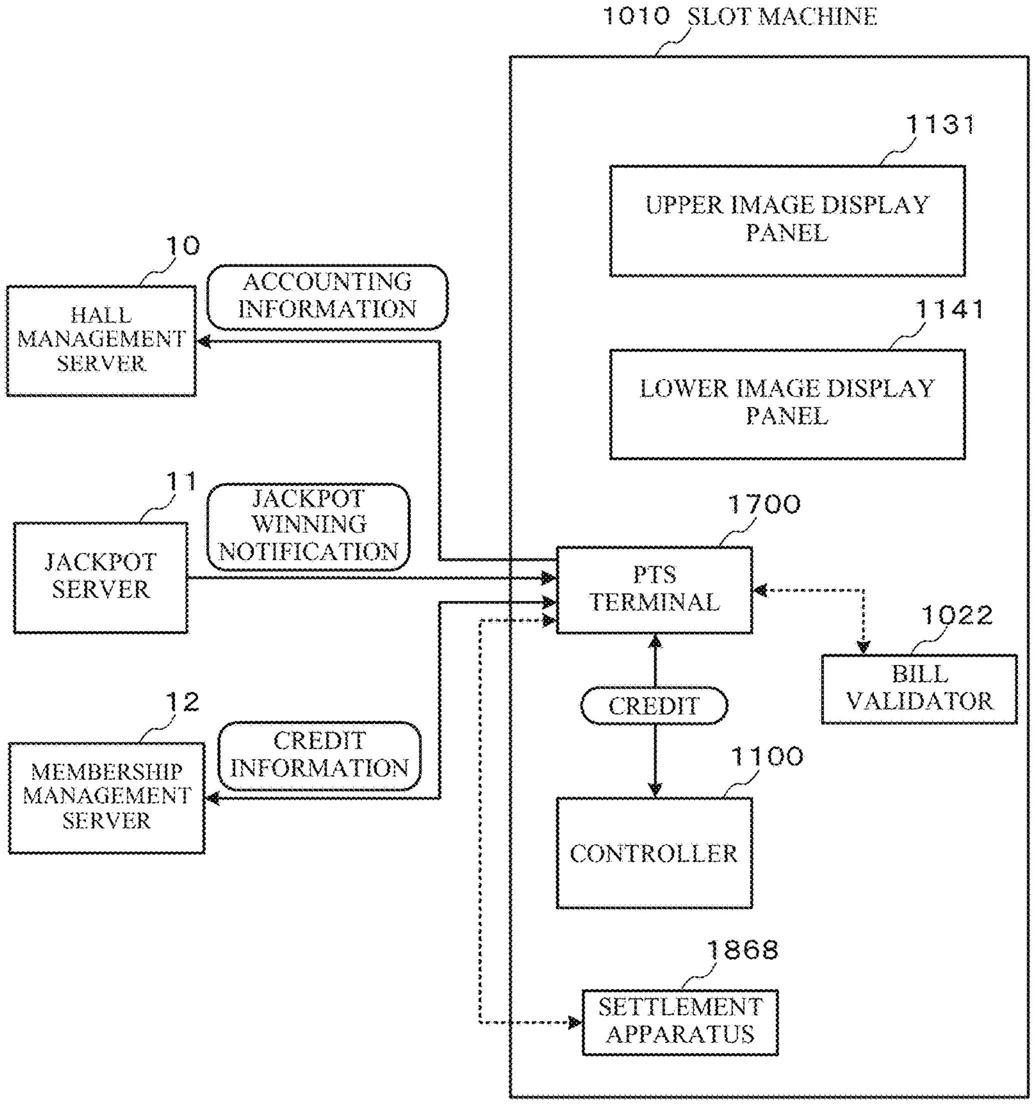
FIG. 2 is a diagram schematically illustrating a slot machine according to one embodiment of the present invention.

Next, with reference to FIG. 2, an outline of a gaming machine according to the embodiment of the present invention will be described. In FIG. 2, a configuration of a slot machine 1010 which is a gaming machine including a player tracking device is conceptually shown. It is to be noted that the player tracking device is a terminal for realizing a player tracking system, and in the present specification, hereinafter, this device is referred to as a PTS terminal. In addition, the PTS terminal in the present embodiment is configured to include a PTS front unit and a PTS main body. The PTS front unit is located on a front face of the gaming machine in an integrated manner and includes an operation part operated by a player. In addition, the PTS main body includes a control part connected to the PTS front unit by a cable or the like and is located so as to be remote from the PTS front unit. It is to be noted that although in the below description, a case where the slot machine is used as the gaming machine will be described, the present invention is not limited to the case of the slot machine and is applicable to a gaming machine which conducts a variety of games.

As shown in FIG. 2, the slot machine 1010 has the PTS terminal 1700 mounted therein and further includes an upper image display panel 1131, a lower image display panel 1141, and a settlement apparatus 1868. The slot machine 1010 is connected via the PTS terminal 1700 to the hall management server 10, the jackpot server 11, and the like via a network. In the present embodiment, one slot machine 1010 is provided with one PTS terminal 1700.

In the present embodiment, the PTS terminal 1700 is connected to a bill validator 1022 via a communication line (or the slot machine 1010).

In addition, based on a predetermined protocol, the PTS terminal 1700 conducts transmission and reception of data to and from a controller (the later-described controller 1100 of the slot machine 1010) and conducts data communication with the hall management server 10, the jackpot server 11, the membership management server 12, and the like connected via the network. For example, from the PTS terminal 1700 to the controller 1100, information pertinent to a credit required to start a game, a stop command to instruct to stop a unit game upon predetermined effect, and the like are transmitted, and from the controller 1100 to the PTS terminal 1700, information pertinent to a credit as a game outcome, start notification of the unit game, and termination notification are transmitted.

In addition, from the PTS terminal 1700 to the hall management server 10, the start notification and the termination notification of the unit game, accounting information including a drawing result or the like, and the like are transmitted. It is to be noted that although in the present embodiment, the game information including the accounting information of the slot machine 1010 is transmitted via the PTS terminal 1700 to the hall management server 10 and the like, said game information may be transmitted, with no PTS terminal 1700 included, via a communication interface or via a device other than the PTS terminal 1700 from the controller 1100 to the hall management server 10 and the like. Further, between the PTS terminal 1700 and the membership management server 12, information pertinent to credits of members or the like is communicated.

Here, an outline of a game flow in a case of members is as described below. First, member registration is conducted by using the membership card issuing terminal, and at this time, a membership card (IC card) is issued. Thereafter, a player inserts the membership card into the PTS terminal 1700 of the slot machine 1010 and inputs cash there. When the bills have been inputted, the bill validator 1022 identifies a currency kind and a money amount and transmits currency kind data and money amount data as an identification result to the PTS terminal 1700. The PTS terminal 1700 calculates a credit for a game from the currency kind data and the money amount data and transmits the calculated credit to the controller 1100.

Based on the credit transmitted from the PTS terminal 1700, the controller 1100 executes the game. A credit in accordance with a game outcome is transmitted from the controller 1100 to the PTS terminal 1700, calculation for paying-out based on the game outcome is performed on the PTS terminal 1700, and a money amount to be paid out to a player is determined. On the PTS terminal 1700, the determined money amount is written onto the membership card as it is, and the membership card is ejected. In addition, in accordance with the execution or the like of the game, predetermined points are provided for the membership card.

In addition, for each game, a to-be-paid-out money amount (credit) as a game outcome is transmitted together with an identification code of that member via the PTS terminal 1700 to the hall management server 10 (in real time or at predetermined timing). The information transmitted as described above is grasped as a game outcome of a corresponding member on the hall management server 10 and is accumulated, respectively.

In a case where a player who is a member plays a game next, the PTS terminal 1700 reads the inserted membership card and then reads out the money amount stored in the membership card. The read-out money amount is converted to a credit and the converted credit is transmitted to the controller 1100. A credit in accordance with a game outcome is transmitted from the controller 1100 to the PTS terminal 1700 as mentioned above, calculation for paying-out based on the game outcome is performed on the PTS terminal 1700, and a money amount (credit) to be paid out to a player is determined. At this time, the money amount obtained as the game outcome is added to the money amount of the membership card, thereby updating this.

Further, at this time, the PTS terminal 1700 transmits an identification code (or a member ID) read out from the membership card and the updated money amount to the membership management server 12, and the membership management server 12 adds the money amount transmitted from the PTS terminal 1700 to a money amount of a member identified by the above-mentioned identification code and stores said money amount. By conducting this process, the money amount which the member holds is invariably managed.

Thereafter, if needed, a player who is a member can make settlement at a cashier counter or the like based on the money amount stored on the membership card. In addition, as on the above-described slot machine 1010, in a case where the settlement apparatus 1868 is included therein, on said slot machine 1010, the settlement can be made by using the membership card.

On the other hand, an outline of a game flow in a case where a player is a non-member is as described below. A player inputs cash to the PTS terminal 1700 of the slot machine 1010. When the bills have been inputted, the bill validator 1022 identifies a currency kind and a money amount and transmits currency kind data and money amount data as an identification result to the PTS terminal 1700. The PTS terminal 1700 calculates a credit for a game from the currency kind data and the money amount data and transmits the calculated credit to the controller 1100.

Based on the credit transmitted from the PTS terminal 1700, the controller 1100 executes the game. A credit in accordance with a game outcome is transmitted from the controller 1100 to the PTS terminal 1700, calculation for paying-out based on the game outcome is performed on the PTS terminal 1700, and a money amount to be paid out to a player is determined. On the PTS terminal 1700, this determined money amount is written onto a new IC card stocked in the slot machine 1010, and the IC card is ejected. Here, the non-member gets the IC card for the first time. In addition, it is also possible for the non-member to obtain a non-membership card (an IC card or an IC ticket) for which a money amount is charged by inputting of cash or the like. In this case, a game can be played by using this non-membership card.

Thereafter, if needed, a player who is the non-member can make settlement at a cashier counter or the like based on the money amount stored on the IC card. In addition, as with the above-described slot machine 1010, in a case where the settlement apparatus 1868 is included therein, on said slot machine 1010, the settlement can be made by using the IC card.

In addition, for each game, a to-be-paid-out money amount (credit) as a game outcome is transmitted via the PTS terminal 1700 to the hall management server 10 (in real time or at predetermined timing). The information transmitted as described above is grasped as a game outcome of the non-member on the hall management server 10 and is accumulated thereon.

[Description of Function Flow Diagram]

Figure 3:
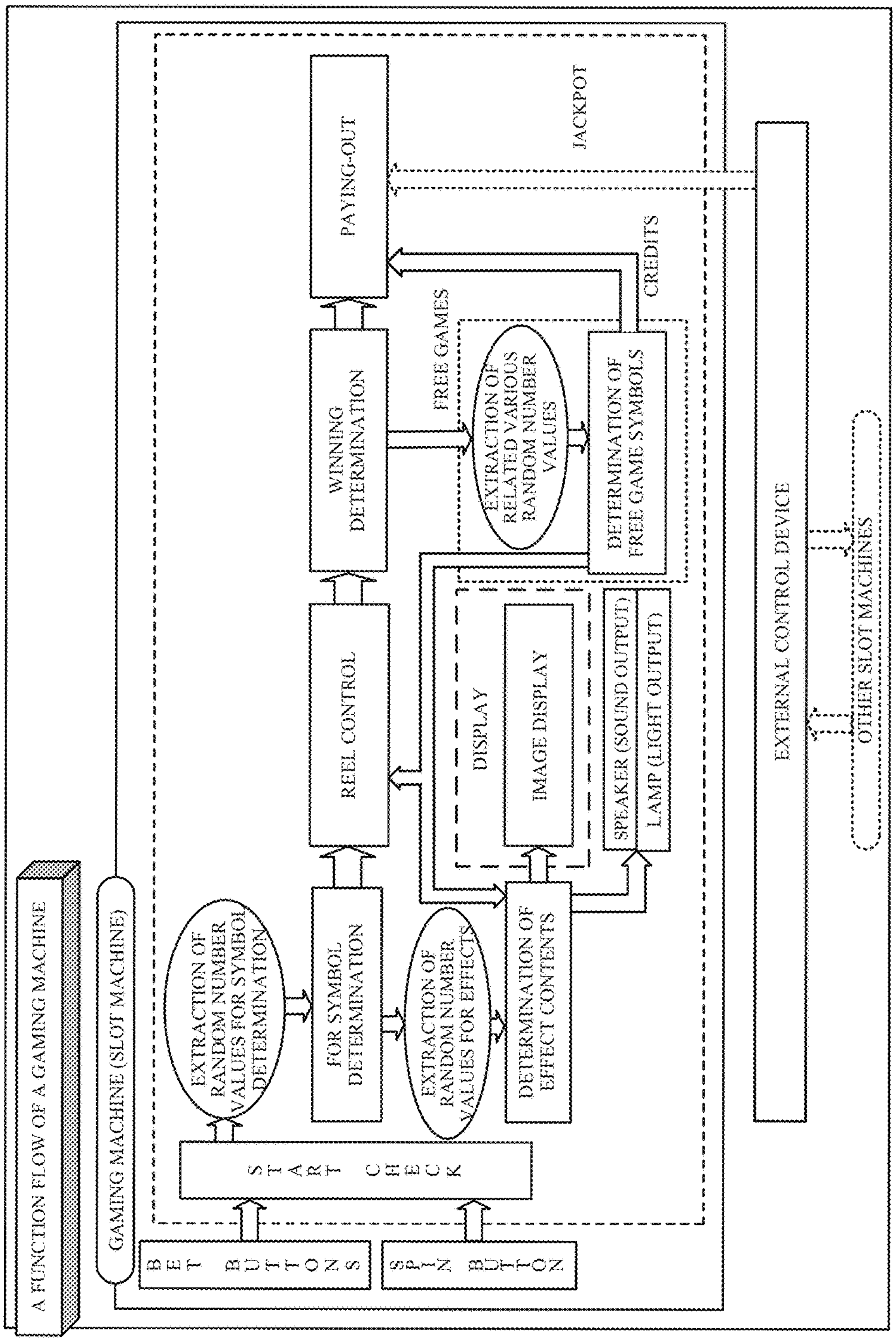
FIG. 3 is a diagram showing basic functions of a gaming machine according to one embodiment of the present invention.

With reference to FIG. 3, basic functions of a gaming machine (slot machine 1010) according to one embodiment of the present invention will be described. As shown in FIG. 3, the slot machine 1010 is connected to an external control device (for example, a jackpot server 11) so as to allow data communication, and the external control device is connected to a plurality of other slot machines 1010 installed in a hall so as to allow data communication.

<Start-Check>

First, the slot machine 1010 checks whether or not a BET button has been pressed by a player, and subsequently checks whether or not a spin button has been pressed by a player.

<Symbol Determination>

Next, when the spin button has been pressed by a player, the slot machine 1010 extracts random number values for symbol determination and determines symbols to be displayed to a player with respect to a plurality of reels at the time of stopping rotation of the reels.

<Reel Control>

Next, the slot machine 1010 starts the rotation of each of the reels and then stops the rotation such that the determined symbols are displayed to a player.

<Winning Determination>

Next, when the rotation of each of the reels has been stopped, the slot machine 1010 determines whether or not a combination of symbols displayed to a player is a combination related to winning.

<Paying-Out>

Next, when the symbols displayed to a player is the combination related to winning, the slot machine 1010 provides benefits according to the combination for a player. For example, when a combination of symbols related to paying-out of coins has been displayed, the slot machine 1010 adds a number of coins corresponding to the combination of symbols to a number of credits.

In addition, when a combination of symbols related to a bonus game trigger has been displayed, the slot machine 1010 starts a bonus game. It is to be noted that, in the present embodiment, a game (free game) in which a drawing related to the above-mentioned determination of to-be stopped symbols is conducted at a predetermined number of times without using coins is conducted as a bonus game.

In addition, when a combination of symbols related to a jackpot trigger has been displayed, the slot machine 1010 pays out coins of a jackpot amount to a player. The jackpot refers to a function which accumulates parts of coins used by players at the respective gaming machines as the amount of jackpot and which, when the jackpot trigger has been established in any of the slot machine 1010, pays out coins of the accumulated amount of the jackpot to that slot machine 1010. The slot machine 1010 calculates the amount (accumulation amount) to be accumulated to the amount of jackpot for each game (unit game) and transmits the calculated amount to the external control device. The external control device accumulates to the jackpot amount the accumulation amounts transmitted from the respective gaming machines.

Here, the unit game refers to a series of operations conducted from when the acceptance of betting is started through a player's pressing-down of the BET button to when winning is likely to be established.

<Determination of Effect>

The slot machine 1010 conducts effect through displaying of images by a display, outputting of light by a lamp, and outputting of sound by a speaker. The slot machine 1010 extracts random number values for the effect and determines effect contents based on symbols or the like determined by a drawing.

[Structure of Slot Machine]

Next, with reference to FIG. 4, an overall structure of a slot machine 1010 will be described.

On the slot machine 1010, as game media, bills or electronic valuable information corresponding to these are used. In particular, in the present embodiment, credit-related data such as cash data stored in an IC card 1500 is used. It is to be noted that although the slot machine 1010 has a structure in which coins are not used as the game media, this is merely one example, and the slot machine 1010 may be configured as a slot machine on which a variety of game media including the coins can be used.

The slot machine 1010 is provided with a housing which includes a cabinet 1011 and a top box 1012 attached on an upper side of the cabinet 1011. Main parts of the cabinet 1011 and the top box 1012 are formed of metallic plate members. In addition, on a front face of the cabinet 1011, an upper door 1142 and a lower door 1144 are provided.

On a lower side of a front face of the upper door 1142, a lower image display panel 1141 is provided. The lower image display panel 1141 is constituted of a liquid crystal panel and configures a display.

In addition, on the front face of the upper door 1142 and above the above-mentioned lower image display panel 1141, a symbol display window 1135 is provided. Through the symbol display window 1135, a reel apparatus M1 which is provided inside of the cabinet 1011 and is constituted of five reels M1A to M1E is visually recognizable. On a peripheral surface of each of the reels, 12 symbols are depicted. The 12 symbols are arranged in succession along a direction in which each of the reels of the reel apparatus M1 is rotated and form a symbol array. Each of the reels M1A to M1E is rotated, the symbols depicted on each of the reels are thereby rotated in a longitudinal direction, and thereafter, the rotation is stopped, thereby allowing the symbols to be rearranged.

Here, “rearrangement” means a state in which after the arrangement of the symbols has been released, the symbols are arranged again. “Arrangement” means a state in which the symbols can be visually confirmed by an external player. The slot machine 1010 executes the so-called slot game in which based on the state of the arrangement of the symbols on the reels M1A to M1E which have been rotated and thereafter stopped, a payout in accordance with a predetermined combination is awarded.

It is to be noted that although in the present embodiment, the slot machine 1010 is a slot machine which includes a mechanical reel type reel apparatus M1, the slot machine 1010 may be a slot machine which includes a video reel type reel apparatus displaying pseudo reels, and the slot machine 1010 may be a slot machine in which the video reel type reel apparatus and the mechanical reel type reel apparatus are combined.

On a front face of the top box 1012, an upper image display panel 1131 is provided. The upper image display panel 1131 is constituted of a liquid crystal panel and configures a display. The upper image display panel 1131 displays images related to effect and images showing introduction of contents of games and rules thereof.

On the above-mentioned lower image display panel 1141, arranged are a number-of-credits display part which indicates a state of credits (for example, a total number of credits which a player currently has) as necessary and a fraction cash display part which indicates fraction cash, and a variety of pieces of information pertinent to a game such as contents of betting are displayed. Here, “credits” are virtual game media on a game, to be used when a player makes betting. In addition, “fraction cash” is cash which is not converted to a credit because an inputted money amount is insufficient.

When the IC card 1500 has been inserted into the later-described PTS terminal 1700, a number of credits stored on the IC card is displayed on the number-of-credits display part, and fraction cash stored on the IC card is displayed on the fraction cash display part. It is to be noted that these numerical values are stored on the membership management server 12 so as to be associated with an identification code of the membership card.

Here, the IC card is, for example, a non-contact IC card and has incorporated thereon an IC (Integrated Circuit) for recording and computing a variety of pieces of data such as credits and enables short-range wireless communication using an RFID (Radio Frequency Identification) technology such as NFC (Near Field Communication), for example. By using the IC card 1500, a player can have the credit-related data and further, freely carries the IC card with him or her among different slot machines. A player inserts the IC card 1500 into the PTS terminal 1700 of the slot machine 1010 and thereby uses the credit-related data (money amount data) stored on the IC card 1500, thereby allowing a player to play a game such as a unit game on the slot machine 1010.

It is to be noted that it may be made possible for a player to deposit cash such as coins and bills as cash data on the IC card 1500 by using an apparatus installed in a hall.

On right and left sides of an uppermost portion of a front face of the lower door 1144, speakers 1112 are respectively provided. On the slot machine 1010, effect of a unit game is executed through displaying of images by the upper image display panel 1131, outputting of sound by the speakers 1112, outputting of light by a lamp (not shown), and the like.

In addition, on the front face of the lower door 1144 and below said speaker 1112, a PTS front unit 1700A which is a front part of the PTS terminal 1700 is incorporated, and on a right side of the PTS front unit 1700A, a printed matter discharge outlet 1136 and a bill insertion slot 1137 are located.

Further, on the front face of the lower door 1144, below the PTS front unit 1700A, a control panel 1030 is located. The control panel 1030 includes a base plate which is of a flat plate shape, and on said base plate, a plurality of operation buttons (i.e. a spin button 1031, a MAX BET button 1032, a 5-BET button 1033, a 3-BET button 1034, a 2-BET button 1035, a 1-BET button 1036, a HELP button 1037, and a CASHOUT button 1038) are located.

In order to allow a player to easily perform a pressing operation of the spin button 1031 and easily identify the spin button 1031, the spin button 1031 is formed so as to be of a circular shape whose size is larger than those of the other buttons. The spin button 1031 is located in a right end portion of the base plate and has a function to start a game through a pressing operation.

The MAX BET button 1032 to 1-BET button 1036 are located on a left side of the spin button 1031 in an aligned manner at equal intervals. Each of these operation buttons is formed so as to be of a quadrangular shape. The MAX BET button 1032 located in a right end portion has a function to allow a game to be played with a maximum number of bets (Bet number) such as a decouple through a pressing operation. The 5-BET button 1033 has a function to allow a game to be played with a quintupled number of bets through a pressing operation. The 3-BET button 1034 has a function to allow a game to be played with a tripled number of bets through a pressing operation. The 2-BET button 1035 has a function to allow a game to be played with a doubled number of bets through a pressing operation. The 1-BET button 1036 has a function to allow a game to be played with one bet through a pressing operation.

The HELP button 1037 and the CASHOUT button 1038 are located in a longitudinal direction in a left end portion of the base plate. The HELP button 1037 has a function to display HELP information indicating a game method and the like on the lower image display panel 1141 or the like through a pressing operation. In addition, the CASHOUT button 1038 has a function to store a credit or the like on the IC card 1500 and to output the credit or the like in the form of a printed matter through a pressing operation.

Further, in the slot machine 1010, in side portions of the cabinet 1011, air ventilation slots 1133 and an air intake slot 1134 are located and on a side portion of the top box 1012, air ventilation slots 1132 are located. In addition, in an inside portion of the cabinet 1011, which corresponds to a position of the air ventilation slots 1133, a fan (not shown) is arranged, and similarly, in an inside portion of the top box 1012, which corresponds to a position of the air ventilation slots 1132, a fan (not shown) is arranged. These fans allow air inside of the slot machine 1010 to be discharged to an outside and take in external air from the air intake slot 1134, and through such air circulation, a temperature inside of the slot machine 1010 is adjusted.

In addition, in the side portion of the cabinet 1011 of the slot machine 1010, provided are a key cylinder 1138 into which a key used to open the upper door 1142 and the lower door 1144 is inserted and a door lock bar 1139 with which the upper door 1142 and the lower door 1144 are locked.

Next, with reference to FIG. 5, the slot machine 1010 in a state in which the upper door 1142 and the lower door 1144 are opened and an internal structure of the cabinet 1011 will be described.

Figure 5:
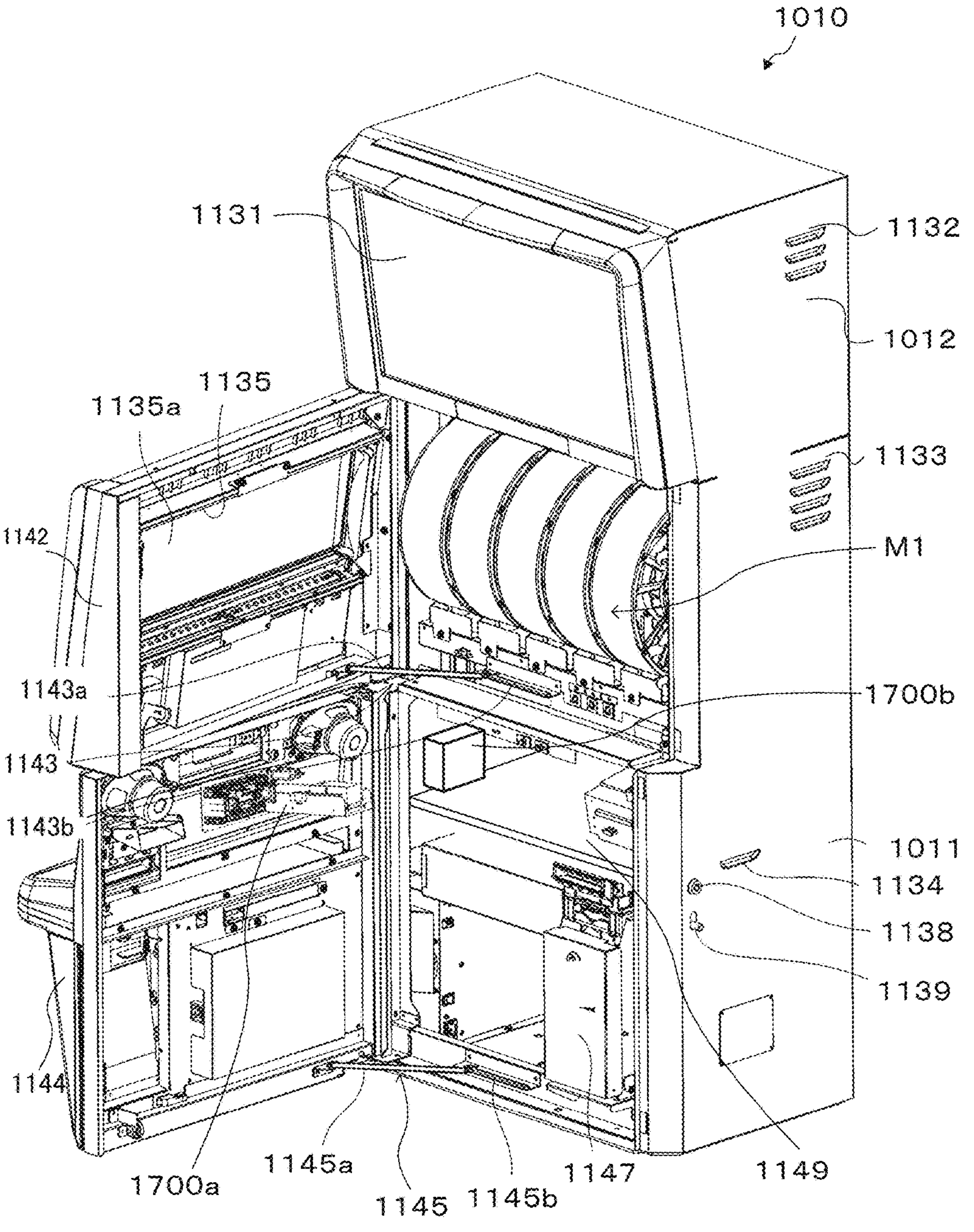
FIG. 5 is a perspective view illustrating a state in which an upper door and a lower door of the slot machine according to the one embodiment of the present invention are opened.

FIG. 5 is a perspective view illustrating the slot machine 1010 in the state in which the upper door 1142 and the lower door 1144 are opened. As shown in FIG. 5, on the front face of the top box 1012 of the slot machine 1010, as described above, the upper image display panel 1131 is located, and in the side portion of the top box 1012, the air ventilation slots 1132 are located. The cabinet 1011 of the slot machine 1010 is formed so as to be of a box-like shape with the front face being opened, and in an upper portion of the front face, the upper door 1142 is located, and in a lower portion of the front face, the lower door 1144 is located.

In addition, in an upper portion of the side portion of the cabinet 1011, the air ventilation slots 1133 are located, and in a middle portion of the side portion of the cabinet 1011, the air intake slot 1134 is located. Further, in the vicinity of the air intake slot 1134, the above-mentioned key cylinder 1138 and door lock bar 1139 are located.

As shown in FIG. 5, in a left end portion of the cabinet 1011, the cabinet 1011 pivotally supports the upper door 1142 and the lower door 1144 in a rotatable manner. On an upper end portion and a lower end portion of the upper door 1142, the upper door 1142 and the cabinet 1011 are pivotally supported in a rotatable manner and are coupled by an upper door opening mechanism 1143. The upper door opening mechanism 1143 is located on a lower side of the upper door 1142 and has a rod member 1143A whose one end portion is pivotally supported in a rotatable manner onto a rear face wall of the upper door 1142 and a slide member 1143B which is laterally provided on a front face side of the cabinet 1011. The slide member 1143B engages the other end portion of the rod member 1143A in a horizontally movable manner, temporarily stops the upper door 1142 at a predetermined opening angle, and when a predetermined force or more is applied externally in a direction in which the upper door 1142 is closed, moves the upper door 1142 in a rotatable manner in a closing direction.

In addition, on an upper end portion and a lower end portion of the lower door 1144, the lower door 1144 and the cabinet 1011 are pivotally supported in a rotatable manner and are coupled by a lower door opening mechanism 1145. The lower door opening mechanism 1145 is located on a lower side of the lower door 1144 and has a rod member 1145A whose one end portion is pivotally supported in a rotatable manner onto a rear face wall of the lower door 1144 and a slide member 1145B which is laterally provided on a front face side of the cabinet 1011. The slide member 1145B engages the other end portion of the rod member 1145A in a horizontally movable manner, temporarily stops the lower door 1144 at a predetermined opening angle, and when a predetermined force or more is applied externally in a direction in which the lower door 1144 is closed, moves the lower door 1144 in a rotatable manner in a closing direction.

In the upper door 1142, as described above, the symbol display window 1135 is arranged, the symbol display window 1135 is covered with a reel cover 1135A. The reel cover 1135A includes: for example, a base panel such as a transparent liquid crystal panel and a transparent panel; and a touch panel provided on a front face of the base panel. The symbol display window 1135 covered with the reel cover 1135A allows 15 symbols in areas of 5 columns×3 rows among symbols depicted on peripheral surfaces of the respective reels of the reel apparatus M1 to be made viewable externally.

In addition, in FIG. 5, the PTS front unit 1700A located in the middle portion of the lower door 1144 is shown. With the lower door 1144 being closed, the PTS front unit 1700A comes to be housed inside of the cabinet 1011. A configuration of the PTS terminal 1700 including the PTS front unit 1700A will be described below in detail.

In a right lower portion of the cabinet 1011, a bill stocker 1147 is housed. The bill insertion slot 1137 shown in FIG. 4 communicates with an insertion slot (an insertion slot of the bill validator 1022) of the bill stocker 1147. The bill stocker 1147 has a function to pull in bills inputted into the bill insertion slot 1137; thereafter, to determine authenticity of the bills; if any of the bills are bogus, to discharge the bogus bills from the bill insertion slot 1137; and if the bills are authentic, to classify the bills according to kinds of the bills and for example, to house the bills. In addition, in a middle portion of the cabinet 1011, a shelf plate member 1149 which partitions inner space of the cabinet 1011 is located. The shelf plate member 1149 is formed of a metallic thin plate.

As shown in FIG. 5, a PTS main body 1700B is located, for example, inside of the cabinet 1011 and above the shelf plate member 1149. The PTS main body 1700B has a magnet with which the PTS main body 1700B is attached in contact with an inner side face of the cabinet 1011. At this time, a portion of the inner side face of the cabinet 1011, which comes in contact with or close to said magnet, is formed of at least a metallic member. It is to be noted that although the PTS front unit 1700A and the PTS main body 1700B are connected by a predetermined network (for example, a predetermined cable), the illustration thereof is omitted here.

Figure 4:
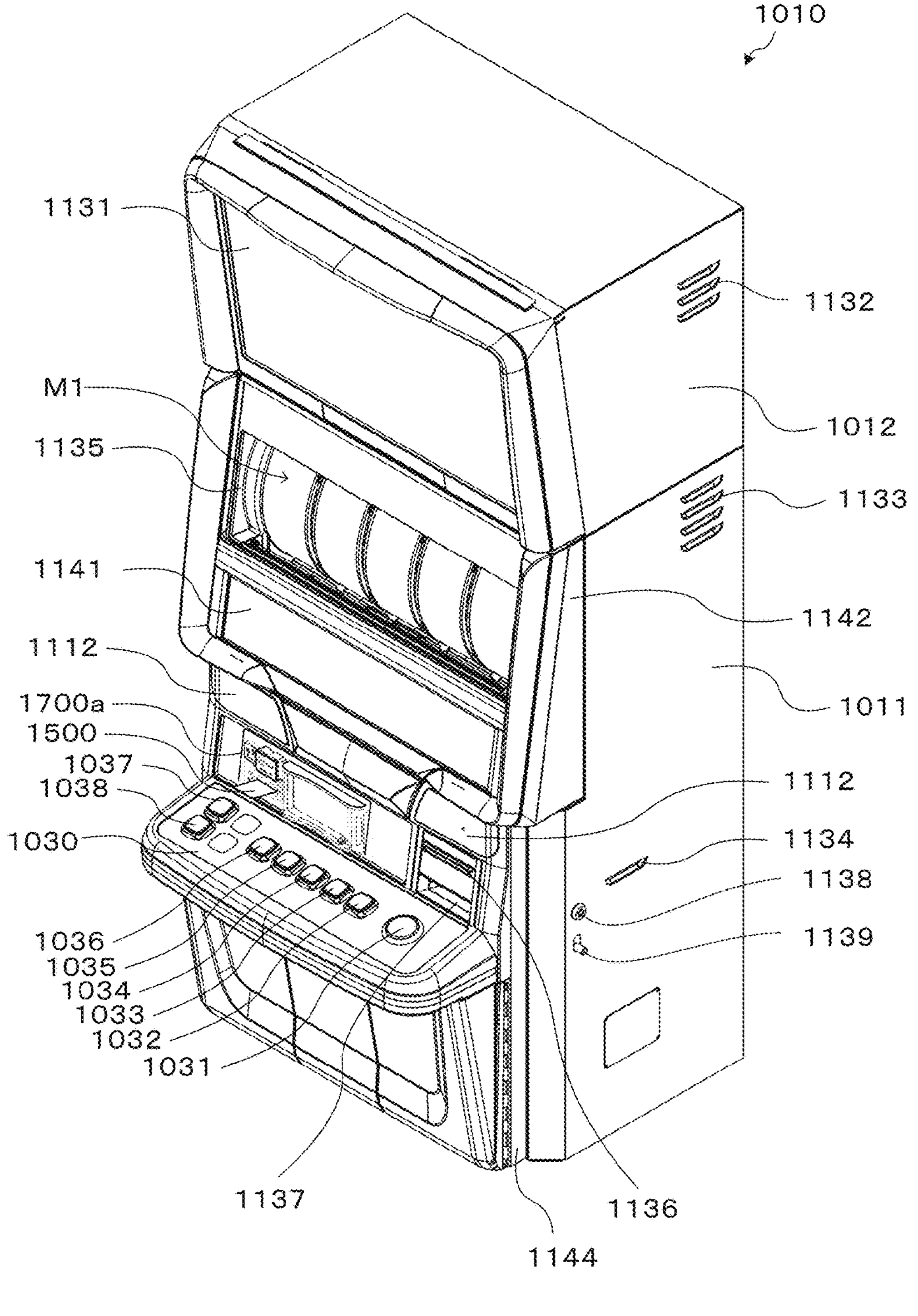
FIG. 4 is a perspective view illustrating an overall structure of the slot machine according to the one embodiment of the present invention.

It is to be noted that although hereinabove, the slot machine 1010 is described as the apparatus having the configuration as shown in FIG. 4 and FIG. 5, a variety of other configurations may be adopted.

[Configuration of PTS Terminal]

Next, with reference to FIG. 6, a configuration of a PTS front unit 1700A will be described. A PTS terminal 1700 includes the PTS front unit 1700A incorporated into a lower door 1144 of a slot machine 1010 and a PTS main body 1700B housed inside of a cabinet 1011 of the slot machine 1010. The PTS front unit 1700A and the PTS main body 1700B are connected by a predetermined network (for example, a predetermined cable). It is to be noted that the PTS terminal 1700 uses a data interface which is commonalized for gaming machines to communicate data and can be thereby incorporated into a variety of types of gaming machines manufactured by a variety of makers.

Figure 6:
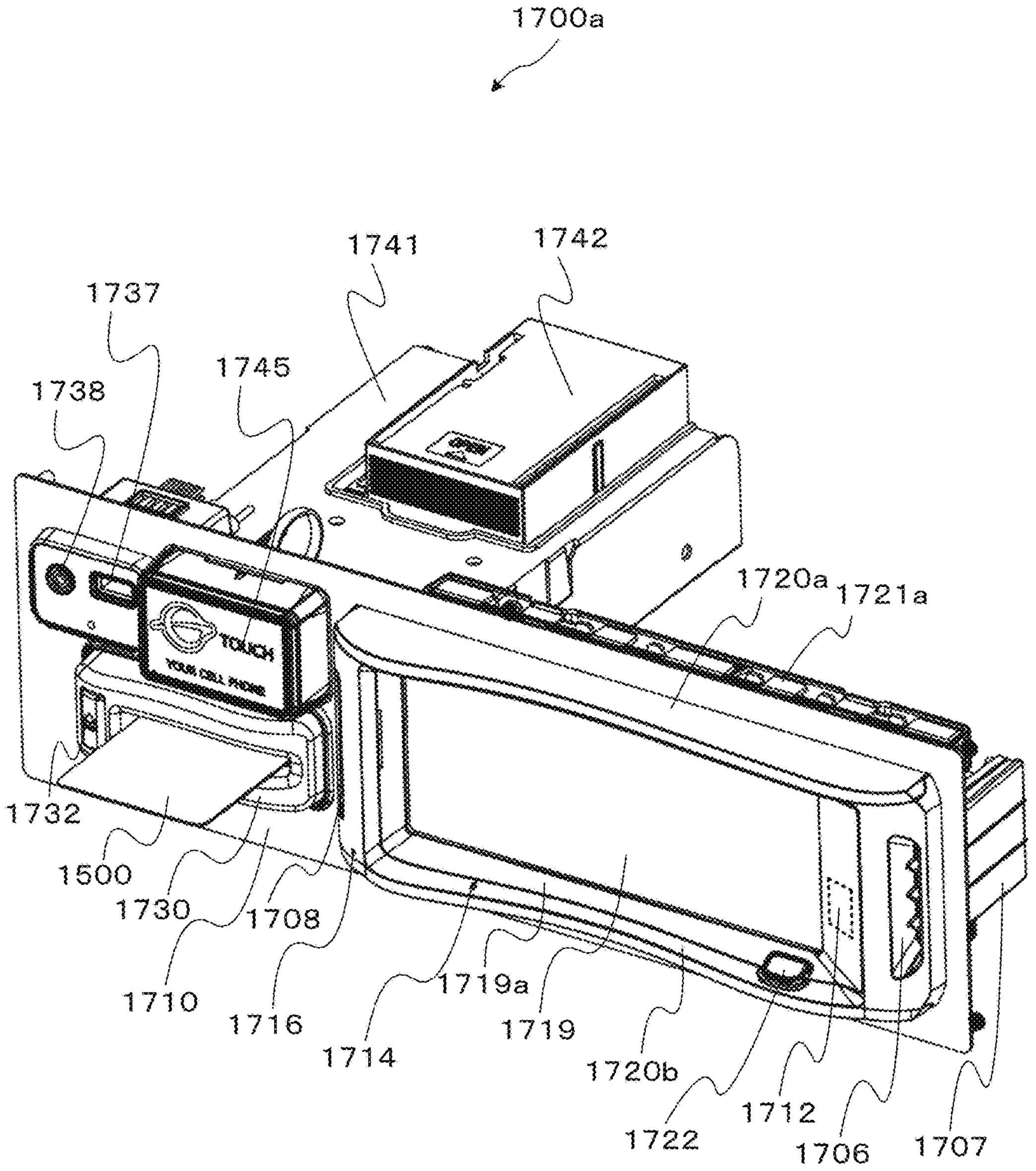
FIG. 6 is a perspective view illustrating a PTS front unit of a PTS terminal which is incorporated into the slot machine according to the one embodiment of the present invention.

FIG. 6 is a diagram illustrating only the PTS front unit 1700A shown in FIG. 4 and FIG. 5 in an enlarged manner. As shown in FIG. 6, the PTS front unit 1700A has a panel 1710, respective parts located on a front face of the panel 1710 are viewable by a player, and members located on a rear face of the panel 1710 are housed inside of the cabinet 1011 of the slot machine 1010 and are not viewable by a player.

On a right side of the front face of the panel 1710, an LCD 1719 having a touch panel function is provided. The LCD 1719 displays, for example, information related to members and information for members, and a size of a screen thereof is 6.2 inches (approximately 15.7 cm).

In addition, around the LCD 1719, an LCD cover 1719A is provided. It is to be noted that although in this example, the LCD 1719 is configured to have the touch panel function, instructions issued by a player may be inputted with other input devices such as a keyboard, a mouse, and buttons.

In addition, above the LCD 1719 and the LCD cover 1719A, a light emitting plate 1720A which is connected to LEDs and emits light is provided. The light emitting plate 1720A is formed of, for example, polycarbonate and is connected to a plurality of (for example, seven) full-color LEDs 1721A located on a rear side of the panel 1710 and emits light in accordance with light emitting of the full-color LEDs 1721A.

Below the LCD 1719 and the LCD cover 1719A, similarly, a light emitting plate 1720B which is connected to LEDs and emits light is provided. The light emitting plate 1720B is formed of, for example, polycarbonate and is connected to a plurality of (for example, seven) full-color LEDs 1721B (not shown) located on the rear side of the panel 1710 and emits light in accordance with light emitting of the full-color LEDs 1721B.

In addition, on a right side of the LCD 1719, an image pickup window 1712 is provided, and a human body detection camera 1713 (not shown) located inside of the LCD cover 1719A or on the rear side of the panel 1710 shoots an image of a player via this image pickup window 1712. The image pickup window 1712 may be also formed of, for example, a half mirror material which has undergone shield processing such as smoke processing.

In addition, at a position of the LCD cover 1719A, which is below the LCD 1719 and is on a right side, a home button 1722 is provided. The home button 1722 is a button to shift a screen displayed on the LCD 1719 to a predetermined upper level screen.

Further, at a position of the LCD cover 1719A, which is on the right side of the LCD 1719, a speaker duct 1706 is provided, and in a portion on the rear side of the panel 1710, which corresponds to a position of the speaker duct 1706, a bass reflex type speaker 1707 is provided. Similarly, on a left side of the LCD 1719, a speaker duct 1708 is provided, and in a portion on the rear side of the panel 1710, which corresponds to a position of the speaker duct 1708, a bass reflex type speaker 1709 (not shown) is provided. These speakers are speakers dedicated to the PTS terminal 1700 and are provided separately from the speakers 1112 for a slot machine game provided on the slot machine 1010. These speakers are capable of realizing effect and a phone call by voice and of outputting notification sound for notifying a player that an IC card 1500 is left unremoved. It is to be noted that since the configuration thereof is made such that sound from the speakers passes through the above-described speaker ducts 1706 and 1708 and is heard in front thereof (on a player side) in a stereophonic manner, the speakers can be installed on the rear side of the panel 1710 and as a result, space-saving of the PTS front unit 1700A (panel face) can be realized.

In addition, at positions of the LCD cover 1719A, which are below the LCD 1719 and are on a left side, a microphone opening part 1714 and a microphone opening part 1716 are provided. In portions corresponding to the microphone opening part 1714 and the microphone opening part 1716 inside of the LCD cover 1719A, microphones 1715 and 1717 (not shown) are provided, respectively.

In a left lower portion of the front face of the panel 1710, a card insertion slot 1730 which allows the IC card 1500 to be inserted thereto and removed therefrom is provided. In a card insertion part of the card insertion slot 1730, full-color LEDs 1731 (not shown) are provided, which are lit up in a plurality of colors, thereby allowing the remaining number of IC cards 1500 stacked in the later-described card stacker 1742 to be notified. At the card insertion slot 1730, an eject button 1732 is provided, and in the vicinity of the eject button 1732, an LED 1733 (not shown) is provided, which is lit up in red, thereby allowing a position and a way of an ejection operation of the eject button 1732 to be found.

In addition, in positions on a rear side of the panel 1710, which correspond to the card insertion slot 1730, a card unit 1741 and the card stacker 1742 are provided, and the card insertion slot 1730 is configured as one part of the card unit 1741. In the card stacker 1742, approximately 30 IC cards 1500 can be retained, and when a player who has newly played a unit game makes settlement of credits, an IC card 1500 retained in the card stacker 1742 is taken out and ejected to the card insertion slot 1730.

For the IC card 1500 taken in from the card insertion slot 1730 and retained in the card unit 1741, upon the settlement of credits, credit information is updated by NFC or the like, and thereafter, the IC card 1500 is ejected from the card insertion slot 1730. While a player is playing a unit game, the IC card 1500 is completely housed inside of the card unit 1741.

In addition, in a case where upon the settlement of credits, in spite of the IC card 1500 left unremoved, absence of a player is detected by the human body detection camera or the like, the configuration may be arranged such that the IC card 1500 can be retained in the card stacker 1742. Thus, for example, even in a case where a player has learned that the remaining number of credits is small and yet has left his or her seat with the IC card 1500 left unremoved or in a case where a player has simply forgotten to remove the IC card 1500 and has left his or her seat, it does not occur that the IC card 1500 is left retained in the card unit 1741 over a long period of time.

In positions on a left upper side of the front face of the panel 1710, a USB terminal 1737 and an audio terminal 1738 are provided. The USB terminal 1737 is configured to allow battery charge or the like by connecting a USB device thereto. In addition, the audio terminal 1738 is, for example, a four-pole terminal, and a headset is inserted thereto, thereby allowing a phone call with other person to be made with the headphones and the microphones. In addition, the audio terminal 1738 may be configured to be a two-pole or three-pole terminal, thereby allowing sound to be listened with the headphones.

On the front face of the panel 1710 and on the left side of the LCD 1719, a touch unit 1745 is provided. The touch unit 1745 includes an RFID module which can function as a writer to write data through data communication to an IC device (for example, a non-contact IC card, a mobile phone and a smartphone, each of which has a communication function by NFC, and the like) including an IC chip and which can function as a reader to read data through the data communication from said IC device. In addition, in four corners of the front face of the touch unit 1745, LEDs 1746 (not shown) are located, respectively. In addition, besides the touch unit 1745 or instead of the touch unit 1745, an information recording medium reading device for reading information stored in an information recording medium such as a magnetic card may be provided. In this case, instead of the IC card 1500, the magnetic card may be a membership card.

As described above, the PTS front unit 1700A according to the present embodiment is formed such that the variety of devices having the microphone function, the camera function, the speaker function, the display function, and the like are integrated into one unit, thus realizing space-saving. In addition, although hereinabove, the PTS front unit 1700A is described as the apparatus having the configuration shown in FIG. 6, the PTS front unit 1700A may be apparatuses having a variety of other configurations.

[Configuration of Circuitry Included in Slot Machine]

Figure 7:
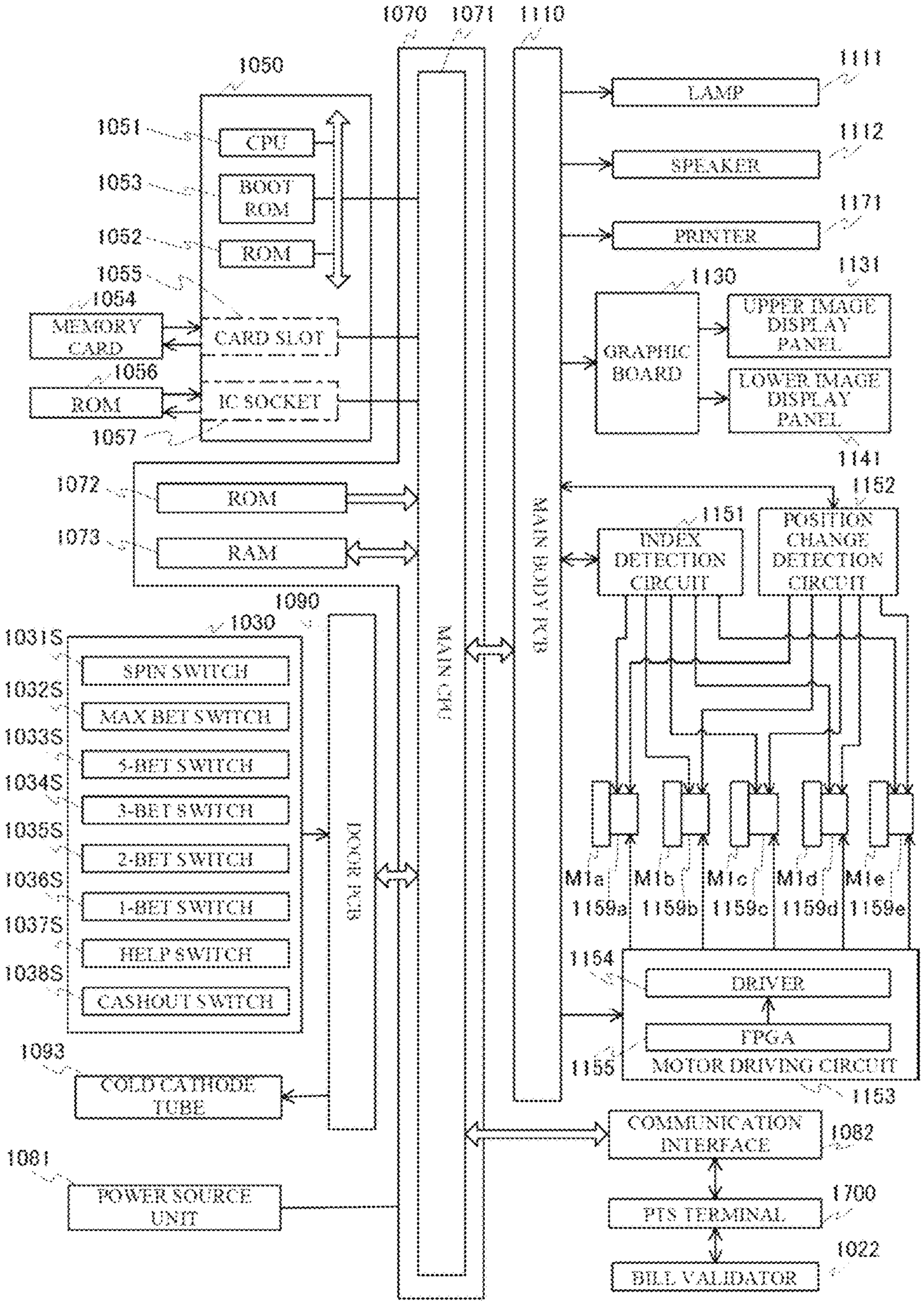
FIG. 7 is a diagram showing a circuitry configuration of the slot machine according to the one embodiment of the present invention.

Next, with reference to FIG. 7, a configuration of circuitry included in a slot machine 1010 will be described.

A gaming board 1050 is provided with: a CPU 1051, a ROM 1052, and a boot ROM 1053, which are mutually connected by an internal bus; a card slot 1055 corresponding to a memory card 1054; and an IC socket 1057 corresponding to a GAL (Generic Array Logic) 1056.

The memory card 1054 includes a non-volatile memory and stores a game program and a game system program. The game program includes a program related to game progression and a program for producing effects by images and sounds. In addition, the above-mentioned game program includes a symbol determination program. The symbol determination program is a program for determining symbols to be rearranged.

In addition, the card slot 1055 is configured so that the memory card 1054 can be inserted thereinto and removed therefrom and is connected to a motherboard 1070 by an IDE bus. Accordingly, the memory card 1054 is pulled out from the card slot 1055, another game program is written into the memory card 1054, and that memory card 1054 is inserted into the card slot 1055, thereby allowing a kind and contents of a game played on the slot machine 1010 to be changed.

The GAL 1056 is a type of a PLD (Programmable Logic Device) having a fixed OR array structure. The GAL 1056 is provided with a plurality of input ports and output ports, and predetermined input into the input port causes output of the corresponding data from the output port.

In addition, the IC socket 1057 is configured so that the GAL 1056 can be inserted thereinto and removed therefrom and is connected to the motherboard 1070 by a PCI bus. The contents of the game to be played on the slot machine 1010 can be changed by replacing the memory card 1054 with another memory card 1054 having another program written therein or by rewriting the program written into the memory card 1054 as another program.

The CPU 1051, the ROM 1052 and the boot ROM 1053 mutually connected by the internal bus are connected to the motherboard 1070 by a PCI bus. The PCI bus enables a signal transmission between the motherboard 1070 and the gaming board 1050 and power supply from the motherboard 1070 to the gaming board 1050.

The ROM 1052 stores an authentication program. The boot ROM 1053 stores a pre-authentication program, a program (boot code) to be used by the CPU 1051 for activating the pre-authentication program, and the like.

The authentication program is a program (tamper check program) for authenticating the game program and the game system program. The pre-authentication program is a program for authenticating the above-mentioned authentication program. The authentication program and the pre-authentication program are written along a procedure (authentication procedure) for proving that the program to be the subject has not been tampered.

The mother board 1070 is configured by using a commercially available general-purpose mother board (printed circuit board having basic components of a personal computer mounted thereon) and includes a main CPU 1071, a ROM (Read Only Memory) 1072, a RAM (Random Access Memory) 1073, and a communication interface 1082. Here, the main CPU 1071 corresponds to a controller 1100 of the slot machine 1010.

The ROM 1072 includes a memory device such as a flash memory and stores a program such as BIOS (Basic Input/Output System) to be executed by the main CPU 1071 and permanent data. When the BIOS is executed by the main CPU 1071, processing for initializing predetermined peripheral devices is conducted; and further, through the gaming board 1050, processing of loading the game program and the game system program stored in the memory card 1054 is started. It is to be noted that in the present invention, the ROM 1072 may be a ROM in which contents are rewritable or a ROM in which contents are un-rewritable.

The RAM 1073 stores data and programs such as the symbol determination program which are used in operation of the main CPU 1071. For example, when the processing of loading the above-mentioned game program, game system program or authentication program is conducted, the RAM 1073 can store the program. The RAM 1073 is provided with working areas used for operations in execution of these programs. Examples of the areas include: an area that stores counters for managing the number of games, the number of BETs, the number of payout, the number of credits, and the like; and an area that stores symbols (code numbers) determined by a drawing.

The communication interface 1082 is to control transmission and reception of data between the PTS terminal 1700 and the main CPU 1071. In addition, the motherboard 1070 is connected with the later-described door PCB (Printed Circuit Board) 1090 and a main body PCB 1110 by respective USBs. The motherboard 1070 is also connected with a power supply unit 1081.

When the power is supplied from the power supply unit 1081 to the motherboard 1070, the main CPU 1071 of the motherboard 1070 is activated, and then the power is supplied to the gaming board 1050 through the PCI bus so as to activate the CPU 1051.

The door PCB 1090 and the main PCB 1110 are connected with input devices such as switches and sensors and peripheral devices, the operations of which are controlled by the main CPU 1071.

The door PCB 1090 is connected with a control panel 1030 and a cold cathode tube 1093.

The control panel 1030 is provided with a spin switch 1031S, a MAX-BET switch 1032S, a 5-BET switch 1033S, a 3-BET switch 1034S, a 2-BET switch 1035S, a 1-BET switch 1036S, a HELP switch 1037S, and a CASHOUT switch 1038S which correspond to the above-mentioned respective buttons. Each of the switches outputs a signal to the main CPU 1071 upon detection of pressing of the button corresponding thereto by a player.

The cold cathode tube 1093 functions as a backlight installed on the rear face sides of the upper image display panel 1131 and the lower image display panel 1141 and lights up based on a control signal outputted from the main CPU 1071.

The main body PCB 1110 is connected with the lamp 1111, the speakers 1112, the printer 1171, and a graphic board 1130. It is to be noted that although in this example, the bill validator 1022 is connected to the PTS terminal 1700, a configuration in which the bill validator 1022 is connected to the slot machine 1010 may be adopted.

The lamp 1111 lights up based on a control signal outputted from the main CPU 1071. The speakers 1112 outputs sounds such as BGM, based on a control signal outputted from the main CPU 1071. Based on a control signal outputted from the main CPU 1071, for example, the printer 1171 prints on a ticket a barcode representing encoded data of the number of credits, date, the identification number of the slot machine 1010, and the like stored in the RAM 1073 and then outputs the ticket as a ticket with a barcode.

It is to be noted that the upper image display panel 1131 and the lower image display panel 1141 may be configured as touch panels. Each of the touch panel detects a position where a finger or the like of a player touches and outputs a signal corresponding to the detected position to the main CPU 1071.

The bill validator 1022 identifies whether or not bills are authentic and accepts authentic bills into the cabinet 1011. An amount of the bills inputted into the cabinet 1011 is converted to a number of coins and a credit which is equivalent to the converted number of coins is added as a credit which a player has.

The graphic board 1130 controls display of images conducted by the respective upper image display panel 1131 and lower image display panel 1141 based on a control signal outputted from the main CPU 1071. The graphic board 1130 is provided with a VDP (Video Display Processor) generating image data, a video RAM storing the image data generated by the VDP, and the like. It is to be noted that the image data used in generation of image data by the VDP is included in the game program which has been read from the memory card 1054 and stored into the RAM 1073.

A motor driving circuit 1153 includes an FPGA (Field Programmable Gate Array) 1155 and a driver 1154. Connected to the motor driving circuit 1153 are stepping motors 1159A to 1159E for rotating the respective reels M1A to M1E. The FPGA 1155 is a programmable electronic circuit such as LSI and functions as a control circuit for the stepping motors 1159A to 1159E. The driver 1154 functions as an amplifying circuit for pulses inputted to the stepping motors 1159A to 1159E.

An index detection circuit 1151 is to detect a position of each of the reels M1A to M1E which are rotating and further, is capable of detecting losing of steps of each of the reels M1A to M1E. A position change detection circuit 1152 detects a change of a position where each of the reels M1A to M1E has stopped. For example, in a case where although in reality, a combination of symbols displayed after stopping of the reels M1A to M1E is not associated with any of combinations of symbols related to winning, the position where each of the reels M1A to M1E has stopped is changed by an external action such as a fraudulent act so as to establish any of combinations of symbols related to winning, the position change detection circuit 1152 detects the change of the position where each of the reels M1A to M1E has stopped. The position change detection circuit 1152 is configured to detect, for example, fins (not shown) attached at predetermined intervals to internal portions of each of the reels M1A to M1E and to be capable of thereby detecting the change of the position where each of the reels M1A to M1E has stopped.

It is to be noted that an excitation system of the stepping motors 1159A to 1159E is not particularly limited and a 1-2 phase excitation system or a 2 phase excitation system may be adopted. In addition, instead of the stepping motors, DC motors may be adopted. In a case where the DC motors are adopted, connected to the main body PCB 110 are a deviation counter, a D/A converter, and a servo amplifier in this order, and the DC motors are connected to the servo amplifier. In addition, rotation positions of the DC motors are detected by a rotary encoder, current rotation positions of the DC motors are supplied as data from the rotary encoder to the deviation counter.

It is to be noted although the configuration of the circuitry of the slot machine 1010 is described as the configuration shown in FIG. 7 hereinabove, a variety of other configurations may be adopted.

[Circuitry Configuration of PTS Terminal]

Figure 8:
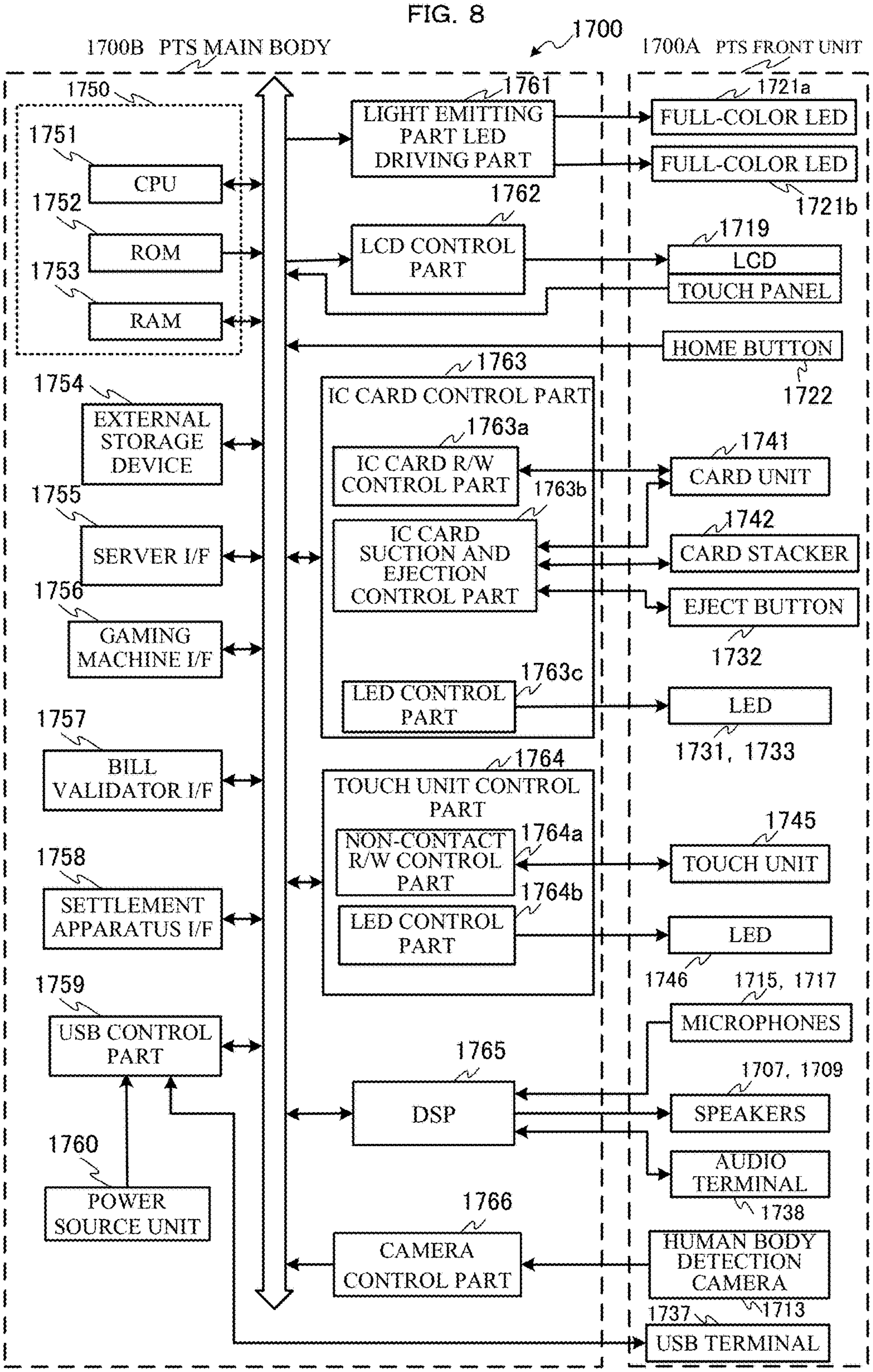
FIG. 8 is a diagram showing a circuitry configuration of the PTS terminal according to the one embodiment of the present invention.

Next, with reference to FIG. 8, a configuration of circuitry or the like which a PTS terminal 1700 includes will be described. As described above, the PTS terminal 1700 includes a PTS front unit 1700A and a PTS main body 1700B. In FIG. 8, however, the circuitry or the like which the PTS terminal 1700 includes is shown by dividing the circuitry or the like into circuitry or the like included in the PTS front unit 1700A and circuitry or the like included in the PTS main body 1700B.

A PTS controller 1750 for controlling the PTS terminal 1700 has a CPU 1751, a ROM 1752, and a RAM 1753.

The CPU 1751 controls execution of each component of the PTS terminal 1700, executes a variety of programs stored in the ROM 1752, and performs computation. For example, the CPU 1751 executes a credit updating program and updates credit-related data stored in an IC card 1500.

The ROM 1752 is constituted of a memory device such as a flash memory and has stored therein permanent data executed by the CPU 1751. For example, in the ROM 1752, a credit updating program for rewriting credit-related data stored in the IC card 1500 or the like can be stored.

The RAM 1753 temporarily stores data required upon executing a variety of programs stored in the ROM 1752.

An external storage device 1754 is a storage device, for example, such as a hard disk device and stores a program executed by the CPU 1751 and data which a program executed by the CPU 1751 uses.

A server I/F (interface) 1755 realizes data communication between servers such as a hall management server 10, a jackpot server 11, and the like and the PTS terminal 1700. A gaming machine I/F (interface) 1756 realizes data communication between a slot machine 1010 and the PTS terminal 1700, and for said data communication, a specified protocol can be used.

Besides, the PTS terminal 1700 is connected to a bill validator 1022 via a bill validator I/F (interface) 1757 and connected to a settlement apparatus 1868 via a settlement apparatus I/F (interface) 1758 and is capable of performing transmission and reception of data as needed.

A USB control part 1759 determines whether on the USB terminal 1737, power is supplied from a power supply unit 1760 and when a predetermined condition is satisfied, enables the recharging on the USB terminal 1737. When the predetermined condition is satisfied, a player connects an electronic device to the USB terminal 1737, thereby allowing said electronic device to be recharged.

A light emitting part LED driving part 1761 performs control such that in order to cause an upper light emitting plate 1720A to emit light, full-color LEDs 1721A of the LCD 1719 are lit up at predetermined timing and performs control such that in order to cause a lower light emitting plate 1720B of the LCD 1719 to emit light, full-color LEDs 1721B are lit up at predetermined timing.

An LCD control part 1762 performs control to cause the LCD 1719 to display information pertinent to members, information for the members, and the like and to display data read out from an IC card 1500 and data inputted by a player. In addition, the LCD 1719 has a touch panel function and when a touch panel is operated by a player, a predetermined signal is transmitted to the CPU 1751.

A home button 1722 is provided in the vicinity of the LCD 1719 and is a button for shifting a screen displayed on the LCD 1719 to a predetermined upper level screen. When the home button 1722 is pressed by a player, that operation by a player is transmitted to the CPU 1751, and the CPU 1751 transmits an instruction to the LCD control part 1762 to update the display on the LCD 1719 in accordance with said operation.

An IC card control part 1763 performs control for insertion and ejection of an IC card 1500, writing of credit data thereto, and the like. The IC card control part 1763 includes an IC card R/W (reader/writer) control part 1763A, an IC card suction and ejection control part 1763B, and an LED control part 1763C.

The IC card R/W control part 1763A controls a card unit 1741 and updates credit-related data stored in an IC card 1500. In addition, when an IC card 1500 is newly issued, credit-related data corresponding a settled money amount is stored. The card unit 1741 has an antenna part for reading data by an NFC or the like from the IC card 1500 or writing the data thereto.

Although the card unit 1741 has functions of an IC card reader for reading information stored in an IC card 1500 and an IC card writer for writing information to an IC card 1500, the card unit 1741 may have a function of either one of the IC card reader and the IC card writer as needed.

The IC card suction and ejection control part 1763B performs control for suction and ejection of an IC card 1500. When an IC card 1500 is inserted by a player into the card insertion slot 1730, the IC card suction and ejection control part 1763B performs control to retain the IC card in the card unit 1741 while a player is executing a game. In addition, after the credit-related data has been written in the IC card 1500 upon the settlement, the IC card suction and ejection control part 1763B performs control to eject that IC card 1500. Further, when an eject button 1732 has been pressed, the IC card suction and ejection control part 1763B ejects the IC card 1500.

In addition, when an IC card 1500 is newly issued, the IC card suction and ejection control part 1763B newly takes out an IC card 1500 from a card stacker 1742 and in order to cause the IC card 1500 to store credit-related data, supplies the IC card 1500 to the card unit 1741.

The LED control part 1763C performs control to light up LEDs (full-color LEDs 1731) provided in the vicinity of the card insertion slot 1730 of the card unit 1741 and to light up an LED (red LED 1733) provided in the vicinity of the eject button 1732.

A touch unit control part 1764 controls data transmission and reception associated with a touch operation on an IC card 1500, a mobile phone, a smartphone, or the like. The touch unit control part 1764 includes a non-contact R/W (reader/writer) control part 1764A and a LED control part 1764B.

The non-contact R/W control part 1764A determines whether or not the IC card 1500 or the mobile phone comes near within a predetermined distance (for example, a touch operation has been conducted) with a touch unit 1745, and when the IC card 1500 or the mobile phone has come near within the predetermined distance, the non-contact R/W control part 1764A obtains reading-out result from the touch unit 1745. The touch unit 1745 has an antenna part for performing data transmission and reception to and from the IC card 1500 or the mobile phone by an NFC or the like.

Although the touch unit 1745 has functions of the IC card reader for reading information stored in the IC card 1500 or the mobile phone and the IC card writer for writing information to the IC card 1500 or the mobile phone, the touch unit 1745 may have a function of either one thereof as needed.

The LED control part 1764B controls LEDs 1746 located in four corners of a front face of the touch unit 1745 to light up the LEDs 1746 at predetermined timing.

A DSP 1765 receives sound data obtained from microphones 1715 and 1717 and conducts predetermined processing for the sound data and thereafter, transmits the processed data to the CPU 1751. In addition, the DSP 1765 transmits the received sound data to speakers 1707 and 1709. Further, the DSP 1765 outputs the sound, received to an audio terminal connected with a headset, to headphones and processes the sound received from the microphones and transmits the processed sound to the CPU 1751. It is to be noted that here, the configuration of the outline is described and the description of an A/D converter, a D/A converter, an amplifier, and the like are omitted.

A camera control part 1766 obtains an image of a player or the like shot by a human body detection camera 1713, subjects the image to predetermined image processing as needed, and transmit the processed data to the CPU 1751. Said data is transmitted, for example, via a server I/F 1755 to the hall management server 10, the membership management server 12, and the like.

It is to be noted that although hereinabove, the circuitry configuration of the PTS terminal 1700 is descried as the configuration shown in FIG. 8, a variety of other configuration may be adopted.

[Configuration of Symbol Combination Table]

Next, with reference to FIG. 9, a symbol combination table will be described.

The symbol combination table specifies combinations of drawn symbols related to winning and the numbers of payout. On the slot machine 1010, the rotation of symbol arrays of five reels M1A to M1E (a first reel to a fifth reel) of a reel apparatus M1 is stopped, and winning is established when the combination of symbols displayed along a winning line matches one of the combinations of symbols specified by the symbol combination table. According to the winning combination, a benefit such as payout of a credit or the like is provided for a player. It is to be noted that winning is not established (i.e. the game is lost) when the combination of symbols displayed along the winning line does not match any of the combinations of symbols specified by the symbol combination table.

Basically, winning is established when all symbols displayed along the winning line by all of the five reels M1A to M1E are of one kind out of kinds of symbols "RED", "APPLE", "BLUE 7", "BELL", "CHERRY", "STRAWBERRY", "PLUM", and "ORANGE". However, with respect to the respective kinds of symbols "CHERRY" and "ORANGE", winning is also established when one or three symbols of either kind are displayed along the winning line by the reel or the reels.

For example, when all the symbols displayed along the winning line by all of the five reels M1A to M1E of the reel apparatus M1 are the symbols "BLUE 7", the winning combination is a "BLUE" combination, and "10" is determined as the number of payout. Based on the determined number of payout, the provision of a credit is conducted. The provision of the credit is conducted, for example, such that the added credit is stored in the IC card 1500 and thereafter, the IC card 1500 is ejected from the card insertion slot 1730.

[Contents of Program Executed on Slot Machine]

Next, with reference to FIG. 10 to FIG. 16, one example of a program executed on a slot machine 1010 will be described.

<Main Control Process>

Figure 10:
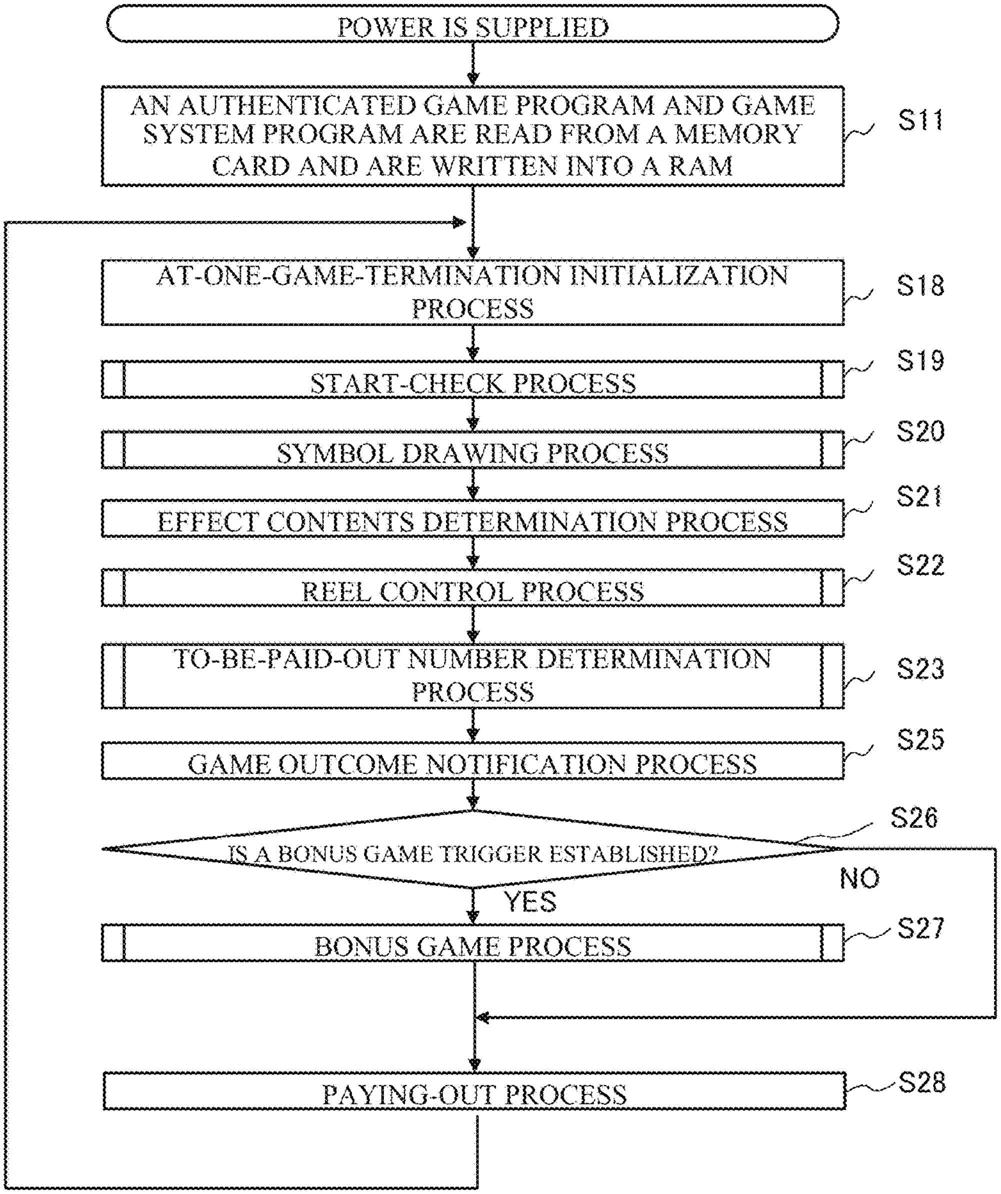
FIG. 10 is a flowchart showing a procedure of a main control process executed on the slot machine according to the one embodiment of the present invention.

First, with reference to FIG. 10, a main control process will be described. FIG. 10 is a flowchart of the main control process executed on a slot machine 1010 according to the embodiment of the present invention.

First, when the power is supplied to the slot machine 1010, a main CPU 1071 reads the authenticated game program and game system program from a memory card 1054 via a gaming board 50 and writes the programs into a RAM 1073 (step S11).

Next, the main CPU 1071 conducts an at-one-game-end initialization process (step S18). For example, data that becomes unnecessary after each game in working areas of the RAM 1073, such as the number of BETs and the symbols determined by a drawing, is cleared.

Next, the main CPU 1071 conducts a start-check process which is described later (step S19). In this process, input from a BET switch and a spin switch is checked.

Next, the main CPU 1071 conducts a symbol drawing process which is described later (step S20). In this process, to-be stopped symbols are determined based on random number values for symbol determination.

Next, the main CPU 1071 conducts an effect contents determination process (step S21). The main CPU 1071 extracts random number values for effect and determines any of the effect contents from a predetermined plurality of effect contents by a drawing. The effect contents can be determined in accordance with a winning combination and a state of a game on a slot machine 1010. For example, the configuration can be arranged such that in accordance with winning combinations and the states of the game on the slot machine 1010, drawing probabilities related to respective effect contents are made different from one another.

Next, the main CPU 1071 conducts a reel control process which is described later (step S22). In this process, rotation of five reels M1A to M1E (a first reel to a fifth reel) of a reel apparatus M1 is started, and the to-be stopped symbols determined in the symbol drawing process at step S20 are stopped in predetermined positions (for example, in a symbol display window 1135). In other words, three symbols including each of the to-be stopped symbols with respect to each of the reels are displayed in the symbol display window 1135.

Next, the main CPU 1071 conducts a to-be-paid-out number determination process which is described later (step S23). In this process, based on a combination of symbols displayed on a winning line L, a to-be-paid-out number is determined and stored in a to-be-paid-out number storage region provided in a RAM 1073.

Next, the main CPU 1071 conducts a game outcome notification process (step S25). In this process, data which includes termination time at which a unit game is terminated (for example, time at which the to-be-paid-out number determination process is conducted); game contents (for example, a to-be-paid-out number); and an identification code for identifying the slot machine 1010 is transmitted to a PTS terminal 1700. In addition, when a player can be identified with an IC card 1500 or the like being inserted, an identification code of a member associated with the IC card 1500 is also transmitted to the PTS terminal 1700. The PTS terminal 1700 transmits this data to a hall management server 10, and on the hall management server 10, this data is accumulated as information (game information) pertinent to a game progress for each player playing games and for each machine.

Next, the main CPU 1071 determines whether or not a bonus game trigger has been established (step S26). When the main CPU 1071 determines that the bonus game trigger has been established, the main CPU 1071 conducts a bonus game process which is described later (step S27).

After the process at step S27 or when determining at step S26 that the bonus game trigger has not been established, the main CPU 1071 conducts a paying-out process (step S28). The main CPU 1071 adds a value stored in the to-be-paid-out number storage region to a number-of-credits storage region provided in the RAM 1073. Here, for example, when a player presses a CASHOUT button, a CASHOUT switch 1038S which has detected the pressing thereof outputs a signal to the main CPU 1071 and the value in the number-of-credits storage region is added to the number of credits stored in the IC card 1500 held by a card unit 1741. It is to be noted that a ticket with a barcode may be issued by a printer 1171. After finishing the paying-out process, the main CPU 1071 returns to the process at S18 and the unit game is repeated.

<Start-Check Process>

Figure 11:
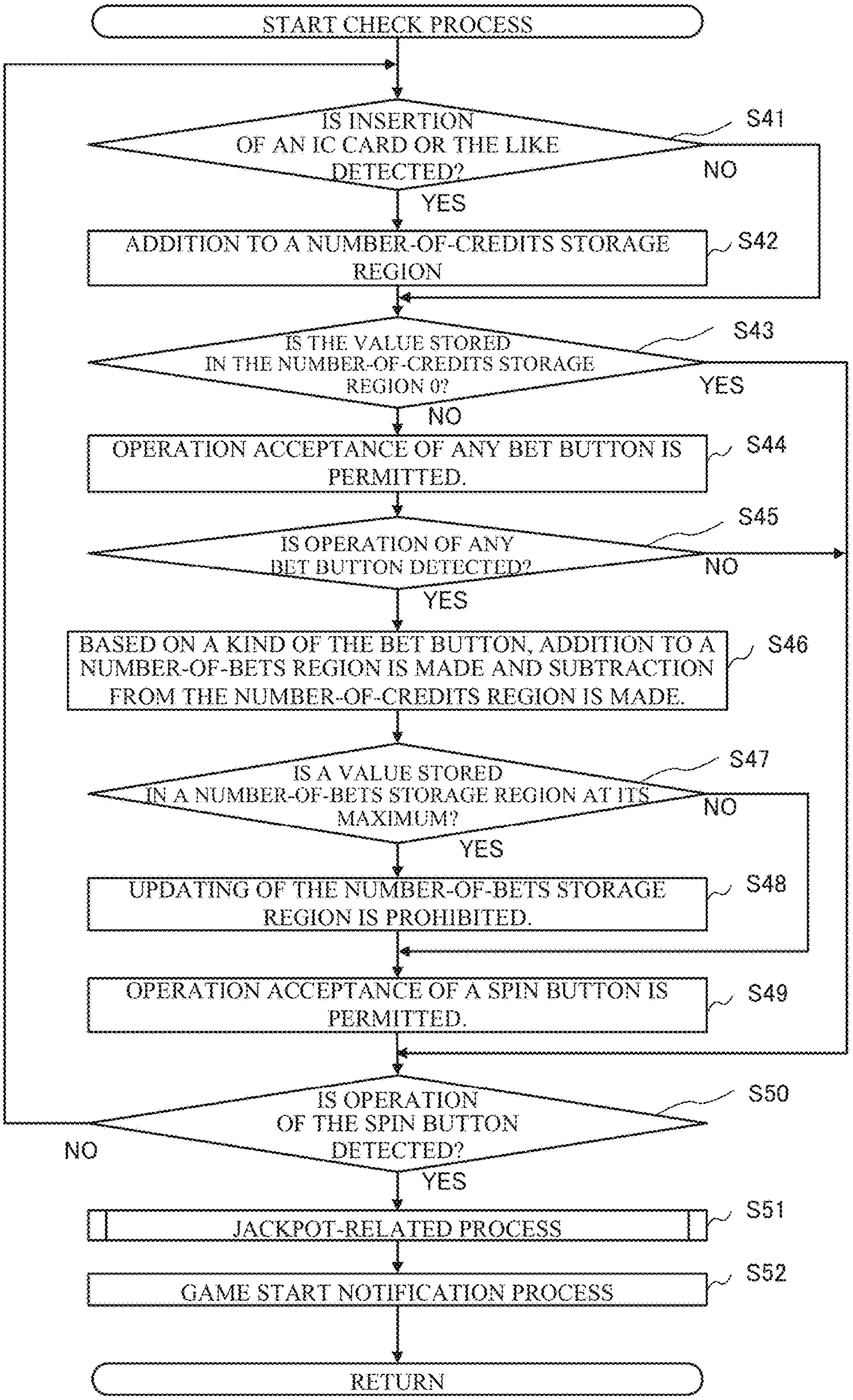
FIG. 11 is a flowchart showing a procedure of a start-check process executed on the slot machine according to the one embodiment of the present invention.

Next, with reference to FIG. 11, a start-check process will be described. FIG. 11 is a flowchart of the start-check process executed on a slot machine 1010 according to the present embodiment of the present invention.

The main CPU 1071 determines whether or not an IC card 1500 inserted from a card insertion slot 1730 has been held by a card unit 1741 and whether or not bills are inputted into a bill validator 1022 (step S41). When the main CPU 1071 determines that the insertion of the IC card 1500 or the inputting of the bills has been detected, authenticity of said IC card 1500 or said bills are confirmed and thereafter, addition thereof to a number-of-credits storage region is conducted (step S42).

After the process at step S42 or when determining at step S41 that the insertion of the IC card 1500 or the like has not been detected, the main CPU 1071 determines whether or not a value stored in the number-of-credits storage region is zero (step S43). When the main CPU 71 determines that the value stored in the number-of-credits storage region is not zero, the main CPU 71 permits operation acceptance of a BET button (for example, any of a MAX BET button 1032, a 5-BET button 1033, a 3-BET button 1034, a 2-BET button 1035, and a 1-BET button 1036) (step S44).

Next, the main CPU 1071 determines whether or not operation of any of the BET buttons has been detected (step S45). When the pressing of any BET button by a player has been detected by a BET switch (for example, any of a MAX-BET switch 1032S, a 5-BET switch 1033S, a 3-BET switch 1034S, a 2-BET switch 1035S, a 1-BET switch 1036S), the main CPU 1071 performs addition to a number-of-BETs storage region provided in the RAM 1073 and subtraction from the number-of-credits storage region based on the kind of the BET button (step S46).

Next, the main CPU 1071 determines whether or not a value stored in the number-of-BETs storage region is at its maximum (step S47). When the main CPU 1071 determines that the value stored in the number-of-BETs storage region is at its maximum, the main CPU 1071 prohibits updating of the value stored in the number-of-BETs storage region (step S48). After step S48 or when determining at step S47 that the value stored in the number-of-BETs storage region is not at its maximum, the main CPU 71 permits operation acceptance of a spin button (step S49).

After step S49 or when determining at step S45 that the operation of any of the BET buttons has not been detected, or when determining at step S43 that the value stored in the number-of-credits storage region is zero, the main CPU 1071 determines whether or not operation of the spin button has been detected (step S50). When the main CPU 1071 determines that the operation of the spin button has not been detected, the main CPU 1071 shifts the processing to step S41.

When the main CPU 1071 determines that the operation of the spin button has been detected, the main CPU 1071 conducts a jackpot-related process which is described later. In this process, one part of the bet credit is paid out via the PTS terminal 1700 to a jackpot server 11, for example, as a jackpot amount to be accumulated for a jackpot (step S51).

Next, the main CPU 1071 conducts a game start notification process (step S52). In this process, data which includes game start time at which a unit game is started; game contents (for example, a bet number); and an identification code for identifying a slot machine 1010 is transmitted to a PTS terminal 1700. In addition, when a player can be identified with an IC card 1500 or the like being inserted, an identification code of a member associated with the IC card 1500 is also transmitted to the PTS terminal 1700. The PTS terminal 1700 transmits this data to a hall management server 10, and on the hall management server 10, this data is accumulated as information (game information) pertinent to a game progress for each player playing games and for each machine. After the process at step S52 has been conducted, the start-check process is completed.

<Symbol Drawing Process>

Figure 12:
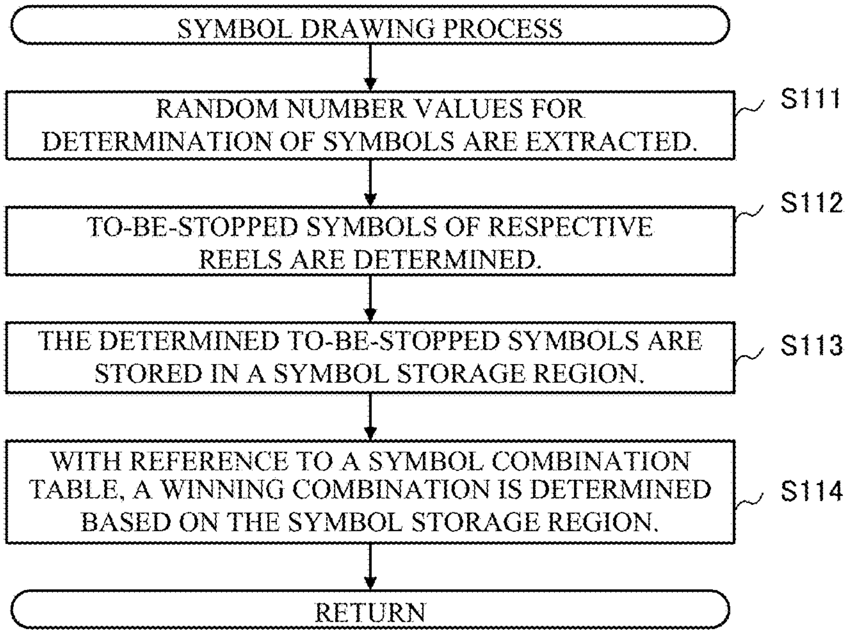
FIG. 12 is a flowchart showing a procedure of a symbol drawing process executed on the slot machine according to the one embodiment of the present invention.

Next, with reference to FIG. 12, a symbol drawing process will be described. FIG. 12 is a flowchart of the symbol drawing process executed on a slot machine 1010 according to the embodiment of the present invention.

First, the main CPU 1071 extracts random number values for symbol determination (step S111). Next, the main CPU 1071 determines to-be stopped symbols for five reels M1A to M1E (a first reel to a fifth reel) of a reel apparatus M1 (step S112). The main CPU 1071 conducts a drawing for each of the reels and determines any of 12 symbols as to-be stopped symbols.

Next, the main CPU 1071 stores the determined to-be stopped symbols for the respective reels in a symbol storage region provided in a RAM 1073 (step S113). Next, the main CPU 1071 references a symbol combination table (FIG. 9) and determines a winning combination based on the symbol storage region (step S114). The main CPU 71 determines whether or not the combination of symbols to be displayed along the winning line by the respective reels matches any of the combinations of symbols specified by the symbol combination table and determines the winning combination. After the process has been conducted, the symbol drawing process is completed.

<Reel Control Process>

Figure 13:
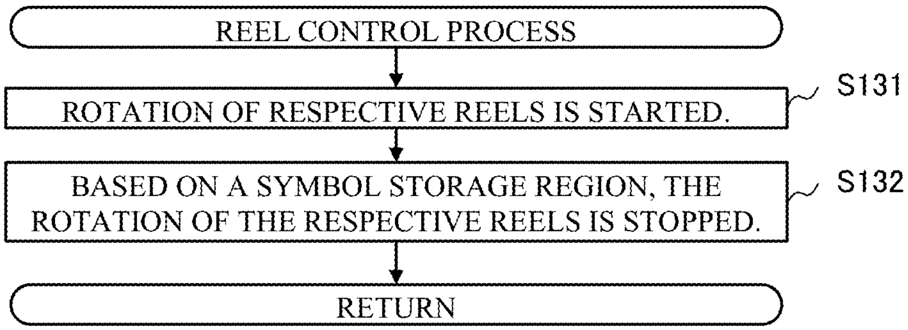
FIG. 13 is a flowchart showing a procedure of a reel control process executed on the slot machine according to the one embodiment of the present invention.

Next, with reference to FIG. 13, a reel control process will be described. FIG. 13 is a flowchart of the reel control process executed on a slot machine 1010 according to the embodiment of the present invention.

First, the main CPU 1071 controls stepping motors 1159A to 1159E and starts rotation of five reels M1A to M1E of a reel apparatus M1 (step S131). Next, the main CPU 1071 controls the stepping motors 1159A to 1159E and stops the rotation of the five reels M1A to M1E based on the above-mentioned symbol storage region (step S132). After the process has been conducted, the reel control process is completed.

It is to be noted that in accordance with timing of starting and stopping of the rotation of the reels M1A to M1E in the reel control process or other timing, the effect determined in the effect contents determination process (FIG. 10) is executed. For example, a moving image and a still image are displayed on an upper image display panel 1131 of the slot machine 1010, sound is outputted from speakers 1112, and a lamp 1111 is lit up, thereby allowing said effect to be executed.

<To-be-Paid-Out Number Determination Process>

Figure 14:
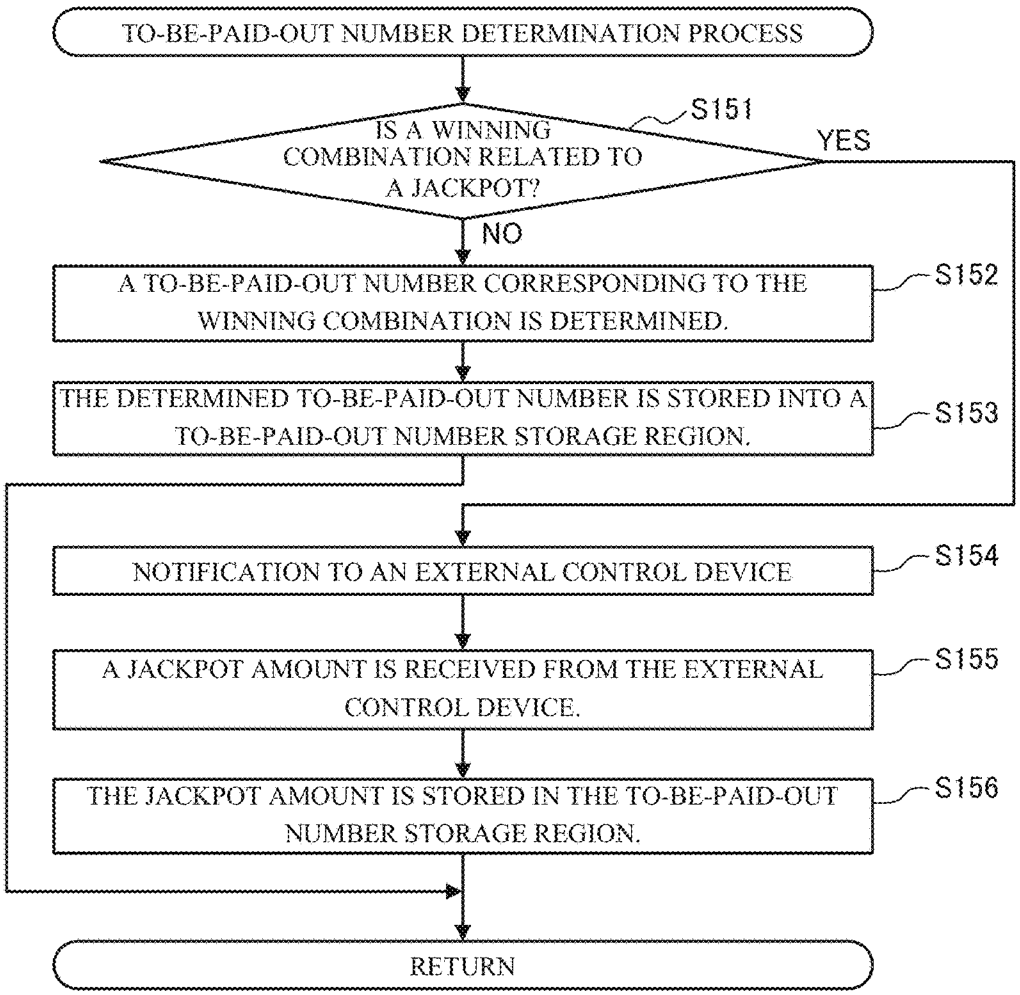
FIG. 14 is a flowchart showing a procedure of a to-be-paid-out number determination process executed on the slot machine according to the one embodiment of the present invention.

Next, with reference to FIG. 14, a to-be-paid-out number determination process will be described. FIG. 14 is a flowchart of the to-be-paid-out number determination process executed on a slot machine 1010 according to the embodiment of the present invention.

First, the main CPU 1071 determines whether or not a winning combination is a combination related to a jackpot (step S151). When the main CPU 1071 determines that the winning combination is not the combination of the jackpot, the main CPU 1071 determines a to-be-paid-out number corresponding to the winning combination (step S152). For example, when the winning combination is a combination of symbols "BELL", the main CPU 1071 determines "8" as the to-be-paid-out number (refer to FIG. 9). It is to be noted that the main CPU 1071 determines "0" as the to-be-paid-out number in a case where a game is lost. Next, the main CPU 1071 stores the determined to-be-paid-out number into a to-be-paid-out number storage region (step S153). After the process has been conducted, the to-be-paid-out number determination process is completed.

When the main CPU 1071 determines that the winning combination is the combination of the jackpot, the main CPU 1071 notifies an external control device (that is, a jackpot server 11) of the winning of the jackpot (step S154). It is to be noted that upon reception of the notification, the jackpot server 11 transmits to the slot machine 1010 the amount of a jackpot having been updated up to that time. At this time, a part (e.g. 80%) of the amount of jackpot may be an amount to be paid out and the rest (e.g. 20%) may be carried over for the upcoming establishment of a jackpot trigger.

Next, the main CPU 1071 receives the jackpot amount from the jackpot server 11 (step S155). Next, the main CPU 1071 stores the received jackpot amount into the to-be-paid-out number storage region (step S156). After this process has been conducted, the to-be-paid-out number determination process is completed.

<Jackpot-Related Process>

Figure 15:
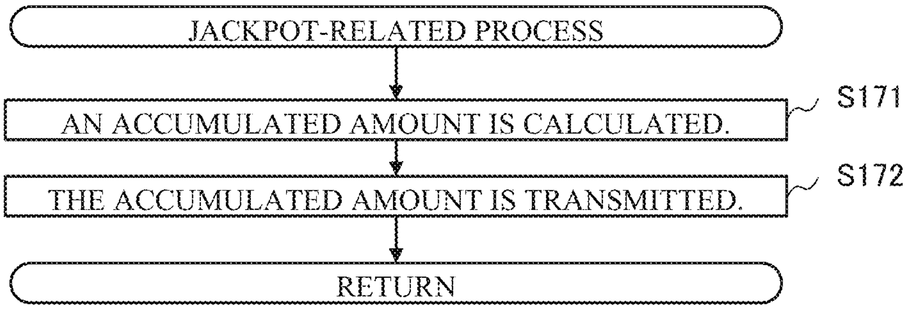
FIG. 15 is a flowchart showing a procedure of a jackpot-related process executed on the slot machine according to the one embodiment of the present invention.

Next, with reference to FIG. 15, a jackpot-related process will be described. FIG. 15 is a flowchart of the jackpot-related process executed on a slot machine 1010 according to the embodiment of the present invention First, the main CPU 1071 calculates an accumulation amount (step S171). The main CPU 1071 obtains a product of the value stored in the number-of-BETs storage region and a predetermined accumulation ratio, thereby calculating the accumulation amount to the amount of a jackpot.

Next, the main CPU 1071 transmits the calculated accumulation amount to the jackpot server 11 (step S172). Upon reception of the accumulation amount, the jackpot server 11 updates the amount of jackpot. After the process has been conducted, the jackpot-related process is completed.

<Bonus Game Process>

Figure 16:
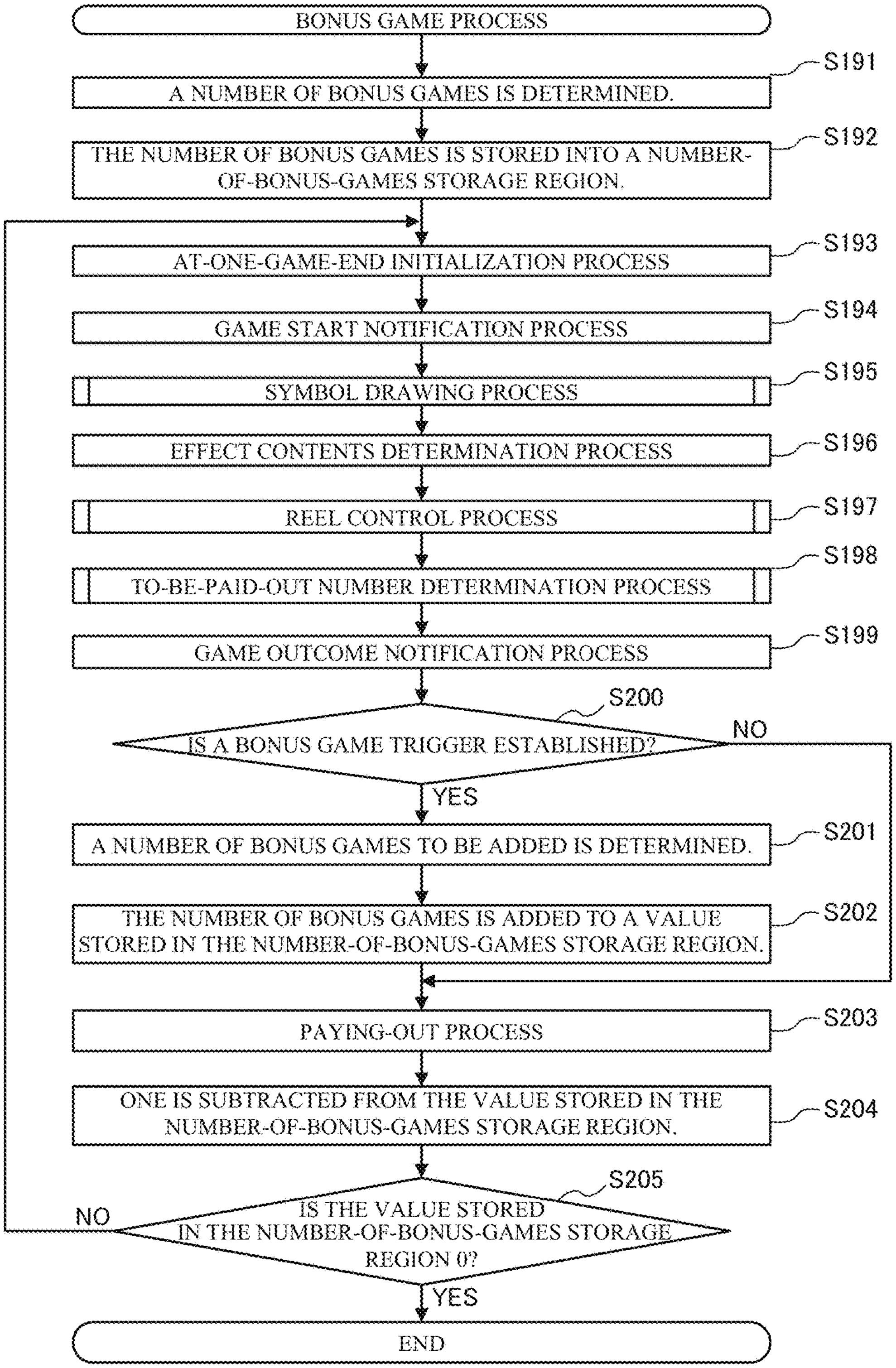
FIG. 16 is a flowchart showing a procedure of a bonus game process executed on the slot machine according to the one embodiment of the present invention.

Next, with reference to FIG. 16, a bonus game process will be described. FIG. 16 is a flowchart of the bonus game process executed on the slot machine 1010 according to the embodiment of the present invention.

First, the main CPU 1071 determines a number of bonus games (step S191). The main CPU 1071 extracts random number values for number-of-bonus-games determination and determines any one of the various numbers of bonus games such as "10", "20" and "30" by a drawing.

Next, the main CPU 1071 stores the determined number of bonus games into a number-of-bonus-games storage region provided in a RAM 1073 (step S192).

Next, the main CPU 1071 conducts an at-one-game-end initialization process in the same way as the process at step S18 described with reference to FIG. 10 (step S193).

Next, the main CPU 1071 conducts a game start notification process (step S194). This process is the same as the game start notification process at step S52 shown in FIG. 11, and in this process, data which includes game start time at which a unit game (in a bonus game) is started; game contents (for example, a bet number); and an identification code for identifying a slot machine 1010 is transmitted to a PTS terminal 1700. In addition, when a player can be identified with an IC card 1500 or the like being inserted, an identification code of a member associated with the IC card 1500 is also transmitted to the PTS terminal 1700. The PTS terminal 1700 transmits this data to a hall management server 10, and on the hall management server 10, this data is accumulated as information (game information) pertinent to a game progress for each player playing games and for each machine.

Next, the main CPU 1071 conducts a symbol drawing process described with reference to FIG. 12 (step S195). Next, the main CPU 1071 conducts an effect contents determination process, as with the process described with reference to FIG. 10 (step S196). Next, the main CPU 1071 conducts a reel control process described with reference to FIG. 13 (step S197). Next, the main CPU 1071 conducts a to-be-paid-out number determination process described with reference to FIG. 14 (step S198).

Next, the main CPU 1071 conducts a game outcome notification process (step S199). This process is the same as the game outcome notification process at step S25 shown in FIG. 10, and in this process, data which includes termination time at which a unit game (in a bonus game) is terminated (for example, time at which the to-be-paid-out number determination process is conducted); game contents (for example, a to-be-paid-out number); and an identification code for identifying the slot machine 1010 is transmitted to a PTS terminal 1700. In addition, when a player can be identified with an IC card 1500 or the like being inserted, an identification code of a member associated with the IC card 1500 is also transmitted to the PTS terminal 1700. The PTS terminal 1700 transmits this data to a hall management server 10, and on the hall management server 10, this data is accumulated as information (game information) pertinent to a game progress for each player playing games and for each machine.

Next, the main CPU 1071 determines whether or not a bonus game trigger has been established (step S200). When the main CPU 1071 determines that the bonus game trigger has been established, the main CPU 1071 determines a number of bonus games to be added (step S201). In the same way as the above-mentioned process at step S191, the main CPU 1071 determines the number of bonus games. Next, the main CPU 1071 adds the determined number of bonus games to a value stored in a number-of-bonus-games storage region (step S202).

After the process of step S202 or when determining at step S200 that the bonus game trigger has not been established, the main CPU 1071 conducts a paying-out process (step S203). In this paying-out process, the main CPU 1071 adds the value stored into the to-be-paid-out number storage region in the above-mentioned to-be-paid-out number determination process at step S198 to a value stored in a to-be-paid-out number storage region for bonuses. The to-be-paid-out number storage region for bonuses is an area for storing a total of the to-be-paid-out numbers determined during the bonus games.

When the bonus game process has been completed, the main CPU 1071 adds the value stored in the to-be-paid-out number storage region for bonuses to the value stored in the number-of-credits storage region provided in the RAM 1073, in the paying-out process at step S28 described with reference to FIG. 10. In other words, the total of the to-be-paid-out numbers determined during the bonus games is collectively paid out.

Next, the main CPU 1071 subtracts one from the value stored in the number-of-bonus-games storage region (step S204). Next, the main CPU 1071 determines whether or not a value stored in the number-of-bonus-games storage region is zero (step S205). When the main CPU 1071 determines that the value stored in the number-of-bonus-games storage region is not zero, the main CPU 1071 shifts the processing to step S193. On the other hand, when the main CPU 1071 determines that the value stored in the number-of-bonus-games storage region is zero, the main CPU 1071 completes the bonus game process. When the bonus game process has been completed, the processing is shifted to the processing at step S28 described with reference to FIG. 10.

On the slot machine 1010 according to the present embodiment, each game executed as the bonus game is each free game in which without consuming coins, a drawing related to determination of to-be stopped symbols is conducted, the free game being repeated at a number of times which is determined by a drawing as a number of bonus games. In addition, a bet number at this time is a bet number in a case where a 1-BET button 1036 is pressed by a player.

[Necessity and Features of Game Information Analysis System]

Next, with reference to FIG. 17 to FIG. 19, necessity and features of a game information analysis system according to the present invention will be described. FIG. 17 is a diagram explaining a background in which the game information analysis system is needed.

As shown in the "problems" described in FIG. 17, for the continuation of sound administration of a hall store, simply pursuing a profit on a side of the hall store is not sufficient, and it is needed to consider a profit of customers (here, the "hall store" includes a casino and other facility where gaming machines are installed).

In other words, it is important to maintain degrees of satisfaction of the hall store and the customers with an appropriate balance being kept. However, in the conventional system, it has been difficult to grasp these degrees of satisfaction, attributes of the customers, and attributes of gaming machines.

Therefore, in the game information analysis system according to the present invention, in order to solve the above-mentioned problem, game information is analyzed from points of view of both sides of the hall store and the customers, optimum management information is provided.

FIG. 18 is a diagram explaining features of the game information analysis system according to the present invention. The game information analysis system according to the present invention is an expert system which provides advice and prediction so as to make the administration of the hall store optimum, and cited as main features are: (1) operation data provided from a slot machine or the like is associated with psychology of a customer, thereby determining administration balance; (2) machine attributes, customer (player) attributes, degrees of satisfaction, and the like are classified (categorized) based on the past operation data; (3) through the comparison with the past data, potential risks and trend changes are detected; (4) future prediction and simulation of profitability are conducted; and so forth. It is to be noted that in the present specification, a gaming machine including a slot machine 1010 and the later-described slot machine 2014 is referred to as a "machine" as needed.

By using the game information analysis system according to the present invention having the features as described above, a game system constructed as the existing system can be further developed, and advice and prediction beneficial for the hall store administration can be provided for an owner of the hall store or the like.

Figure 19:
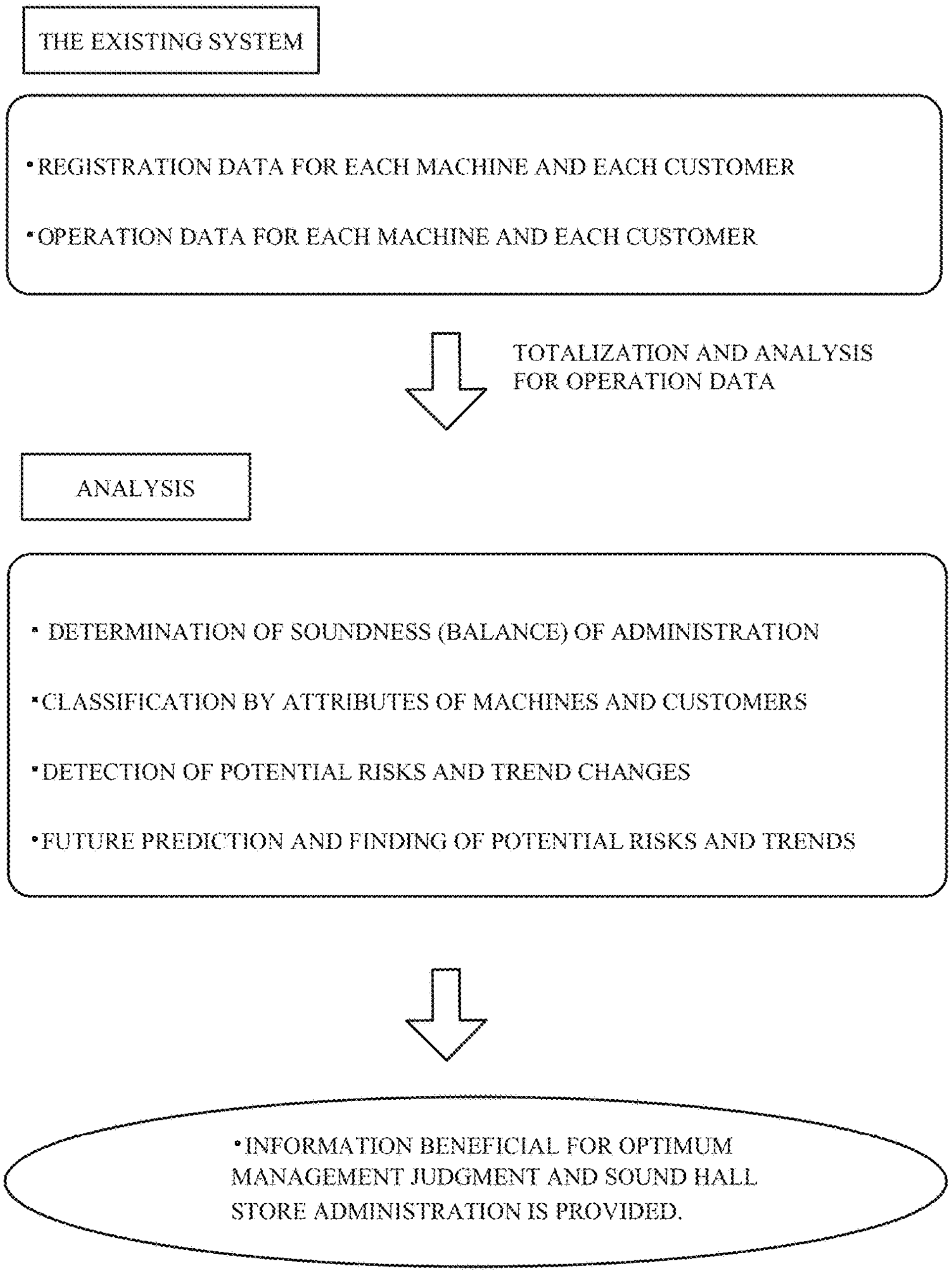
FIG. 19 is a diagram explaining an outline of an analysis process in the game information analysis system according to the present invention.

FIG. 19 is a diagram explaining an outline of an analysis process in the game information analysis system according to the present invention. The game information analysis system according to the present invention effectively utilizes the operation data of the existing system and is thereby capable of conducting a comprehensive game information analysis. From the existing system to the game information analysis system, for example, registration data for each machine and each customer and operation data for each machine and each customer (data related to IN/OUT of a slot machine, in other words, a player investment money amount (IN) and a slot machine payout amount (OUT)) are provided, and in the game information analysis system, totalization and analysis for the operation data are conducted.

The game information analysis system conducts a variety of analyses for, for example: (1) determination of soundness (balance) of administration; (2) classification by attributes of machines/customers; (3) detection of potential risks and trend change; (4) future prediction and finding of potential risks and trends, and so forth.

Through the above-described analysis by the game information analysis system, information beneficial for optimum management judgment and sound hall store administration is provided.

[Outline of Game Information Analysis System]

Next, with reference to FIG. 20 to FIG. 45, an outline of a game information analysis system will be described. The game information analysis system according to the present invention is to obtain and analyze game information pertinent to gaming machines such as slot machines or the like installed in a hall store (or a store).

FIG. 20 is a diagram showing variations of representative operation forms of the game information analysis system. As shown in FIG. 20, as the representative operation forms of the game information analysis system, there are an online operation form for a small-scale hall store; an online operation form for a large-scale hall store; and an offline operation form, and further, as options, several appendant operation forms are prepared.

In the online operation form for the small-scale hall store, the game information analysis system includes (the later-described) analysis server for conducting an analysis process, and this analysis server obtains, from a hall management server, game information or the like required for an analysis in real time or at other timing. In addition, the hall management server receives, from a plurality of gaming machines (in the present embodiment, slot machines), information related to game states or the like and accumulates the information. Here, a number of gaming machines connected to the hall store management server is, for example, 1,000 or less, and the number thereof is a number of the gaming machines in the small-scale hall store.

In the online operation form for the large-scale hall store, as in the online operation form for the small-scale hall store, the game information analysis system includes (the later-described) analysis server for conducting an analysis process, and this analysis server obtains, from a hall management server, game information or the like required for analysis in real time or at other timing. In addition, the hall management server receives, from a plurality of gaming machines (in the present embodiment, slot machines), information related to game states or the like and accumulates the information. Here, a number of gaming machines connected to the hall store management server is, for example, larger than 1,000, and the number thereof is a number of the gaming machines in the large-scale hall store. Because the analysis server in said operation form receives data from such a large number of gaming machines (via the hall management server) and conducts the analysis process, there may be a case where a large load is exerted on a computer resource. Therefore, a plurality of analysis servers is provided to share the analysis process, and the game information analysis system also can be thereby configured so as not to exert an excessive load on each of the analysis servers.

In the offline operation forms, as in the online operation form for the small-scale hall store, the game information analysis system is configured to include an analysis server which conducts an analysis process. However, analysis result data or the like transmitted from the analysis server to a client terminal is neither received in real time nor received via a network. The analysis result data or the like is provided for the client terminal via, for example, a portable recording medium such as a CD-ROM and a portable memory.

The game information analysis system can be configured to conduct the analysis process, as an option, by using game information or the like on a plurality of sites (for example, sites of a plurality of independent hall stores, sites of a plurality of hall stores belonging to the same group, etc.). In addition, displaying or the like of an analysis result can be instructed by a simple operation including a simple authentication-compliant operation (by the later-described client terminal connected to the analysis server). Further, as the above-mentioned client terminal, a mobile terminal such as a smartphone, a mobile phone, and a PDA can be used. The game information or the like is obtained from the hall management server or the like of the existing system, thereby allowing linkage among systems to be realized.

Figure 21:
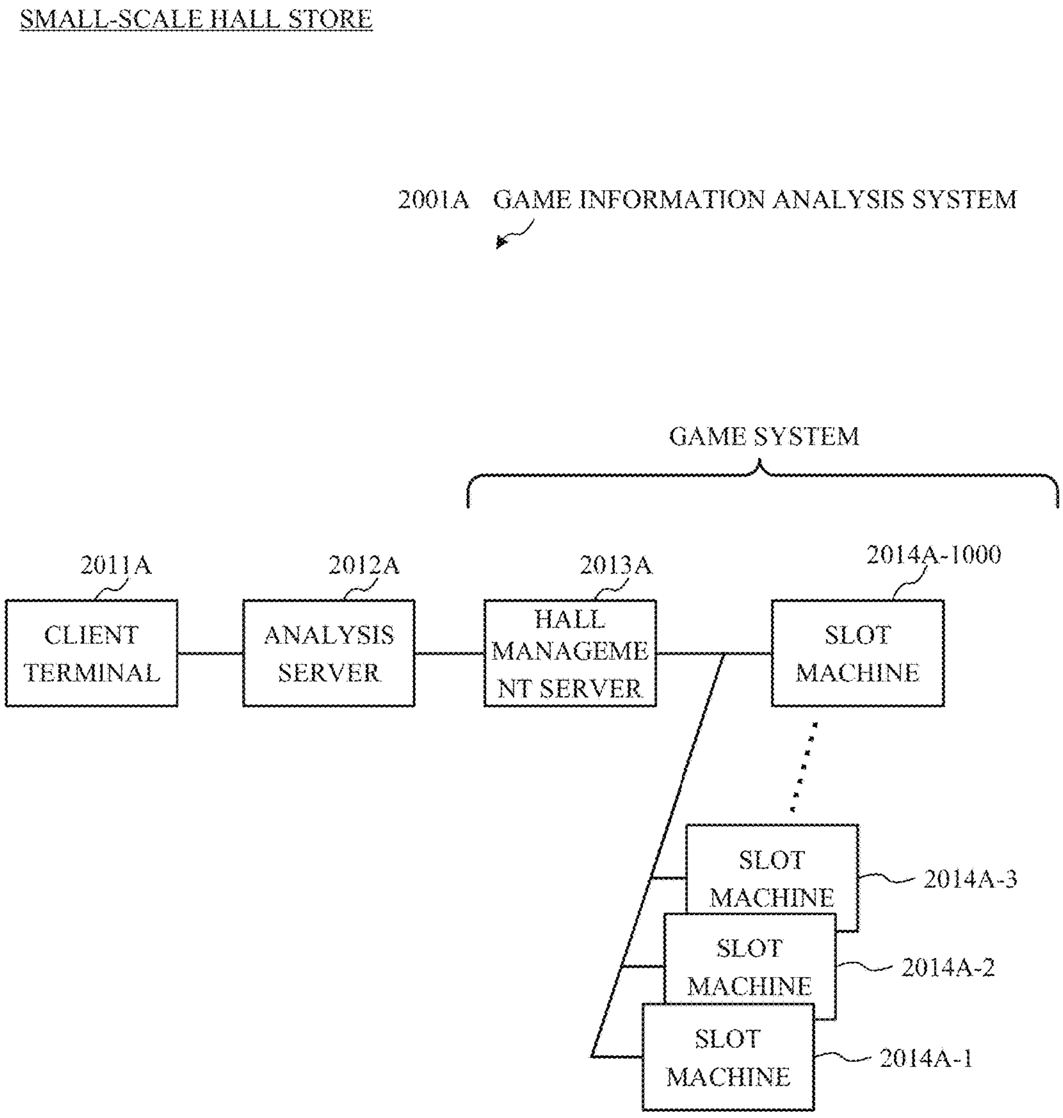
FIG. 21 is a diagram showing a configuration example of a game information analysis system realized in an online operation form for a small-scale hall store according to one embodiment of the present invention.

FIG. 21 is a diagram showing a configuration example of a game information analysis system 2001A realized in the online operation form for the small-scale hall store.

As shown in FIG. 21, the game information analysis system 2001A includes a client terminal 2011A and an analysis server 2012A and is connected to a game system such as a game system 1 show in FIG. 1, which is introduced in each hall store. Here, the game system includes, for example, a hall management server 2013A and a plurality of slot machines 2014A-1, 2014A-2, and 2014A-3 to 2014A-1000 connected to this hall management server 2013A.

The game information analysis system 2001A is a system implemented in the online operation form for the above-described small-scale hall store and includes the slot machines whose number is 1000 or less (1000) as described above. Each of the slot machines is connected via a network to the hall management server 2013A, and game information indicating game states such as a money amount or a number of coins inputted to each of the slot machines (as it is called, "IN" information, hereinafter, referred to as a bet number, a bet amount, a bet money amount, or the like) and a money amount or a number of coins paid out from each of the slot machines (as it is called, "OUT" information, hereinafter, referred to as a to-be-paid-out number, a payout amount, a to-be-paid-out money amount, or the like) is transmitted from each of the slot machines to the hall management server 2013A in real time and further, is transmitted from the hall management server 2013A to the analysis server 2012A.

In addition, machine information related to each of the slot machines stored in the hall management server 2013A is transmitted to the analysis server 2012A. The machine information includes fixed information registered for managing the gaming machines and variable information which varies in accordance with a game played by a player, and the variable information is transmitted in real time from each of the slot machines via the hall management server 2013A to the analysis server 2012A.

The analysis result data obtained as a result of the analysis process on the analysis server 2012A is provided for the client terminal 2011A, and in response to a user's operation, the client terminal 2011A controls a display or the like of the client terminal 2011A to display a variety of analysis reports or the like based on the received analysis result data.

It is to be noted that the analysis server 2012A can be connected to the existing game system. In this case, it is required for the analysis server 2012A to grasp a protocol and a format of the data transmitted from hall management server 2013A of the game system and to receive the data so as to correspond thereto.

In addition, in the present specification, in a case where the game information analysis system is collectively referred to, instead of being referred to as each game information analysis system in each of the individual operation forms, the game information analysis system is referred to as a game information analysis system 2001; in a case where the client terminal is collectively referred to, instead of being referred to as each client terminal in each of the individual operation forms, the client terminal is referred to as a client terminal 2011; in a case where the analysis server is collectively referred to, instead of being referred to as each analysis server in each of the individual operation forms, the analysis server is referred to as an analysis server 2012; in a case where the hall management server is collectively referred to, instead of being referred to as each hall management server in each of the individual operation forms, the hall management server is referred to as a hall management server 2013; and in a case where the slot machine is collectively referred to, instead of being referred to as each slot machine in each of the individual operation forms, the slot machine is referred to as a slot machine 2014. The slot machine 2014 corresponds to the slot machine 1010 shown in FIG. 2 and FIG. 4.

Figure 22:
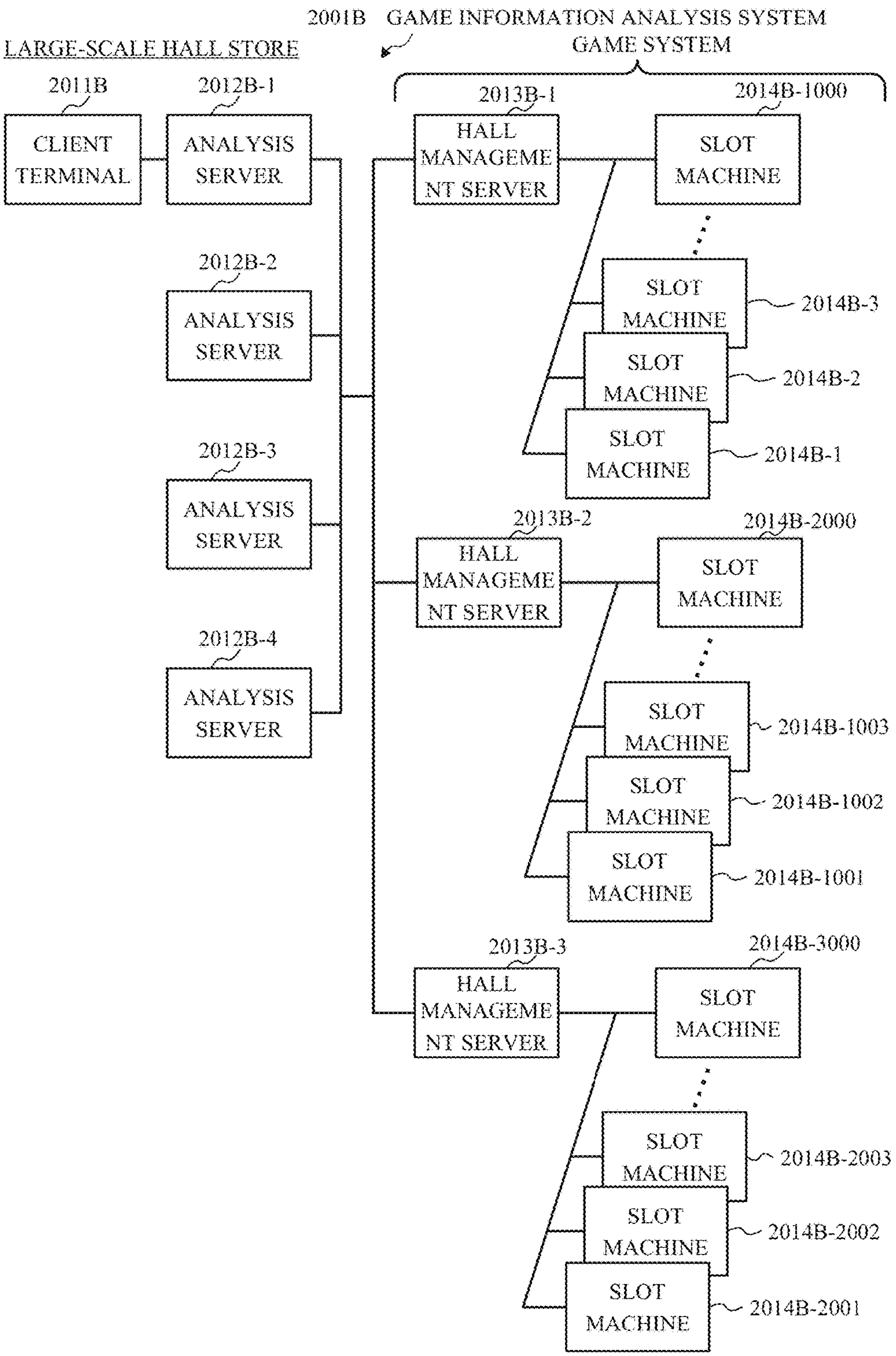
FIG. 22 is a diagram showing a configuration example of a game information analysis system realized in an online operation form for a large-scale hall store according to one embodiment of the present invention.

FIG. 22 is a diagram showing a configuration example of a game information analysis system 2001B realized in the online operation form for the large-scale hall store.

As shown in FIG. 22, the game information analysis system 2001B includes a client terminal 2011B and analysis server 2012B-1 to analysis server 2012B-4 and is connected to a game system introduced in each hall store such as the game system 1 shown in FIG. 1. Here, the game system includes, for example, a hall management server 2013B-1 to hall management server 2013B-3 and a plurality of slot machines 2014B-1, 2014B-2, 2014B-3 to 2014B-1000, 2014B-1001, 2014B-1002, 2014B-1003 to 2014B-2000, 2014B-2001, 2014B-2002, and 2014B-2003 to 2014B-3000 which are connected the hall management server 2013B-1 to hall management server 2013B-3.

The game information analysis system 2001B is a system implemented in the online operation form for the above-described large-scale hall store and includes the slot machines whose number is larger than 1000 (3000) as described above. Each of the slot machines is connected via a network to one corresponding hall management server among the hall management server 2013B-1 to hall management server 2013B-3, and game information indicating a game state such as a bet number inputted to each of the slot machines and a to-be-paid-out number paid out is transmitted to the corresponding hall management server 2013B in real time from each of the slot machines, and further, the game information is transmitted from each of the hall management server 2013B-1 to hall management server 2013B-3 to any of the analysis server 2012B-1 to analysis server 2012B-4.

In this example, the analysis server 2012B is constituted of four analysis server 2012B-1 to analysis server 2012B-4, the analysis process is shared to be executed. The analysis server 2012B may be configured such that each of the analysis servers 2012B takes charge of a different analysis process or executes the same analysis process with respect to each different range of slot machines. The hall management server 2013B-1 to hall management server 2013B-3 transmit necessary data to the respective analysis servers 2012B in accordance with processing contents on the analysis server 2012B-1 to analysis server 2012B-4.

In addition, machine information related to each of the slot machines stored on the hall management server 2013B-1 to hall management server b-3 is transmitted as needed to all or any of the analysis server 2012B-1 to analysis server 2012B-4. The machine information includes fixed information registered for managing the gaming machines and variable information which varies in accordance with a game played by a player, and the variable information is transmitted in real time from each of the slot machines via the hall management server 2013B to the analysis server 2012B.

Figure 23:
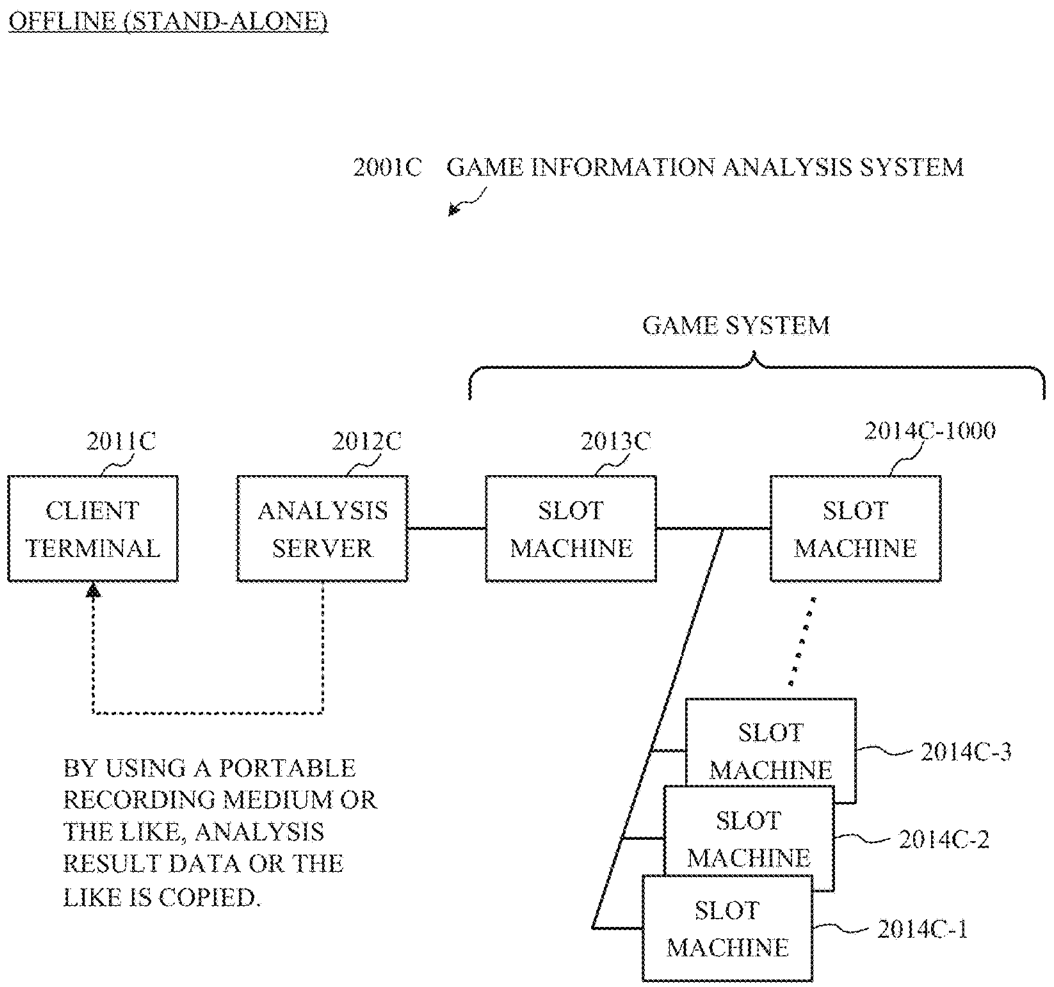
FIG. 23 is a diagram showing a game information analysis system realized in an offline operation form according to one embodiment of the present invention.

FIG. 23 is a diagram showing a configuration example of a game information analysis system 2001C realized in the offline operation form.

As shown in FIG. 23, the game information analysis system 2001C includes a client terminal 2011C and an analysis server 2012C and is connected to a game system introduced in each hall store such as the game system 1 shown in FIG. 1. Here, the game system includes, for example, a hall management server 2013C and a plurality of slot machines 2014C-1, 2014C-2, and 2014C-3 to a machine 2014C-1000 connected to this hall management server 2013C. In this case, the client terminal 2011C is not connected via a network to the analysis server 2012C and therefore, can be referred to as a "stand-alone terminal".

The game information analysis system 2001C is a system implemented in the offline operation form for the above-described small-scale hall store and includes slot machines whose number is within 1000 (1000) as described above. Connection between each of the slot machine 2014C-1 to slot machine 2014C-1000 and the hall management server 2013C and data to be transmitted are the same as in the game information analysis system 2001A shown in FIG. 21, and connection between the analysis server 2012C and the hall management server 2013C and data to be transmitted are also the same as in the game information analysis system 2001A shown in FIG. 21.

Analysis result data obtained as a result of an analysis process on the analysis server 2012C is stored in, for example, a portable recording medium such as a CD-ROM and a portable memory and is provided for the client terminal 2011C. Based on the received analysis result data, the client terminal 2011C controls a display or the like of the client terminal 2011C to display a variety of analysis reports or the like.

Figure 24:
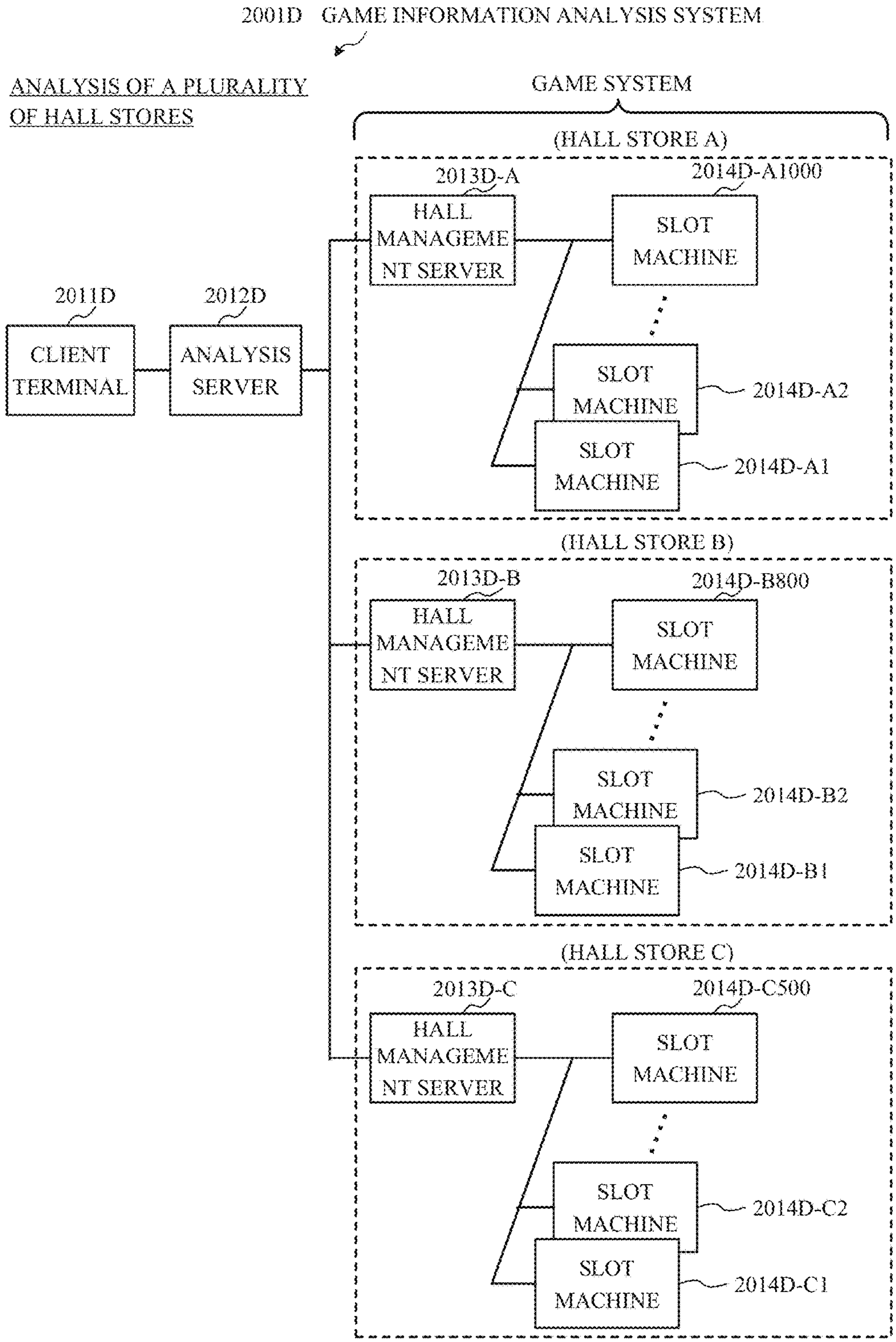
FIG. 24 is a diagram showing a game information analysis system according to one embodiment of the present invention in which an analysis process is conducted with respect to a plurality of hall stores.

FIG. 24 is a diagram showing a configuration example of a game information analysis system 2001D in which an analysis process is conducted with respect to a plurality of hall stores. The game information analysis system 2001D is provided as an option, for example, for three configuration examples of the above-described game information analysis system (the game information analysis system 2001A, the game information analysis system 2001B, and the game information analysis system 2001C).

As shown in FIG. 24, the game information analysis system 2001D includes a client terminal 2011D and an analysis server 2012D and is connected to a plurality of game systems introduced in the hall stores, each of which is the game system 1 shown in FIG. 1. Here, the game systems are game systems with respect to three hall stores (a hall store A to a hall store C). The game system with respect to the hall store A includes, for example, a hall management server 2013D-A and a plurality of slot machines 2014D-A1 and 2014D-A2 to 2014D-A1000 connected to this hall management server 2013D-A. The game system with respect to the hall store B includes, for example, a hall management server 2013D-B and a plurality of slot machines 2014D-B1 and 2014D-B2 to 2014D-B800 connected to this hall management server 2013D-B. In addition, the game system with respect to the hall store C includes, for example, a hall management server 2013D-C and a plurality of slot machines 2014D-C1 and 2014D-C2 to 2014D-C500 connected to this hall management server 2013D-C.

Each of the hall store A to hall store C corresponds to the above-described small-scale hall store (in other words, the number of slot machines is within 1000). Connection between each of the slot machine 2014D-A1 to slot machine 2014D-A1000 and the hall management server 2013D-A in the hall store A and data to be transmitted are the same as in the game information analysis system 2001A shown in FIG. 21, and also in each of the hall store B and the hall store C, connection between corresponding apparatuses and data to be transmitted are the same as in the game information analysis system 2001A shown in FIG. 21.

From the hall management server 2013D-A to the analysis server 2012D, game information or the like related to the slot machine 2014D-A1 to the slot machine 2014D-A1000 is transmitted in real time or at other timing. From the hall management server 2013D-B to the analysis server 2012D, game information or the like related to the slot machine 2014D-B1 to the slot machine 2014D-B800 is transmitted in real time or at other timing. From the hall management server 2013D-C to the analysis server 2012D, game information or the like related to the slot machine 2014D-C1 to the slot machine 2014D-C500 is transmitted in real time or at other timing.

Figure 25:
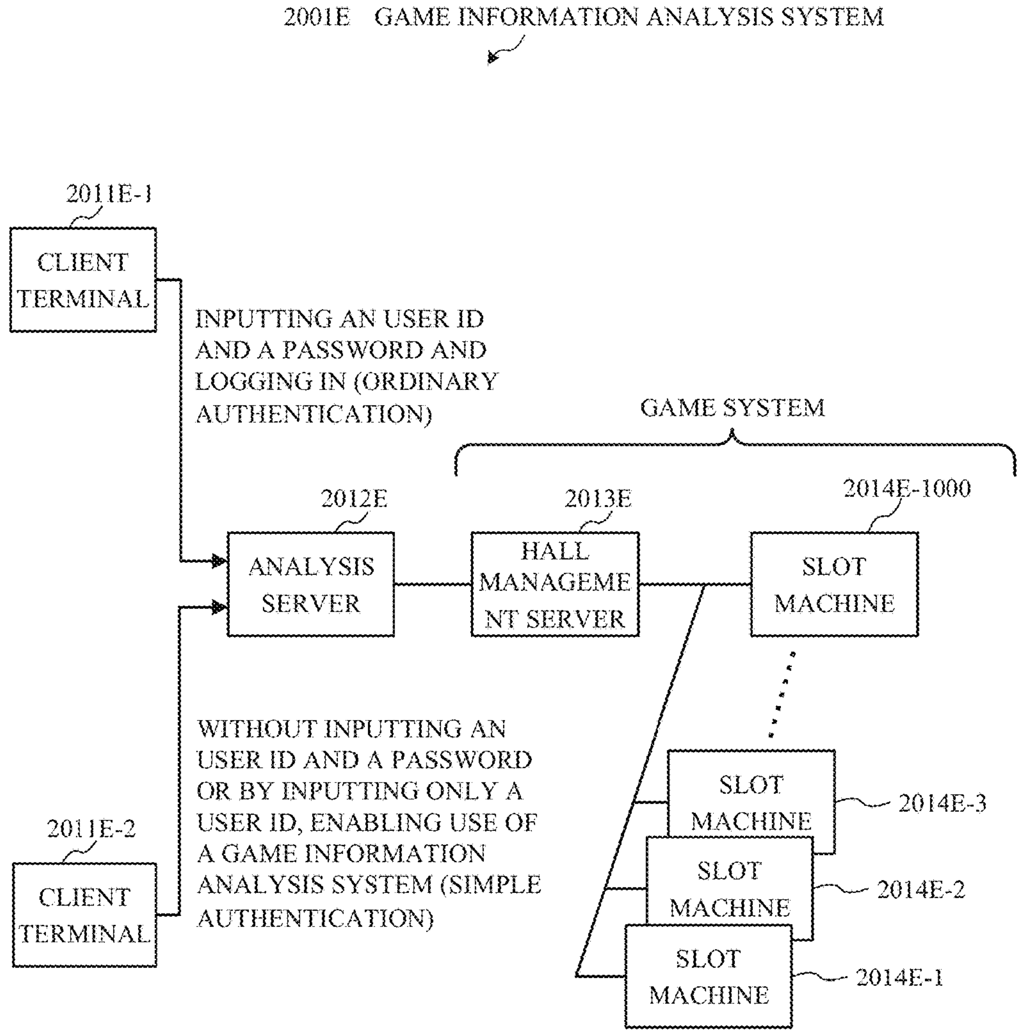
FIG. 25 is a diagram showing a game information analysis system according to one embodiment of the present invention in which client terminals are connected to an analysis server through a plurality of connection methods.

FIG. 25 is a diagram showing a configuration example of a game information analysis system 2001E in which client terminals are connected to an analysis server through a plurality of connection methods. The game information analysis system 2001E is provided as an option, for example, for three configuration examples of the above-described game information analysis system (the game information analysis system 2001A, the game information analysis system 2001B, and the game information analysis system 2001C).

As shown in FIG. 25, the game information analysis system 2001E includes a client terminal 2011E and an analysis server 2012E and is connected to a game system introduced in each hall store such as the game system 1 shown in FIG. 1. Here, the game system includes a hall management server 2013E and a plurality of slot machines 2014E-1, 2014E-2, and 2014E-3 to 2014E-1000 connected to this hall management server 2013E.

In addition, the client terminal 2011E in the game information analysis system 2001E can be configured so as to include two kinds of client terminals (for example, a client terminal 2011E-1 and a client terminal 2011E-2). Here, when a user operates and causes the client terminal 2011E-1 to display an analysis result, by inputting an user ID and a password, the client terminal 2011E-1 can connect to the analysis server 2012E and can log on to the game information analysis system 2001E (ordinary authentication).

On the other hand, by inputting neither a user ID nor a password or only by inputting a user ID and other character string, the client terminal 2011E-2 can connect to the analysis server 2012E and log on to the game information analysis system 2001E (simple authentication).

As described above, the log-in methods (authentication methods) of the client terminal 2011E-1 and the client terminal 2011E-2 to the game information analysis system 2001E are different from each other, and in accordance with the above-mentioned difference, ranges in which data can be referenced with the game information analysis system 2001E, data which can be handled, functions which can be utilized, and the like may be different from each other.

Figure 26:
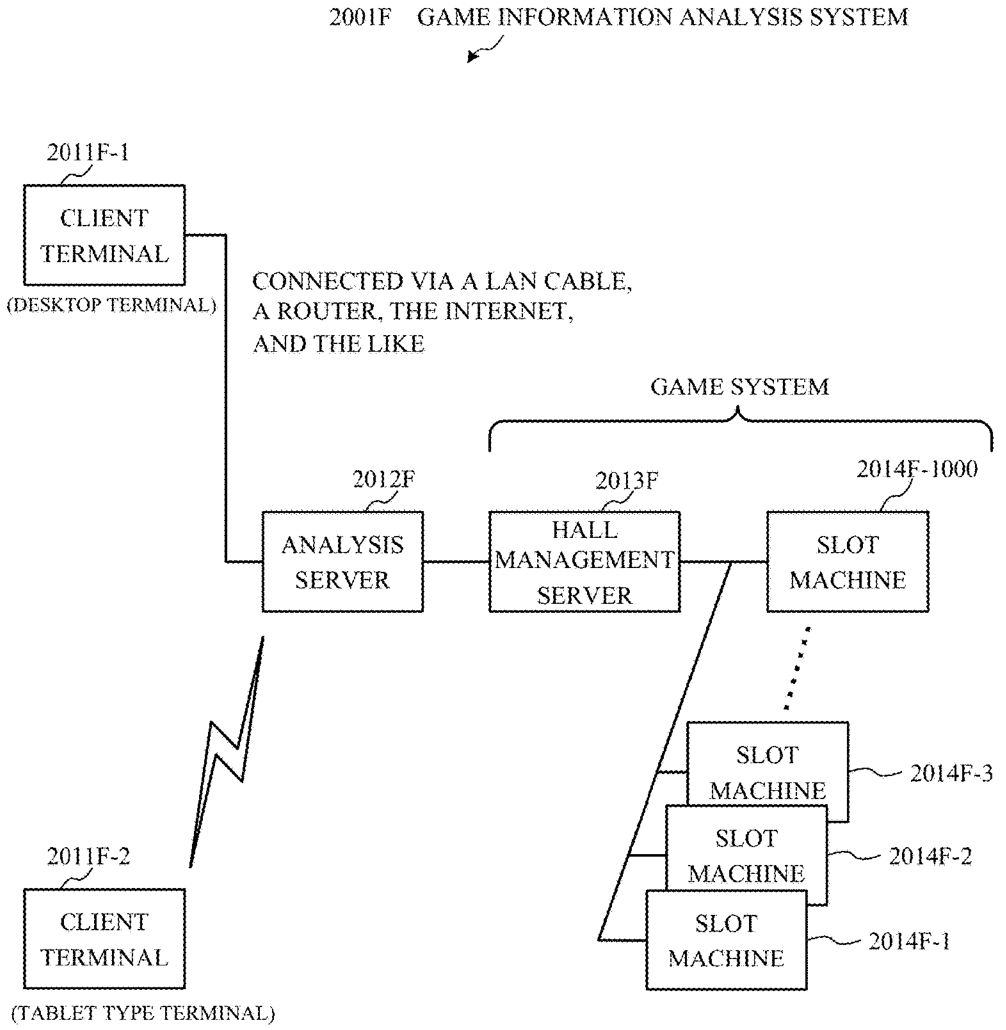
FIG. 26 is a diagram showing a game information analysis system according to one embodiment of the present invention in which a plurality of kinds of client terminals can be utilized.

FIG. 26 is a diagram showing a configuration example of a game information analysis system 2001F in which a plurality of kinds of client terminals can be utilized. The game information analysis system 2001F is provided as an option, for example, for three configuration examples of the above-described game information analysis system (the game information analysis system 2001A, the game information analysis system 2001B, and the game information analysis system 2001C).

As shown in FIG. 26, the game information analysis system 2001F includes a client terminal 2011F and an analysis server 2012F and is connected to a game system introduced in each hall store such as the game system 1 shown in FIG. 1. Here, the game system includes a hall management server 2013F and a plurality of slot machines 2014F-1, 2014F-2, and 2014F-3 to 2014F-1000 connected to this hall management server 2013F.

In addition, the client terminal 2011F of the game information analysis system 2001F can be configured so as to include two kinds of client terminals (for example, a client terminal 2011F-1 and a client terminal 2011F-2). Here, the client terminal 2011F-1 is a desktop type personal computer and the client terminal 2011F-2 is a tablet type portable computer. Here, the client terminal 2011F-1 is connected to the analysis server 2012F via a LAN cable, a router, the Internet, and the like, whereas the client terminal 2011F-2 is connected to the analysis server 2012F via a wireless LAN, a wireless router, the Internet, and the like or via a public wireless communication network, a wireless base station, the Internet, and the like.

As described above, configurations of hardware of the client terminal 2011F-1 and the client terminal 2011F-2 are different from each other and in some cases, methods of connecting the client terminal 2011F-1 and the client terminal 2011F-2 to the analysis server 2012F are different from each other, and in accordance with the above-mentioned difference, ranges in which data can be referenced with the game information analysis system 2001F, data which can be handled, functions which can be utilized, and the like may be different from each other.

In addition, here, although the desktop type personal computer and the tablet type portable computer are exemplified, other various computers such as a smartphone and a mobile phone which can be connected to the analysis server 2012F can be used as the client terminal.

Hereinabove, although with reference to FIG. 21 to FIG. 26, each of the configurations of the game information analysis system is described, each of these configurations is merely one example, and by employing other various configurations, the game information analysis system according to the present invention can be realized. For example, although in the above-described example, the game information or the like related to each of the slot machines is transmitted via the hall management computer to the analysis server, the game information or the like related thereto may be transmitted via other computer to the analysis server, and the game information or the like related to each of the slot machines can be grasped on the analysis server in other various communication forms.

Figure 27:
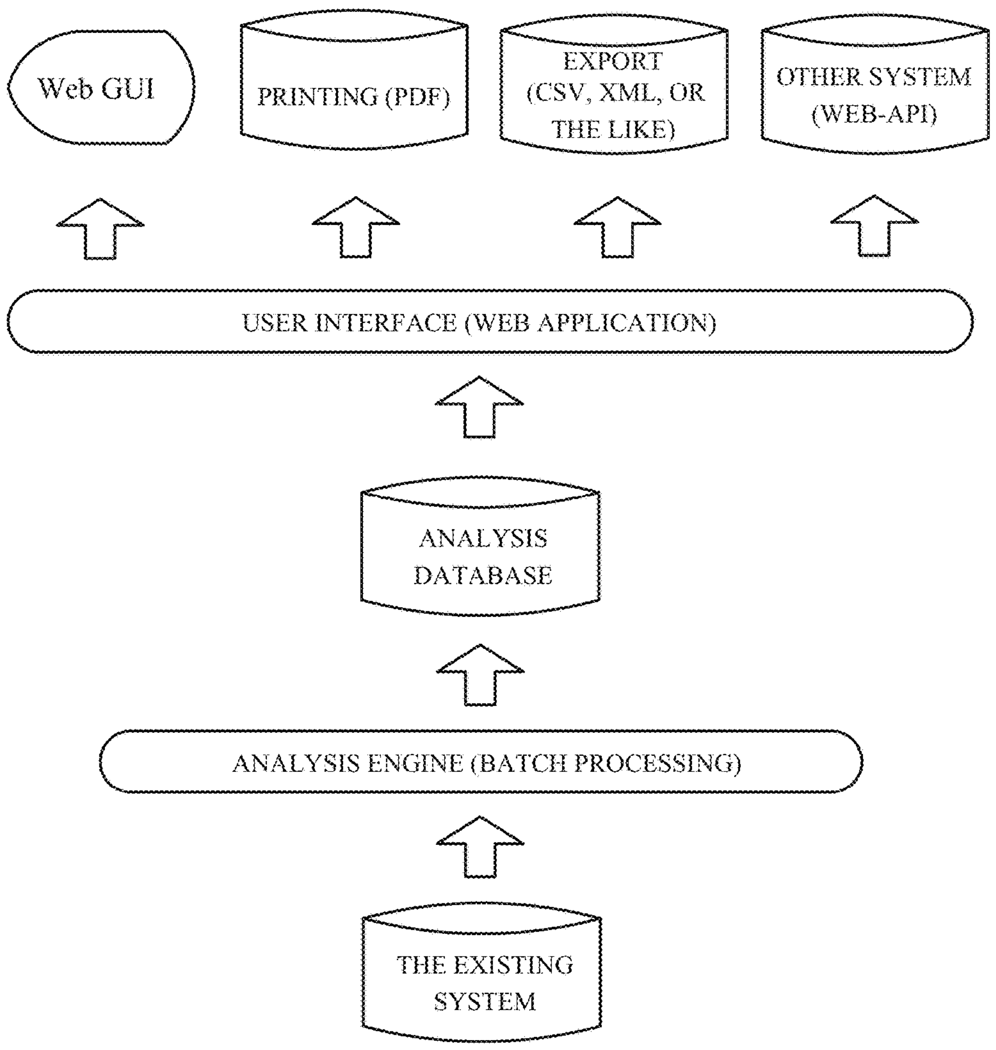
FIG. 27 is a diagram showing a configuration example of software of the game information analysis system according to the one embodiment of the present invention.

Next, with reference to FIG. 27, a configuration example of software of a game information analysis system 2001 according to the present invention will be described. In an example shown in FIG. 27, from a hall management server 2013 or the like included in the existing game system (the existing system) to an analysis engine of an analysis server 2012, game information or the like accumulated from the past to the present is transmitted, an analysis process for the past information or the like is conducted, and an analysis result is stored and accumulated in an analysis database. The analysis process using the analysis engine is, here, a batch process, and for example, in the night, the game information or the like is collected from the hall management server via a network including the Internet and the analysis process is conducted.

Through the above-described analysis process for the past accumulated data, for example, even in a case where the game information analysis system 2001 according to the present invention is introduced from halfway to said existing game system, for a while, without obtaining the game information from each of the slot machines and conducting the analysis (for obtaining statistical data), player attributes and machine attributes at the present time can be immediately grasped (by the past accumulated data), and from the moment at which the use of the game information analysis system 2001 according to the present invention is started, outputting or the like of an effective analysis report is enabled.

Of course, the analysis process by the analysis engine may be conducted in real time and an analysis result may be stored in the analysis database. It is to be noted that in this case, it is required for the game information or the like needed for the analysis process to be transmitted in real time from the hall management server.

The analysis result stored in the analysis database is provided by a user interface such as a Web application for a user. For example, the analysis result stored in the analysis database is obtained and interpreted by a Web browser (Web GUI) executed on the client terminal connected to the analysis server, and an analysis result report or the like is displayed to a user (on a display of the client terminal).

In addition, the analysis result stored in the analysis database is obtained and interpreted by an application executed on the client terminal connected to the analysis server, and the analysis result report or the like is outputted to a printer or the like connected to the client terminal for printing. In addition, the analysis result report or the like is outputted as data in a predetermined file format such as PDF, and a user displays that data on other computer, thereby allowing the analysis result report or the like to be confirmed.

Further, the analysis result stored in the analysis database is obtained and interpreted by an application executed on the client terminal connected to the analysis server, and the analysis result report or the like is outputted as data in a predetermined file format such as CSV and XML, and a user displays that data on other computer, thereby allowing the analysis result report or the like to be confirmed.

In addition, further, by accessing the analysis server from other system via a WEB-API, needed data is obtained from the analysis database, the analysis result report or the like may be edited and outputted. The WEB-API can be previously prepared in the game information analysis system so as to allow a predetermined user to utilize the analysis result or the like.

Next, with reference to FIG. 28 to FIG. 39, outlines of main functions and features of the game information analysis system 2001 according to the present invention will be described. A first function is a function to make a diagnosis with respect to a balance between customer psychology and administration. In the present invention, a psychological analysis of a customer in accordance with transition of games can be made. In the psychological analysis of a customer, for example, a course (history) of games played by a customer (player) is represented by a candlestick chart, and psychological states are thereby classified and are scored. The details thereof will be described later.

In addition, in the present invention, a diagnosis with respect to a balance between this psychology of a customer and sales can be made. If a hall store attaches weight to sales and holds down a payout amount, an adverse influence is exerted on the psychology of a customer. In the present invention, the effective diagnosis with respect to the balance between such customer psychology and the administration can be made.

Figure 29:
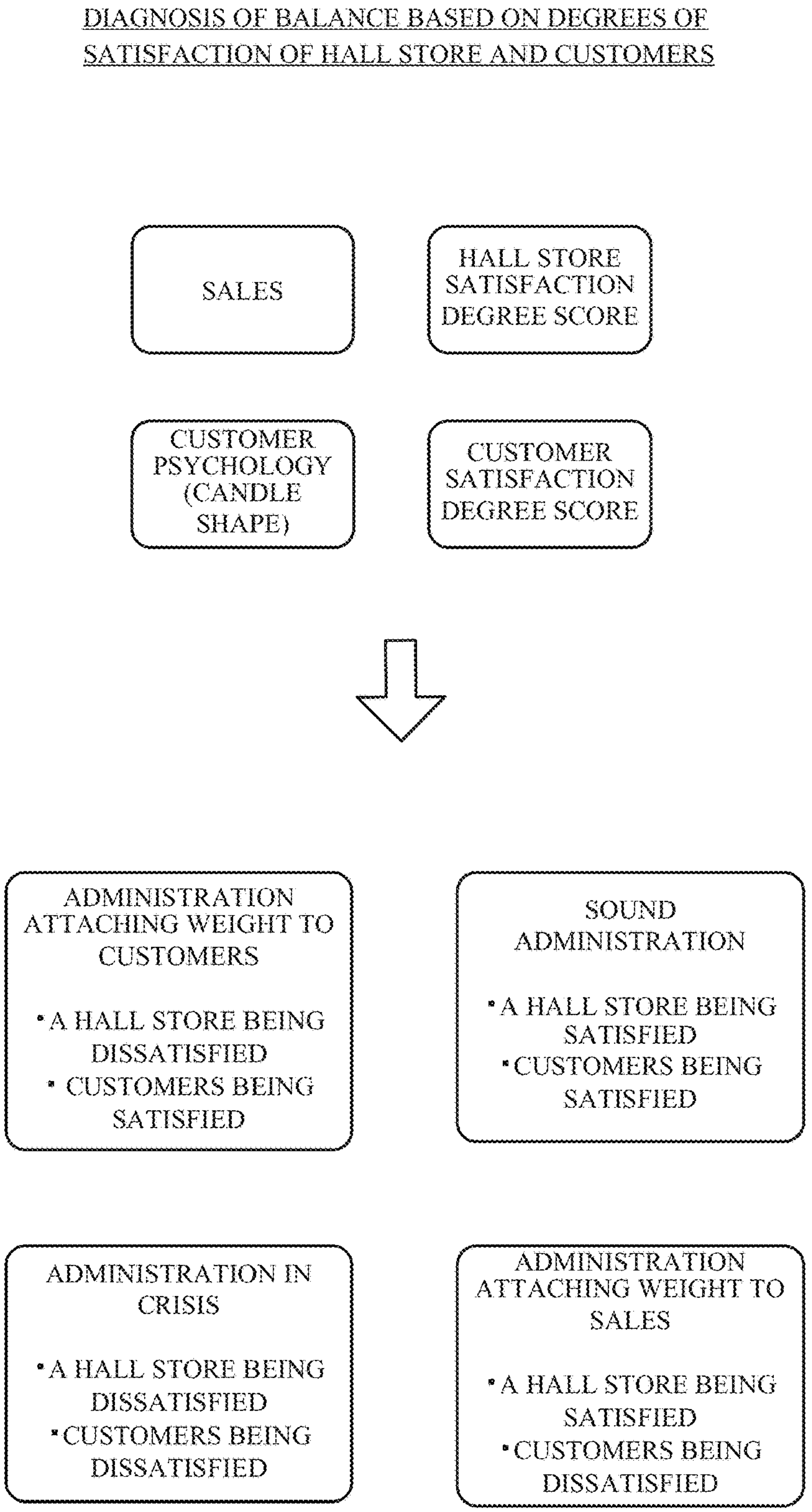
FIG. 29 is a diagram explaining an outline of a balance diagnosis between sales and customer psychology in the game information analysis system according to the one embodiment of the present invention.

In FIG. 29, an outline of a balance diagnosis between sales and customer psychology is shown. As shown in FIG. 29, based on a variety of factors such as sales, customer psychology (candle shape), a hall store satisfaction degree score, and a customer satisfaction degree score, the balance diagnosis is made. As shown in FIG. 29, as representative administration balances, there are patterns: administration attaching weight to customers (a hall store being dissatisfied and customers being satisfied); sound administration (a hall store being satisfied and customers being satisfied); administration in crisis (a hall store being dissatisfied and customers being dissatisfied); and administration attaching weight to sales (a hall store being satisfied and customers being dissatisfied).

If a hall store pursues only a profit, customers are dissatisfied, and hall store administration cannot be stable. In the game information analysis system 2001 according to the present invention, from a scatter diagram in which scored customer psychology and sales are shown, diagnosis on whether the administration of a hall store is in a well-balanced state can be made.

A second function of the game information analysis system 2001 shown in FIG. 28 is a function to analyze attributes of machines and customers. In the present invention, the attributes of the machines (in other words, gaming machines such as slot machines) and the attributes of customers (in other words, game players or players) can be analyzed, and thus, attribute matching diagnosis for the machines and the customers can be further made.

Figure 30:
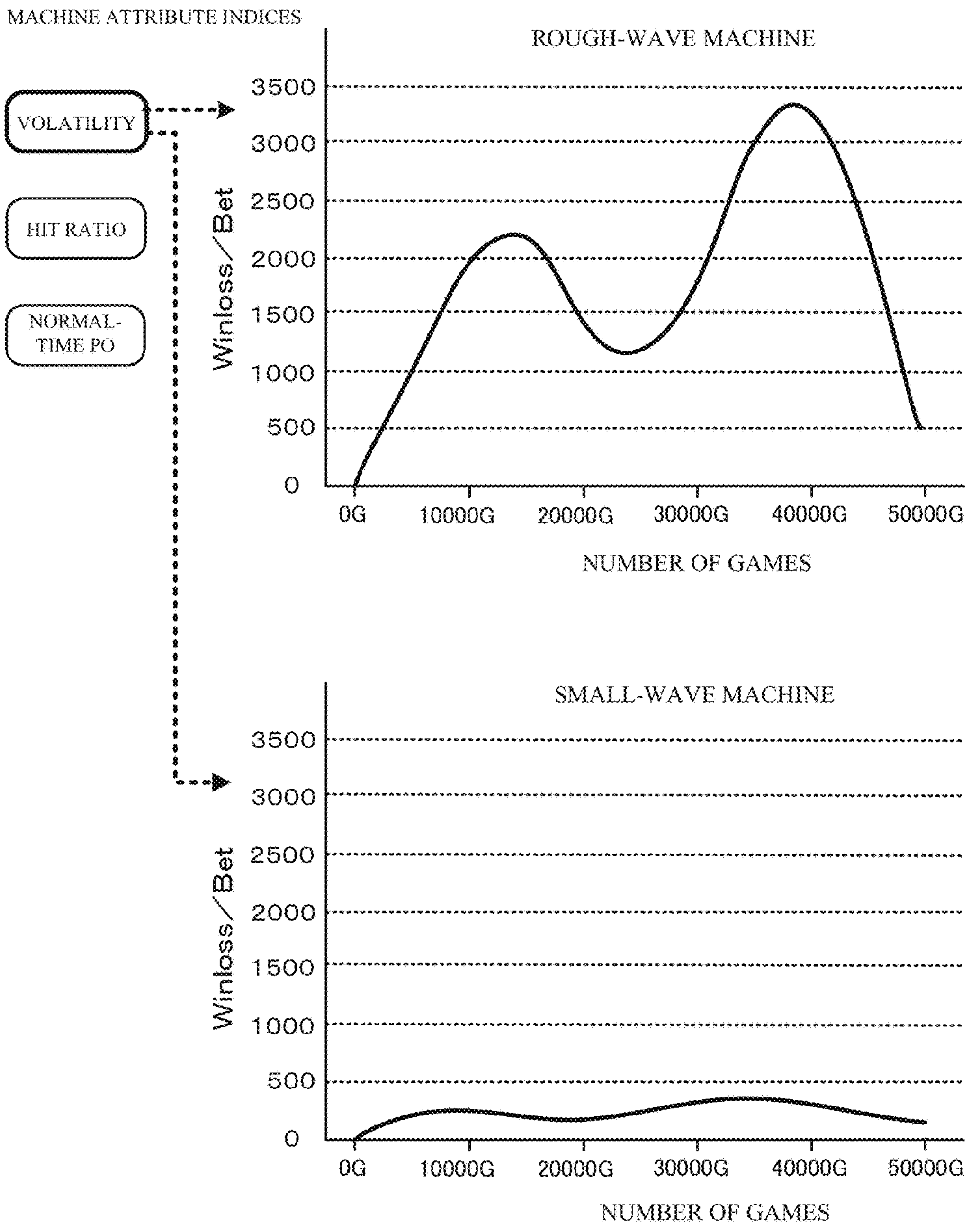
FIG. 30 is a diagram showing a simple example of classification of machine attributes in the game information analysis system according to the one embodiment of the present invention.

In FIG. 30, a simple example of classification of the machine attributes is shown. In FIG. 30, with attention focused on a volatility which is a machine attribute index, from roughness of a wave and a winning probability or the like, the machine attributes are classified, that is, in this example, classification on whether each of the machines is a rough-wave machine or a small-wave machine is made. In an upper graph shown in FIG. 30, an example of the "rough-wave machine" on which in accordance with an increase in the number of games, a Winloss/Bet is largely changed is shown. On the other hand, in a lower graph shown in FIG. 30, an example of the "small-wave machine" on which in accordance with an increase in the number of games, a Winloss/Bet is not much changed is shown.

Figure 31:
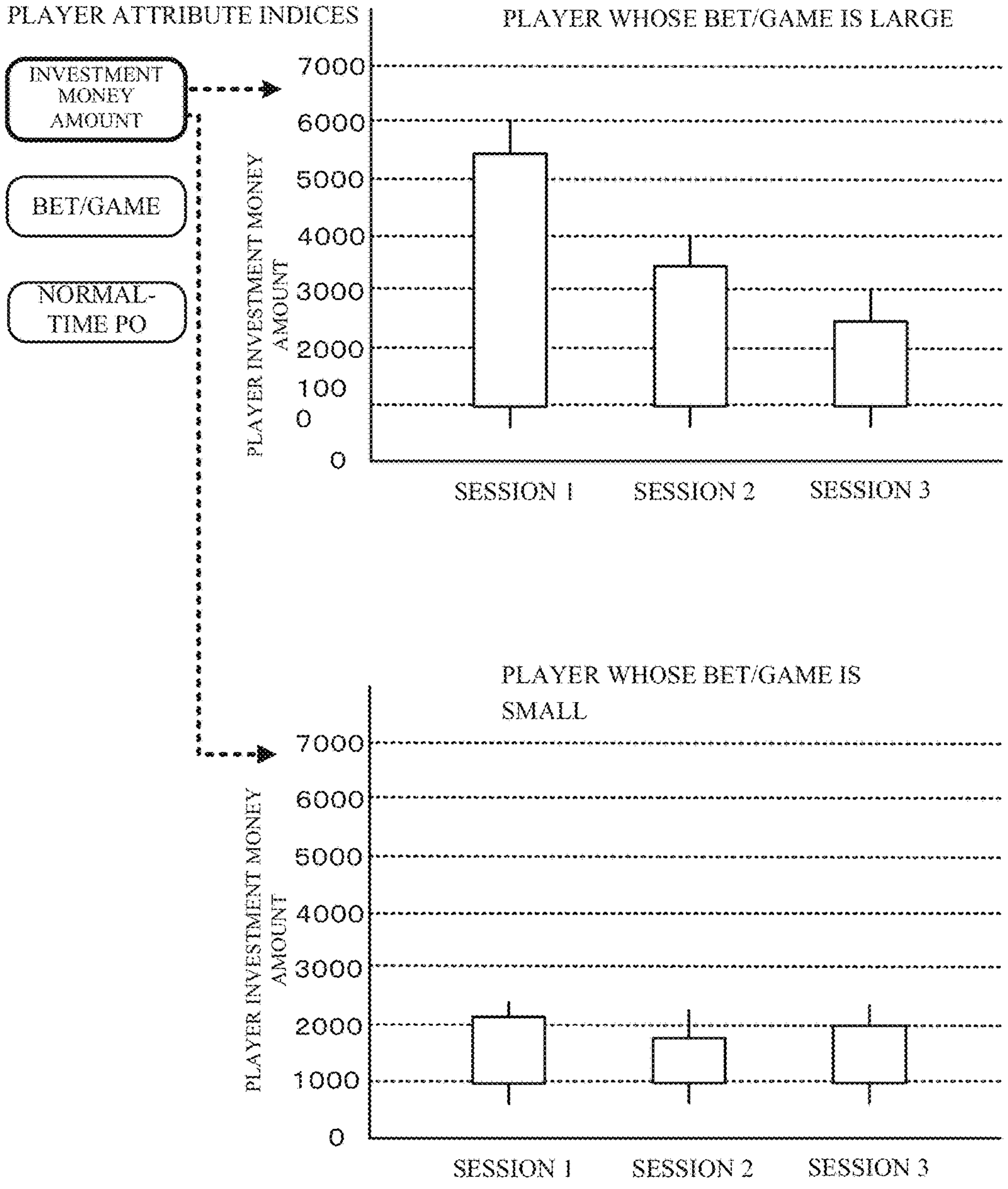
FIG. 31 is a diagram showing a simple example of classification of player attributes in the game information analysis system according to the one embodiment of the present invention.

In FIG. 31, a simple example of classification of the player attributes is shown. In FIG. 31, with attention focused on an investment money amount which is a player attribute index, respective players are classified into players whose each bet amount (Bet/game) per game is large and players whose each bet amount (Bet/game) per game is small. In an upper graph shown in FIG. 31, an example of the "player whose bet amount per game is large" in which in each session composed of a series of games, the player investment money amount is largely changed is shown. On the other hand, in a lower graph shown in FIG. 31, an example of the "player whose bet amount per game is small" in which in each session composed of a series of games, the player investment money amount is not much changed is shown. It is to be noted that although in each of the graphs in FIG. 31, each of the changes in the player investment money amount in each of the sessions is represented by the above-described candlestick chart, the details of the candlestick chart will be described later.

Figure 32:
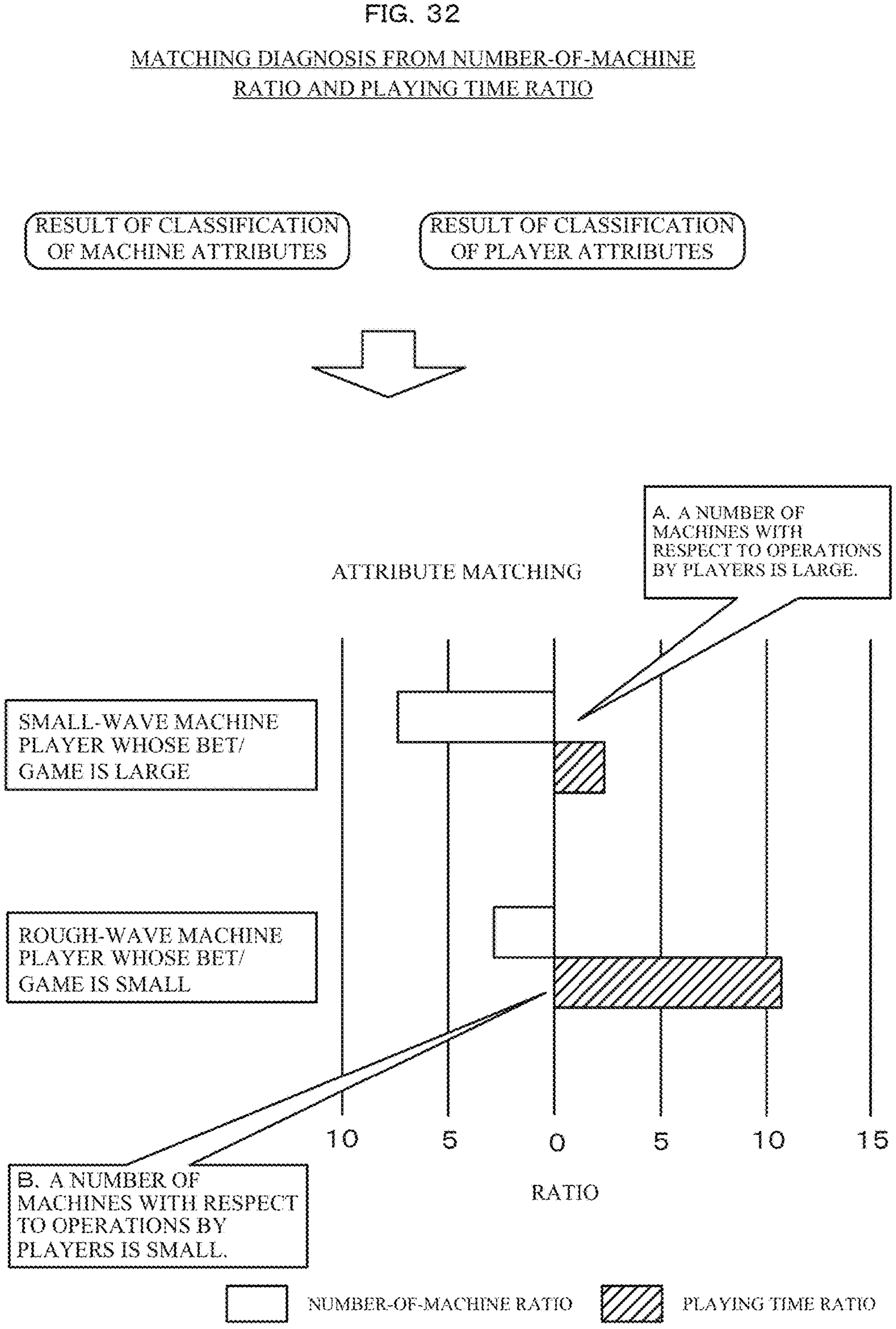
FIG. 32 is a diagram showing an example of the matching diagnosis based on the machine attributes and the customer attributes in the game information analysis system according to the one embodiment of the present invention.

In FIG. 32, an example of the matching diagnosis based on the machine attributes and the customer attributes is shown. As shown in FIG. 30 and FIG. 31, based on the classification (rough-wave machine/small-wave machine) by the machine attributes and the classification (player whose bet amount per game is large/player whose bet amount per game is small) by the player attributes, from a number-of-machine ratio and a playing time ratio, the matching diagnosis is made.

As shown in a graph of attribute matching in FIG. 32, with respect to a combination of a machine attribute=the "small-wave machine" and a player attribute=the "player whose bet amount per game is large", a number-of-machine ratio is large, and a playing time ratio is small. Accordingly, matching diagnosis is made such that the number of machines with respect to operations by players is large. On the other hand, with respect to a combination of a machine attribute=the "rough-wave machine" and a player attribute=the "player whose bet amount per game is small", the number-of-machine ratio is small, and a playing time ratio is large. Accordingly, in this case, matching diagnosis is made such that the number of machines with respect to operations by players is small. As described above, for example, from the matching of the machine attribute and the player attribute, whether machines on which customers want to play are installed is diagnosed.

A third function of the game information analysis system 2001 shown in FIG. 28 is a function to detect potential risks and trend changes. In the present invention, through analysis for machine operations and a profitability, a fraudulent act analysis, a failure analysis, and the like, the potential risks can be detected. In addition, through a popularity analysis and the like based on the machine classification and the customer classification, the trend changes can be detected. It is to be noted that the "fraudulent act" is an act to receive payout from a machine through a fraudulent act.

Figure 33:
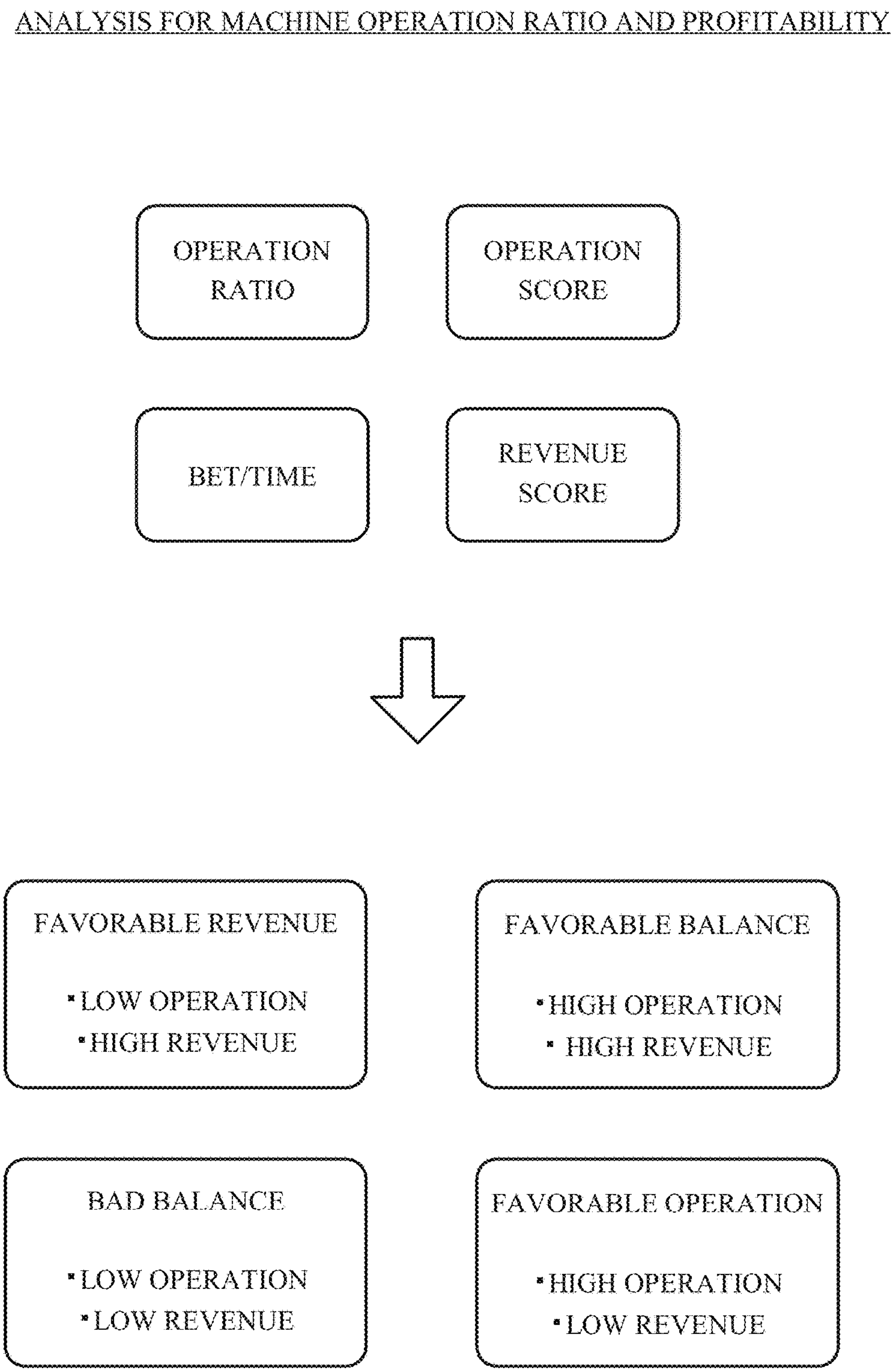
FIG. 33 is a diagram showing an outline of an analysis for a machine operation ratio and a profitability in the game information analysis system according to the one embodiment of the present invention.

In FIG. 33, an outline of analysis for a machine operation ratio and a profitability is shown. As shown in FIG. 33, based on a variety of factors such as an operation ratio, a Bet/time, an operation score, and a revenue score, balance diagnosis between the operation ratio and the profitability is made. As shown in FIG. 33, as representative administration balances, there are patterns: a favorable revenue (a low operation and a high revenue); a favorable balance (a high operation and a high revenue); a bad balance (a low operation and a low revenue); and a favorable operation (a high operation and a low revenue). Based on viewpoints as described above, judging from both of the operation and the profit, any machines whose operation efficiencies are bad are extracted.

In FIG. 34, an example in which with respect to a fraudulent act analysis, a suspected machine, a suspected player, and a suspected session are analyzed is shown. In an upper row in FIG. 34, determination results of a player A are shown. With respect to the player A, four fraudulent act determination methods (in other words, determination based on a large Bet per game; determination based on a machine failure; determination based on taking-in-and-out of bills; and determination based on a winning ratio) are implemented, all of the determination results are "OK".

In a lower row in FIG. 34, determination results of a player B are shown. With respect to the player B, the four fraudulent act determination methods (in other words, determination based on a large Bet per game; determination based on a machine failure; determination based on taking-in-and-out of bills; and determination based on a winning ratio) are implemented, determination results other than a determination result of the winning ratio determination are "NG" which means "not OK". The player B from which the above-mentioned determination results are obtained is extracted as a caution-needed player who has the possibility of committing the fraudulent act.

Figure 35:
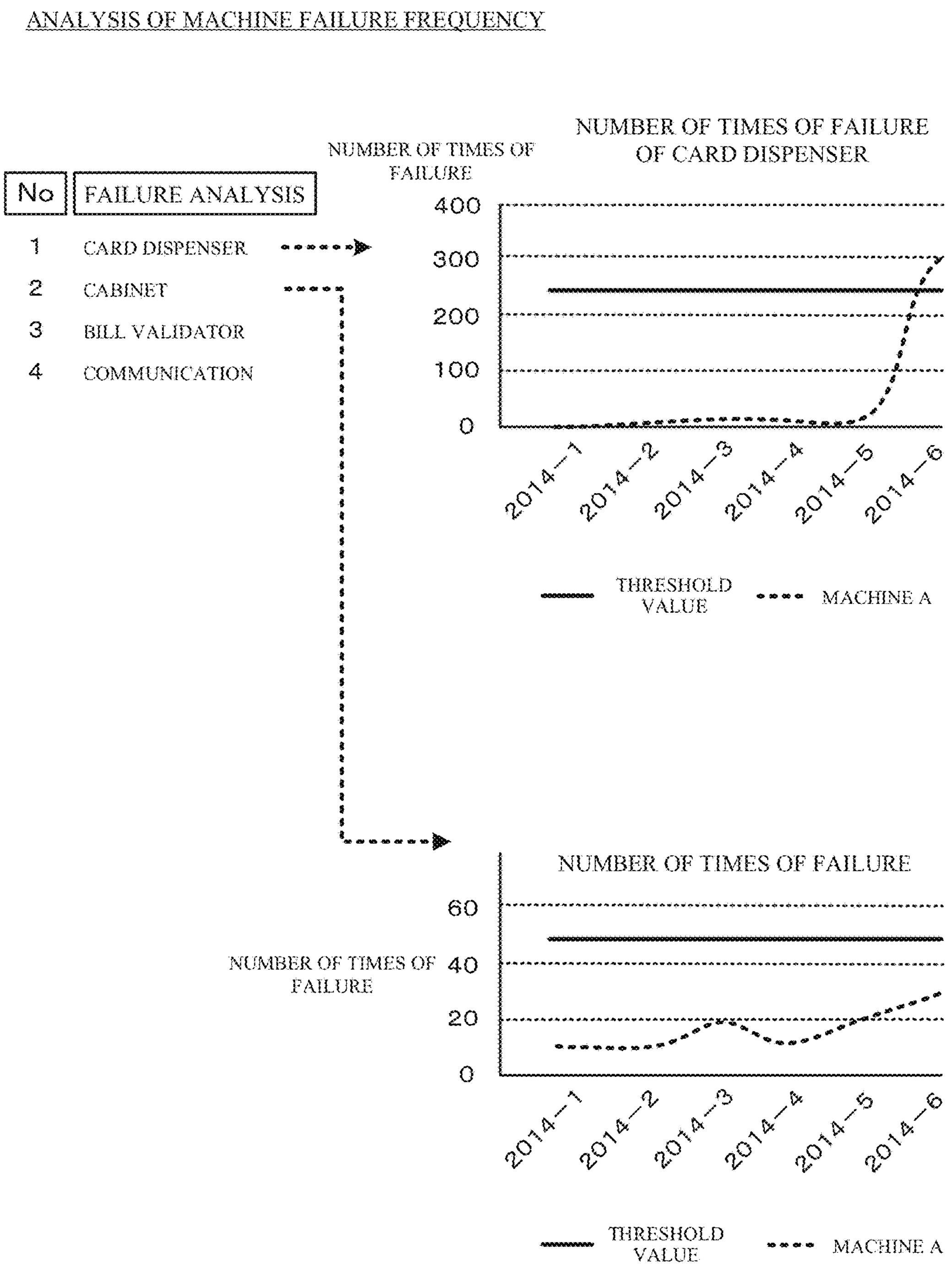
FIG. 35 is a diagram showing an example in which a machine failure frequency is analyzed.

In FIG. 35, an example in which a machine failure frequency is analyzed is shown. In an upper graph in FIG. 35, the numbers of times at which a failure of a card dispenser of a machine A occurred from January in 2014 to June in 2014 are shown together with a threshold value (240 times). In addition, in a lower graph in FIG. 35, the numbers of times at which a failure of a cabinet of the machine A occurred from January in 2014 to June in 2014 are shown together with a threshold value (44 times). A signal indicating each of the failures occurring on each of the machines is transmitted from each of the slot machines and is grasped by the game information analysis system according to the present invention. Through the above-described analysis, a machine whose failure risk is high is extracted.

Figure 36:
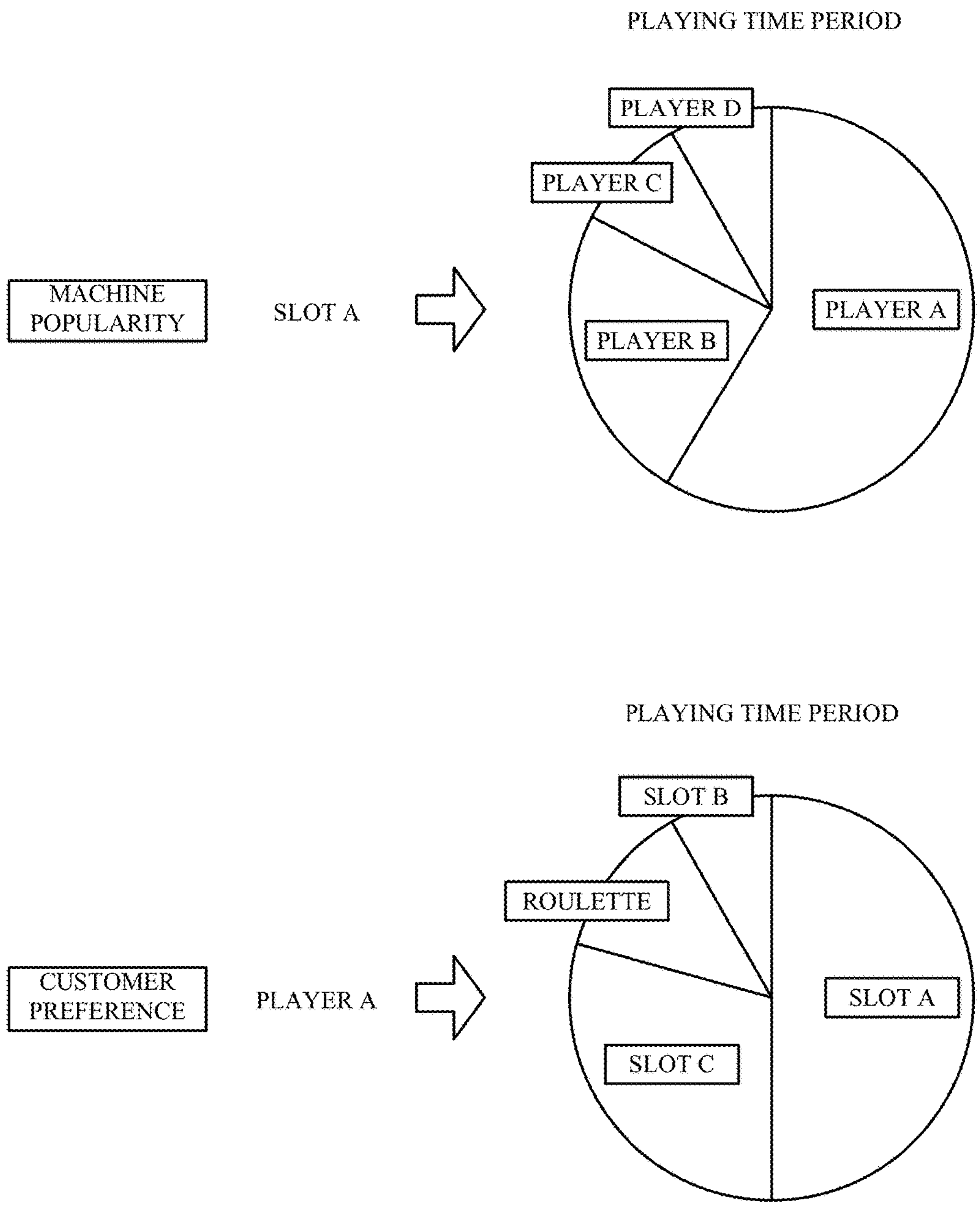
FIG. 36 is a diagram showing an example of a popularity analysis through machine classification and customer classification in the game information analysis system according to the one embodiment of the present invention.

In FIG. 36, an example of a popularity analysis through machine classification and customer classification is shown. In an upper graph in FIG. 36, playing time periods viewed from an individual machine are shown, and in this example, a playing time period of a player A is the longest; next, a playing time of a player B is longer; next, a playing time period of a player C is longer, and next, a playing time period of a player D is long. In addition, in a lower graph in FIG. 36, how long the player A was playing on each kind of a machine is shown by a playing time period, and in this example, it is seen that the playing time period of a slot machine A by the player A is the longest; thereafter, the playing time period of a slot machine C by the player A is longer; next, the playing time period of a roulette is longer;

and next, the playing time period of a slot machine B by the player A is long. Through the analysis as described above, a preference of a machine and a customer (player) can be grasped.

A fourth function of the game information analysis system 2001 shown in FIG. 28 is a function to conduct future prediction and simulation of a profitability. In the present invention, through setting of sales targets and prediction, the simulation can be conducted, and in addition, simulation related to promotion effect can be conducted.

Figure 37:
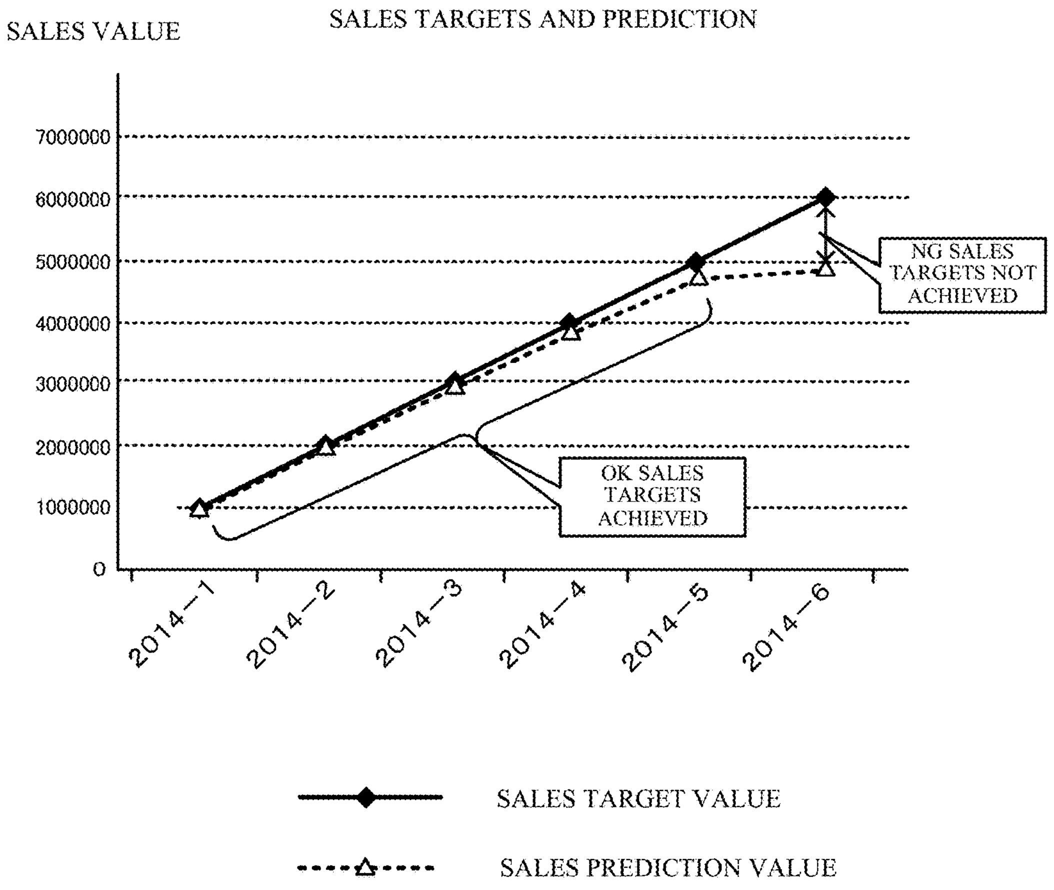
FIG. 37 is a diagram showing an example of risk management through sales targets and prediction in the game information analysis system according to the one embodiment of the present invention.

In FIG. 37, an example of risk management through the sales targets and the prediction is shown. On a graph in FIG. 37, a sales value is set on a vertical axis and time (year and month) is set on a horizontal axis, and a sales target value and a sales prediction value in each month in a year are shown. For example, it is seen that from January in 2014 up to May in 2014, sales targets can be roughly achieved and that in June 2014, a sales target is likely not to be achieved. The graph as described above is displayed, thereby allowing a risk of any sales target being not achieved to be found in an early stage.

Figure 38:
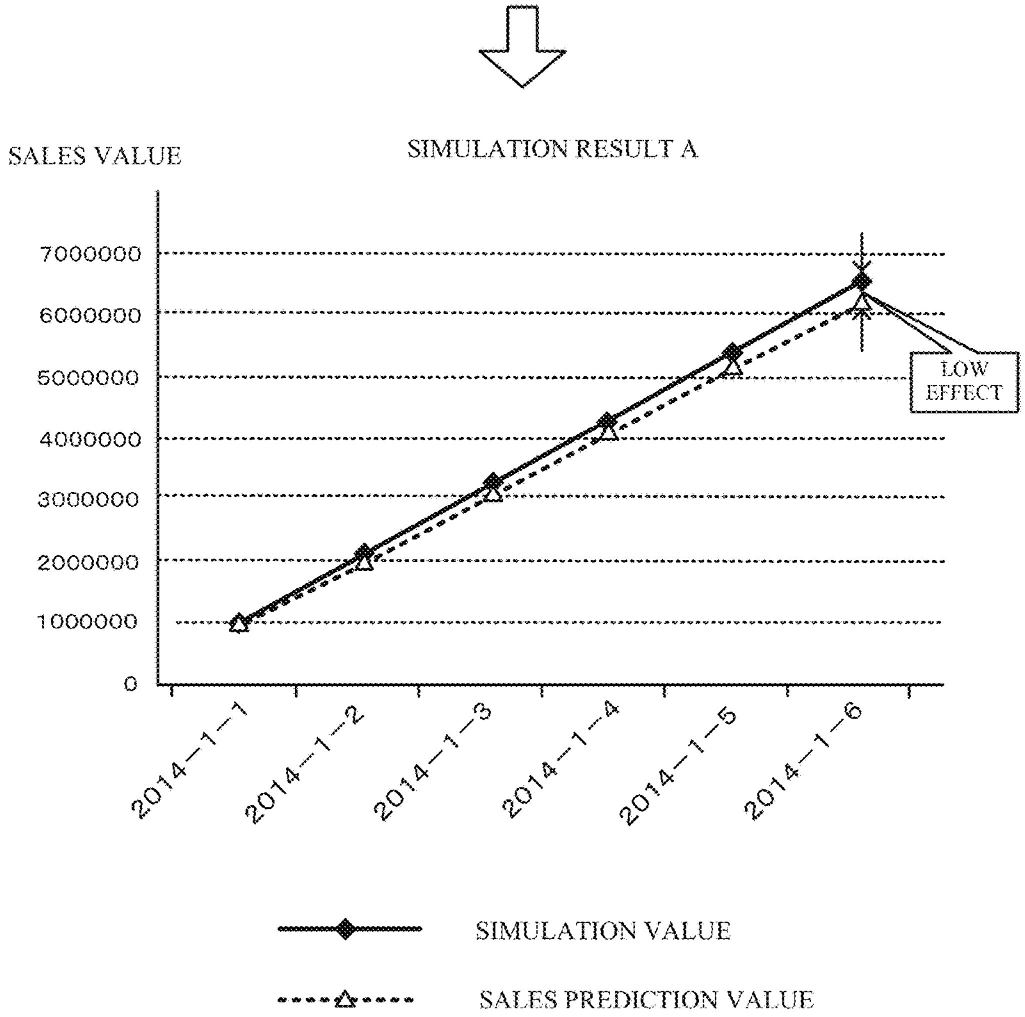
FIG. 38 is a diagram showing a simulation result of promotion effect in the game information analysis system according to the one embodiment of the present invention.
Figure 39:
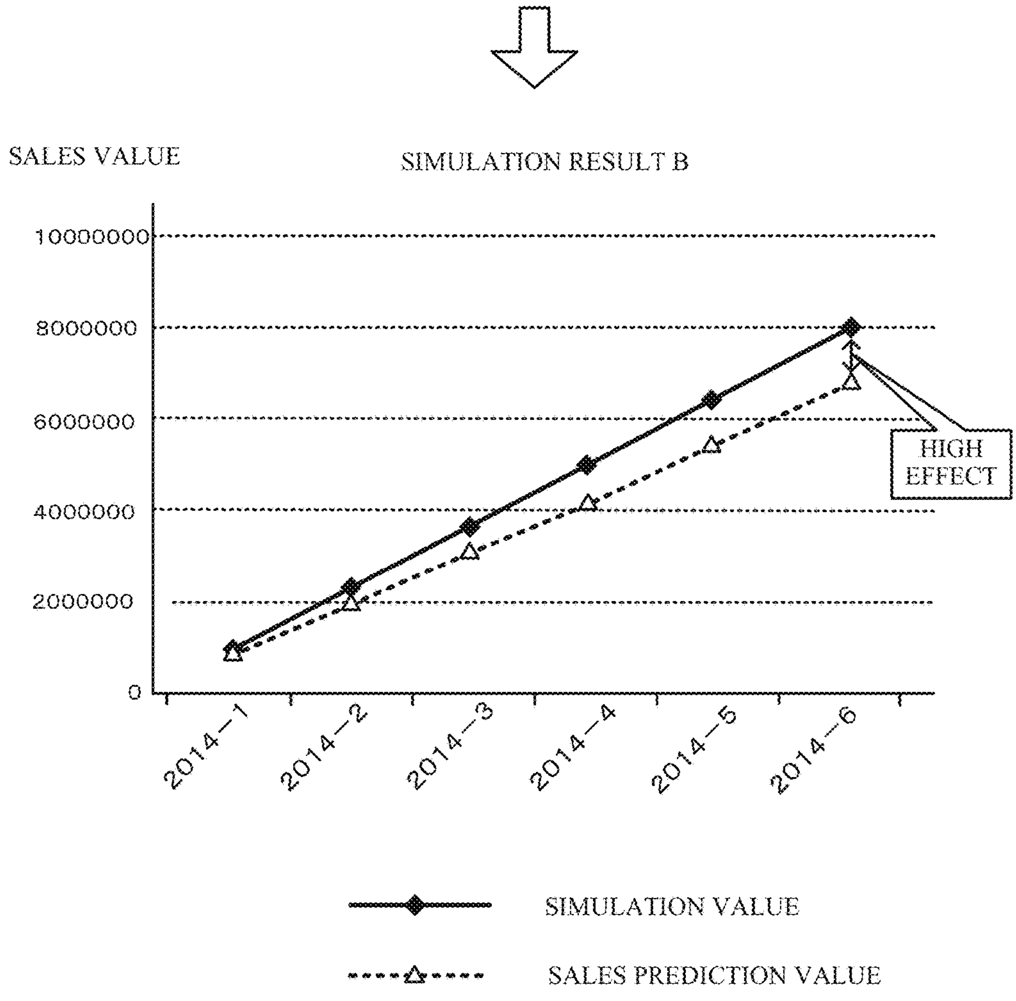
FIG. 39 is a diagram showing a simulation result of promotion effect in the game information analysis system according to the one embodiment of the present invention.

In addition, in FIG. 38 and FIG. 39, a simulation result of promotion effect is shown. On a graph in FIG. 38, a sales value is set on a vertical axis and time (date) is set on a horizontal axis, and a simulation value and a sales prediction value on each date are shown. In the simulation, with respect to players classified as players whose each visiting frequency is high, promotion is implemented. A simulation result A indicates as the promotion effect a sales value of +100,000, and it is seen that the effect is comparatively low.

On a graph in FIG. 39, a sales value is set on a vertical axis and time (date) is set on a horizontal axis, and a simulation value and a sales prediction value on each date are shown. In the simulation, with respect to players classified as players whose each visiting frequency is middle and players classified as players whose each visiting frequency is low, promotion is implemented. A simulation result B indicates as the promotion effect a total sales value of +1,000,000, and it is seen that the effect is comparatively high. As described above, in the game information analysis system 2001 according to the present invention, the simulation using the past data is conducted, thereby allowing the promotion effect to be predicted.

Next, with reference to FIG. 40 to FIG. 42, hardware configurations of a client terminal 2011 and an analysis server 2012 which are used in the game information analysis system 2001 according to the present invention and a hardware configuration of a hall management server 2013 used in the game information analysis system 2001 according thereto will be described.

Figure 40:
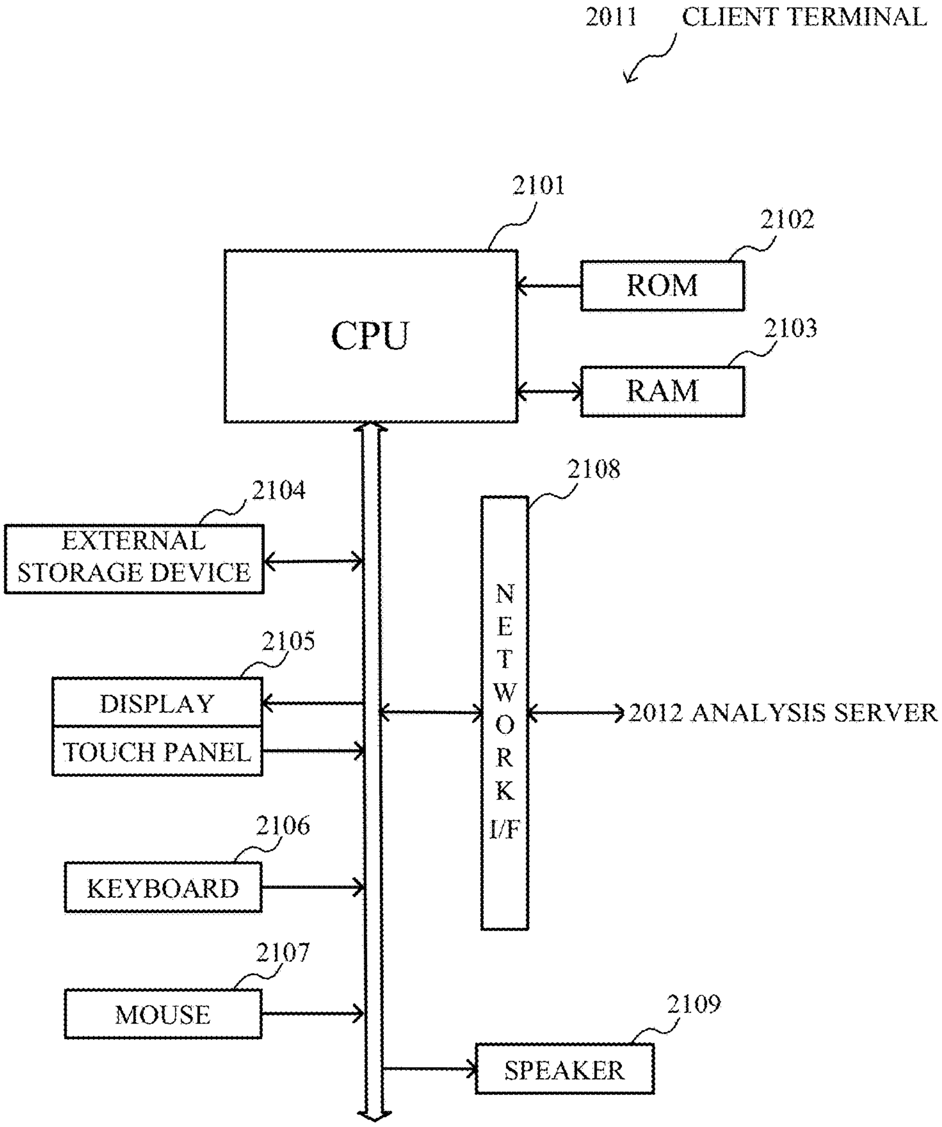
FIG. 40 is block diagram showing one example of a hardware configuration of a client terminal in the game information analysis system according to the one embodiment of the present invention.

FIG. 40 is a block diagram showing one example of the hardware configuration of the client terminal 2011 according to the present invention. The client terminal 2011 includes a CPU 2101, a ROM 2102, a RAM 2103, an external storage device 2104, a display 2105, a keyboard 2106, a mouse 2107, a network I/F (interface) 2108, and a speaker 2109.

The CPU 2101 reads out and executes control programs stored in the ROM 2102 and the RAM 2103. For example, the CPU 2101 executes a WEB browser by a user's instruction and based on analysis result data or the like received from the analysis server 2012, displays a variety of analysis reports or the like on the display 2105. The ROM (Read Only Memory) 2102 is a non-volatile memory, and programs or the like executed upon starting up the client terminal 2011 are stored therein. The RAM (Random Access Memory) 2103 is a volatile memory, and programs such as the above-described WEB browser executed by the CPU 2101 and data or the like used during the execution of these programs are temporarily stored therein.

The external storage device 2104 is a storage device, for example, such as a hard disk device, and program data of the WEB browser and analysis result data or the like received from the analysis server 2012 are stored therein.

The display 2105 is configured as a touch panel display including a touch panel on which a touch operation by a user can be performed. This display 2105 is realized, for example, by a liquid crystal display, and the analysis reports or the like are displayed by the WEB browser thereon. Here, when the user's operation is inputted onto the touch panel, said operation content is transmitted to the CPU 2101, and processing in accordance with that operation is conducted.

The keyboard 2106 and the mouse 2107 are input devices with which a user issues instructions and conducts data inputting or the like.

The network I/F 2108 is connected via a network such as the Internet to the analysis server 2012 and controls data transmission and reception between the client terminal 2011 and the analysis server 2012. For example, via this network I/F 2108, a user's instruction content is transmitted from the client terminal 2011 to the analysis server 2012, and conversely, analysis result data (WEB page) is transmitted from the analysis server 2012 to the client terminal 2011. The speaker 2109 outputs a variety of pieces of sound data.

It is to be noted that although FIG. 40 shows the example in which the client terminal 2011 is a desktop type computer, as described above, as the client terminal 2011, computers in various other forms such as a tablet type computer and a smartphone can be used.

In a case where the client terminal 2011 is configured as the stand-alone terminal like the client terminal 2011C shown in FIG. 23, the analysis result data or the like is copied from the analysis server 2012 into a portable recording medium such as a CD-ROM and a portable memory; the data stored in the portable recording medium is read via an external recording medium interface (not shown) of the client terminal 2011 and stored in the external storage device 2104; thereafter, the analysis result data or the like is interpreted by the WEB browser; and finally, the variety of analysis reports or the like are displayed on the display 2105.

In addition, in a case where the client terminal 2011 is configured as a terminal (for example, a tablet type terminal) which receives the analysis result data or the like through wireless communication, like the client terminal 2011F-2 shown in FIG. 26, the client terminal 2011 is configured to have a wireless communication control part and an antenna (not shown), and through these components, a user's instruction content is transmitted from the client terminal 2011 to the analysis server 2012 via a network including a wireless network and on the other hand, the analysis result data or the like is transmitted from the analysis server 2012 to the client terminal 2011.

Figure 41:
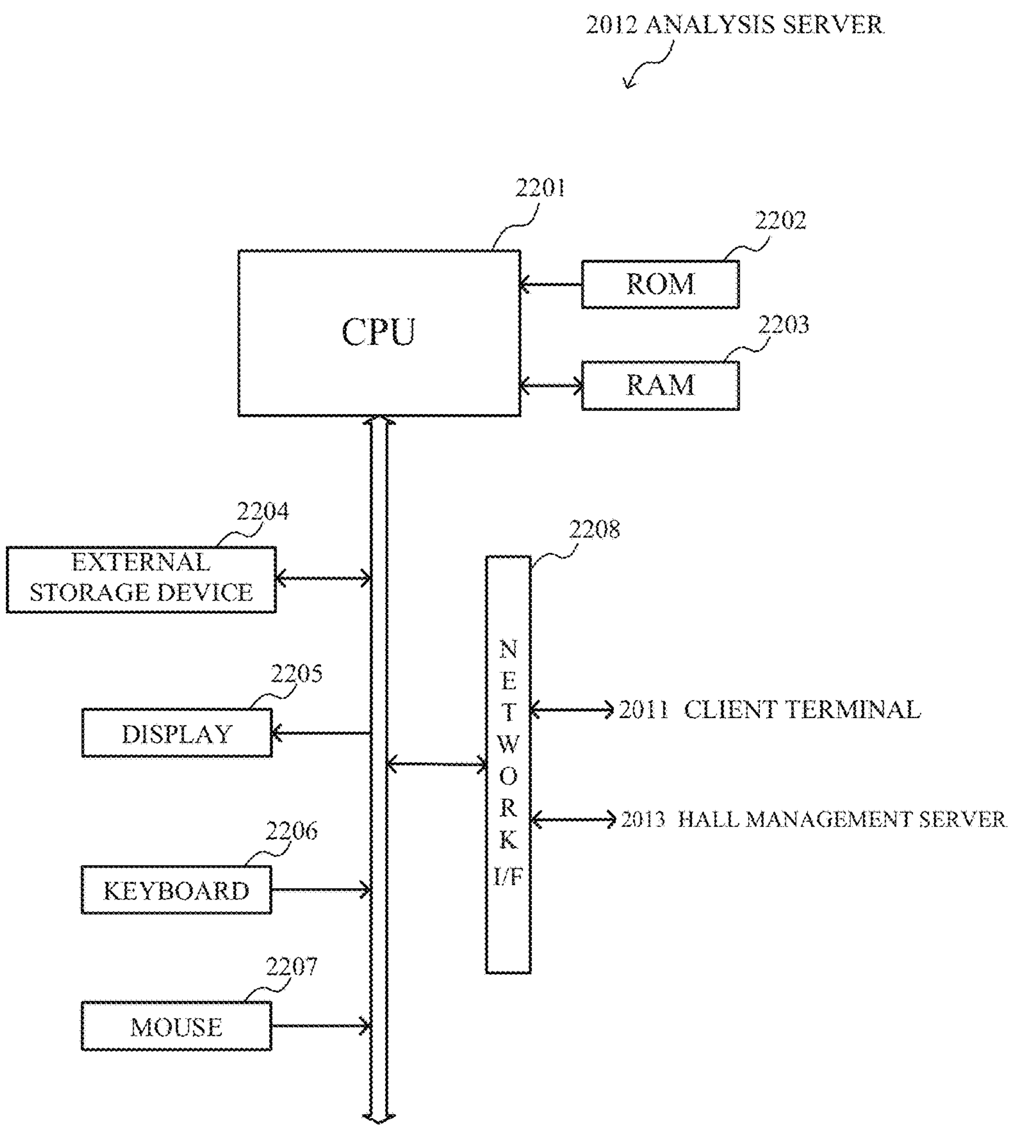
FIG. 41 is a block diagram showing one example of a hardware configuration of an analysis server in the game information analysis system according to the one embodiment of the present invention.

FIG. 41 is a block diagram showing one example of the hardware configuration of the analysis server 2012 according to the present invention. The analysis server 2012 includes a CPU 2201, a ROM 2202, a RAM 2203, an external storage device 2204, a display 2205, a keyboard 2206, a mouse 2207, and a network I/F (interface) 2208.

The CPU 2201 reads out and executes control programs stored in the ROM 2202 and the RAM 2203. For example, the CPU 2201 executes a corresponding analysis process in accordance with a user's instruction from the client terminal 2011 and generates analysis result data. The ROM 2202 is a non-volatile memory and programs or the like executed upon starting up the analysis server 2012 are stored therein.

The RAM 2203 is a volatile memory and programs for conducting the above-described analysis process to be executed by the CPU 2201 and data or the like used during the execution of these programs are temporarily stored therein.

The external storage device 2204 is a storage device, for example, such as a hard disk device and program data for conducting the analysis process, the analysis result data transmitted to the client terminal 2011, game information received from the hall management server 2013, and the like are stored therein.

The display 2205 is configured as a touch panel display including a touch panel on which a touch operation by an administrator of the game information analysis system can be performed. This display 2205 is realized, for example, by a liquid crystal display. In a case where the analysis server 2012 receives input and an instruction from a terminal remotely connected, it is not required for the analysis server 2012 to include the display 2205.

The keyboard 2206 and the mouse 2207 are input devices with which an administrator of the game information analysis system issues instructions and conducts data inputting or the like. Also with respect to the keyboard 2206 and the mouse 2207, as in the above description, in a case where the analysis server 2012 receives input and an instruction from a terminal remotely connected, it is not required for the analysis server 2012 to include these.

The network I/F 2208 is connected via a network such as the Internet to the client terminal 2011 and the hall management server 2013 and controls data transmission and reception between the client terminal 2011 and the analysis server 2012 as well as between the hall management server 2013 and the analysis server 2012. For example, via this network I/F 2208, a user's instruction content is transmitted from the client terminal 2011 to the analysis server 2012, and conversely, analysis result data (WEB page) is transmitted from the analysis server 2012 to the client terminal 2011. In addition, via this network I/F 2208, game information or the like is transmitted from the hall management server 2013 to the analysis server 2012.

It is to be noted that the analysis server 2012 shown in FIG. 41 is merely one example, and other various configurations can be adopted.

Figure 42:
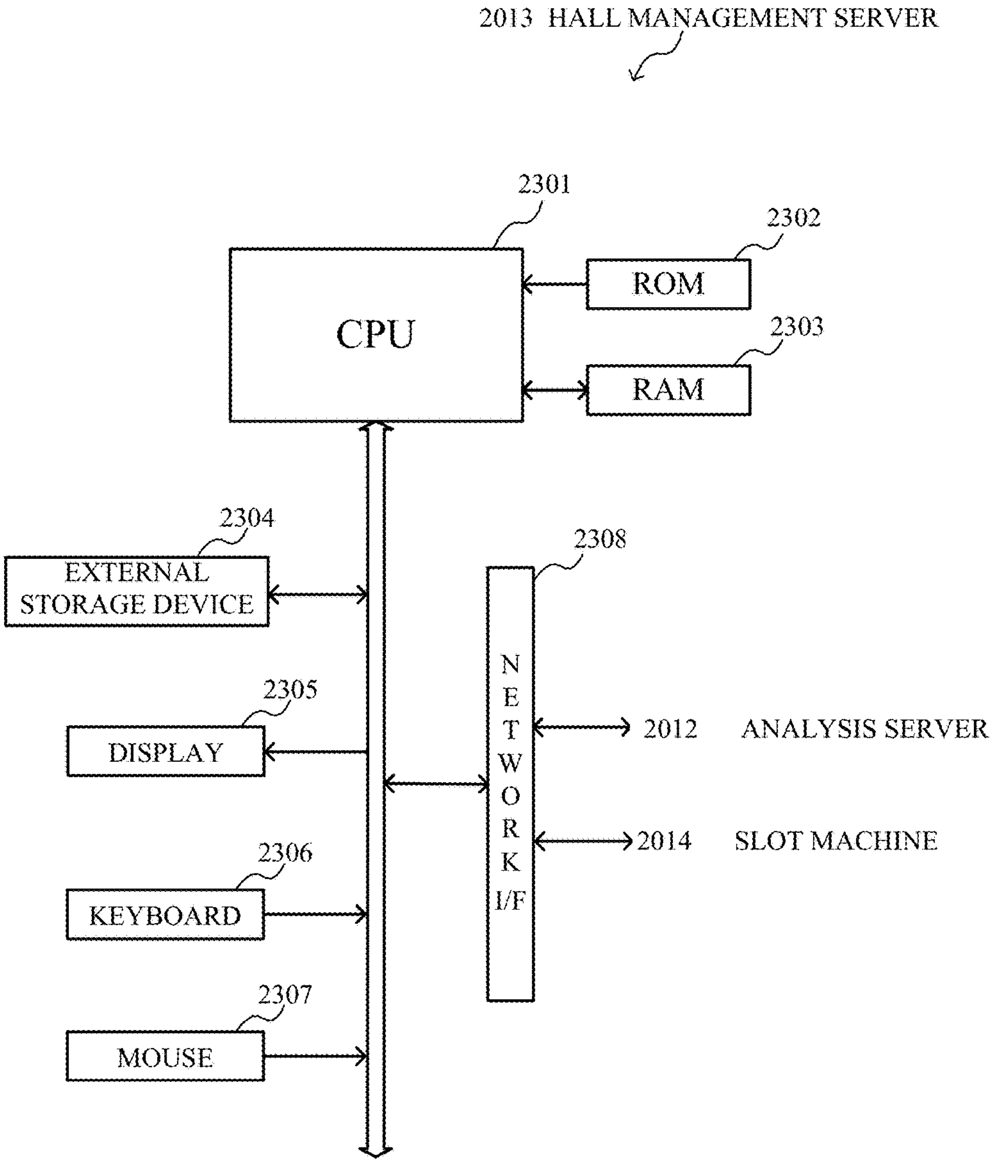
FIG. 42 is a block diagram showing one example of a hardware configuration of a hall management server in the game information analysis system according to the one embodiment of the present invention.

FIG. 42 is a block diagram showing one example of the hardware configuration of the hall management server 2013. There is a case where the hall management server 2013 is a hall management server included in the existing game system or also a case where as the hall management server 2013, a hall management server is newly introduced to be combined in the game information analysis system 2001 according to the present invention. The hall management server 2013 includes a CPU 2301, a ROM 2302, a RAM 2303, an external storage device 2304, a display 2305, a keyboard 2306, a mouse 2307, and a network I/F (interface) 2308.

The CPU 2301 reads out and executes control programs stored in the ROM 2302 and the RAM 2303. For example, when pieces of game information are transmitted from a slot machine 2014, the CPU 2301 appropriately edits and totalizes those pieces of information as needed and accumulates those in the external storage device 2304. The ROM 2302 is a non-volatile memory and programs or the like executed upon starting up the hall management server 2013 are stored therein. The RAM 2303 is a volatile memory and programs for controlling the accumulation of the above-described game information executed by the CPU 2301 and data or the like used during the execution of these programs are temporarily stored therein.

The external storage device 2304 is a storage device, for example, such as a hard disk device and program data for controlling the accumulation of the pieces of game information and the game information or the like are stored therein.

The display 2305 is configured as a touch panel display including a touch panel on which a touch operation by an administrator of a hall store can be performed. This display 2305 is realized, for example, by a liquid crystal display. In a case where the hall management server 2013 receives input and an instruction from a terminal remotely connected, it is not required for the hall management server 2013 to include the display 2305.

The keyboard 2306 and the mouse 2307 are input devices with which an administrator of a hall store issues instructions and conducts data inputting or the like. Also with respect to the keyboard 2306 and the mouse 2307, as in the above description, in a case where the hall management server 2013 receives input and an instruction from a terminal remotely connected, it is not required for the hall management server 2013 to include these.

The network I/F 2308 is connected via a network such as the Internet to the analysis server 2012 and is connected to slot machines 2014 via a network or the like in a hall store and controls data transmission and reception between the hall management server 2013 and the analysis server 2012 as well as between the slot machines 2014 and the hall management server 2013. For example, via this network I/F 2308, game information or the like is transmitted from the hall management server 2013 to the analysis server 2012 and the game information or the like is transmitted from the slot machines 2014 to the hall management server 2013.

It is to be noted that the hall management server 2013 shown in FIG. 42 is merely one example, and other various configurations can be adopted.

Next, with reference to FIG. 43 to FIG. 45, respective functions of the client terminal 2011 and the analysis server 2012 used in the game information analysis system 2001 according to the present invention and respective functions of the hall management server 2013 used therein will be described.

Figure 43:
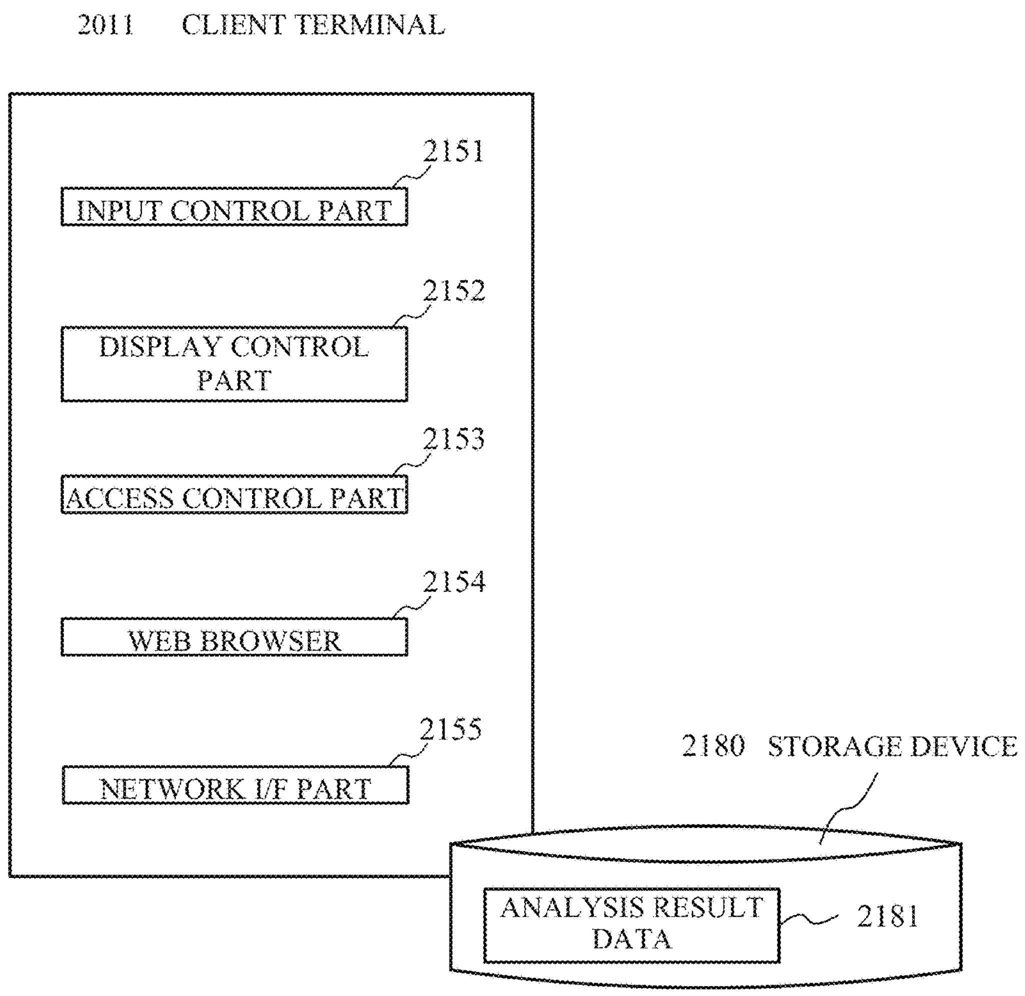
FIG. 43 is a functional block diagram of the client terminal in the game information analysis system according to the one embodiment of the present invention.

FIG. 43 is a functional block diagram of the client terminal 2011 according to the present invention. The client terminal 2011 includes an input control part 2151, a display control part 2152, an access control part 2153, a WEB browser 2154, and a network I/F (interface) part 2155. In addition, the client terminal 2011 stores (as needed) analysis result data 2181 received from the analysis server 2012 in a storage device 2180 (corresponding to the external storage device 2104 shown in FIG. 40).

The input control part 2151 detects operations of the display 2105, the keyboard 2106, the mouse 2107, and the like which are shown in FIG. 40 and transmits operation contents to the CPU 2101. Thus, for example, a user or the like can display a desired analysis report on the WEB browser.

The display control part 2152 controls the display 2105 to display a screen or the like. For example, in response to an instruction of the WEB browser 2154, the display control part 2152 controls the display 2105 to display a WEB page in which the analysis report or the like generated by the WEB browser 2154 is displayed.

The access control part 2153 transmits a user ID and a password inputted by a user to the analysis server 2012 and when accessing is permitted by the analysis server 2012 (authentication OK), the reception or the like of the analysis result data from the analysis server 2012 is made possible. In addition, when the simple authentication as shown in FIG. 25 is conducted, the access control part 2153 enables data transmission and reception to and from the analysis server 2012 without conducting an authentication process with the analysis server 2012 or by transmitting only a user ID to the analysis server 2012.

The WEB browser 2154 requests the analysis server 2012 to display a designated analysis report in response to a user's operation; receives, as a response for said request, analysis result data in HTML format transmitted from the analysis server 2012 and related image data; interprets the received analysis result data or the like; and generates an analysis report (WEB page) to be displayed on the display 2105. It is to be noted that although in this example, by using the WEB browser 2154, the analysis report is displayed on the display 2105, the configuration can be arranged such that by using other application, the same process is conducted.

The network I/F part 2155 controls the network I/F 2108 shown in FIG. 40 and controls data transmission and reception between the client terminal 2011 and the analysis server 2012.

Figure 44:
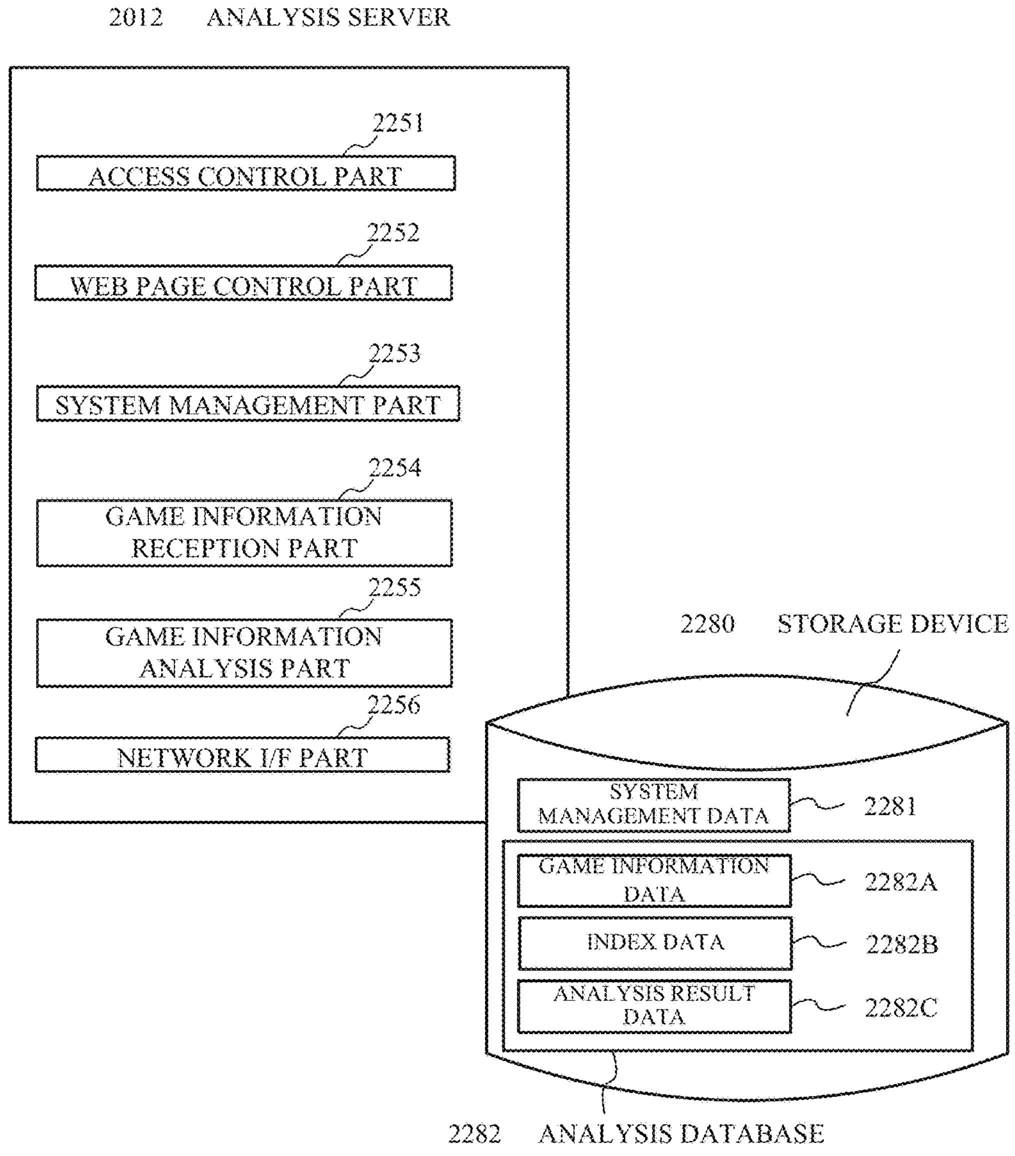
FIG. 44 is a functional block diagram of the analysis server in the game information analysis system according to the one embodiment of the present invention.

FIG. 44 is a functional block diagram of the analysis server 2012 according to the present invention. The analysis server 2012 includes an access control part 2251, a WEB page control part 2252, a system management part 2253, a game information reception part 2254, a game information analysis part 2255, and a network I/F (interface) part 2256. In addition, the analysis server 2012 stores system management data 2281 and analysis database 2282 in a storage device 2280 (corresponding to the external storage device 2204 shown in FIG. 41). Here, in the analysis database 2282, game information data 2282A, index data 2282B, and analysis result data 2282C are included.

When there is login from the client terminal 2011, the access control part 2251 conducts authentication checking for a user ID and a password based on user registration information of the system management data 2281 and if the authentication is OK, the access control part 2251 permits accessing of the client terminal 2011.

When there is a request of a WEB page from a WEB browser executed on the client terminal 2011, the WEB page control part 2252 generates the requested WEB page and transmits the generated WEB page to the client terminal 2011. For example, when there is a request to display the analysis report from the client terminal 2011, the WEB page control part 2252 generates as a WEB page the analysis result data 2282C in the analysis database 2282 and a result of the analysis process by the game information analysis part 2255 and transmits those as analysis result data to the client terminal 2011. The WEB page control part 2252 is, so to speak, a function part which functions as a WEB server.

When a user operates the client terminal 2011 and performs an operation for system management (operation related to system management performed by selecting the system management on the later-described menu screen of the game information analysis system), the system management part 2253 stores that operation and the input result in the system management data 2281 in the storage device 2280.

For example, when as the operation for the system management, data management operation for conducting maintenance for predetermined data and algorithm is performed by a user, the system management part 2253 stores a processing result obtained by that operation in data information of the system management data 2281. In addition, when a group management operation for defining authorization of a user group utilizing the present system is performed by a user, the system management part 2253 stores a processing result obtained by that operation in group information of the system management data 2281. In addition, when a user management operation for registering a user utilizing the present system is performed by a user, the system management part 2253 stores a processing result obtained by that operation in user registration information of the system management data 2281. In the user registration information, user IDs, passwords, and the like are included. In addition, the system management part 2253 stores an access history of a user utilizing the present system in access information of the system management data 2281.

The game information reception part 2254 receives game information from the hall management server 2013. The game information includes game information transmitted from a plurality of slot machines 2014 and game information accumulated, edited, or processed on the hall management server 2013. In addition, the game information reception part 2254 can receive the game information of the slot machines 2014 in a hall store in real time or at near-real-time timing. The received game information is stored as the game information data 2282A in the analysis database 2282 in the storage device 2280.

In addition, when the game information analysis system 2001 is introduced in the existing game system, the accumulated past game information can be collectively received.

In addition, in the game information analysis system according to the present invention, the index data 2282B used for the analysis of the game information is held in the analysis database 2282. Each piece of the index data 2282B, for which updating and generation are required each time the game information is received, is calculated in the later-described game information analysis part 2255 and is stored as index data 2282B.

Based on the game information data 2282A, the index data 2282B, and the like in the analysis database 2282, the game information analysis part 2255 conducts an analysis process at a predetermined timing and stores an analysis result as the analysis result data 2282C in the analysis database 2282. It is to be noted that as the timing at which the game information analysis part 2255 conducts the analysis process, various timings such as a timing at which a user issues a request to display the analysis report via the client terminal 2011 and a timing at which the game information reception part 2254 receives the game information can be set.

In addition, when the game information reception part 2254 collectively receives the accumulated past game information, the configuration can be arranged such that through batch processing in the night, the analysis process is conducted from the predetermined game information or the index data is generated.

The network I/F (interface) part 2256 controls the network I/F 2208 shown in FIG. 41, controls data transmission and reception between the analysis server 2012 and the client terminal 2011, and controls reception of the game information transmitted from the hall management server 2013.

It is to be noted that the respective functions of the analysis server 2012 shown in FIG. 44 are executed through the control by the CPU 2201 of the analysis server 2012 shown in FIG. 41.

Figure 45:
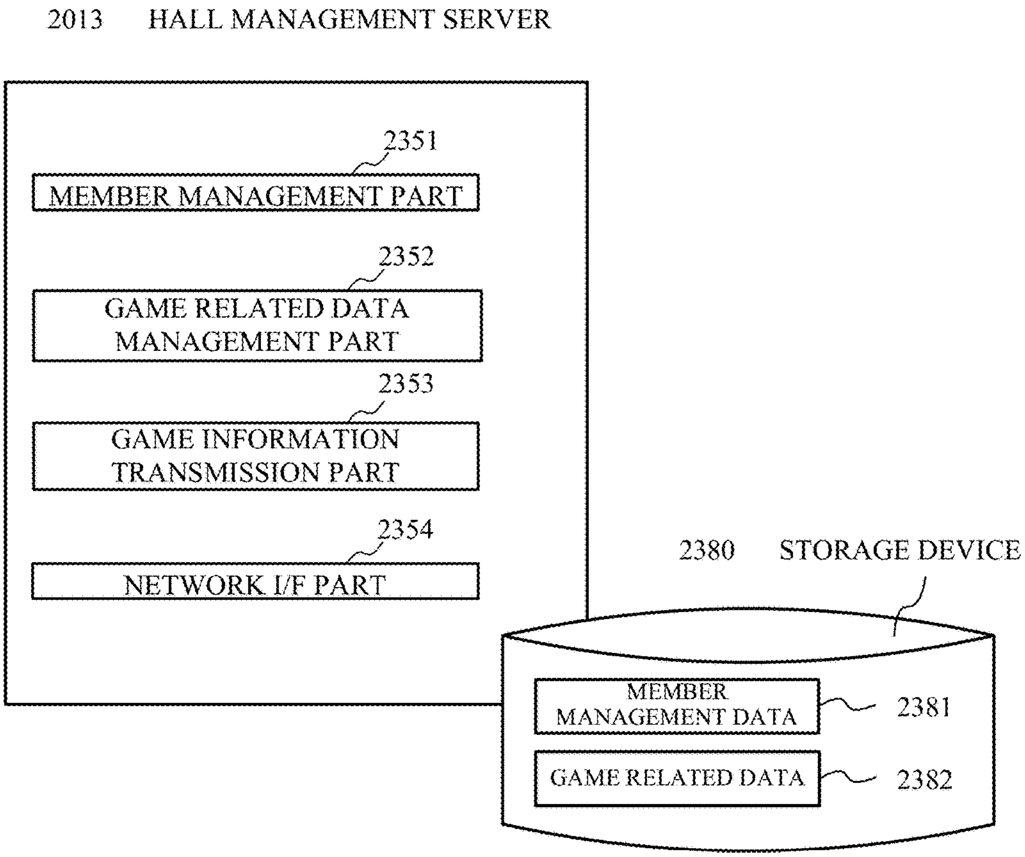
FIG. 45 is a functional block diagram of the hall management server in the game information analysis system according to the one embodiment of the present invention.

FIG. 45 is a functional block diagram of the hall management server 2013. The hall management server 2013 includes a member management part 2351, a game related data management part 2352, a game information transmission part 2353, and a network I/F (interface) part 2354. In addition, the hall management server 2013 stores member management data 2381 and game related data 2382 in a storage device 2380 (corresponding to the external storage device 2304 shown in FIG. 42).

Here, the member management data 2381 includes information pertinent to members who have been registered as members in a hall store. In addition, the game related data 2382 includes game information transmitted from the hall management server 2013 to the analysis server 2012 and stores a game history on each of the slot machines 2014 (the game history of each member is managed so as to be associated with an identifier such as a member ID) and in addition thereto, stores a variety of pieces of information or the like which includes information pertinent to machine information of each of the slot machines 2014 and failure thereof.

The member management part 2351 controls an operation of the member registration in a hall store and stores information pertinent to registered members in the member management data 2381 in the storage device 2380.

The game related data management part 2352 collects game related data from each of the slot machines 2014 and stores the data in the game related data 2382. As the game related data, starting time of each game on each of the slot machines 2014, termination time of each game thereon, a Bet amount, a payout amount, a machine ID, a player ID (in a case of a member) and in addition thereto, a variety of pieces of data are included.

The game information transmission part 2353 transmits the data collected by the game related data management part 2352 from each of the slot machines 2014 to the analysis server 2012 having a previously set address as needed. The pieces of information related to each game such as the starting time of a game, the termination time thereof, and the Bet amount are transmitted basically in real time, and the timing of the transmission is determined variously in accordance with a kind of the data.

The respective functions of the hall management server 2013 shown in FIG. 45 are executed through the control by the CPU 2301 of the hall management server 2013 shown in FIG. 42. In addition, there is a case where the game information analysis system 2001 according to the present invention is designed and developed independently of the game system including the hall management server 2013 (for example, a case where the game information is transmitted from a hall management server 2013 of the existing game system manufactured by other company to the game information analysis system 2001). In such a case, it is required to devise consistency between a transmission protocol and a transmission format of the hall management server 2013 in the game system and a reception protocol and a reception format of the analysis server 2012 in the game information analysis system 2001.

[Outline of Menu Configuration of Game Information Analysis System]

Next, with reference to FIG. 46 to FIG. 76, a menu screen having a hierarchical structure, which is displayed on a display of a client terminal 2011 by a game information analysis system 2001 according to the present invention will be described.

Figure 46:
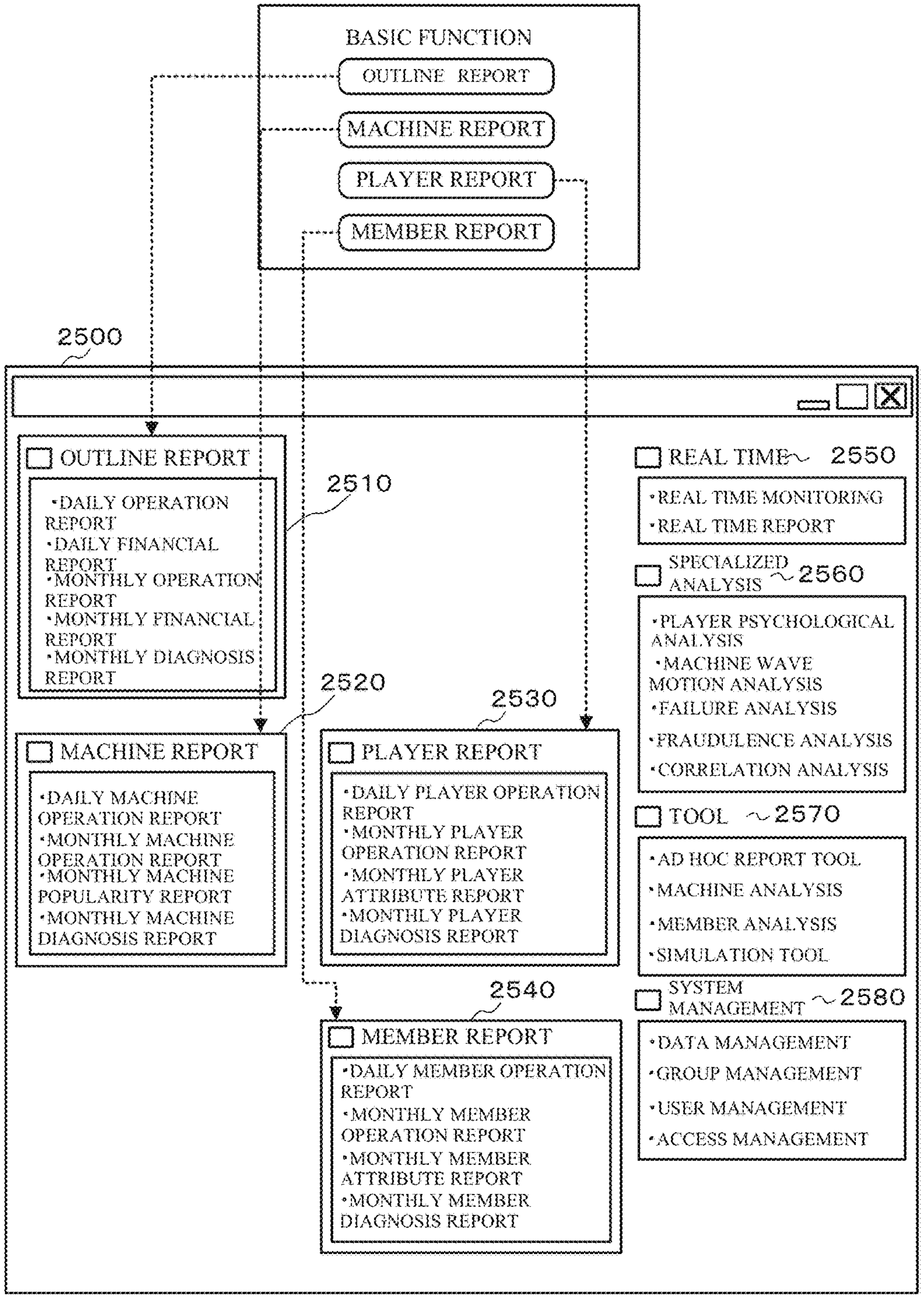
FIG. 46 is a diagram showing a menu screen displayed in the game information analysis system according to the one embodiment of the present invention.

FIG. 46 is a diagram showing a menu screen 2500 displayed on the display of the client terminal 2011. In FIG. 46, the menu screen 2500 is shown so as to be associated with basic functions of the game information analysis system 2001. The menu screen 2500 is a screen initially displayed on the display of the client terminal 2011, for example, when a user logs in to the game information analysis system 2001 by the client terminal 2011.

As shown in FIG. 46, the menu screen 2500 roughly includes respective display parts: an outline report display part 2510; a machine report display part 2520; a player report display part 2530; a member report display part 2540; a real time display part 2550; a specialized analysis display part 2560; a tool display part 2570; and a system management display part 2580.

As shown in an upper portion in FIG. 46, the basic functions of the game information analysis system 2001 include an outline report, a machine report, a player report, and a member report. Among these functions, the basic function "outline report" is associated with the outline report display part 2510, and in other words, by respective reports provided by the outline report display part 2510, said basic function is realized. Similarly, the basic function "machine report" is associated with the machine report display part 2520; the basic function "player report" is associated with the player report display part 2530; and the basic function "member report" is associated with the member report display part 2540.

Figure 47:
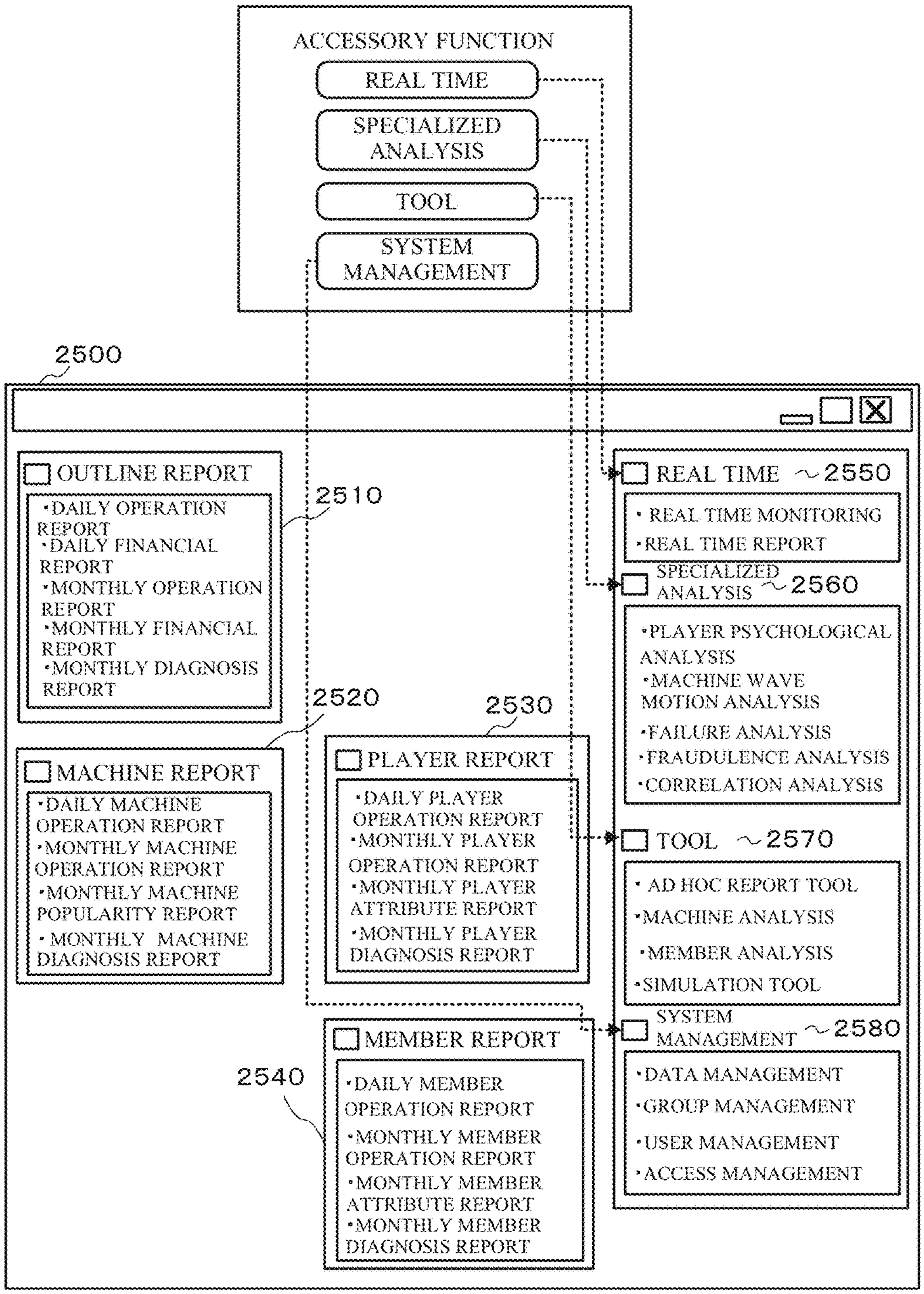
FIG. 47 is a diagram showing a menu screen displayed in the game information analysis system according to the one embodiment of the present invention.

Although in FIG. 47, the same menu screen 2500 as shown in FIG. 46 is shown, here, the menu screen 2500 is shown so as to be associated with accessory functions of the game information analysis system 2001.

As shown in an upper portion in FIG. 47, the accessory functions of the game information analysis system 2001 include: real time; a specialized analysis; tool; and system management. Among these functions, the accessory function "real time" is associated with the real time display part 2550, and in other words, by a monitor display and a report provided by the real time display part 2550, said basic function is realized. Similarly, the accessory function "specialized analysis" is associated with the specialized analysis display part 2560; the accessory function "tool" is associated with the tool display part 2570; and the accessory function "system management" is associated with the system management display part 2580.

Figure 48:
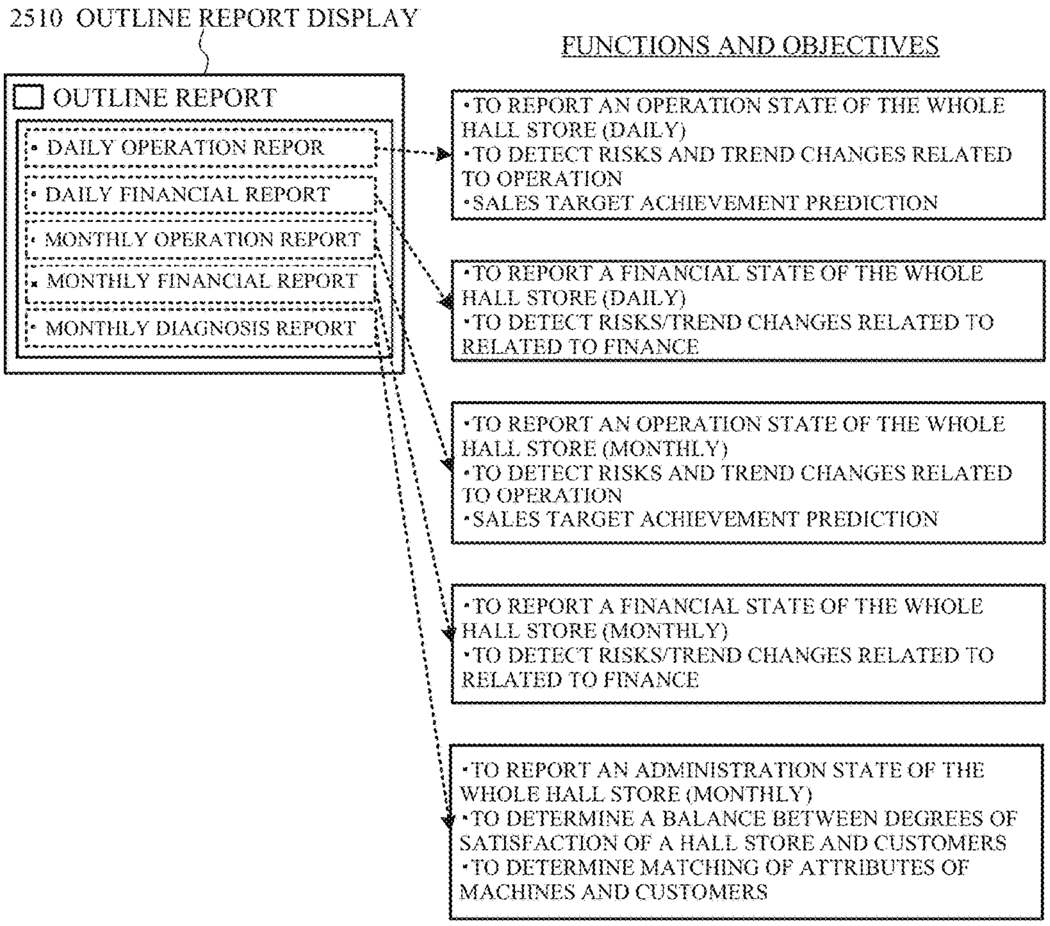
FIG. 48 is a diagram explaining an outline report of the menu screen displayed in the game information analysis system according to the one embodiment of the present invention.

FIG. 48 is a diagram explaining functions and objectives of the respective reports which can be selected by the outline report display part 2510 among the display parts of the menu screen 2500.

As shown in FIG. 48, as the reports which can be selected by the outline report display part 2510, there are a daily operation report, a daily financial report, a monthly operation report, a monthly financial report, and a monthly diagnosis report.

Here, an objective of the daily operation report is to report a daily operation state of the whole hall store, and a variety of pieces of data which allow risks and trend changes related to the operation to be detected are displayed. In addition, sales achievement prediction can also be conducted. An objective of the daily financial report is to report a daily financial state of the whole hall store, and a variety of pieces of data which allows risks and trend changes related to finance to be detected are displayed.

An objective of the monthly operation report is to report a monthly operation state of the whole hall store, and a variety of pieces of data which allow risks and trend changes related to the operation to be detected are displayed. In addition, sales achievement prediction can also be conducted. An objective of the monthly financial report is to report a monthly financial state of the whole hall store, and a variety of pieces of data which allow risks and trend changes related to the finance to be detected are displayed.

In addition, an objective of the monthly diagnosis report is to report a monthly administration state of the whole hall store, and a variety of pieces of data which are used to determine a balance between a degree of satisfaction of a hall store and degrees of satisfaction of customers are displayed. In addition, a variety of pieces of data which are used to determine matching between attributes of slot machines and attributes of customers are displayed.

FIG. 49 shows contents of the report displayed when the daily operation report which can be selected by the outline report display part 2510 is selected. As shown in FIG. 49, in the daily operation report, an operation summary, Winloss accumulation, Winloss comparison, Bet transition, valid session transition, valid member transition, operation unit transition, operation ratio transition, stopping ratio transition, caution-needed session transition, and transition details are displayed by, for example, a Web browser executed on the client terminal 2011 as one Web page on the display of the client terminal 2011.

Here, for example, the operation summary displays a summary of operation related indices (for example, Winloss, operation ratios, numbers of sessions, numbers of members, and the like). The Winloss accumulation displays target achievement ratios and prediction analysis results of Winloss. The Winloss comparison displays index comparison analysis results of Winloss, Hold, and operation ratios. The Bet transition displays data for detecting a Bet fluctuation risk. The valid session transition displays data for detecting a valid session fluctuation risk. The valid member transition displays data for detecting a valid member fluctuation risk. The operation unit transition displays transition of numbers of operation machines (in this example, slot machines). The operation ratio transition displays data for detecting a machine operation ratio fluctuation risk. The stopping ratio transition displays data for detecting a machine stopping time fluctuation risk. The caution-needed session transition displays each session determined as a caution-needed session (for risk management). The transition details display time series lists of the operation related indices.

FIG. 50 shows contents of the report displayed when the daily financial report which can be selected by the outline report display part 2510 is selected. As shown in FIG. 50, in the daily financial report, Winloss transition, transition of currency, transition of each currency, transition of cashless transactions, a cashless category, and point transition are displayed by, for example, the Web browser executed on the client terminal 2011 as one Web page on the display of the client terminal 2011.

Here, for example, the Winloss transition displays time series transition of funds by Winloss. The transition of currency displays time series transition of the currency in a cashbox. The transition of each currency displays time series transition of each of the currencies in the cashbox. The transition of the cashless transitions displays time series transition of the cashless transactions. The cashless category displays a balance of the cashless transactions by composition ratios of categories of the cashless transactions (for example, WAT, a coupon, a ticket, and the like). The point transition displays data which shows a balance of points.

FIG. 51 shows contents of the report displayed when the monthly operation report which can be selected by the outline report display part 2510 is selected. As shown in in FIG. 51, in the monthly operation report, an operation summary, Winloss accumulation, Winloss comparison, Bet transition, valid session transition, valid member transition, operation unit transition, operation ratio transition, stopping ratio transition, caution-needed session transition, and transition details are displayed by, for example, the Web browser executed on the client terminal 2011 as one Web page on the display of the client terminal 2011.

Since these reports are reports in which the respective daily operation reports described with reference to FIG. 49 are organized and represented on a monthly basis, the detailed description thereof is omitted.

FIG. 52 shows contents of the report displayed when the monthly financial report which can be selected by the outline report display part 2510 is selected. As shown in FIG. 52, in the monthly financial report, Winloss transition, transition of currency, transition of each currency, transition of the cashless transactions, a cashless category, and point transition are displayed by, for example, the Web browser executed on the client terminal 2011 as one Web page on the display of the client terminal 2011.

Since these reports are reports in which the respective daily financial reports described with reference to FIG. 50 are organized and represented on a monthly basis, the detailed description thereof is omitted.

FIG. 53 shows contents of the report displayed when the monthly diagnosis report which can be selected by the outline report display part 2510 is selected. As shown in FIG. 53, in the monthly diagnosis report, a balance between degrees of satisfaction, transition of a balance between degrees of satisfaction, popularity matching, attribute matching, and feature attribute matching are displayed by, for example, the Web browser executed on the client terminal 2011 as one Web page on the display of the client terminal 2011.

Here, for example, the balance between degrees of satisfaction displays data represented with respect to an administration balance diagnosis in consideration of degrees of satisfaction of customers. The transition of a balance between degrees of satisfaction displays time series details of an administration balance in consideration of the degrees of satisfaction of customers. The popularity matching displays an analysis result of machine popularity matching viewed from a machine (in this example, slot machines) composition ratio and a playing time period ratio. The attribute matching displays an analysis result of machine attribute matching viewed from the machine composition ratio and the playing time period ratio. The feature attribute matching displays an analysis result of machine feature attribute matching viewed from the machine composition ratio and the playing time period ratio.

Figure 54:
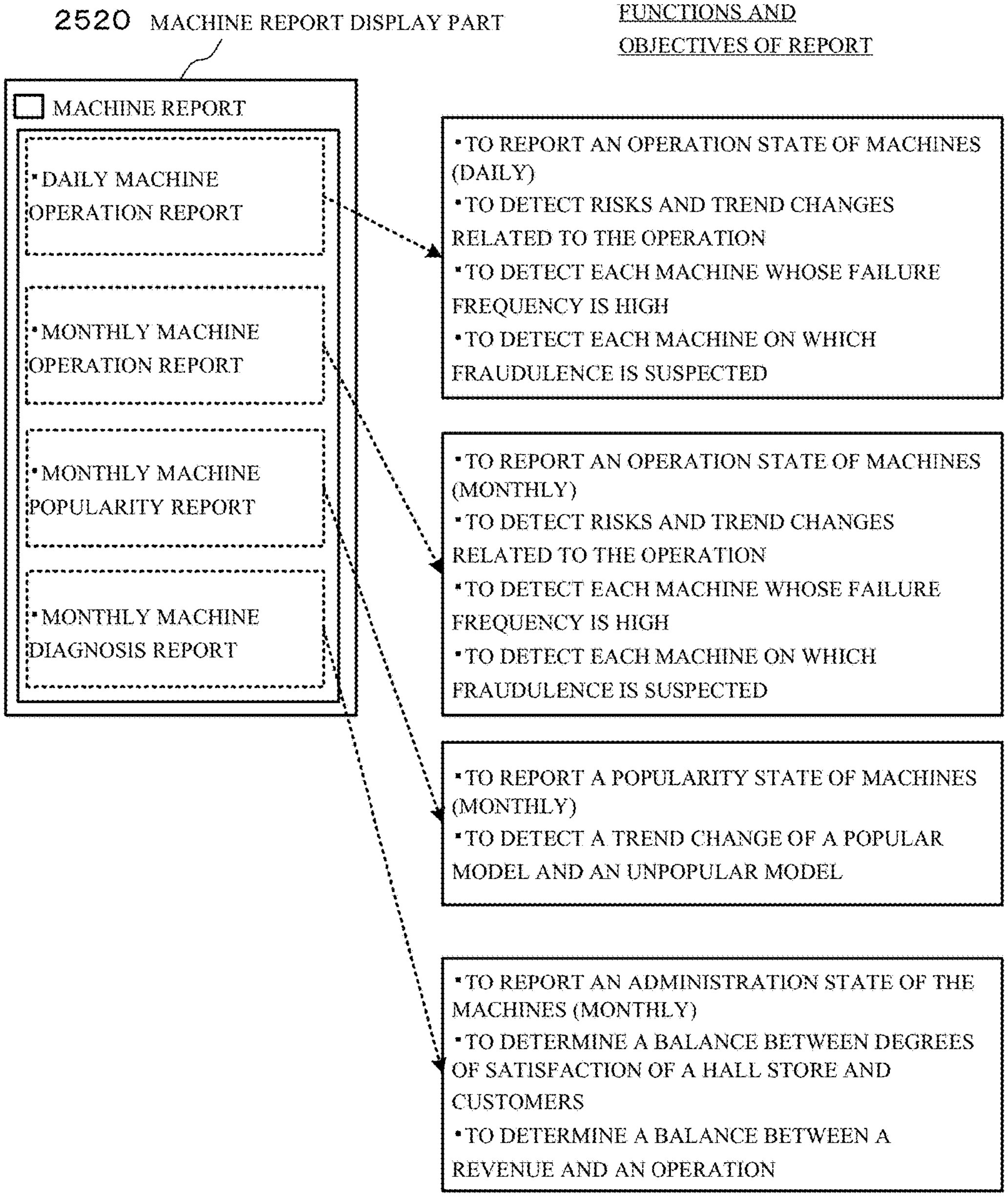
FIG. 54 is a diagram explaining a machine report of the menu screen displayed in the game information analysis system according to the one embodiment of the present invention.

FIG. 54 is a diagram explaining functions and objectives of respective reports which can be selected by the machine report display part 2520 among the display parts of the menu screen 2500.

As shown in FIG. 54, as the reports which can be selected by the machine report display part 2520, there are a daily machine operation report, a monthly machine operation report, a monthly machine popularity report, and a monthly machine diagnosis report.

Here, an objective of the daily machine operation report is to report a daily operation state of machines (in this example, slot machines), and a variety of pieces of data which allow risks and trend changes related to the operation to be detected are displayed. In addition, data for detecting each machine whose failure frequency is high and data for detecting each machine on which a fraudulent act is suspected are displayed. An objective of the monthly machine operation report is to report a monthly operation state of the machines, and a variety of pieces of data which allow risks and trend changes related to the operation to be detected are displayed. In addition, data for detecting each machine whose failure frequency is high and data for detecting each machine on which a fraudulent act is suspected are displayed.

In addition, an objectives of the monthly machine popularity report is to report a monthly popularity state of the machines, and data for detecting trend changes of a popular model and an unpopular model is displayed. An objective of the monthly machine diagnosis report is to report a monthly administration state of the machines, and data for determining a balance between a degree of satisfaction of a hall store and degrees of satisfaction of customers is displayed. In addition, data for determining a balance between a revenue and operation is displayed.

FIG. 55 shows contents of the report displayed when the daily machine operation report which can be selected by the machine report display part 2520 is selected. As shown in FIG. 55, in the daily machine operation report, an operation summary, Winloss comparison, Bet transition, stopping time ranking, and caution-needed session ranking are displayed by, for example, a Web browser executed on the client terminal 2011 as one Web page on the display of the client terminal 2011.

Here, for example, the operation summary displays a summary (for example, Winloss/unit, playing time period/unit, and the like) of operation related indices. The Winloss comparison displays an index comparison analysis result of the Winloss/unit and the Bet/unit. The Bet transition displays data for detecting a Bet/unit fluctuation risk. The stopping time ranking displays stopping time ranking of the machines. The caution-needed session ranking displays ranking of the machines with caution-needed sessions.

FIG. 56 shows contents of the report displayed when the monthly machine operation report which can be selected by the machine report display part 2520 is selected. As shown in FIG. 56, in the monthly machine operation report, an operation summary, Winloss comparison, Bet transition, stopping time ranking, and caution-needed session ranking are displayed by, for example, a Web browser executed on the client terminal 2011 as one Web page on the display of the client terminal 2011.

Since these reports are reports in which the respective daily machine operation reports described with reference to FIG. 55 are organized and represented on a monthly basis, the detailed description thereof is omitted.

FIG. 57 shows contents of the report displayed when the monthly machine popularity report which can be selected by the machine report display part 2520 is selected. As shown in FIG. 57, in the monthly machine popularity report, Bet theme ranking, game type attributes, denomination attributes, theme attributes, vendor attributes, base PO attributes, matching class attributes, popularity degrees of game types, popularity degrees of denominations, popularity degrees of themes, popularity degrees of vendors, popularity degrees of base POs, and degrees of popularity of matching classes are displayed by, for example, a Web browser executed on the client terminal 2011 as one Web page on the display of the client terminal 2011.

Here, for example, the Bet theme ranking displays ranking of Bet themes. The game type attributes display Bet ratios for game types. The denomination attributes display Bet ratios for denominations. The theme attributes display Bet ratios for themes. The vendor attributes display Bet ratios for makers. The base PO attributes display Bet ratios for base POs. The matching class attributes display Bet ratios for machine attribute classes. The popularity degrees of game types display member ratios for game types. The popularity degrees of denominations display member ratios for denominations. The popularity degrees of themes display member ratios for themes. The popularity degrees of vendors display member ratios for makers. The popularity degrees of base POs display member ratios for base POs. The degrees of popularity of matching classes display member ratios for machine attribute classes.

FIG. 58 shows contents of the report displayed when the monthly machine diagnosis report which can be selected by the machine report display part 2520 is selected. As shown in FIG. 58, in the monthly machine diagnosis report, an operation balance summary, an operation balance transition, a satisfaction degree balance summary, transition of a balance between degrees of satisfaction, and degrees of satisfaction of machines are displayed by, for example, a Web browser executed on the client terminal 2011 as one Web page on the display of the client terminal 2011.

Here, for example, the operation balance summary displays an operation balance summary of an operation ratio and a profitability (Bet/H). The operation balance transition displays time series details of an operation balance of the operation ratio and the profitability (Bet/H). The satisfaction degree balance summary displays a balance between a degree of satisfaction of a hall store and a degree of satisfaction of customers by using a number-of-machines distribution. The transition of a balance between degrees of satisfaction displays the balance between a degree of satisfaction of a hall store and degrees of satisfaction of customers by using time series details of the number-of-machines distribution. The degree of satisfaction of machines displays a machine distribution of the balance between a degree of satisfaction of a hall store and degrees of satisfaction of customers.

Figure 59:
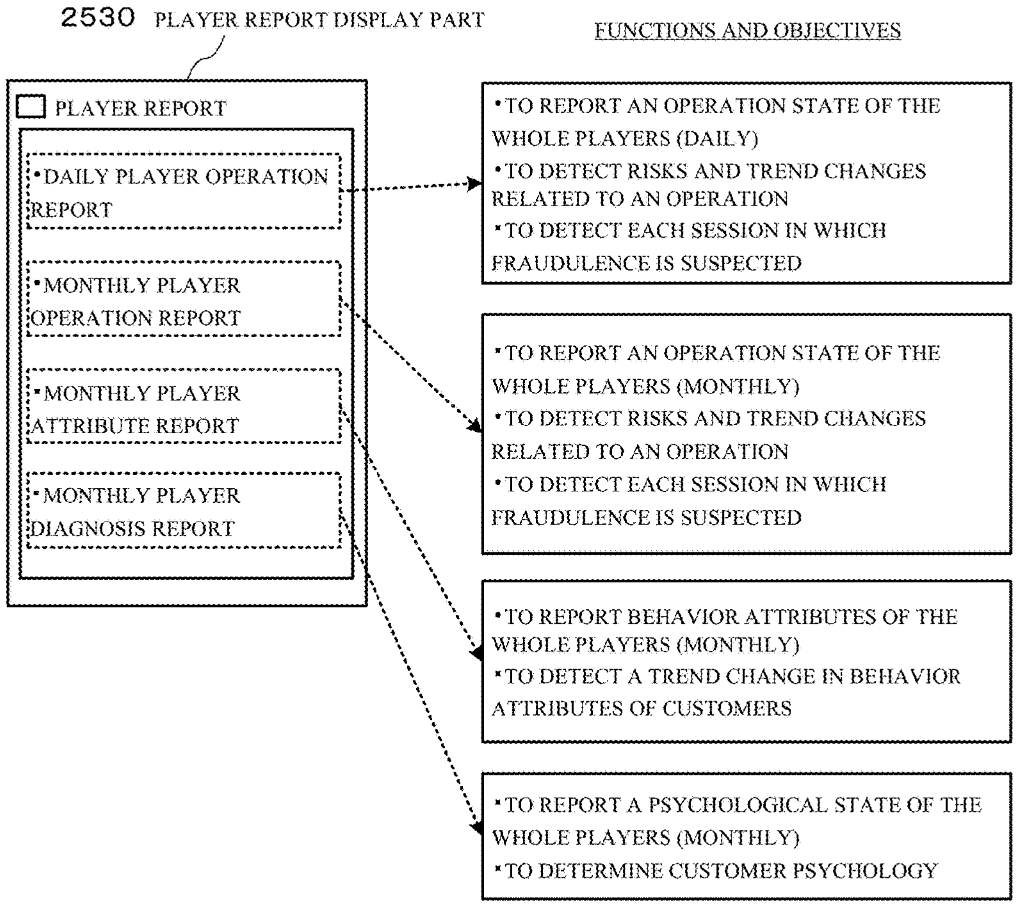
FIG. 59 is a diagram explaining a player report of the menu screen displayed in the game information analysis system according to the one embodiment of the present invention.

FIG. 59 is a diagram explaining functions and objectives of respective reports which can be selected by the player report display part 2530 among the display parts of the menu screen 2500.

As shown in FIG. 59, as the reports which can be selected by the player report display part 2530, there are a daily player operation report, a monthly player operation report, a monthly player attribute report, and a monthly player diagnosis report.

Here, an objective of the daily player operation report is to report a daily operation state of the whole players, and a variety of pieces of data which allow risks and trend changes related to the operation to be detected are displayed. In addition, data which allows each session in which a fraudulent act is suspected to be detected is displayed. An objective of the monthly player operation report is to report of a monthly operation state of the whole players, and a variety of pieces of data which allow risks and trend changes related to the operation to be detected are displayed. In addition, data which allows each session in which a fraudulent act is suspected to be detected is displayed. An objective of the monthly player attribute report is to report monthly behavior attributes of the whole players, and a variety of pieces of data which allow trend changes in behavior attributes of customers to be detected are displayed. An objective of the monthly player diagnosis report is to report monthly psychological states of the whole players, and a variety of pieces of data for determining customer psychology are displayed.

FIG. 60 shows contents of the report displayed when the daily player operation report which can be selected by the player report display part 2530 is selected. As shown in FIG. 60, in the daily player operation report, an operation summary, Winloss comparison, Bet transition, and caution-needed session ranking are displayed by, for example, a Web browser executed on the client terminal 2011 as one Web page on the display of the client terminal 2011.

Here, for example, the operation summary displays a summary (for example, Winloss/session, a playing time period (minutes)/session, and the like) of operation related indices. The Winloss comparison displays an index comparison analysis result of the Winloss/session and the playing time period (minutes)/session. The Bet transition displays data for detecting a Bet/session fluctuation risk. The caution-needed session ranking displays ranking of machines with the caution-needed sessions.

FIG. 61 shows contents of the report displayed when the monthly player operation report which can be selected by the player report display part 2530 is selected. As shown in FIG. 61, in the monthly player operation report, an operation summary, Winloss comparison, Bet transition, and caution-needed session ranking are displayed by, for example, a Web browser executed on the client terminal 2011 as one Web page on the display of the client terminal 2011.

Since these reports are reports in which the respective daily player operation reports described with reference to FIG. 60 are organized and represented on a monthly basis, the detailed description thereof is omitted.

FIG. 62 shows contents of the report displayed when the monthly player attribute report which can be selected by the player report display part 2530 is selected. As shown in FIG. 62, in the monthly player attribute report, player-type Bet ranking, player-type attributes, matching class attributes, a player-type degree of popularity, and a matching class degree of popularity are displayed by, for example, a Web browser executed on the client terminal 2011 as one Web page on the display of the client terminal 2011.

Here, for example, the player-type Bet ranking displays player-type Bet ranking. The player-type attributes display player-type Bet ratios. The matching class attributes display player-attribute Bet ratios. The player-type degree of popularity displays player-type ratios of a slot game and a table game. The matching class degree of popularity displays player-attribute ratios of a slot game and a table game.

FIG. 63 shows contents of the report displayed when the monthly player diagnosis report which can be selected by the player report display part 2530 is selected. As shown in FIG. 63, in the monthly player diagnosis report, Winloss session ratio transition and candlestick ratio transition are displayed by, for example, a Web browser executed on the client terminal 2011 as one Web page on the display of the client terminal 2011.

Here, for example, the Winloss session ratio transition displays time series details of session winning-and-losing ratios. The candlestick ratio transition displays time series details of candle shapes in sessions.

Figure 64:
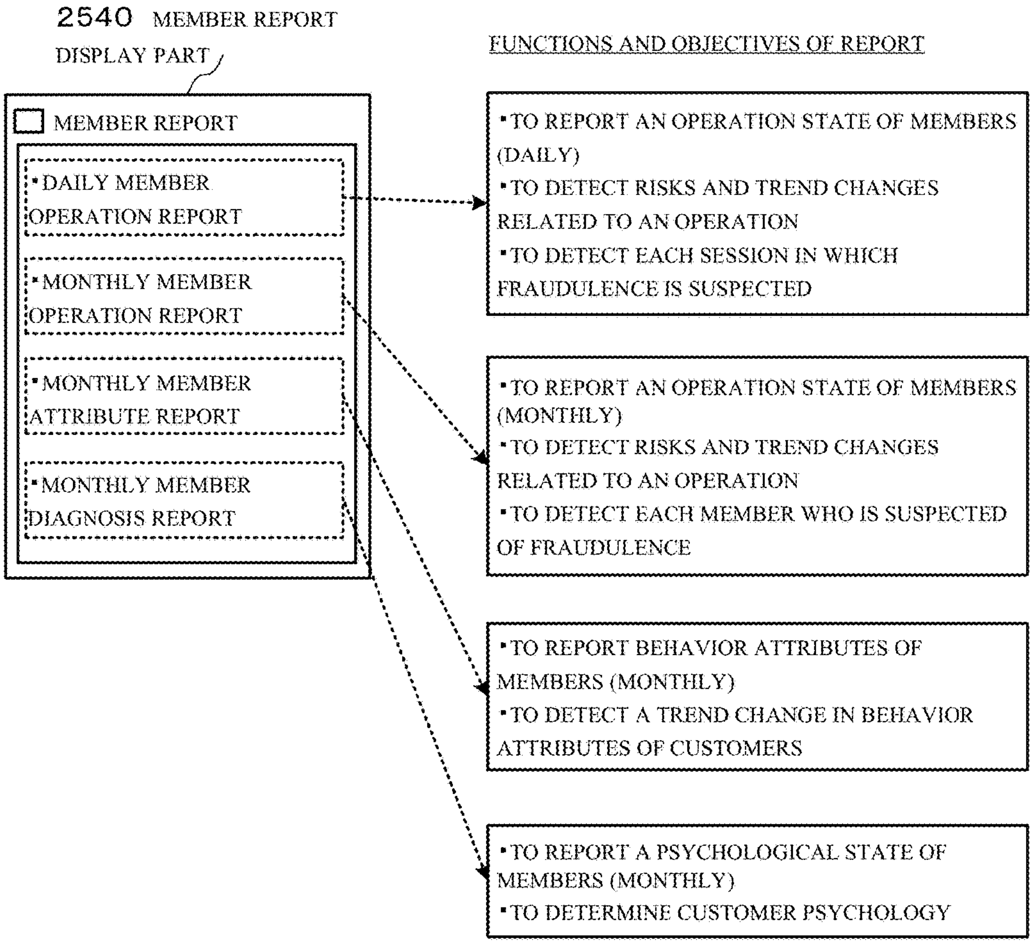
FIG. 64 is a diagram explaining a member report of the menu screen displayed in the game information analysis system according to the one embodiment of the present invention.

FIG. 64 is a diagram explaining functions and objectives of respective reports which can be selected by the member report display part 2540 among the display parts of the menu screen 2500.

As shown in FIG. 64, as the reports which can be selected by the member report display part 2540, there are a daily member operation report, a monthly member operation report, a monthly member attribute report, and a monthly member diagnosis report.

Here, an objective of the daily member operation report is to report a daily operation state of members, and a variety of pieces of data which allow risks and trend changes related to the operation to be detected are displayed. In addition, data which allows each member who is suspected of committing a fraudulent act to be detected is displayed. An objective of the monthly member operation report is to report a monthly operation state of members, and a variety of pieces of data which allow risks and trend changes related to the operation to be detected are displayed. In addition, data which allows each member who is suspected of committing the fraudulent act to be detected is displayed. An objective of the monthly member attribute report is to report monthly behavior attributes of members, and a variety of pieces of data which allow trend changes in behavior attributes of customers to be detected are displayed. An objective of the monthly member diagnosis report is to report a monthly psychological state of members, and a variety of pieces of data for determining customer psychology are displayed.

FIG. 65 shows contents of the report displayed when the daily member operation report which can be selected by the member report display part 2540. As shown in FIG. 65, in the daily member operation report, an operation summary, Winloss comparison, Bet transition, and caution-needed session ranking are displayed by, for example, a Web browser executed on the client terminal 2011 as one Web page on the display of the client terminal 2011.

Here, for example, the operation summary displays a summary of operation related indices (for example, Winloss/person, a playing time period (minutes)/person, and the like). The Winloss comparison displays an index comparison analysis result of the Winloss/person and the playing time period (minutes)/person. The Bet transition displays data for detecting a Bet/person fluctuation risk. The caution-needed session ranking displays Winloss ranking of caution-needed sessions.

FIG. 66 shows contents of the report displayed when the daily member operation report which can be selected by the member report display part 2540. As shown in FIG. 66, in the monthly member operation report, an operation summary, Winloss comparison, Bet transition, and caution-needed session ranking are displayed by, for example, a Web browser executed on the client terminal 2011 as one Web page on the display of the client terminal 2011.

Since these reports are reports in which the respective daily player operation reports described with reference to FIG. 65 are organized and represented on a monthly basis, the detailed description thereof is omitted.

FIG. 67 shows contents of the report displayed when the monthly member attribute report which can be selected by the player report display part 2540. As shown in FIG. 67, in the monthly member attribute report, by-nationality Bet ranking, by-nationality attributes, by-sex attributes, by-age attributes, by-store-visiting-interval attributes, by-store-visiting-frequency and by-bet-amount attributes, a by-nationality popularity degree, a by-sex popularity degree, a by-age popularity degree, a by-store-visiting-interval popularity degree, and a by-store-visiting-frequency and by-bet-amount popularity degree are displayed by, for example, a Web browser executed on the client terminal 2011 as one Web page on the display of the client terminal 2011.

Here, for example, the by-nationality Bet ranking displays by-nationality Bet ranking. The by-nationality attributes display by-nationality Bet ratios. The by-sex attributes displays by-sex Bet ratios. The by-age attributes display by-age Bet ratios. The by-store-visiting-interval attributes display by-store-visiting-interval Bet ratios. The by-store-visiting-frequency and by-bet-amount attributes displays Bet ratios by store visiting frequencies and by used bet amounts. The by-nationality popularity degree displays by-nationality ratios of a slot game and a table game. The by-sex popularity degree displays by-sex ratios of a slot game and a table game. The by-age popularity degree displays by-age ratios of a slot game and a table game. The by-store-visiting-interval popularity degree displays by-store-visiting-interval ratios of a slot game and a table game. The by-store-visiting-frequency and by-bet-amount popularity degree displays ratios of a slot game and a table game by a store visiting frequency and by a used bet amount.

FIG. 68 shows contents of the report displayed when the monthly member attribute report which can be selected by the member report display part 2540. As shown in FIG. 68, in the monthly member diagnosis report, player satisfaction degree score ranking is displayed by, for example, a Web browser executed on the client terminal 2011 as one Web page on the display of the client terminal 2011.

Here, for example, the player satisfaction degree score ranking displays ranking of degrees of satisfaction of customers.

Figure 69:
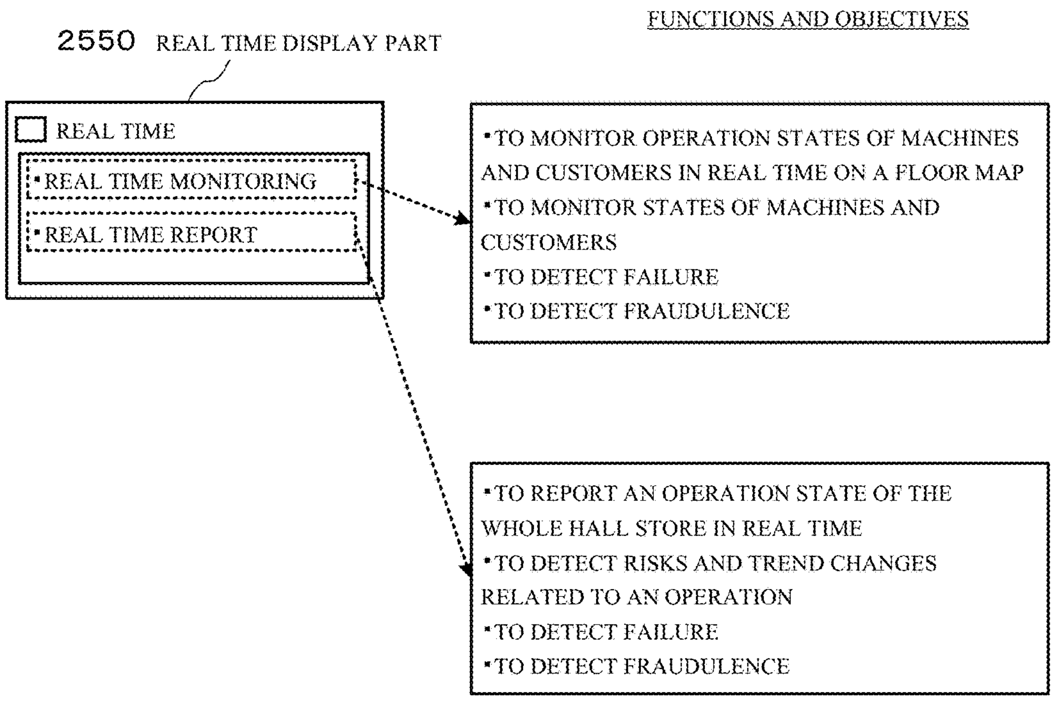
FIG. 69 is a diagram explaining real time of the menu screen displayed in the game information analysis system according to the one embodiment of the present invention.

FIG. 69 is a diagram explaining functions and objectives of respective reports which can be selected by the real time display part 2550 among the display parts of the menu screen 2500.

As shown in FIG. 69, as the report which can be selected by the real time display part 2550, there are real time monitoring and a real time report.

Here, an objective of the real time monitoring is to monitor operation states of machines and customers in real time on a floor map, and a monitoring screen for the states of machines and customers is displayed and in addition, data which allows failure to be detected and a fraudulent act to be detected is displayed. An objective of the real time report is to report an operation state of the whole hall store in real time, and data which allows risks and trends related to the operation to be detected is displayed, and in addition, data which allows failure to be detected and a fraudulent act to be detected is displayed.

FIG. 70 shows contents of the report displayed when the real time monitoring which can be selected by the real time display part 2550 is selected. As shown in FIG. 70, in the real time monitoring, a session, an event, a meter, a temperature, a humidity, a voltage, and a phone call are displayed by, for example, a Web browser executed on the client terminal 2011 as one Web page on the display of the client terminal 2011. In addition, as options, a camera angle, temperature evaluation, and a phone call line are displayed.

Here, for example, the session generates and displays a store visiting state of a player and an alert related to a caution-needed session. The event displays machine statuses (for example, states of a stacker, a jackpot, a hand pay, maintenance, and the like). The meter detects a caution-needed machine, for example, by meter data transmitted from each of the slot machines 2014 and displays a state thereof. The temperature displays distribution of machine temperatures. The humidity displays distribution of machine humidity. The voltage displays distribution of machine voltages. The phone call displays phone call statuses. In addition, the camera angle displays monitoring cameras in a hall store and ranges of vision. The temperature evaluation displays a temperature map of the whole floor. The phone call line displays an image of phone call lines.

FIG. 71 shows contents of the report displayed when the real time report which can be selected by the real time display part 2550 is selected. As shown in FIG. 71, in the real time report, a summary and a chart are displayed by, for example, a Web browser executed on the client terminal 2011 as one Web page on the display of the client terminal 2011.

Here, for example, the summary displays a summary of operation indices (for that day). In addition, the chart displays a time scale chart (Winloss, Bets, sessions, members, operation ratios, and the like). The time scale chart represents, for example, a chart such as a candlestick chart for a given time period.

Figure 72:
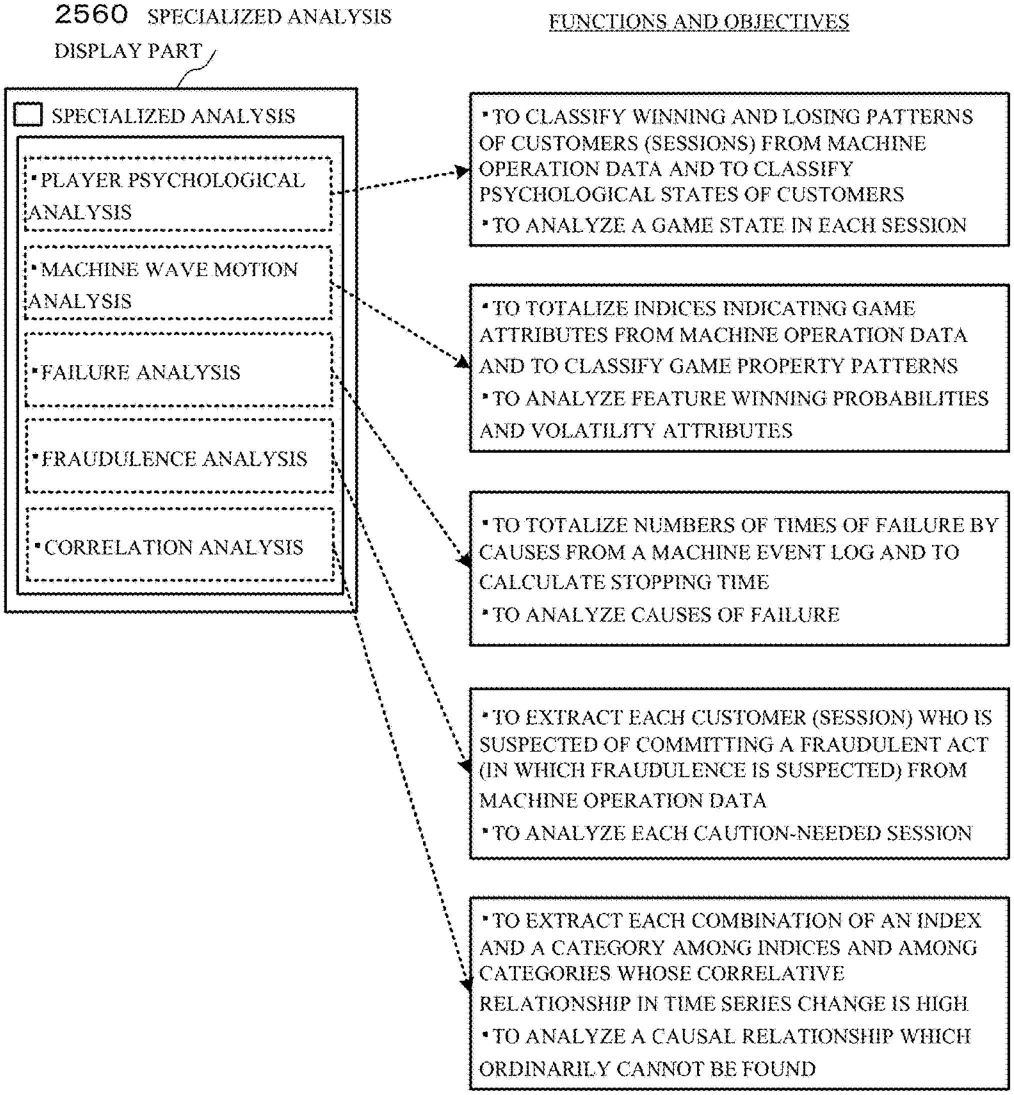
FIG. 72 is a diagram explaining a specialized analysis of the menu screen displayed in the game information analysis system according to the one embodiment of the present invention.

FIG. 72 is a diagram explaining functions and objectives of respective reports which can be selected by the specialized analysis display part 2560 among the display parts of the menu screen 2500.

As shown in FIG. 72, as the reports which can be selected by the specialized analysis display part 2560, there are a player psychological analysis, a machine wave motion analysis, a failure analysis, a fraudulent act analysis, and a correlation analysis.

Here, an objective of the player psychological analysis is to analyze winning and losing patterns of customers (sessions) from machine operation data and to classify psychological states of customers, and data which allows a game state in each session to be analyzed is displayed. An objective of the machine wave motion analysis is to totalize indices indicating game attributes from the machine operation data and to classify game property patterns, and data which allow feature winning probabilities and volatility attributes to be analyzed is displayed. An objective of the failure analysis is to totalize numbers of times of failure by causes from a machine event log and to calculate stopping time, and data which allows failure causes to be analyzed is displayed. An objective of the fraudulent act analysis is to extract each customer (session) who is suspected of committing a fraudulent act (in which a fraudulent act is suspected) from the machine operation data, and data which allows each caution-needed session to be analyzed is displayed. An objective of the correlation analysis is to extract each combination of an index and a category among indices and among categories, whose correlative relationship in time series change is high, and data which allows a causal relationship, which ordinarily cannot be found, to be analyzed is displayed.

FIG. 73 shows contents of the report displayed when the player psychological analysis which can be selected by the specialized analysis display part 2560 is selected. As shown in FIG. 73, in the player psychological analysis, a psychology summary, psychology time series lists, and candlestick charts are displayed by, for example, a Web browser executed on the client terminal 2011 as one Web page on the display of the client terminal 2011.

Here, for example, the psychology summary displays monthly psychological attribute machine lists. The psychology time series lists display monthly psychological attribute lists by machines. The candlestick chart displays monthly and by-machine psychological analysis candlestick charts.

FIG. 74A shows contents of the report displayed when the machine wave motion analysis which can be selected by the specialized analysis display part 2560 is selected. As shown in FIG. 74A, in the machine wave motion analysis, a wave motion summary and a wave motion chart are displayed by, for example, a Web browser executed on the client terminal 2011 as one Web page on the display of the client terminal 2011.

Here, for example, the wave motion summary displays game attribute machine lists. The wave motion chart displays by-machine Winloss/Bet wave motion charts.

FIG. 74B shows contents of the report displayed when the failure analysis which can be selected by the specialized analysis display part 2560 is selected. As shown in FIG. 74B, in the failure analysis, a failure summary and details of numbers of times of failure are displayed by, for example, a Web browser executed on the client terminal 2011 as one Web page on the display of the client terminal 2011.

Here, for example, the failure summary displays machine lists of monthly numbers of times of failure. The details of numbers of times of failure display detailed lists of monthly and by-machine numbers of times of failure.

FIG. 75A shows contents of the report displayed when the fraudulent act analysis which can be selected by the specialized analysis display part 2560 is selected. As shown in FIG. 75A, in the fraudulent act analysis, a fraudulent act summary is displayed by, for example, a Web browser executed on the client terminal 2011 as one Web page on the display of the client terminal 2011.

Here, for example, the fraudulent act summary displays a monthly caution-needed session list, a caution-needed machine list, and a caution-needed member list.

FIG. 75B shows contents of the report displayed when the correlation analysis which can be selected by the specialized analysis display part 2560 is selected. As shown in FIG. 75B, in the correlation analysis, a correlation summary and details are displayed by, for example, a Web browser executed on the client terminal 2011 as one Web page on the display of the client terminal 2011.

Here, for example, the correlation summary and details display an index-and-category-correlation coefficient summary and details.

Figure 76:
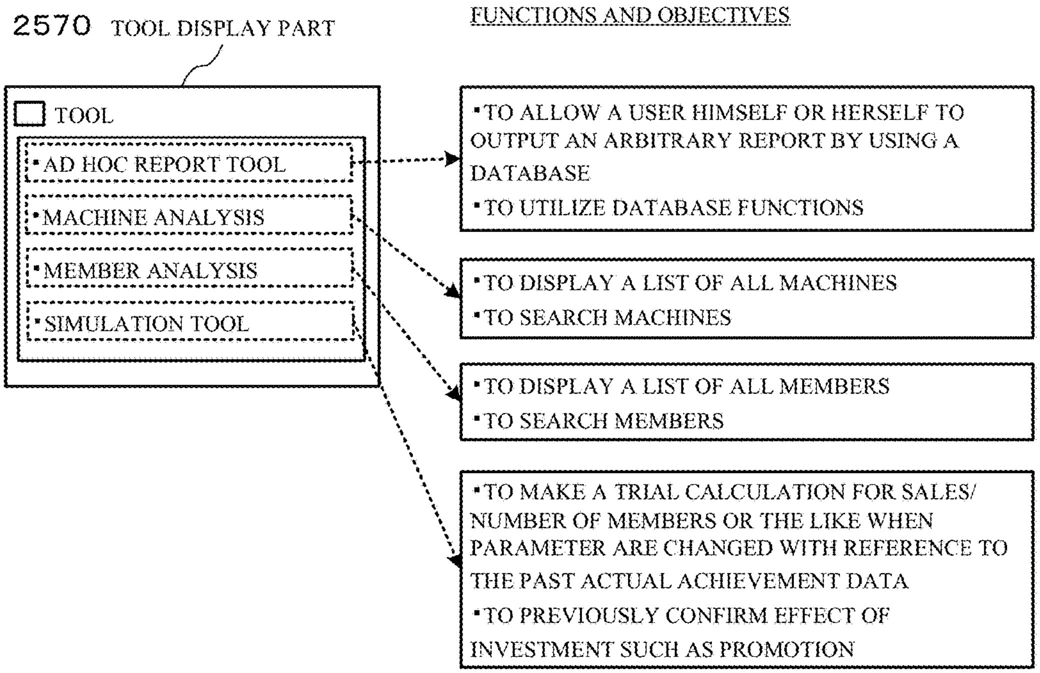
FIG. 76 is a diagram explaining a tool of the menu screen displayed in the game information analysis system according to the one embodiment of the present invention.

FIG. 76 is a diagram explaining functions and objectives of respective reports which can be selected by the tool display part 2570 among the display parts of the menu screen 2500.

As shown in FIG. 76, as the reports which can be selected by the tool display part 2570, there are an ad hoc report tool, a machine analysis, a member analysis, and a simulation tool.

Here, an objective of the ad hoc report tool is to allow a user himself or herself to output an arbitrary report by using a database, and a variety of database functions are utilized by said tool. An objective of the machine analysis is to display a list of all machines, and thus, it is also made possible to search machines. An objective of the member analysis is to display a list of all members, and thus, it is also made possible to search members. An objective of the simulation tool is to make a trial calculation for sales/number of members or the like when parameters are changed with reference to the past actual achievement data, and data which allows investment effect such as promotion effect to be previously confirmed is displayed.

FIG. 77A shows items displayed when the ad hoc report tool which can be selected by the tool display part 2570 is selected. As shown in FIG. 77A, in the ad hoc report tool, respective items related to report selection, report reference, and the ad hoc report tool are displayed by, for example, a Web browser executed on the client terminal 2011 as one Web page on the display of the client terminal 2011.

Here, for example, as the item related to the report selection, displaying with which a user instructs report selection is conducted. As the item related to the report reference, displaying with which a user instructs the report reference is conducted. As the item related to the ad hoc report tool, displaying with which a user instructs various designation for customized report creation tool is conducted.

FIG. 77B shows a report displayed when the machine analysis which can be selected by the tool display part 2570 is selected. As shown in FIG. 77B, in the machine analysis, a machine list is displayed by, for example, a Web browser executed on the client terminal 2011 as one Web page on the display of the client terminal 2011.

Here, for example, the machine list displays a machine list (for example, which includes respective items such as a base, an operation status, attributes, and failure).

FIG. 78A shows a report displayed when the member analysis which can be selected by the tool display part 2570 is selected. As shown in FIG. 78A, in the member analysis, a member list is displayed by, for example, a Web browser executed on the client terminal 2011 as one Web page on the display of the client terminal 2011.

Here, for example, the member list displays a member list (for example, which includes respective items such as individuals, a base, and a category).

FIG. 78B shows items displayed when the simulation tool which can be selected by the tool display part 2570 is selected. As shown in FIG. 78B, in the simulation tool, the items related to the simulation tool are displayed by, for example, a Web browser executed on the client terminal 2011 as one Web page on the display of the client terminal 2011.

Here, for example, as the items related to the simulation tool, a simulation result for promotion and a simulation result related to the operation are displayed.

Besides, as a display part of the menu screen 2500, there is the system management display part 2580 which is selected to conduct setting or the like for the game information analysis system 2001 according to the present invention. As functions which can be selected by the system management display part 2580, as shown in FIG. 47, there are data management, group management, user management, and access management.

The data management is selected, for example, to conduct setting for game information or the like received from the hall management server 2013, and the group management is selected, for example, to conduct setting for grouping of the client terminal 2011, the analysis server 2012, and the hall management server 2013.

In addition, the user management is selected, for example, to register and manage a user of the client terminal 2011 which receives an analysis result provided from the analysis server 2012. The access management is selected, for example, to conduct setting a range of analysis results or the like which can be referenced, when a registered user references an analysis result by using the client terminal 2011, in accordance with the user and the client terminal 2011.

[Use Case Related to Game Information Analysis System]

Next, with reference to FIG. 79 to FIG. 100, a manner in which a user of a game information analysis system 2001 according to one embodiment of the present invention can uses this game information analysis system 2001 will be described as use cases with respect to supposed users.

Figure 79:
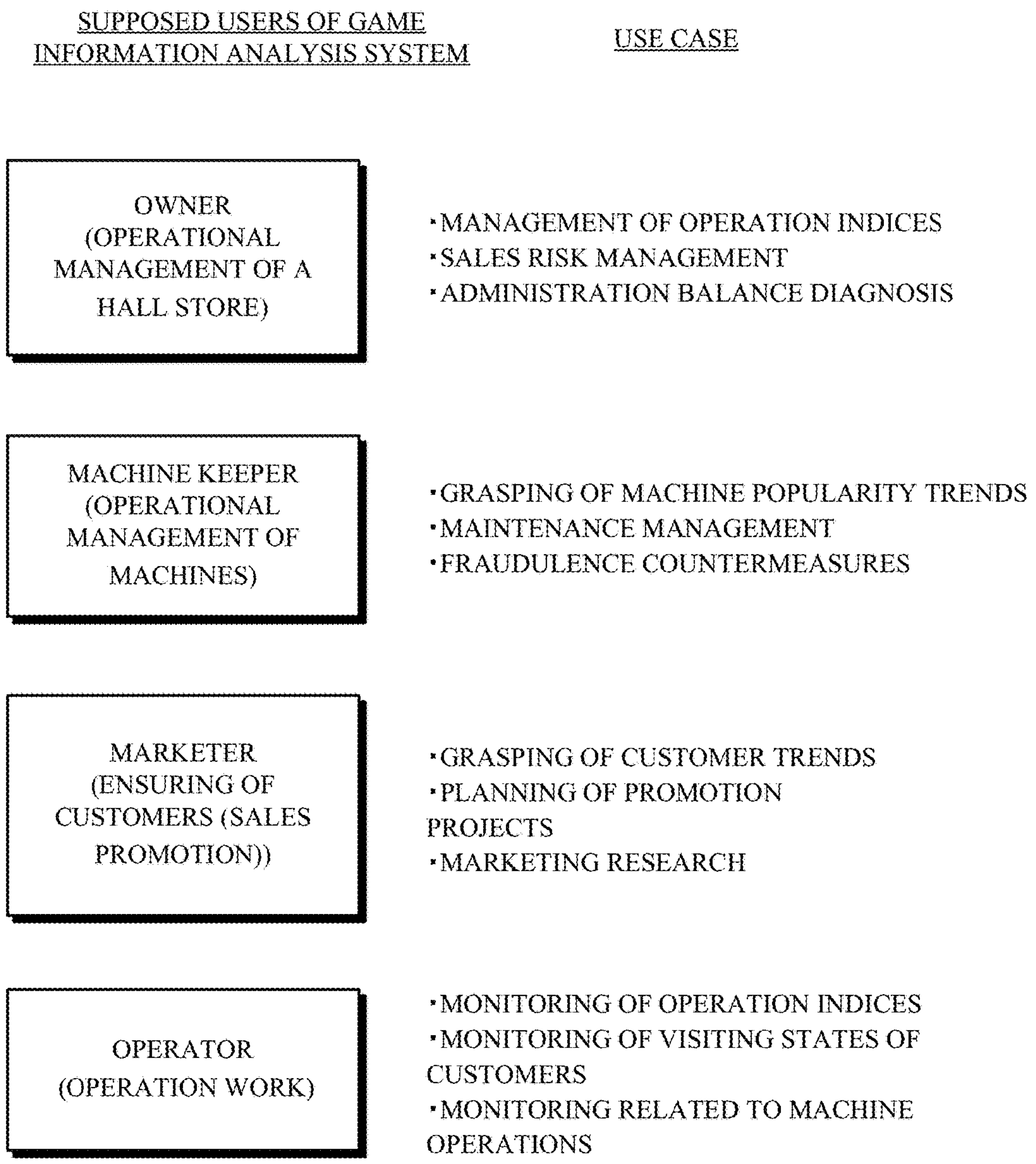
FIG. 79 is a diagram explaining representative use cases of supposed users of the game information analysis system according to the one embodiment of the present invention.

FIG. 79 is a diagram showing the supposed users of the game information analysis system 2001 according to the one embodiment of the present invention and representative use cases of said users. The users who are supposed to use the game information analysis system 2001 are broadly classified into four. A first user is an owner of a hall store. The owner is a person who performs operational management of a hall store. As the use case of the owner, for example, there are management of operation indices of the whole hall store, sales risk management, an administration balance diagnosis, and the like.

A second user is a machine keeper. The machine keeper is a person who undertakes operational management of machines (in this example, slot machines). As the use case of machine keeper, for example, there are grasping of machine popularity trends, machine maintenance management, fraudulent act countermeasures, and the like.

A third user is a marketer. The marketer is a person who ensures customers of a hall store and performs sales promotion. As the use case of the marketer, for example, there are grasping of customer trends, planning of promotion projects, marketing research, and the like.

A fourth user is an operator. The operator is a person who performs operation work for machines and other apparatuses in a hall store. As the use case of the operator, for example, there are, monitoring of operation indices, monitoring of visiting states of customers, monitoring related to machine operation, and the like.

Figure 80:
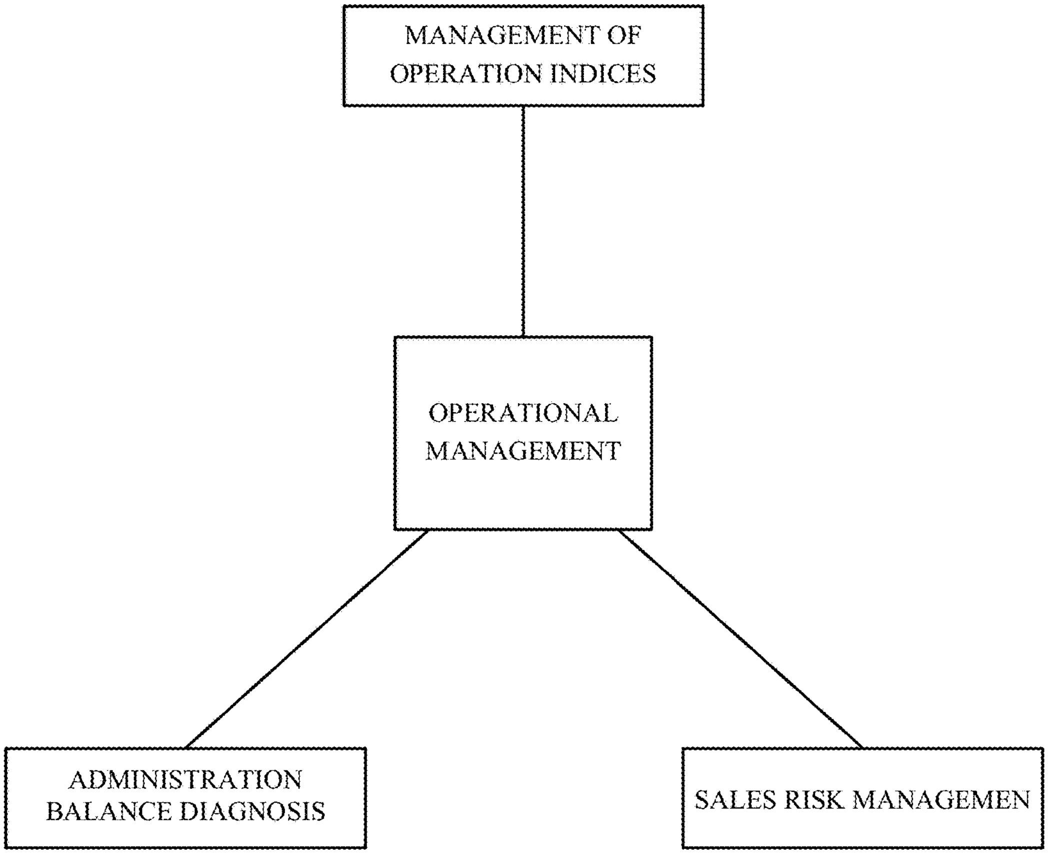
FIG. 80 is a diagram exemplifying relationship of a use case related to an owner in the game information analysis system according to the one embodiment of the present invention.

FIG. 80 is a diagram exemplifying relationship of the use case related to the owner. In the center of the work of the owner, there is the operational management of a hall store, and the operational management includes: individual work of the management of the operation indices; individual work of the sales risk management; and individual work of the administration balance diagnosis, and for each individual work, functions of the game information analysis system 2001 according to the present invention can be effectively utilized.

FIG. 81 is a diagram showing the menu screen 2500 displayed on the display of the client terminal 2011 in the game information analysis system 2001 according to the present invention and showing which functions among the functions of this menu screen 2500 are effectively utilized in the use case related to the owner. As shown in FIG. 81, in the use case related to the owner, the variety of reports included in the outline report displayed by the outline report display part 2510 can be utilized.

In addition, as described with reference to FIG. 80, as the individual work related to the owner, there are the individual work of the management of the operation indices, the individual work of the sales risk management, and the individual work of the administration balance diagnosis. The management of the operation indices includes, for example, confirmation or the like of indices related to sales, operation, and visitors; the sales risk management includes risk management or the like through confirmation of an actual achievement value and a predictive value with respect to a target value; and the administration balance diagnosis includes a balance diagnosis or the like of an administration state from a point of view of customers.

In FIG. 82, shown is the operation summary (daily) which is a part of the report displayed when displaying of the daily operation report displayed by the outline report display part 2510 is instructed (refer to FIG. 49). In the operation summary (daily), with respect to operation related indices such as Winloss, an operation ratio, numbers of sessions, and numbers of members, numerical values of said indices on the actual date, and average values of said indices for a predetermined time period (comparison target time period) are displayed, and further, change ratios (%) indicating to what extent the actual numerical values have changed with respect to the average values are shown. In addition, with respect to the Winloss, a budget on that date and a budget use ratio (%) indicating to what extent that budget has been used are displayed.

Here, when attention is focused on the point that the numerical value of the Winloss has been reduced, as compared to before (the change ratio was −34.95, which is a comparatively large numerical value) and this is regarded as a problematic point, the change ratio of Hold (%) was −30.87 and the change ratio of the number of members was −24.53, and these large changes are considered as the causes. Therefore, as countermeasures, the owner, for example, can review setting of PO and examine a boost in the number of members through promotion. As described above, by the report in the game information analysis system 2001 according to the present invention, a problematic point can be grasped and an improvement measure can be appropriately considered and implemented.

Figure 83:
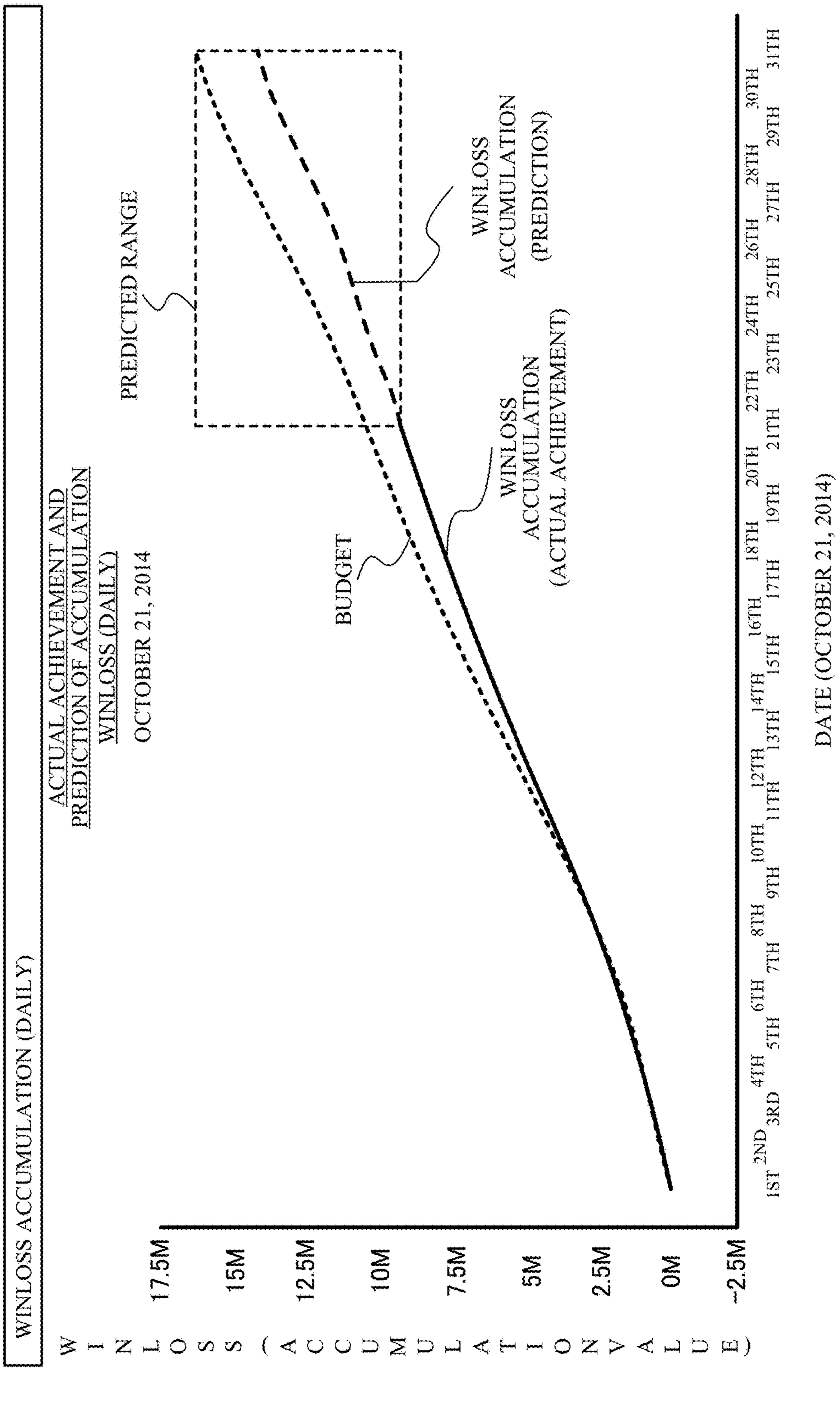
FIG. 83 is a diagram showing a report displayed by the outline report in details in the game information analysis system according to the one embodiment of the present invention.

In FIG. 83, shown is the Winloss accumulation (daily) which is a part of the report displayed when displaying of the daily operation report displayed by the outline report display part 2510 is instructed (refer to FIG. 49). The Winloss accumulation (daily) is shown in a graph whose vertical axis indicates an accumulation value of the Winloss and horizontal axis indicates a date (dates for one month), and an actual achievement value of the Winloss accumulation and a budget are displayed. In addition, the Winloss accumulation after the date of today is displayed as prediction within a predicted range (in FIG. 83, in an area indicated by a rectangle drawn by a dotted line).

Here, it is grasped from the graph shown in FIG. 83 that in a period from the beginning of this month up to the present, the Winloss accumulation has not reached a budget and in addition, also in the days to come (within this month), it is forecasted that the Winloss accumulation does not reach the budget. Therefore, the owner can examine, for example, an improvement measure to increase a number of store visitors and an improvement measure to increase a machine operation ratio. As described above, by the report in the game information analysis system 2001 according to the present invention, target achievement management can be conducted, and a problematic point can be grasped in an early stage and countermeasures in advance are taken, thereby allowing a risk to be avoided.

Figure 84:
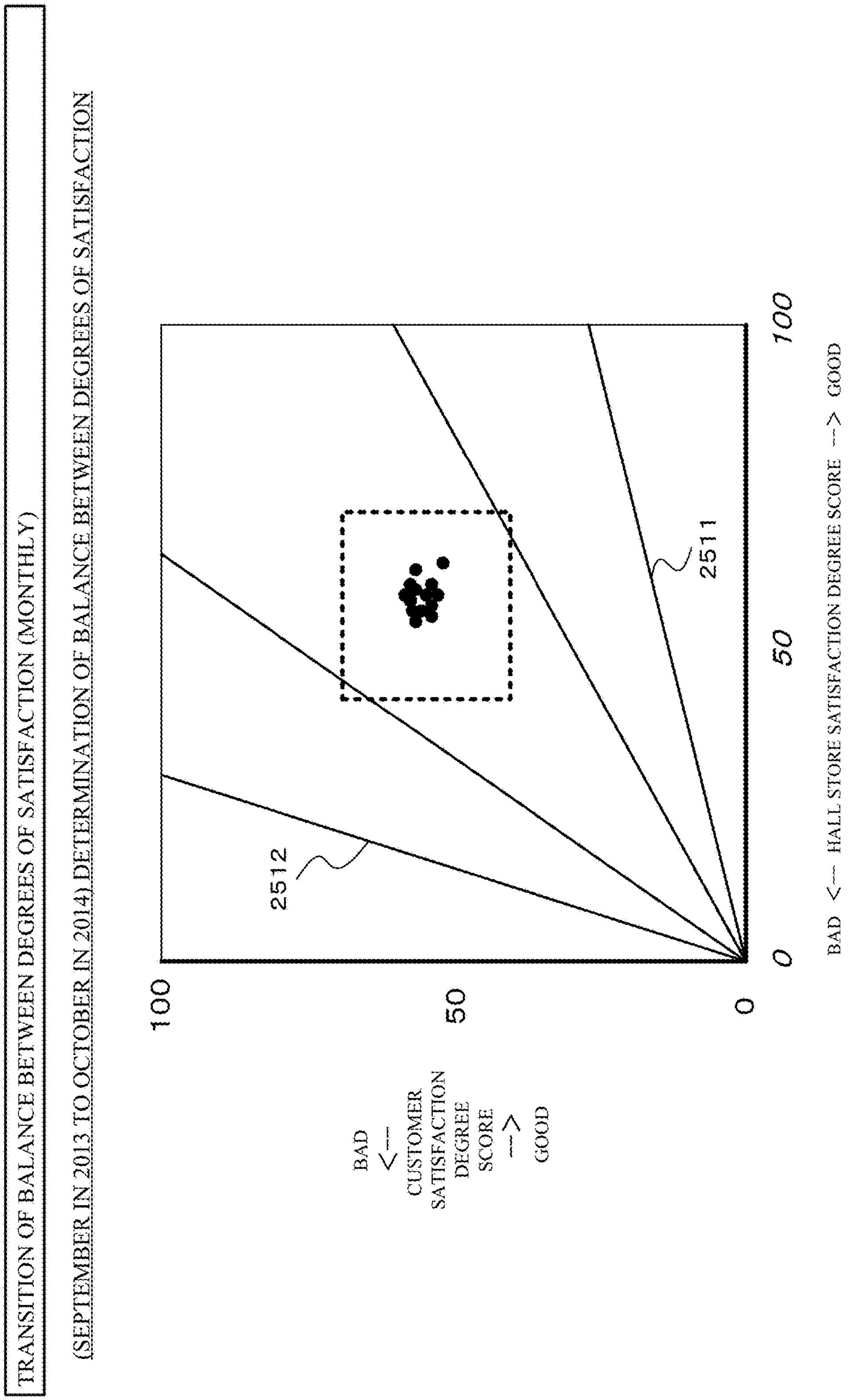
FIG. 84 is a diagram showing a report displayed by the outline report in details in the game information analysis system according to the one embodiment of the present invention.

In FIG. 84, shown is the transition of a balance between degrees of satisfaction (monthly) which is a part of the report displayed when displaying of the monthly diagnosis report displayed by the outline report display part 2510 is instructed (refer to FIG. 53). The transition of a balance between degrees of satisfaction (monthly) is shown in a graph whose vertical axis indicates a customer satisfaction degree score and horizontal axis indicates a hall store satisfaction degree score. In this example, data from September in 2013 to October in 2014 is plotted by months. If there are many plotted points of the respective months in an upper right area, it can be said that the balance between degrees of satisfaction is favorable. Conversely, if there are many plotted points of the respective months in a lower left area, it can be said that the balance between degrees of satisfaction is not favorable.

In addition, if there are many plotted points in the vicinity of a line 2511 extending from an origin of the graph shown in FIG. 84 in a direction closest to the horizontal axis, a degree of satisfaction for a hall store is high and a degree of satisfaction for customers is low, and it cannot be said that a balance between the degrees of satisfaction is favorable. On the other hand, if there are many plotted points in the vicinity of a line 2512 extending from the origin of the graph shown in FIG. 84 in a direction closest to the vertical axis, the degree of satisfaction for a hall store is low and the degree of satisfaction for customers is high, and it cannot be said that the balance between the degrees of satisfaction is favorable.

Here, if in the graph shown in FIG. 84, the balance between the degree of satisfaction of customers and sales is roughly favorable, but the above-described analysis result shown in FIG. 83 is obtained, it is grasped that the Winloss value has not achieved the target. Therefore, the owner can examine, for example, an improvement measure to boost sales with the degree of satisfaction of customers being maintained and an improvement measure to enhance the degree of satisfaction of customers and to boost the sales while conducting return promotion. As described above, by the report in the game information analysis system 2001 according to the present invention, the sales can be continually maintained while the degree of satisfaction of customers is considered, and in addition, administration in which attention is paid to not only a profit but also the degree of satisfaction of customers (return to customers) can be conducted.

Figure 85:
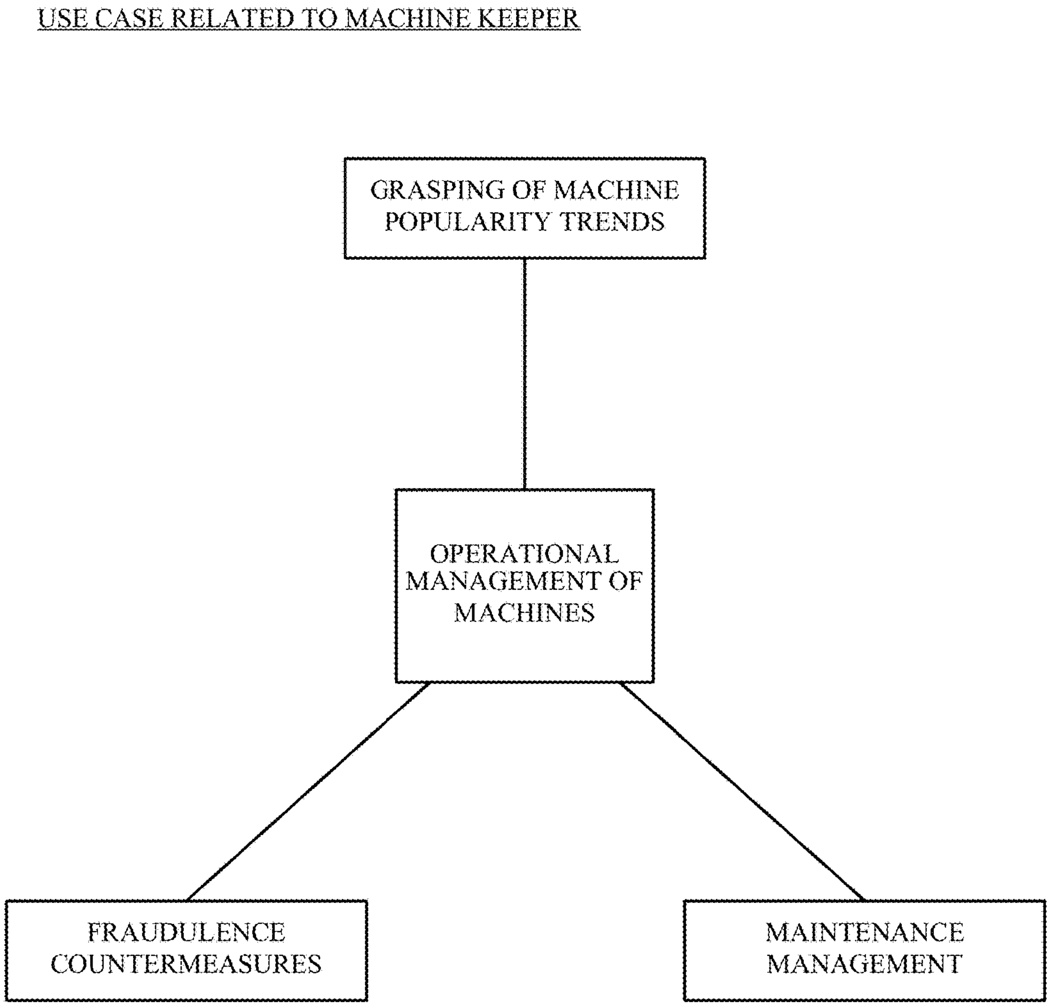
FIG. 85 is a diagram exemplifying relationship of a use case related to a machine keeper in the game information analysis system according to the one embodiment of the present invention.

FIG. 85 is a diagram exemplifying relationship of the use case related to the machine keeper. In the center of the work of the machine keeper, there is the operational management of machines, and the operational management includes: individual work of grasping of machine popularity trends; individual work of maintenance management; and individual work of fraudulent act countermeasures, and for each individual work, functions of the game information analysis system 2001 according to the present invention can be effectively utilized.

Figure 86:
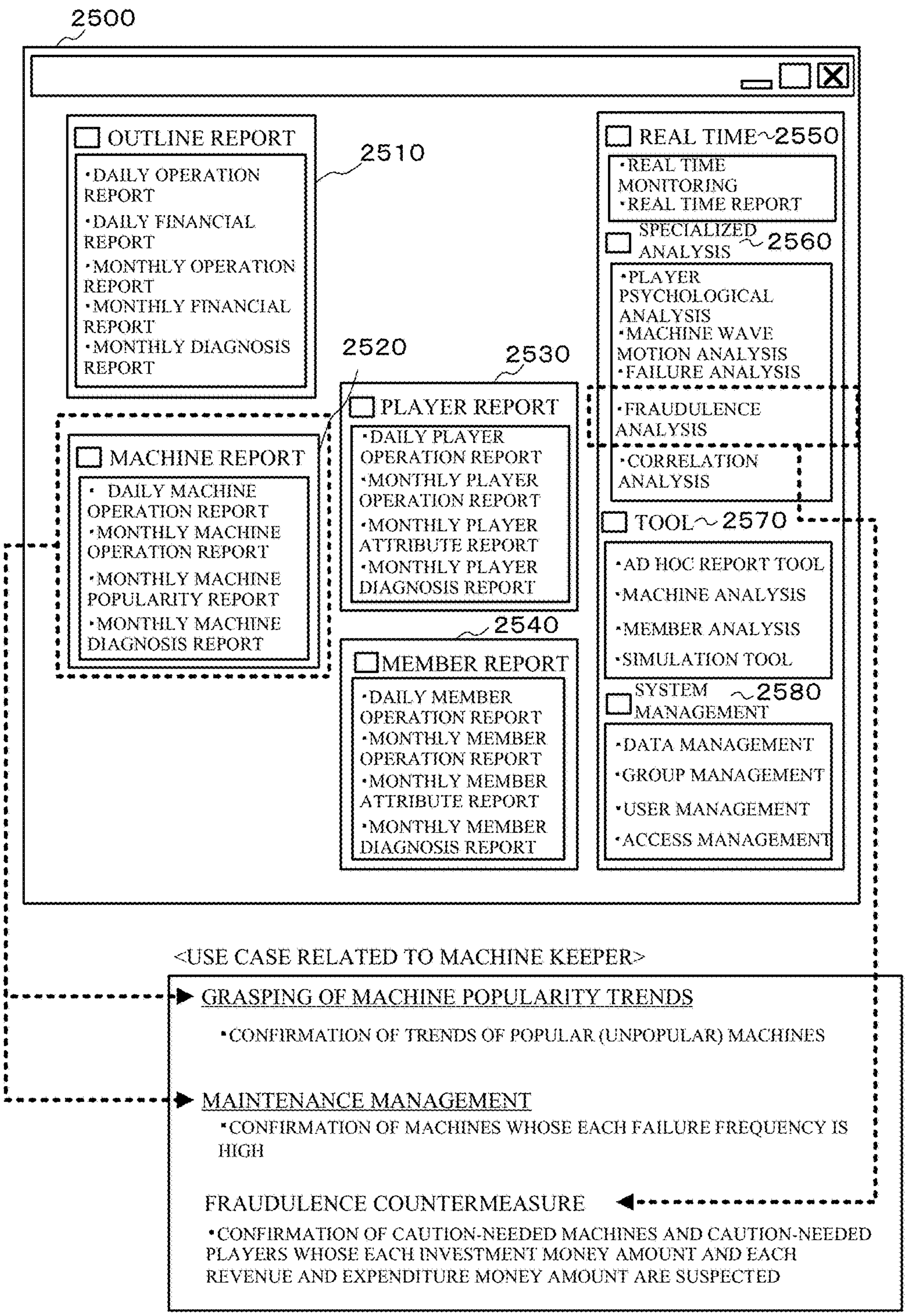
FIG. 86 is a diagram exemplifying the menu screen and the relationship of the use case related to the machine keeper in the game information analysis system according to the one embodiment of the present invention.

FIG. 86 is a diagram showing the menu screen 2500 displayed on the display of the client terminal 2011 in the game information analysis system 2001 according to the present invention and showing which functions among the functions of this menu screen 2500 are effectively utilized in the use case related to the machine keeper. As shown in FIG. 86, in the use case related to the machine keeper, the variety of reports included in the machine report displayed by the machine report display part 2520 and the fraudulent act analysis displayed by the specialized analysis display part 2560 can be utilized.

In addition, as described with reference to FIG. 85, as the individual work related to the machine keeper, there are the individual work of grasping of the machine popularity trends and the individual work of the maintenance management, and the individual work of the fraudulent act countermeasures. The grasping of the machine popularity trends includes, for example, confirmation of trends of popular (unpopular) machines or the like (the above-described machine report is utilized); the maintenance management includes, for example, confirmation of machines whose each failure frequency is high or the like (the above-described machine report is utilized); and the fraudulent act countermeasures include confirmation of caution-needed machines and caution-needed players whose each investment money amount and each revenue and expenditure money amount are suspected or the like (the above-described fraudulent act analysis is utilized).

Figure 87:
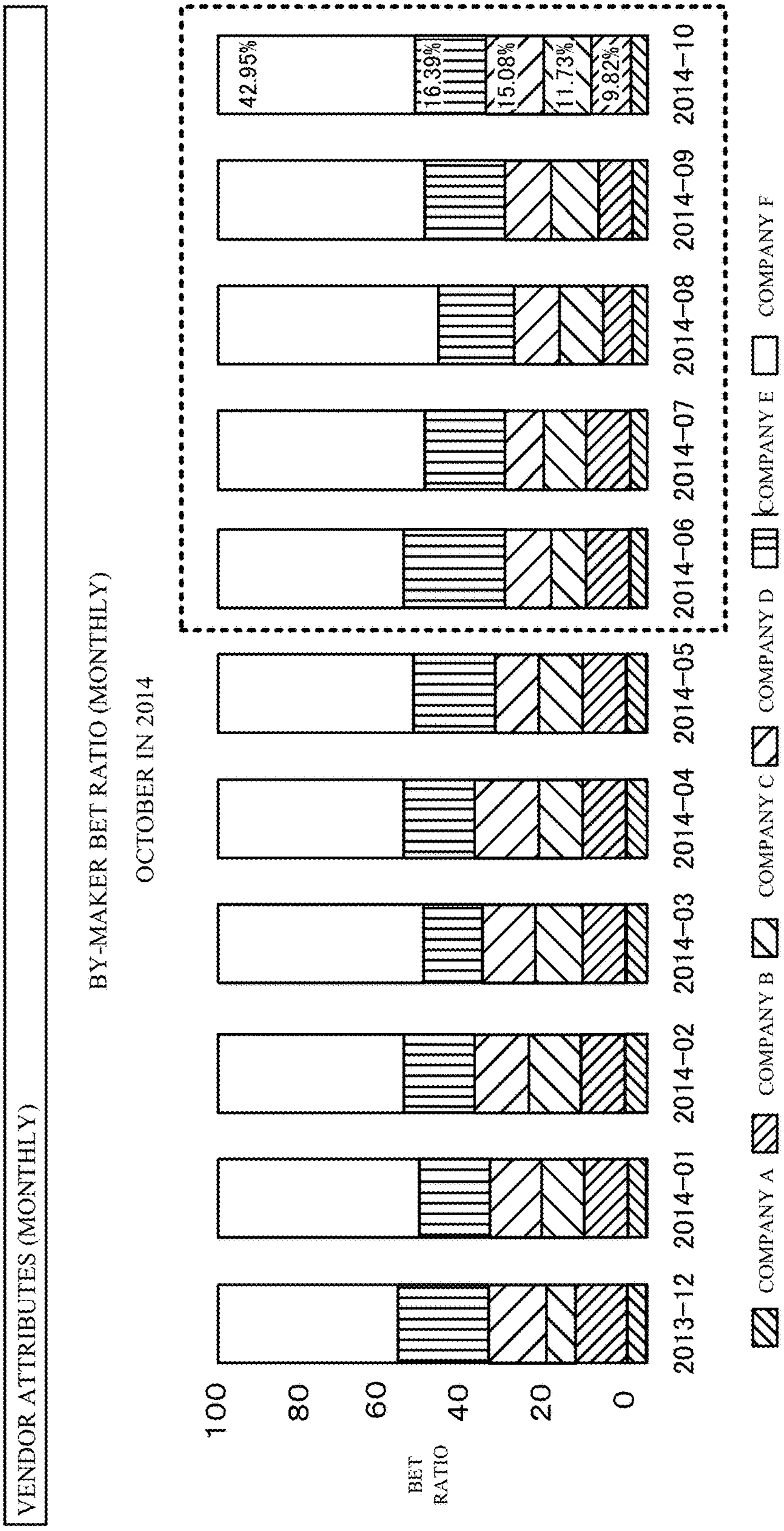
FIG. 87 is a diagram showing a report in details displayed by the machine report in the game information analysis system according to the one embodiment of the present invention.

In FIG. 87, shown is the vendor attributes (monthly) which is a part of the report displayed when displaying of the monthly machine popularity report which is displayed by the machine report display part 2520 is instructed (refer to FIG. 57). The vendor attributes (monthly) show by-maker Bet ratios on a monthly basis which are each shown for each month in a bar graph whose vertical axis indicates a Bet ratio and horizontal axis indicates each month from December in 2013 to October in to 2014.

Here, from the graph shown in FIG. 87, shares in each month classified by makers and viewed from the Bet ratios can be grasped. For example, as shown in a rectangular area drawn by a dotted line, it can be grasped that in said time period, there have been large changes in Bet composition ratios of machines (in this example, slot machines) manufactured by a D company and an E company. In such a case, the machine keeper can review composition of machines introduced in a hall store and can organize events for machines whose each operation ratio is low. As described above, by the report in the game information analysis system 2001 according to the present invention, optimum composition of machines in which the trends of the machine popularity are grasped can be examined, and in addition, follow-up measures for machines whose each popularity has begun to decline and each operation ratio has become low can also be conducted.

In FIG. 88, shown is the stopping time ranking (monthly) which is a part of the report displayed when displaying of the monthly machine operation report which is displayed by the machine report display part 2520 is instructed (refer to FIG. 56). The stopping time ranking (monthly) shows machines whose each stopping time is long individually in a ranking format.

Here, in a graph shown in FIG. 88, it is displayed that a stopping time of a machine (in this example, a slot machine) with a machine ID="0085" is the longest; subsequently thereto, a stopping time of a machine (in this example, a slot machine) with a machine ID="0043" is long; and subsequently thereto, a stopping time of a machine (in this example, a slot machine) with a machine ID="0053" is long, and which machines whose each stopping time has become long by failure can be grasped. In such a case, the machine keeper can examine reinforcement of regular maintenance for reducing the stopping time and can examine an overhaul for machines. As described above, by the report in the game information analysis system 2001 according to the present invention, operation losses caused by machine troubles can be reduced, and operation of machines having little trouble can be realized.

In FIG. 89, shown is the fraudulent act summary which is a part of the report displayed when displaying of the fraudulent act analysis displayed by the specialized analysis display part 2560 is instructed (refer to FIG. 75A). In the fraudulent act summary shown in FIG. 89, statistics of caution-needed sessions and a list of abnormal sessions (caution-needed session list) are displayed.

Here, in the statistics of the caution-needed sessions, among sessions (in each of which a series of games are played by a player), in each of which winning has occurred, each session whose ratio with respect to sales of a hall store has become abnormal is deemed as a caution-needed session, and a number of caution-needed sessions, a total of Bets, and Winloss are displayed. In addition, in the list of the abnormal sessions, sessions which are determined as suspected sessions are listed and displayed. In the list of the sessions, start date and time, termination date and time, identification IDs (session IDs), player IDs, machine IDs, makers, themes, playing time periods (h), totals of Bets, Winloss, and Bet/game are respectively included. In this example, the abnormal sessions in the list are displayed in the descending order of won money amounts (in the ascending order of values of Winloss).

By the above-described report, the machine keeper can efficiently find sessions, in each of which an investment money amount and a revenue and expenditure money amount has become abnormal, and can take improvement measures, for example, to reinforce monitoring of caution-needed machines and caution-needed players. As described above, by the report in the game information analysis system 2001 according to the present invention, the fraudulent act countermeasures can be managed, and losses caused by the fraudulent act can be minimized.

Figure 90:
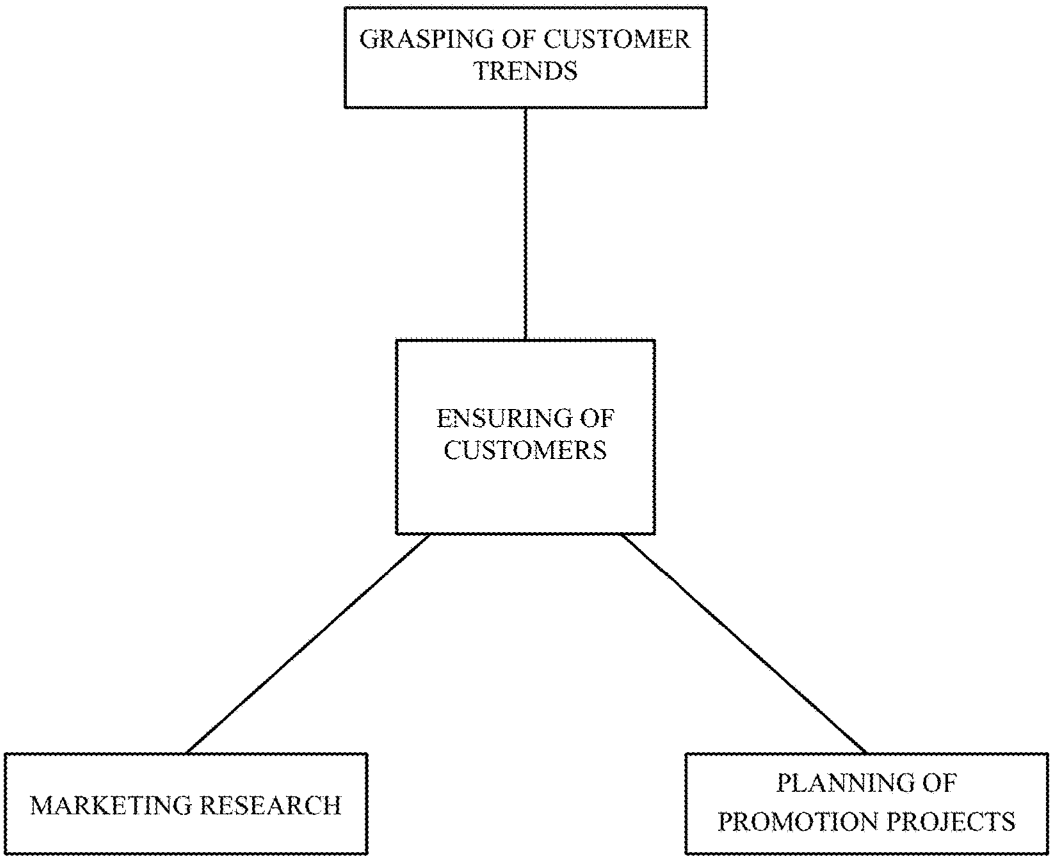
FIG. 90 is a diagram exemplifying relationship of a use case related to a marketer in the game information analysis system according to the one embodiment of the present invention.

FIG. 90 is a diagram exemplifying relationship of the use case related to the marketer. In the center of the work of the marketer, there is ensuring of customers (sales promotion), and the ensuring of customers includes: individual work of grasping of customer trends; individual work of planning of promotion projects, and individual work of marketing research, and for each individual work, functions of the game information analysis system 2001 according to the present invention can be effectively utilized.

Figure 91:
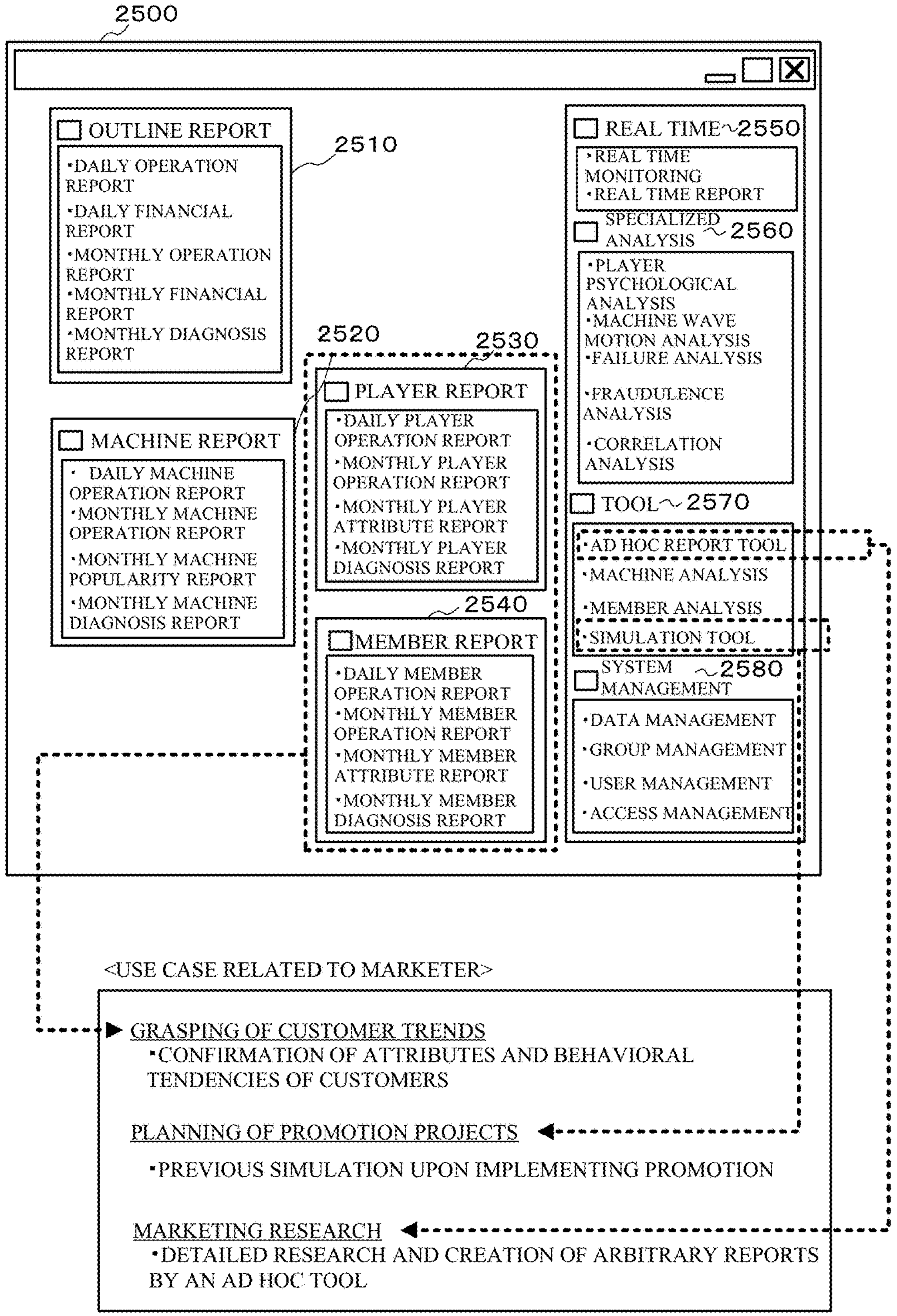
FIG. 91 is a diagram exemplifying the menu screen and the relationship of the use case related to the marketer in the game information analysis system according to the one embodiment of the present invention.

FIG. 91 is a diagram showing the menu screen 2500 displayed on the display of the client terminal 2011 in the game information analysis system 2001 according to the present invention and showing which functions among the functions of this menu screen 2500 are effectively utilized in the use case related to the marketer. As shown in FIG. 91, in the use case related to the marketer, the variety of reports included in the player report displayed by the player report display part 2530, the variety of reports included in the member report displayed by the member report display part 2540, and the ad hoc report tool and the simulation tool displayed by the tool display part 2570 can be utilized.

In addition, as described with reference to FIG. 90, as the individual work related to the marketer, there are the individual work of grasping of customer trends; the individual work of planning of promotion projects; and the individual work of marketing research. The grasping of the customer trend includes confirmation or the like of attributes and behavioral tendencies of customers (the above-described player report and member report are utilized); the planning of promotion projects includes previous simulation or the like upon implementing the promotion (the above-described simulation tool is utilized); and the marketing research includes detailed research and creation of arbitrary reports (the above-described ad hoc report tool is utilized).

Figure 92:
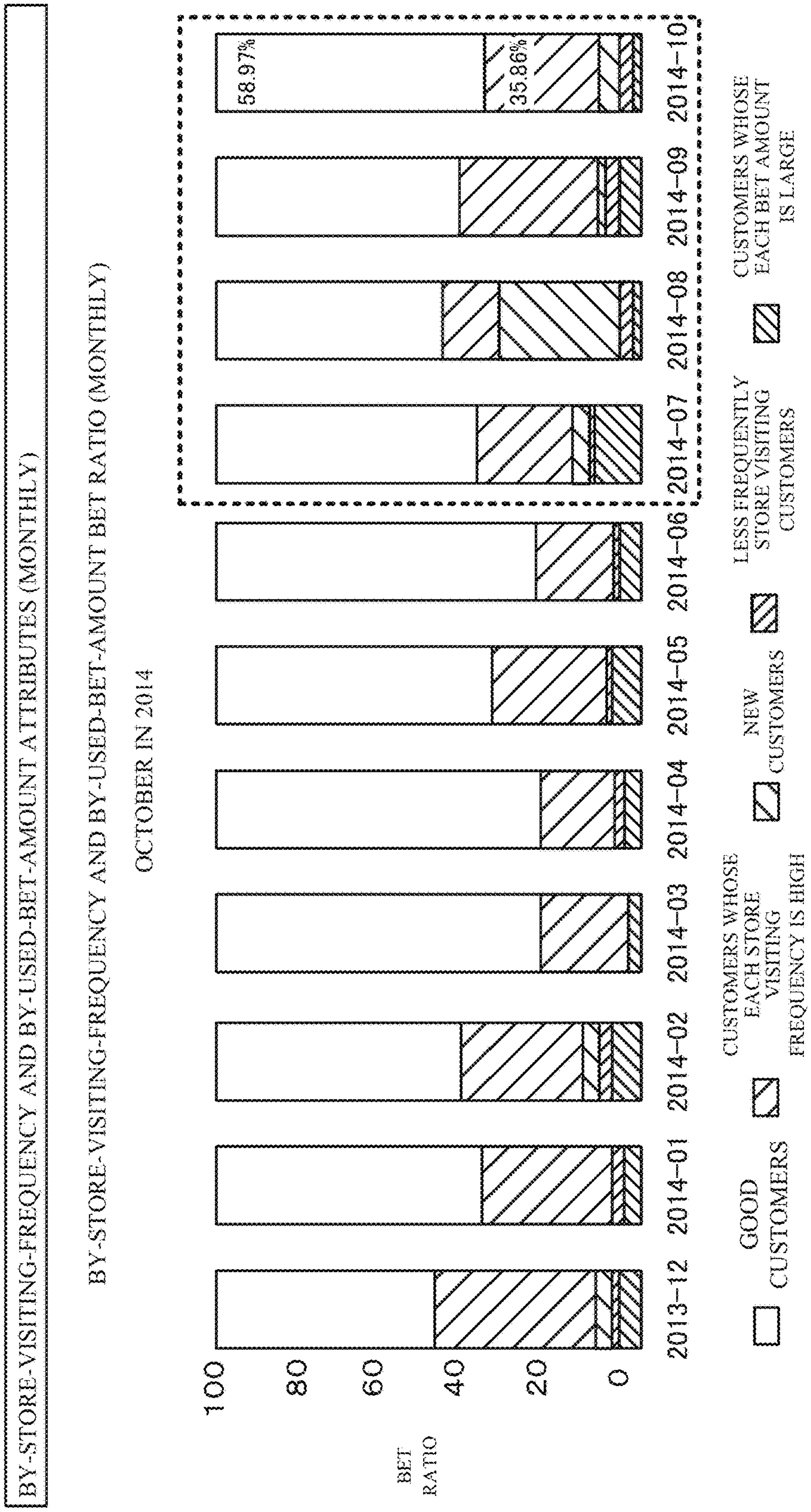
FIG. 92 is a diagram showing a report in details displayed by the member report in the game information analysis system according to the one embodiment of the present invention.

In FIG. 92, shown is the by-store-visiting-frequency and by-bet-amount attributes (monthly) which are a part of the report displayed when displaying of the monthly member attribute report displayed by the member report display part 2540 is instructed (refer to FIG. 67). The by-store-visiting-frequency and by-bet-amount attributes (monthly) shown in FIG. 92 show by-customer-type Bet ratios on a monthly basis, classification of the customer types including classification by store-visiting frequencies of customers, and are shown in a bar graph whose vertical axis indicates a Bet ratio and horizontal axis indicates each month from December in 2013 to October to 2014.

Here, by the graph shown in FIG. 92, by-customer-type shares viewed from the Bet ratios in each month can be grasped. For example, as shown in a rectangular area drawn by a dotted line, it can be grasped that in said time period, there have been large changes in Bet composition ratios of customers whose store-visiting frequencies are low and of customers whose bet amounts are large. In addition, a decrease in a Bet ratio of good customers is also deemed as a problem. In such a case, for example, the marketer can examine implementation of a point provision service as a measure to make customers, whose visiting frequencies are high, good customers, and can examine measures to conduct exploitation of good customers from new members. As described above, by the report in the game information analysis system 2001 according to the present invention, actions toward target customers whose customer trends are grasped can be examined and implemented.

Figure 93:
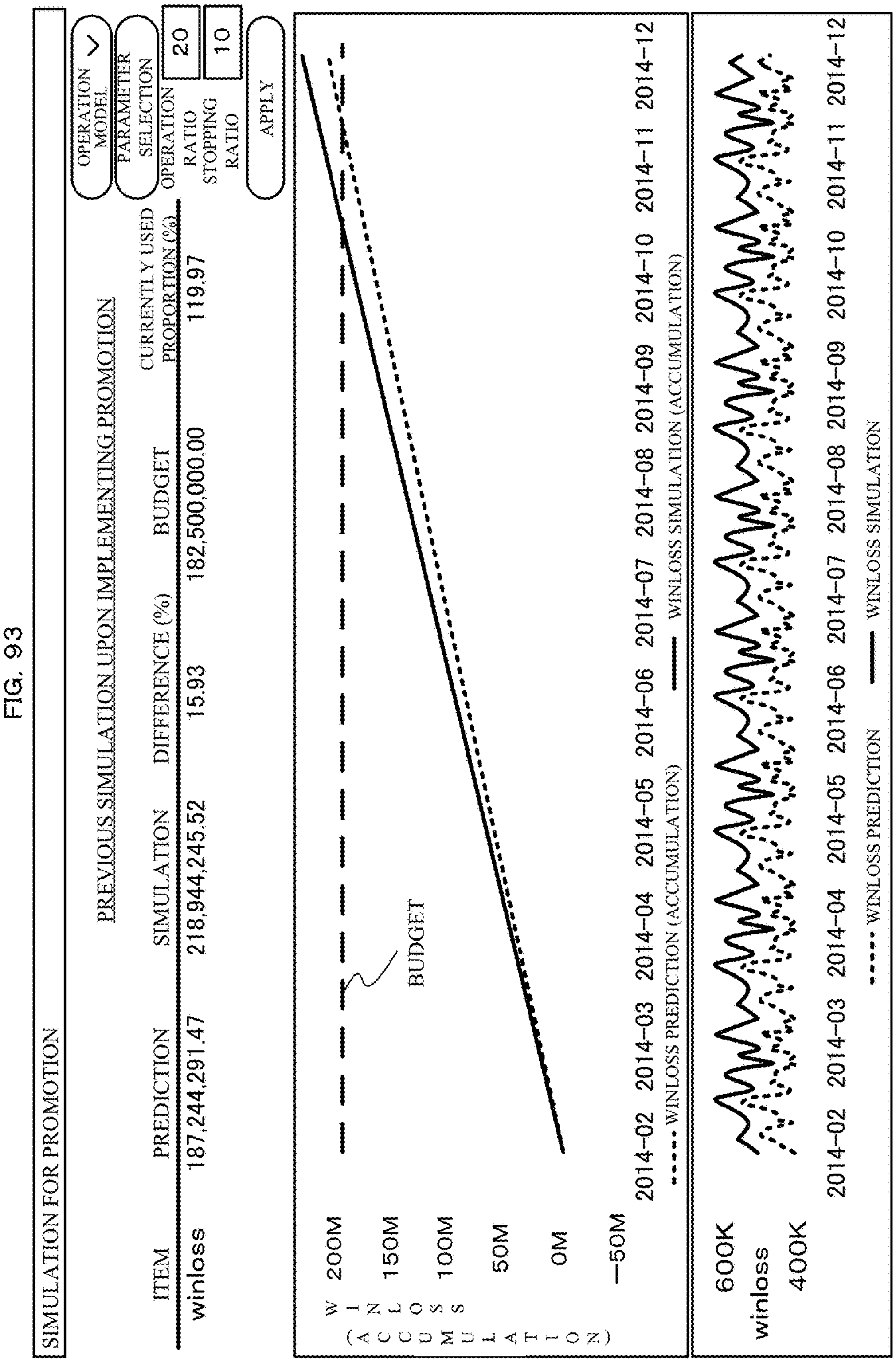
FIG. 93 is a diagram showing a report in details displayed by the tool in the game information analysis system according to the one embodiment of the present invention.

In FIG. 93, shown is the simulation result (simulation for promotion) which is a part of the report displayed when displaying of the simulation tool displayed by the tool display part 2570 is instructed (refer to FIG. 78B). The simulation for promotion shown in FIG. 93 displays a predicted amount related to Winloss, a simulation amount, a difference (%) between the predicted amount and the simulation amount, a budget, and a currently used proportion (%) of the budget as well as two graphs.

The first graph indicates Winloss prediction (accumulation) and Winloss simulation (accumulation) with respect to a budget of Winloss, with a vertical axis indicating a Winloss (accumulation) amount and a horizontal axis indicating each month of February in 2014 to December in 2014 and is a graph which indicates transition of the Winloss prediction (accumulation) and the Winloss simulation (accumulation) over the passage of time.

The second graph indicates time series transition of the Winloss prediction (accumulation) and the Winloss simulation (accumulation), with a vertical axis indicating a Winloss amount and a horizontal axis indicating each month of February in 2014 to December in to 2014 and is a graph which indicates the transition of the Winloss prediction (accumulation) and the Winloss simulation (accumulation) over the passage of time.

In addition, in the first graph and the second graph, an operation model and machine operation ratio & stopping ratio can be set (refer to a setting area in a right upper portion of FIG. 93).

The marketer has a need that when the marketer wants to implement the promotion, the marketer want to previously grasp specific numerical values and effect. Therefore, by using the simulation tool shown in FIG. 92, simulation related to a promotion cost and its effect is conducted, and more specific numerical values and effect can be previously grasped. As described above, by the report in the game information analysis system 2001 according to the present invention, promotion projects utilizing the past actual achievement can be planned, and in addition, optimization related to costs and promotion targets can also be made.

Figure 94:
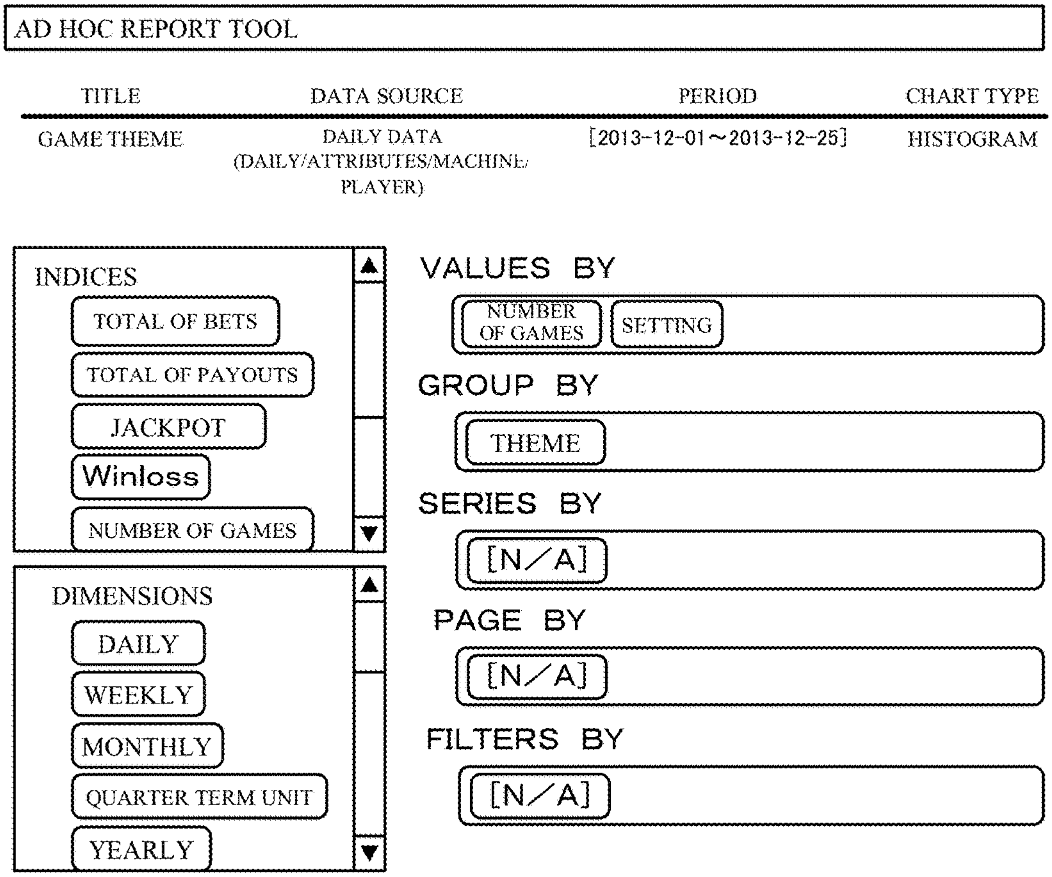
FIG. 94 is a diagram showing a report in details displayed by the tool in the game information analysis system according to the one embodiment of the present invention.

In FIG. 94, shown is the ad hoc report tool which is a report output instruction screen displayed when displaying of the ad hoc report tool displayed by the tool display part 2570 is instructed (refer to FIG. 77A). In the ad hoc report tool shown in FIG. 94, on a left side, an index area in which indices are displayed and a dimension area in which dimensions are displayed. As the indices, there are a total of Bets, a total of payouts, a jackpot, Winloss, numbers of games, and the like. As the dimensions, there are a daily dimension, a weekly dimension, a monthly dimension, a quarter term dimension, a yearly dimension, and the like.

In addition, on a right side in FIG. 94, there is an area where a display form of the report is specified. Displayed therein are a section where values (VALUE) indicating targets to be displayed and counted are specified; a section where a group (GROUP) indicating a unit of grouping is specified; a section where series (SERIES) indicating values with which displaying orders are sorted; a section where pages (PAGE) indicating a unit for repagination are specified; and a section where a filter (FILTER) indicating a unit for filtering is specified. Further, in the respective input sections, icons which allow detailed setting or the like related to displaying can be added.

In an example shown in FIG. 94, in the section of the values (VALUE), "numbers of games" are specified from the index area and a summary related to the numbers of games is displayed, and a "setting" icon which is set so as to display frequencies, with the numbers of games being sectioned by 90,000 increments, is specified. In the section of the group (GROUP), themes are specified from the index area. In the other sections, no specification is made.

Figure 95:
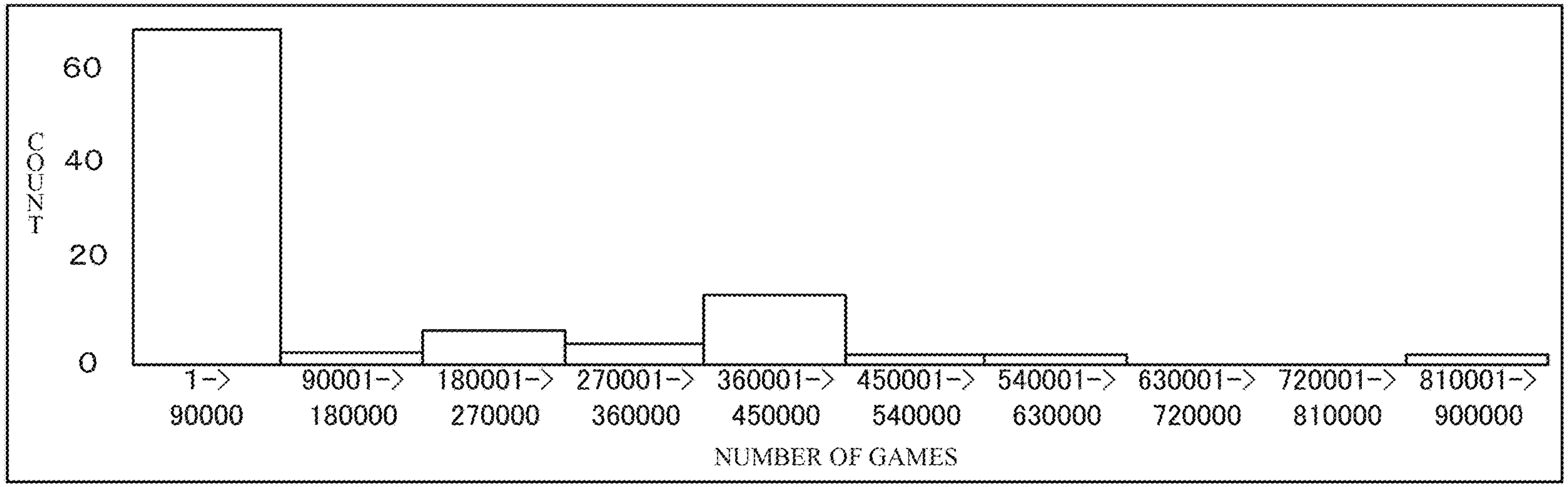
FIG. 95 is a diagram showing a report in details displayed by the tool in the game information analysis system according to the one embodiment of the present invention.

As a result, as shown in FIG. 95, the summary of the numbers of games is display in an upper row; a histogram related to counts (frequencies) for each number of games is displayed in a middle row; and each number of games for each theme is displayed in a lower row.

In the summary displayed in the upper row in FIG. 95, a total of the numbers of games (SUM), an average (AVG), a minimum number of games (MIN) (in one session), a maximum number of games (MAX) (in one session), and a standard deviation (STD) are shown.

In the middle row in FIG. 95, the counts (frequencies) for each number of games (in one session) are represented as the histogram. For example, a number of cases, in each of which the number of games was 1 to 90,000 games, and a number of cases, in each of which the number of games was 90,001 to 180,000 games, and the like are displayed in the histogram in accordance with the counts indicated on the vertical axis, respectively.

In the lower row in FIG. 95, each number of games for each theme is shown. For example, displaying is conducted such that a number of games of a theme="A1" was 13,174, and a number of games of a theme="A2" was 28,746.

By the reports shown in the above-described FIG. 94 and FIG. 95, the information and the attributes of machines and customers can be analyzed in a diversified manner. As described above, by the reports in the game information analysis system 2001 according to the present invention, it is made possible to create the reports customized by the marketer. In addition, the analysis tool including the indices which are unique to the game information analysis system can be provided.

In addition, there is a case where the marketer wants to grasp the attributes and the features of machines and customers so as to be classified by money amounts, operations, and categories. By the reports by the ad hoc report tool shown in the above-described FIG. 94 and FIG. 95, distribution of the totalization data can be confirmed, and in addition, money amounts and categories which are effective upon the promotion can be grasped.

Figure 96:
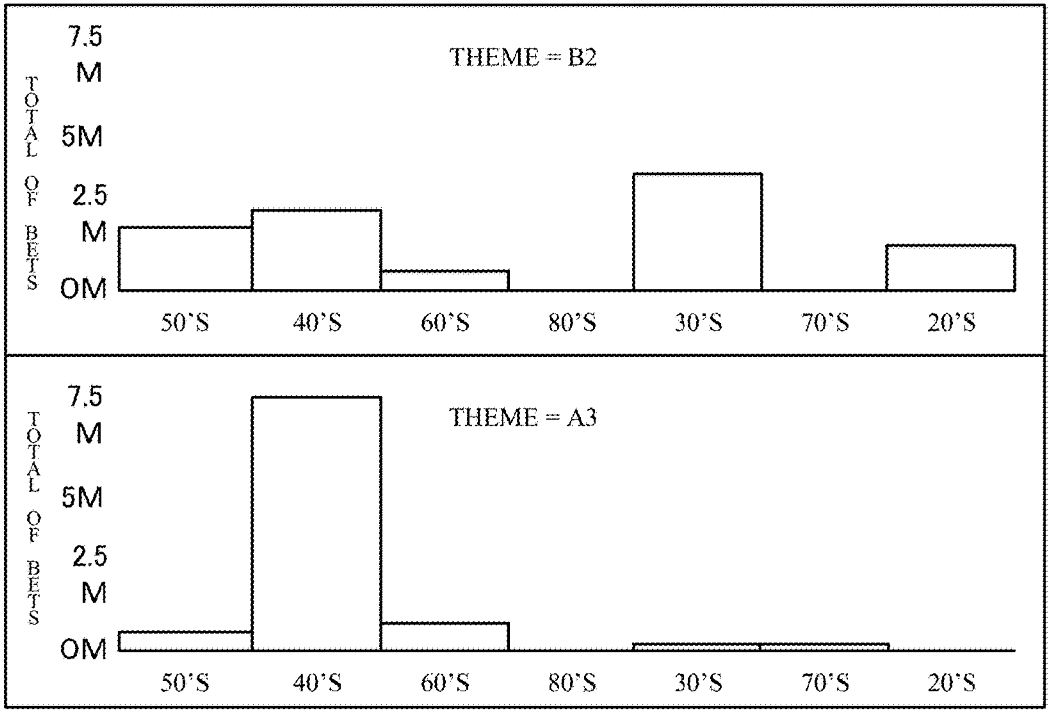
FIG. 96 is a diagram showing a report in details displayed by the tool in the game information analysis system according to the one embodiment of the present invention.

FIG. 96 is a diagram showing popularity degrees (bet amounts) classified by themes and ages, displayed by the ad hoc report tool.

In an upper row in FIG. 96, a summary is displayed, and herein, a total of bet amounts (SUM), an average amount (AVG), a minimum amount (MIN), a maximum amount (MAX), and a standard deviation (STD) are shown.

In a middle row in FIG. 96, shown is a bar graph in which each by-age bet amount total on machines (in this example, slot machines) with a theme="B2" is displayed. In addition, in a lower row in FIG. 96, shown is a bar graph in which each by-age bet amount total on machines (in this example, slot machines) with a theme="A3" is displayed.

There is a case where the marketer wants to analyze popularity of machines in details. By the report by the ad hoc report tool shown in the above-described FIG. 96, the popularity of machines can be grasped in details, and in addition, a customer feature analysis of each of the popular machines can be conducted. For example, with reference to FIG. 96, it is seen that the machine with the theme="B2" is popular among customers in their thirties, and with the customers in their thirties being in the center, the machine with the theme="B2" is popular among customers in their twenties, forties, and fifties to some extent. In addition, it is seen that the machine with the theme="A3" is popular overwhelmingly among customers in their forties, and the machine with the theme="A3" is hardly popular among the customers at the other ages.

FIG. 97 is a diagram showing operation days of the week classified by member types, displayed by the ad hoc report tool.

In an upper row in FIG. 97, a summary is displayed, and herein, a total of bet amounts (SUM), an average amount (AVG), a minimum amount (MIN), a maximum amount (MAX), and a standard deviation (STD) are shown.

In a middle row in FIG. 97, shown is a bar graph in which used bet amounts of members whose member type is "important", classified by days of the week (operation days or store visiting days), are displayed. In addition, in a lower row in FIG. 97, shown is a bar graph in which used bet amounts of members whose member type is "new", classified by days of the week (operation days or store visiting days), are displayed.

There is a case where the marketer wants to grasp operation trends classified by member types. By the report by the ad hoc report tool shown in the above-described FIG. 97, the operation trends of the members can be grasped, and in addition, it is made possible to conduct planning of promotion projects based on the member trends. For example, with reference to FIG. 97, it is seen that the members whose member type is "important" have a tendency that the operation on Wednesday is sluggish. In addition, it is seen that the members whose member type is "new" have a tendency that the operation on Friday is sluggish.

Figure 98:
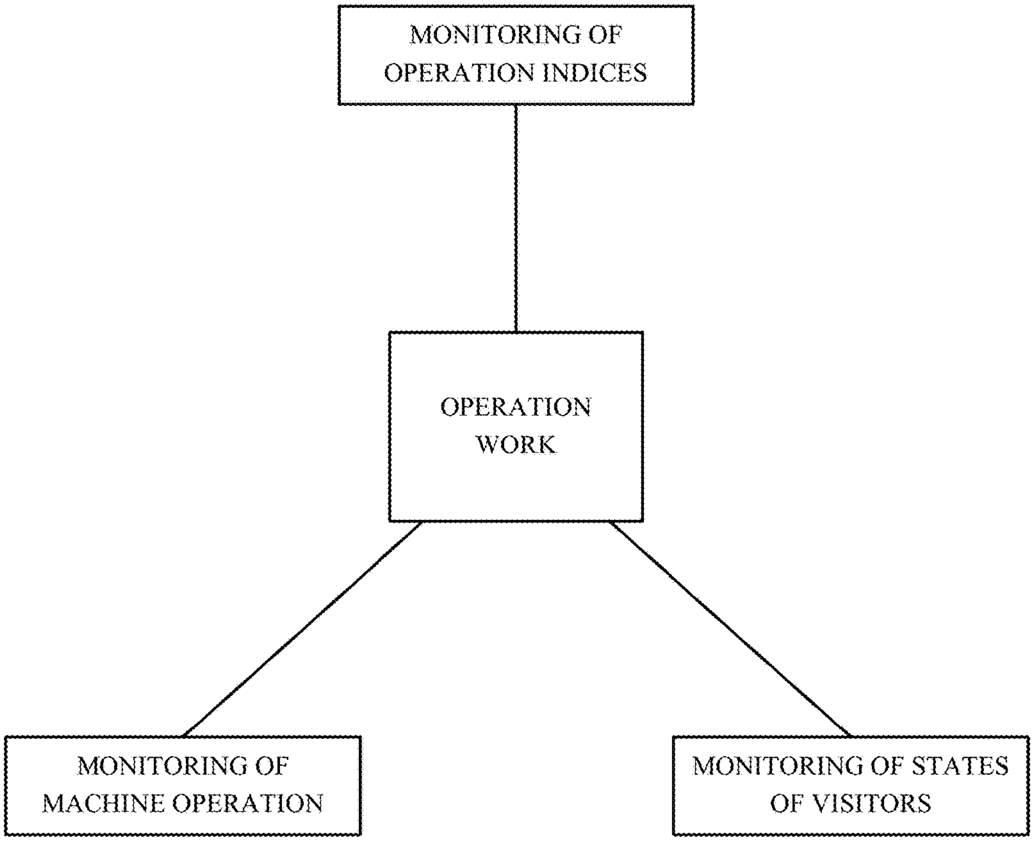
FIG. 98 is a diagram exemplifying relationship related to the use case of an operator in the game information analysis system according to the one embodiment of the present invention.

FIG. 98 is a diagram exemplifying relationship related to the use case of the operator. In the center of the work of the operator, there is operation work, and the operation work includes: individual work of monitoring of operation indices; individual work of monitoring of states of visitors; and individual work of monitoring of machine operation, and for each individual work, functions of the game information analysis system 2001 according to the present invention can be effectively utilized.

Figure 99:
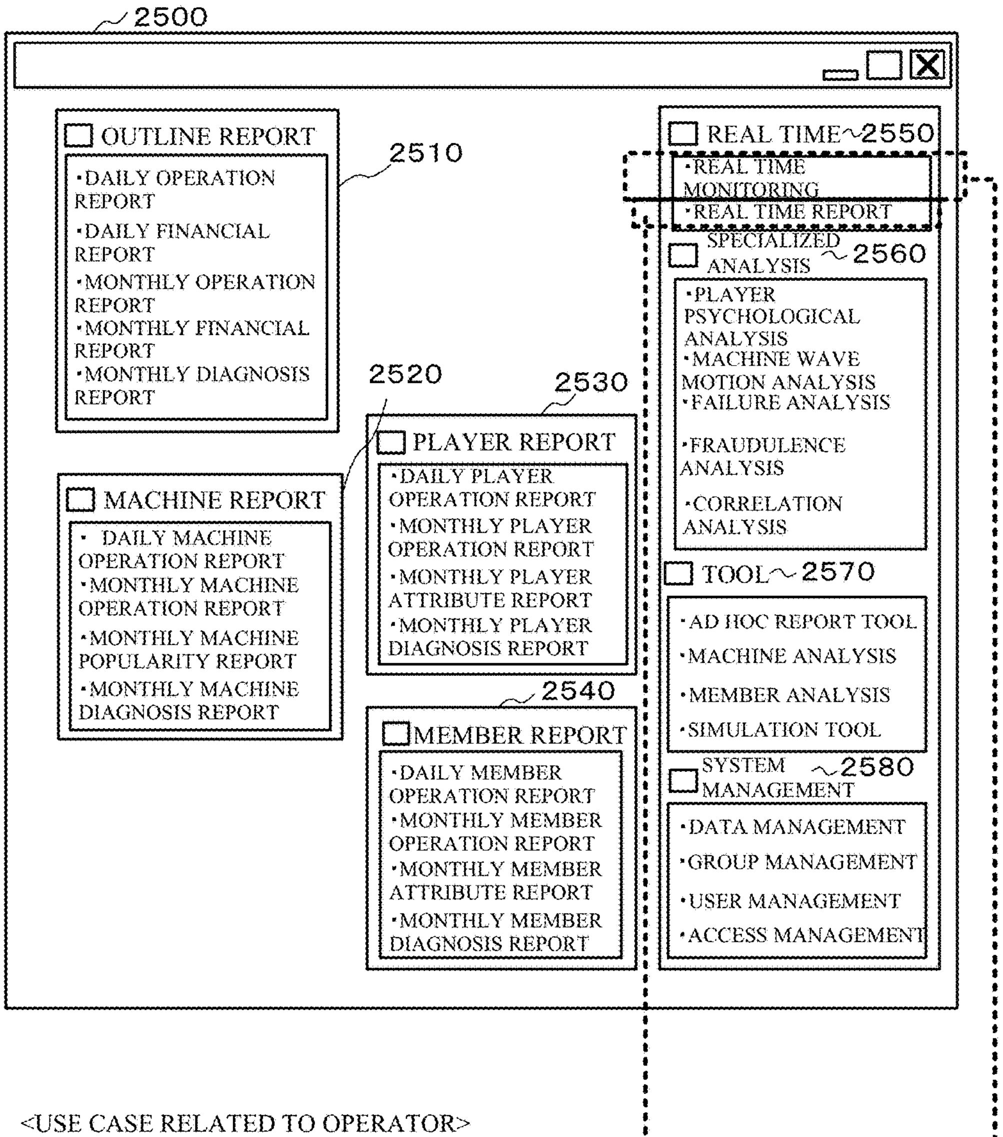
FIG. 99 is a diagram exemplifying the menu screen and the relationship of the use case related to the operator in the game information analysis system according to the one embodiment of the present invention.

FIG. 99 is a diagram showing the menu screen 2500 displayed on the display of the client terminal 2011 in the game information analysis system 2001 according to the present invention and showing which functions among the functions of this menu screen 2500 are effectively utilized in the use case related to the operator. As shown in FIG. 99, in the use case related to the operator, the real time monitoring and the real time report displayed by the real time display part 2550.

In addition, as described with reference to FIG. 98, as the individual work related to the operator, there are the individual work of monitoring of operation indices, the individual work of monitoring of states of visitors, and the individual work of monitoring of machine operation. The monitoring of the operation indices includes confirmation or the like of sales and states of visitors (the above-described real time report is utilized); the monitoring of the states of visitors includes confirmation or the like of players playing games on a floor map (the above-described real time monitoring is utilized); and the monitoring of machine operation includes confirmation or the like of malfunctioning machines on the floor map (the above-described real time monitoring is utilized).

Figure 100:
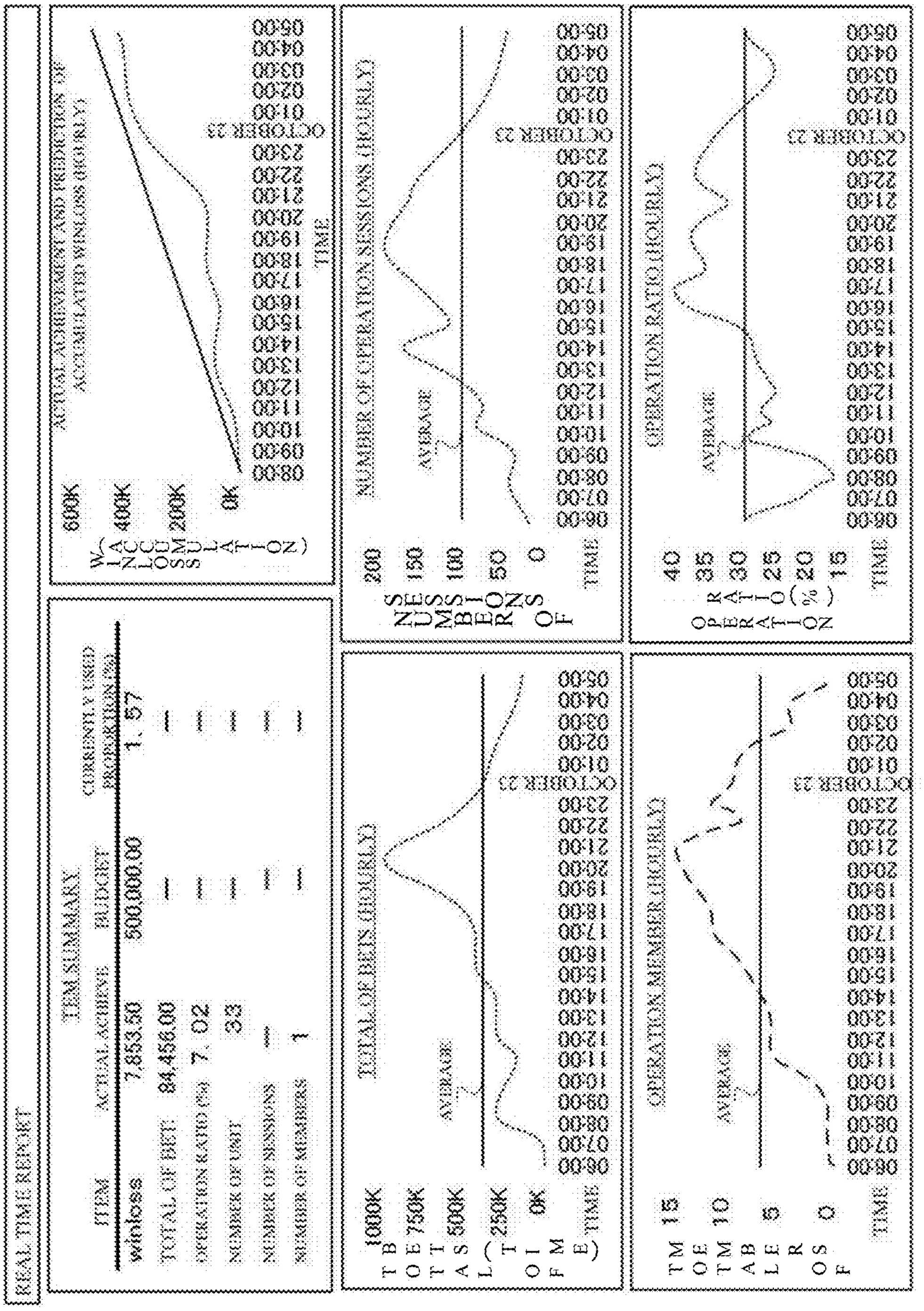
FIG. 100 is a diagram showing reports displayed by real time in details in the game information analysis system according to the one embodiment of the present invention.

In FIG. 100, shown are a summary and graphs which are a part of the report displayed when displaying of the real time report displayed by the real time display part 2550 is instructed (refer to FIG. 71). In the real time report shown in FIG. 100, one summary and five graphs are displayed. The summary shown on a left side in an upper row is an item summary, and herein, with respect to Winloss, a total of Bets, an operation ratio (%), a number of units (number of machines), a number of sessions, and a number of members, actual achievement in real time are displayed. As for the Winloss, in addition thereto, a budget and a currently used proportion (%) of the budget are displayed.

The graph shown on a right side in an upper row in FIG. 100 displays transition of actual achievement of accumulated Winloss up to the present time over the passage of time. Prediction is also displayed together with the actual achievement of the accumulated Winloss over the passage of time.

The graph shown on a left side in a middle row in FIG. 100 displays transition of the total of Bets up to the present time over the passage of time. In addition, the graph shown on a right side in the middle row in FIG. 100 displays transition of the number of operation sessions up to the present time over the passage of time. It is to be noted that in each of these graphs, a straight line indicating an average is also concurrently displayed.

The graph shown on a left side in a lower row in FIG. 100 displays transition of the number of operation members up to the present time over the passage of time. In addition, the graph shown on a right side in the lower row in FIG. 100 displays transition of the operation ratio up to the present time over the passage of time. It is to be noted that in each of these graphs, a straight line indicating an average is also concurrently displayed.

By the real time report shown in the above-described FIG. 100, the transition of the sales and the machine operation, classified by visiting time zones, can be confirmed. As described above, by the report in the game information analysis system 2001 according to the present invention, the operator can confirm the operation states in the daytime and optimize service work. In addition, by controlling an increase and a decrease in the number of working staff so as to be classified by the time zones, efficient personnel allocation can be conducted.

[Menu Configuration and Indices in Game Information Analysis System]

Next, with reference to FIG. 101 to FIG. 120, a configuration of a menu screen, indices, and categories which a game information analysis system 2001 according to the one embodiment of the present invention provides and utilizes will be described.

FIG. 101 is a table organized as a list of reports related to basic functions provided by the menu screen 2500 shown in FIG. 46. The basic functions include: an outline report, a machine report, a player report, and a member report. The outline report provides an analysis report targeted for the whole hall store and includes a daily operation report, a daily financial report, a monthly operation report, a monthly financial report, and a monthly diagnosis report. The machine report provides an analysis report targeted for machines (in this example, slot machines) and includes a daily machine operation report, a monthly machine operation report, a monthly machine popularity report, and a monthly machine diagnosis report.

The player report provides an analysis report targeted for the whole players and includes a daily player operation report, a monthly player operation report, a monthly player attribute report, and a monthly player diagnosis report. The member report provides an analysis report targeted for members and includes a daily member operation report, a monthly member operation report, a monthly member attribute report, and a monthly member diagnosis report.

FIG. 102 is a table organized as a list of reports and functions, and the like related to an accessory function provided by the menu screen 2500 show in FIG. 47. As the accessory functions, there are real time, a specialized analysis, tool, and system management. The function of the real time is to grasp states of a hall store on that day in real time and includes real time monitoring and real time report. The specialized analysis provides highly specialized analyses classified by objectives and includes a player psychological analysis, a machine wave motion analysis, a failure analysis, a fraudulent act analysis, and a correlation analysis.

The tool is an analysis tool used by a user himself or herself and includes an ad hoc report tool, a machine list, a member list, and a simulation tool. The system management provides a function related to system operational management and includes data management, group management, user management, and access management.

FIG. 103 is a table organized as a list explaining basic indices provided by the game information analysis system 2001 according to the present invention, together with obtainment and totalization methods. An input money amount (IN) shows a money amount inputted by a player. A paid-out money amount (OUT) shows a money amount paid out by a slot machine. A jackpot money amount (JP) shows a jackpot money amount paid out by a slot machine. A play sales money amount (Winloss) shows a sales money amount based on a difference between the input money amount and the paid-out money amount. A number of games (Games) shows a number of games played on a slot machine. A playing time period shows a time period from game start to game termination on a slot machine. A number of sessions shows a unit of a series of games played by a player, which is constituted of a plurality of games.

The input money amount, the paid-out money amount, the jackpot money amount, and the number of games are data obtained from a hall management server (data transmitted from a slot machine). The play sales money amount, the playing time period, and the number of sessions are pieces of information calculated from the data or the like obtained from the hall management server. In addition, the number of games may be calculated from the data or the like obtained from the hall management server.

FIG. 104 is a table organized as a list explaining machine basic indices provided by the game information analysis system 2001 according to the present invention, together with obtainment and totalization methods. As the machine basic indices, there are, for example, an operation ratio, stopping time, failure time, hand pay time, other stopping time, number of operation days/machine, a number of machines (registered number), actually measured POs, an average Bet per game, a number of times of a failure event, a number of times of a non-failure event, and a Hold ratio (Hold (%)).

For example, the operation ratio is an operation ratio of each of the machines (in this example, slot machines) and is calculated based on a playing time period/business hours. The stopping time is a service stopping time other than the failure topping time. The failure time is service stopping time by a failure of a machine. The actually measured PO is a PO ratio in a time period or a game section and is obtained by an expression (OUT+IN)/IN×100. The Hold ratio is obtained by an expression (1−(OUT+JP)/IN)×100.

FIG. 105 is a table organized as a list explaining player basic indices provided by the game information analysis system 2001 according to the present invention, together with obtainment and totalization methods. As the player basic indices, there are, for example, a number of members, a number of times of store visiting, intervals of store visiting, a number of days elapsed from the latest store visiting day, a number of store visiting members, a member ratio (%), and a customer satisfaction degree score.

FIG. 106 is a table organized as a list explaining balance determination indices (1) provided by the game information analysis system 2001 according to the present invention, together with evaluation determination, determination threshold values, and a totalization method and remarks. As the balance determination indices (1), there are, for example, satisfaction degree ranks, a balance between degrees of satisfaction, a hall store satisfaction degree score, and a customer satisfaction degree score.

Each of FIG. 107 and FIG. 108 is a table organized as a list explaining balance determination indices (2) provided by the game information analysis system 2001 according to the present invention, together with evaluation determination, determination threshold values, and a totalization method and remarks. As the balance determination indices (2), there are, for example, a shape psychology score, a revenue and expenditure psychology score, a shadow psychology score, a volume psychology score, a win session expected value score, an operation balance score, an operation score, a revenue score, and a member score.

Each of FIG. 109 and FIG. 110 is a table organized as a list explaining psychology indices provided by the game information analysis system 2001 according to the present invention, together with evaluation determination, determination threshold values, and a totalization method and remarks. As the psychology indices, for example, classes of degrees of satisfaction, winning 1 (ratio), winning 2 (ratio), winning 3 (ratio), winning 4 (ratio), losing 1 (ratio), losing 2 (ratio), losing 3 (ratio), losing 4 (ratio), draws (ratio), an accumulated sales money amount (Open), an accumulated sales money amount (High), an accumulated sales money amount (Low), an accumulated sales money amount (Close), an accumulated sales money amount BB+3, an accumulated sales money amount BB−3, a candle shape codes (psychology scores), member session ratios, and winning percentages (sessions).

Each of FIG. 111 and FIG. 112 is a table organized as a list explaining wave motion attribute indices (1) provided by the game information analysis system 2001 according to the present invention, together with evaluation determination, determination threshold values, and a totalization method and remarks. As the wave motion attribute indices (1), there are, for example, Win/Bet, Win/Bet accumulation, Win/Bet accumulation (theoretical values), section determination, Winloss/Bet jackpot intervals classified by multipliers in all sections, Winloss/Bet hit intervals classified by multipliers in normal sections, Winloss/Bet hit intervals classified by multipliers in discharge sections, Winloss/Bet deviations in all sections, Winloss/Bet deviations in normal sections, Winloss/Bet deviations in discharge sections, and discharge time ratios (%).

Each of FIG. 113 and FIG. 114 is a table organized as a list explaining wave motion attribute indices (2) provided by the game information analysis system 2001 according to the present invention, together with evaluation determination, determination threshold values, and a totalization method and remarks. As the wave motion attribute indices (2), there are, for example, a number of times of occurrence of feature games classified by multipliers, feature game POs, an average Bet per game, attributes (intervals of hit of×100 times or more), attributes (an average multiplier of ×100 times or more), attributes (POs at the time of low multipliers), a number of occurrence of progressive jackpots, a number of occurrence of jackpots, a number-of-game ratio by members, intervals of feature game hits, an average multiplier of feature games, and normal POs.

FIG. 115 is a table organized as a list explaining session attribute indices provided by the game information analysis system 2001 according to the present invention, together with evaluation determination, determination threshold values, and a totalization method and remarks. As the session attribute indices, there are, for example, slot game investment money amounts (losing sessions), table game investment money amounts (losing session), an average Bet per slot game, an average Bet per table game, POs excluding jackpots (each PO ratio being a Win/Bet of a machine played thereon of×less than 100), and normal POs (each normal PO of a machine played thereon).

FIG. 116 is a table organized as a list explaining calendar indices provided by the game information analysis system 2001 according to the present invention, together with evaluation determination, determination threshold values, and a totalization method and remarks. As the calendar indices, there is, for example, user arbitrary data.

Each of FIG. 117 and FIG. 118 is a table organized as a list with respect to machine categories provided by the game information analysis system 2001 according to the present invention, together with classification definitions and remarks. As the machine categories, there are, for example, denominations, themes, vendors, locations, set payout ratios (%), the latest operation day, game type classes (game kinds), game type classes (with or without a link), game type classes (with or without progressive), game type classes (display shapes), game type classes (a number of reels), game type classes (a number of lines), game type classes (a number of bets per line), game type classes (bonus attributes), game type classes (table game kinds), game type classes, jackpot interval classes (intervals of jackpots of×100 times or more), jackpot average multiplier classes (each average multiplier of×100 times or more), low multiplier PO classes (POs excluding POs of×100 times or more), feature hit interval classes, feature average multiplier classes, normal PO classes, and machine user definitions.

FIG. 119 is a table organized as a list with respect to player categories provided by the game information analysis system 2001 according to the present invention, together with classification definitions and remarks. As the player categories, there are, for example, player types (members or non-members), player ranks, sex, nationalities, ages, the latest operation day, member classification, game types, and member user definitions.

FIG. 120 is a table organized as a list with respect to calendar categories provided by the game information analysis system 2001 according to the present invention, together with classification definitions and remarks. As the calendar categories, there is, for example, a user arbitrary category.

[Detection of Bonus Game State]

Next, with reference to FIG. 121 to FIG. 128, a bonus game state detection process in which whether or not each game played by a player on a slot machine 2014 is in a bonus game state is detected will be described. The above-mentioned bonus game state detection process is conducted by, for example, a game information analysis part 2255 of an analysis server 2012 through batch processing or in real time. It is to be noted that here, the bonus state is a state in which a game is implemented as a bonus game on the slot machine 2014, and the bonus game includes free games, a feature game, and the like.

If the analysis server 2012 can obtain, via a hall management server 2013 from each of the slot machines 2014, information indicating that the implemented game is the bonus game, the above-described bonus game state detection process is unnecessary. However, in a case where as the game information, pieces of information such as starting time, termination time, a player investment money amount, a slot machine payout amount, and a machine ID are transmitted for each game from each of the slot machines 2014, and information pertinent to whether or not each game is the bonus game is used in a game information analysis process, said process is necessary. In addition, even in a case where information indicating whether or not each game is the bonus game is provided for each game, it is preferable that although the game is not the bonus game, a state in which the game is substantially in the bonus game state can be grasped.

Figure 121:
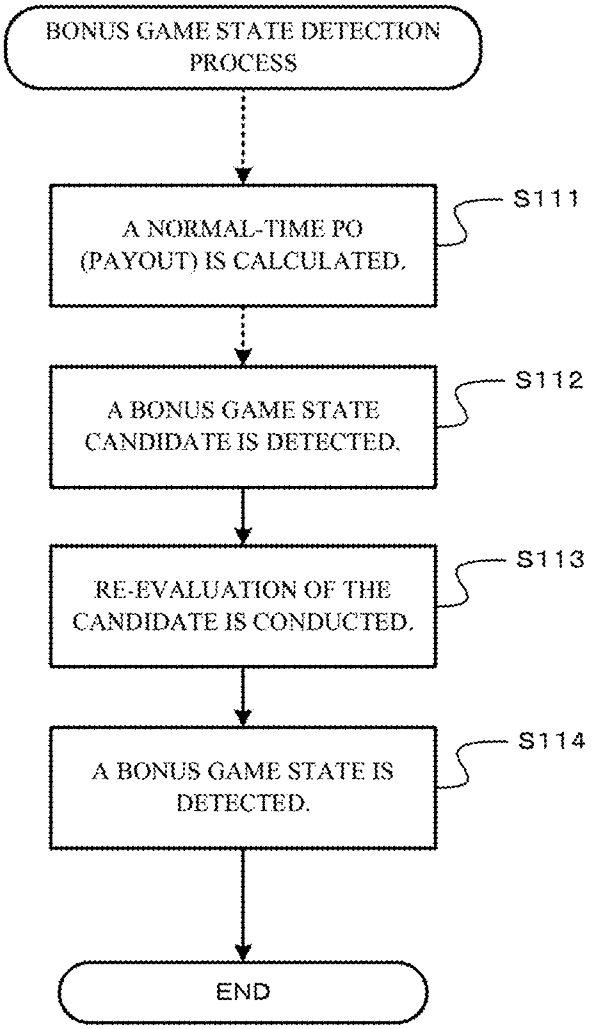

FIG. 121 is a flowchart showing an outline of a procedure of the bonus game state detection process. First, at step S111, a normal-time PO (payout) is calculated. The payout is obtained by the following Equation 1.

Payout=(slot machine payout money amount/player investment money amount)×100 (Equation 1)

This process is a process, for example, in which in a predetermined time period, discharge sections, in each of which many wins by a player have occurred, and normal sections other than the discharge sections are determined and a PO ratio in the normal sections is obtained as a normal-time PO. The details of the process will be described later.

Here, the predetermined time period includes, for example, several hours, one day, one week, and one month. The normal-time PO is information which should be previously obtained as statistical data. Accordingly, although for the sake of convenience, it is described that in the flowchart shown in FIG. 121, the calculation of the normal-time PO is conducted at step S111, the calculation of the normal-time PO can be executed at arbitrary timing prior to conducting the bonus game state detection process. In addition, this normal-time PO can be previously obtained for each of the slot machines.

Next, at step S112, a bonus game state candidate is detected. This process is a process in which a PO for each game is obtained from data of each game transmitted from each of the slot machines 2014, and a game whose discrepancy from the normal-time PO is a predetermined ratio (or a predetermined value) or more is detected as the bonus game state candidate. The details of the process will be described later.

Next, at step S113, with respect to the game detected as the bonus game state candidate, re-evaluation is conducted. At step S114, a game which satisfies a condition as the bonus game is finally detected as being in the bonus game state. These steps also will be described later.

Figure 122:
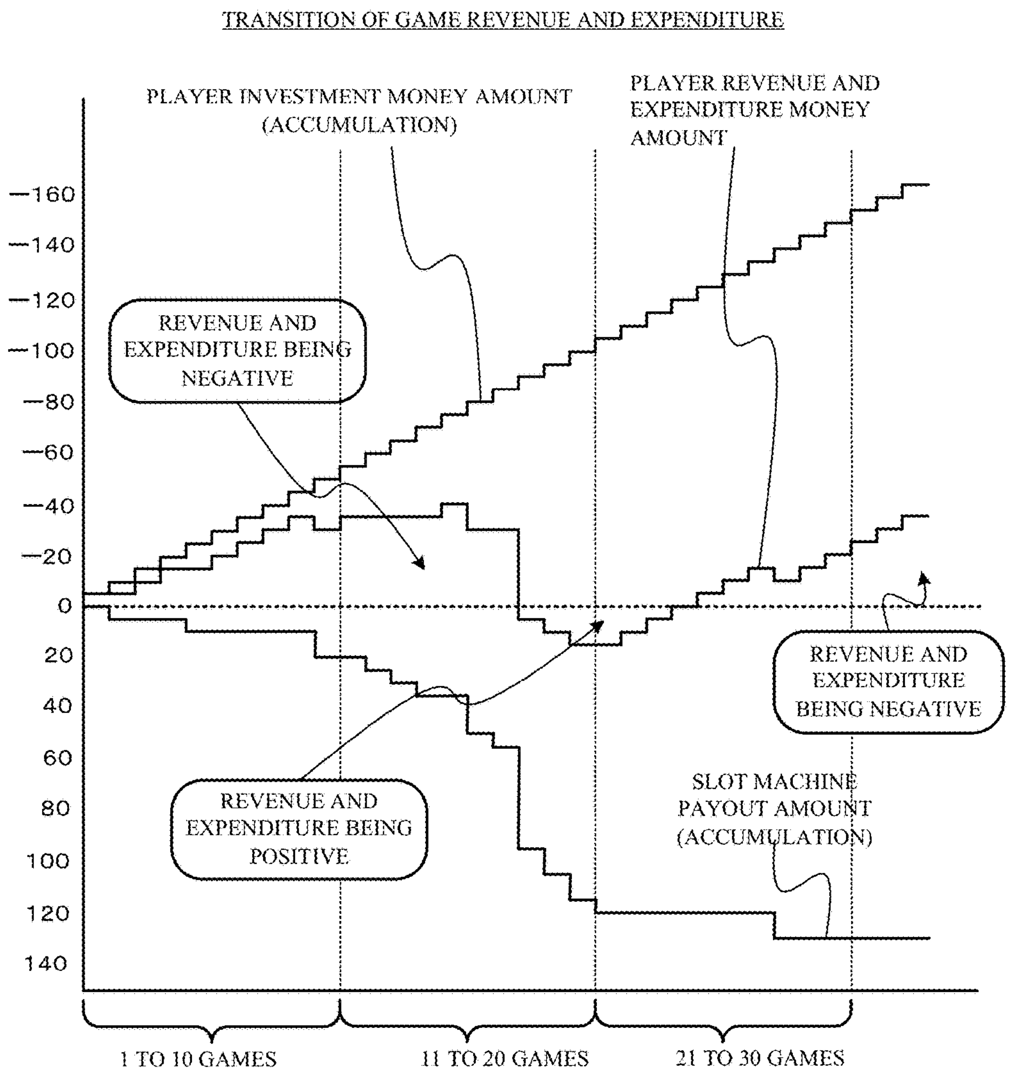

FIG. 122 is a graph exemplifying transition of a game revenue and expenditure for games on each of the slot machines 2014. A vertical axis of the graph shown in FIG. 122 indicates a money amount, and units are, for example, a Hong Kong dollar (HKD), an American dollar (USD), Japanese yen (JPY), and the like. A horizontal axis of the graph shown in FIG. 122 indicates games. In this example, the transition of accumulation of input money amounts of a player and the transition of accumulation of payout amounts of a slot machine in respective games when a player has played the first game to the 30th game are shown, and revenue and expenditure money amounts for a player are shown.

When a line indicating the revenue and expenditure money amount of a player is located above 0, it indicates that a figure of the revenue and expenditure is negative (for a player), and when the line is located below 0, it indicates that a figure of the revenue and expenditure is positive (for a player).

In the example shown in FIG. 122, a player invests a fixed bet money amount (5 HKD) in each of the first game to the 30th game, and in each of the games, the slot machine 2014 determines a payout amount by a drawing and pays out the determined payout amount. It is shown that although the figures of the revenue and expenditure of a player were negative in the first game to the 17th game, the figures of the revenue and expenditure thereof turned positive in the 18th game to the 23th game and thereafter, the figures of the revenue and expenditure thereof returned negative again, and finally, the figure of the revenue and expenditure thereof was −20 (HKD).

Conversely, the above-described transition indicates that for a hall store, although the figures of the revenue and expenditure of were positive in the first game to the 17th game, the figures of the revenue and expenditure turned negative in the 18th game to the 23th game and thereafter, the figures of the revenue and expenditure returned positive again, and finally, the figure of the revenue and expenditure thereof was 20 (HKD) as a profit.

FIG. 123 is a table showing data used for displaying the graph showing the transition of the game revenue and expenditure in FIG. 122. This data is the game information transmitted from the slot machine 2014 via the hall management server 2013 to the analysis server 2012.

The game information shown in FIG. 123 includes game NOs, player investment money amounts, slot machine payout amounts, game start date and time, game termination date and time, a member identification code (member ID), and a machine identification code (machine code). The member ID is set when a membership card is inserted onto the slot machine 2014. As described above, the analysis server 2012 can grasp what investment and payout are conducted in each of the games on a specific slot machine 2014, for example, in real time.

Next, with reference to FIG. 124, the process related to the calculation of the normal-time PO at step S111 in FIG. 121 will be described in details. FIG. 124 shows a result of calculation of a variety of indices based on the game information which the game information analysis part 2255 of the analysis server 2012 has received from the slot machine 2014.

Game NOs, player investment money amounts (IN), and slot machine payout amounts (OUT) shown in FIG. 124 are game information received from the slot machine 2014, as with the game NOs, the player investment money amounts, and the slot machine payout amounts shown in FIG. 123.

The PO (payout) shown in FIG. 124 is calculated on the analysis server 2012 for each of the games by the following Equation 2.

PO=slot machine payout amount(OUT)/player investment money amount(IN)×100 (Equation 2)

In addition, Winloss shown in FIG. 124 is calculated on the analysis server 2012 for each of the games by the following Equation 3.

Winloss=player investment money amount(IN)−slot machine payout amount(OUT) (Equation 3)

In addition, Winloss/Bet is obtained by dividing the above-mentioned Winloss by a bet amount, and here, the player investment money amount (IN) is defined as the bet amount.

Here, when each moving average of the Winloss/Bet is calculated, values shown in a column on a right end in FIG.

124 are obtained with respect to the respective games. This Winloss/Bet moving average is obtained by taking a moving average of Winloss/Bet values in five games (refer to the index "section determination in FIG. 111). It is to be noted that although in this example, the five games targeted for taking the moving average include preceding two games and succeeding two games, a number of games targeted for taking the moving average can be set in a various manner, for example, so as to include preceding four games and succeeding four games.

Next, a threshold value of the Winloss/Bet moving average is defined to be −0.5. An aggregate of games each having a value of the Winloss/Bet moving average being larger than −0.5 is defined as a "normal section", and an aggregate of games each having a value of the Winloss/Bet moving average being −0.5 or less is defined as a "discharge section". By conducting the above-described process, the discharge section in which a number of wins by a player is large and the normal section in which a number of wins by a player is small can be determined.

Thereafter, an average value of POs in the normal section is calculated (POs in each part enclosed by a rectangle drawn by a dotted line in FIG. 124 is targeted for the calculation). As described above, although the normal-time POs can be obtained in a time period such as one day and one week, here, for the sake of convenience, POs from the first game to the 50th game are obtained. As a result, each of the normal-time POs is calculated by the following Equation 4.

Normal-time PO=1900/24=79.2 (rounded off to one decimal place) (Equation 4)

Figure 125:
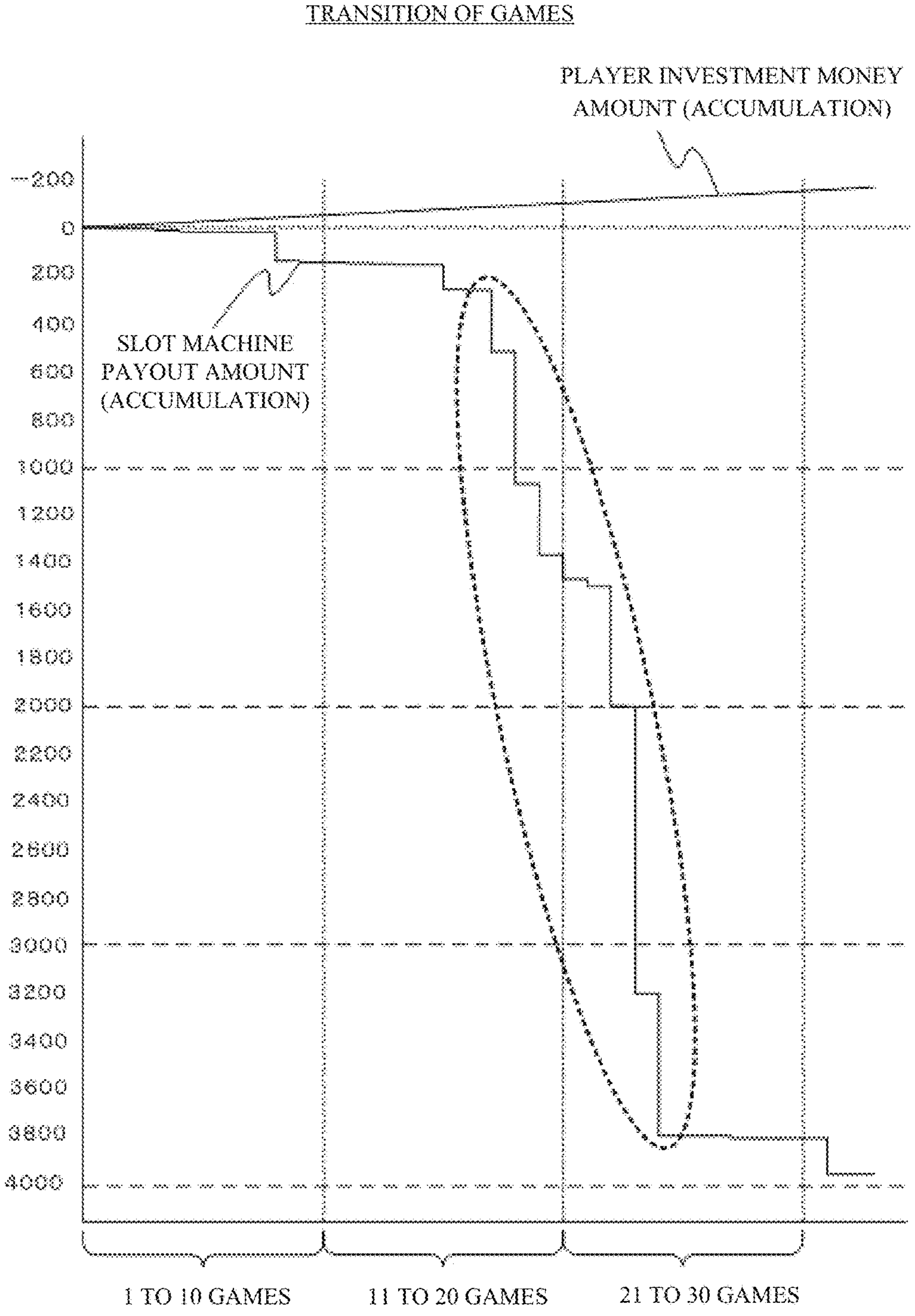

Next, with reference to FIG. 125 and FIG. 126, the process related to the detection of the bonus game state candidate at step S112 in FIG. 121 will be described in details. FIG. 125 is a graph exemplifying transition of the game revenue and expenditure in games on the slot machine 2014. Although the graph shown in FIG. 125 is related to games different from those shown in FIG. 122, a notation method is the same as that in FIG. 122 (note: numerical values of money amounts indicated by a vertical axis of this graph are larger than those in FIG. 122).

In FIG. 125, it is seen that from the 18th game to the 25th game (a part enclosed in an ellipse drawn by a dotted line in FIG. 125), bonus games were executed, and slot machine payout amounts were abruptly changed to large numerical values.

FIG. 126 shows game information corresponding to the graph shown in FIG. 125 and further, shows each-game POs and PO moving averages calculated by the analysis server 2012. Each of these PO moving averages is obtained by taking a moving average of POs in three games. It is to be noted that although in this example, the three games targeted for taking the moving average include preceding one game and succeeding one game, a number of games targeted for taking the moving average can be set in a various manner, for example, so as to include preceding two games.

Here, 79.2 which is the numerical value obtained as the normal-time PO is multiplied by 10 to obtain 792, and this numerical value can be defined as a threshold value of the bonus game state determination. For example, in FIG. 126, games whose each PO moving average exceeds 792 as the threshold value can be determined as the bonus game state candidates. By conducting the above-described determination, as shown in FIG. 126, bonus game state candidates (1), bonus game state candidates (2), and bonus game state candidates (3) are determined, and these correspond to the eighth game to the 10th game, the 17th game to the 26th game, and the 31th game to the 33th game, respectively.

Here, the process related to the re-evaluation of the candidates and the detection of the bonus game states at step S113 and step S114 in FIG. 121 will be described in details. After the detection of the games as the bonus game state candidates, each of the games which satisfies a predetermined condition is finally determined as being in the bonus game state. The predetermined condition includes, for example, the following first condition or second condition.

The first condition is that a jackpot has occurred in that game and the jackpot is not a single jackpot (for example, that a game in which the jack pot has occurred also in a game preceding (or succeeding) several games is present).

The second condition is that no jackpot has occurred in that game, but a plurality of jackpots are present before or after that game (for example, that a plurality of games, in each of which the jackpot has occurred, are present in several games before (or after) that game).

Here, when in the first condition and the second condition, a slot machine payout amount which is 150 or more is defined as the jackpot, and a range of two preceding games and two succeeding games is defined as a range in which presence of other jackpot is checked, the eighth game to the 10th game are determined not to be in the bonus game state; the 17th game to the 26th game are determined to be in the bonus game state; and the 31 game to the 33th game are determined not to be in the bonus game state.

By conducting the series of processes by the analysis server 2012, even if there is not direct data indicating that each of the games is the bonus game, it can be determined whether or not each of the games grasped by the game information is in the bonus game state. In addition, with respect to the single jackpot, based on the states of the preceding or succeeding games, it can be determined whether or not each of the games is the bonus game.

Figure 127:
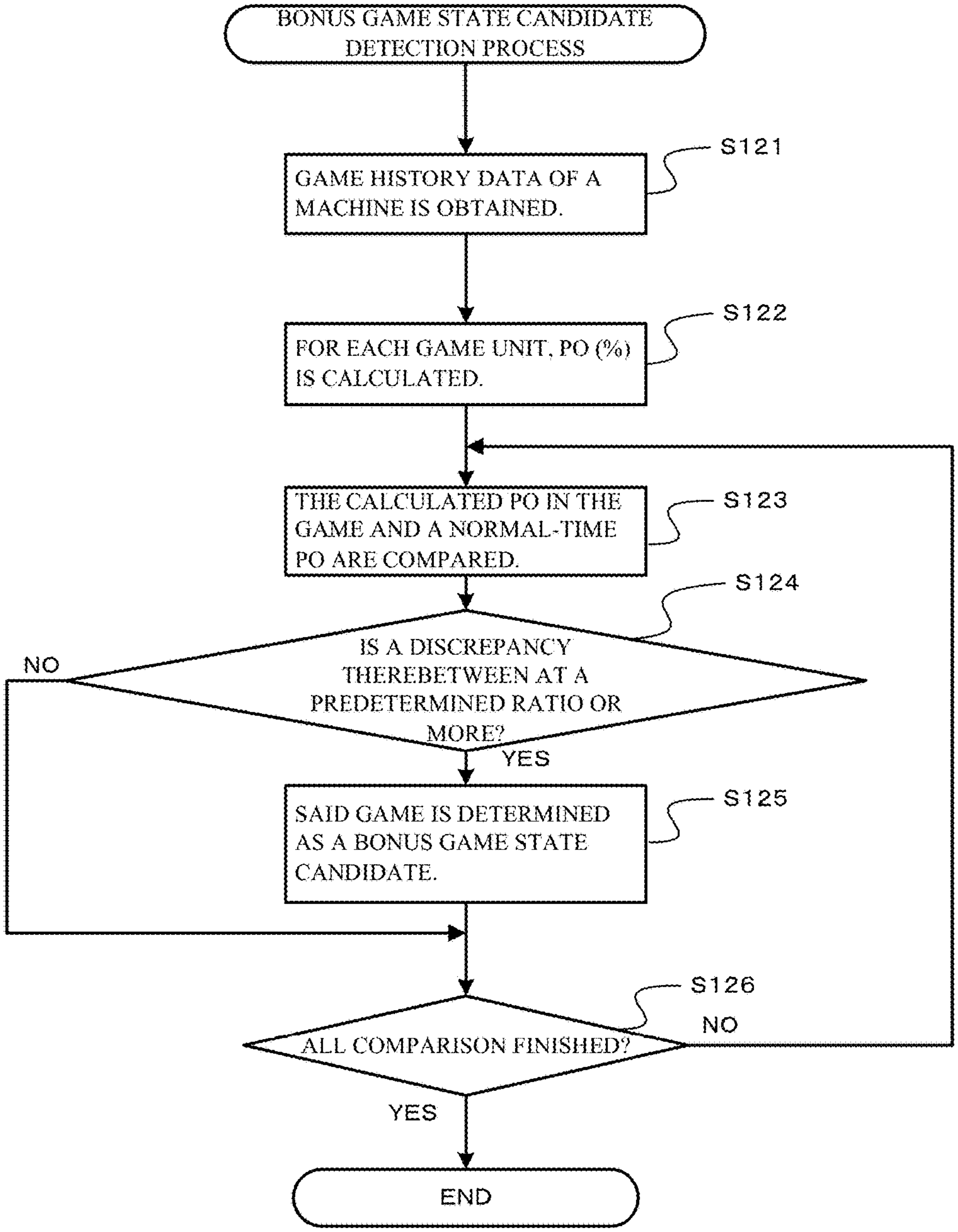

Next, with reference to a flowchart shown in FIG. 127, the procedure related to the detection of the bonus game state candidates at step S112 in FIG. 121 will be described.

First, at step S121, game history data of one machine is obtained. Such game history data is included in the game information transmitted from the slot machine 2014. In addition, when the game history data is obtained, it can be arranged that for each one gaming unit (session) which is composed of a series of games played by a player, the game history data is obtained.

Next, at step S122, for each game as a unit, a PO is calculated. Thereafter, the process is repeated for each of the games.

At step S123, the previously obtained normal-time PO and the PO obtained at step S122 are compared. When a discrepancy between the normal-time PO and the PO is a predetermined ratio or more (YES at step S124), at step S125, that game is determined as the bonus game state candidate. For example, as described above, when the PO is 10 times or more larger than the normal-time PO, that game can be determined as the bonus game state candidate. However, a variety of other criteria can be set.

When the discrepancy between the normal-time PO and the PO is not the predetermined ratio or more (NO at step S124) or after step S125, it is determined at step S126 whether or not the comparison for all of the games has been finished. When the comparison therefor has not been finished (NO at step S126), the processes at and after step S123 are repeated. When the comparison therefor has been finished (YES at step S126), said processing is finished.

At this point in time, the games determined as the bonus game state candidates are provided with flags or the like indicating that the games are the bonus game state candidates in areas associated with said games in the game history data, which is stored as game information data 2282A in analysis database 2282.

Figure 128:
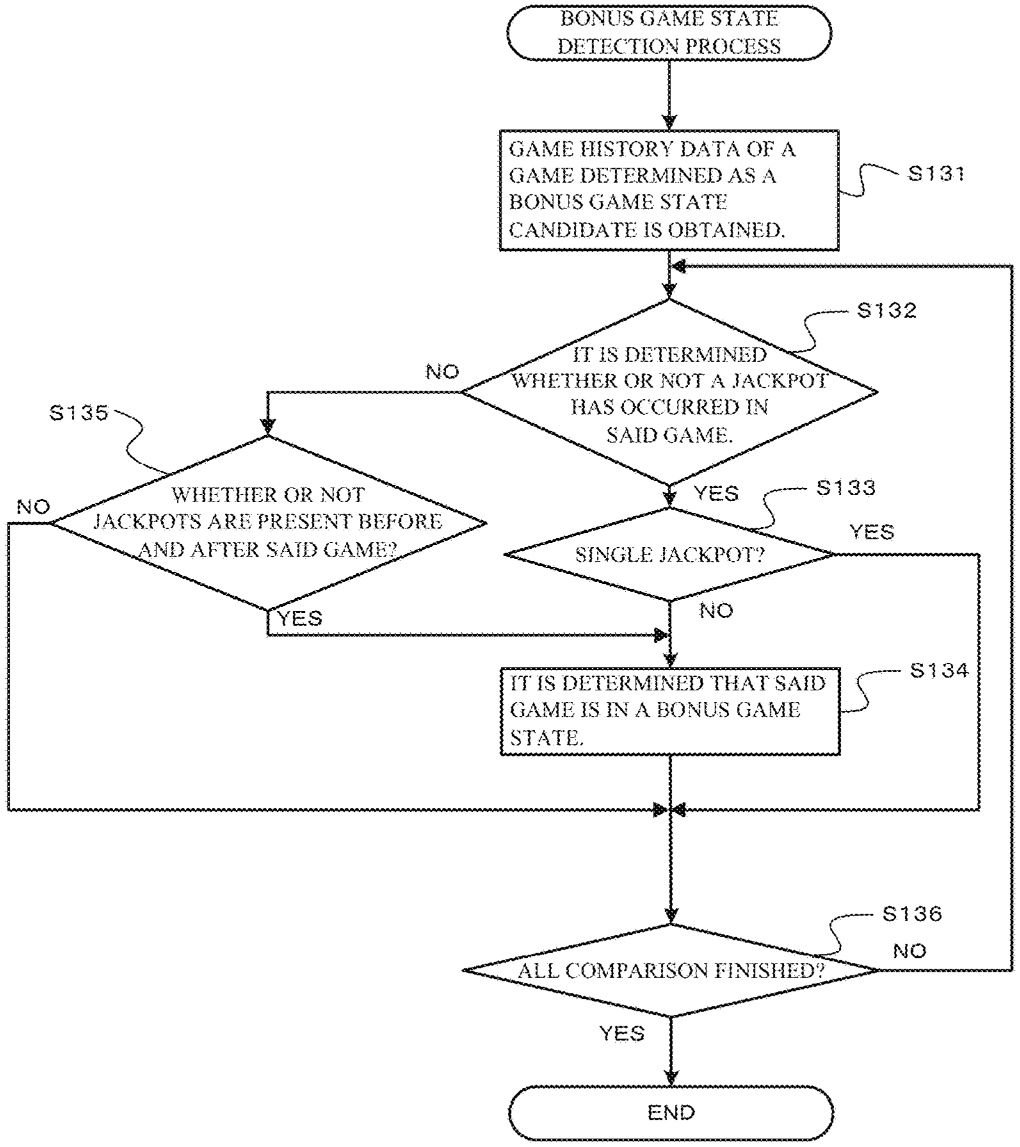

Next, with reference to a flowchart shown in FIG. 128, the procedures related to the re-evaluation of the candidates and the detection of the bonus game state at step S113 and step S114 in FIG. 121 will be described.

First, at step S131, game history data of the games determined as the bonus game state candidates is obtained. Such game history data is obtained from the game information data 2282A of the above-described analysis database 2282. Thereafter, for each of the games, the processing is repeated.

Next, at step S132, it is determined whether or not a big hit has occurred in said game. For example, as described above, when a slot machine to-be-paid-out number is greater than or equal to a predetermined money amount (150), it is determined that the big hit has occurred therein. When it is determined that the big hit has occurred in said game (YES at step S132), at step S133, it is determined that a single big hit has occurred in said game. This determination can be conducted based on, for example, a number of games, in each of which the big hit has occurred (in other words, whether or not big hit are present in several preceding or succeeding games) or the like.

When the single big hit has not occurred in said game (NO at step S133), at step S134, it is determined that said game is in the bonus game state.

At step S132, when it is not determined that the big hit has occurred in said game (NO at step S132), at step S135, it is determined whether or not big hit are present before or after said game. This determination can be conducted based on, for example, a number of games, in each of which the big hit has occurred (in other words, whether or not big hits are present in several preceding or succeeding games) or the like.

When the big hits are present before or after said game (YES at step S135), at step S134, said game is determined as being in the bonus game state.

When the single big hit has occurred in said game (YES at step S133), when no big hits are present before or after said game (NO at step S135) or after step S134, it is determined at step S136 whether or not the comparison for all of the games has been finished. When the comparison therefor has not been finished (NO at step S136), the processes at and after step S132 are repeated. When the comparison therefor has been finished (YES at step S136), said processing is finished.

At this point in time, the games determined as being in the bonus game state are provided with flags or the like indicating that the games are in the bonus game state in areas associated with said games in the game history data, which is stored as game information data 2282A in the analysis database 2282. By referencing this data, it is made possible to determine whether each of the games is the bonus game. In addition, it is also made possible to calculate an occurrence ratio of bonus games based on this data.

[Detection of Session (One Gaming)]

A player normally plays a plurality of successive games by using one slot machine 2014 and basically, a psychological state of a player is influenced depending on winning or losing in that unit. In the present specification, an aggregate of the above-mentioned successive games in one gaming is referred to as a "session".

Since the psychological state of each player is determined depending on the winning or losing in the unit of the above-mentioned session, it is important to determine from where to where one session is, with respect to the games successively played on the slot machine 2014. However, although the above-described game information transmitted from the slot machine 2014 to an analysis server 2012 includes information such as a player investment money amount, a slot machine payout amount, and the like for each of the games, there is not information pertinent to sectioning of sessions and to which game belongs to which session.

Therefore, when the sectioning of the sessions can be determined from other information related to the slot machine 2014, it is extremely effective.

Each of FIGS. 129A, 129B, 129C, 130A, and 130B is a diagram showing some patterns of game start and termination on one slot machine 2014.

In a pattern shown in FIG. 129A, on one slot machine 2014, a membership card is inserted into the slot machine 2014 by a member and a first game of a session is thereby started, and thereafter, the membership card is ejected and the session is thereby terminated, and an immediately previous game is a final game. In the above-mentioned pattern, since the starting game and the final game are clearly seen, the session can also be clearly detected.

In the above-mentioned case, a game history of the member is stored on a membership management server 12 or the like. Further, statistical information such as an average playing time period of one session, an average number of played games of one session, and an average playing interval in games in one session is calculated on the analysis server 2012, and the calculated data is stored as index data 2282B of analysis database 2282. It is to be noted that the average playing time period of one session, the average number of played games of one session, and the average playing interval in games in one session are likely to tend to vary in accordance with difference in games, days of the week, and the like, and respective average values can be prepared.

In a pattern shown in FIG. 129B, on one slot machine 2014, a session (1) is started by a non-member, and thereafter, a session (2) is started by the non-member. Also when the non-member starts a game by using cash or a non-membership card (an IC card or an IC ticket) and terminates the game, since the non-member does not perform a predetermined act such as ejection of a membership card as a member performs, it is difficult to detect a session. However, when facial authentication is conducted by a human body detection camera 1713 of a PTS terminal 1700 provided on the slot machine 2014, it can be determined whether the session (1) and the session (2) are executed by the same non-member, thereby allowing sessions executed by the non-member to be detected with a high accuracy.

In the pattern shown in FIG. 129B, when seating determination is conducted by the human body detection camera 1713 of the PTS terminal 1700 provided on the slot machine 2014, it is difficult to determine whether each of the session (1) and the session (2) is one session executed by the same non-member. Therefore, based on the above-described statistical information such as the average playing time period of one session and the average number of played games of one session, which are previously calculated, sectioning of sessions can be estimated. In addition, an interval between the session (1) and the session (2), an interval in games in the session (1), and an interval in games in the session (2) are compared with an average playing interval in games in one session, which is previously calculated, it is estimated whether each of the session (1) and the session (2) constitutes one session (or whether there is other sectioning of sessions).

In a pattern shown in FIG. 129C, on one slot machine 2014, a non-membership card is inserted by a non-member and a session (1) is thereby started; thereafter, the non-membership card is ejected; further thereafter, the non-membership card is inserted by the non-member and a session (2) is thereby started; thereafter, for a while, an interval is left; and thereafter, the membership card is inserted by the member and a session (3) is thereby started.

In this case, by starting the session (3), the termination of the session (2) is made clear and it is seen that the session (3) is different from the session (1) and the session (2). However, despite the ejection and the insertion of the non-membership card in the session (1) and the session (2) in the middle of a course, the session (1) and the session (2) are likely to be the same one session. In such a case, based on the above-described statistical information such as the average playing time period in one session and the average number of played games in one session, which are previously calculated, sectioning of sessions can be estimated. In addition, an interval between the session (1) and the session (2), an interval in games in the session (1), and an interval in games in the session (2) are compared with an average playing interval in games in one session, which is previously calculated, it is estimated whether each of the session (1) and the session (2) constitutes one session (or whether there is other sectioning of sessions).

In a pattern shown in FIG. 130A, on one slot machine 2014, bills are inserted by a non-member and a session (1) is thereby started; thereafter, for a while, an interval is left; bills are inserted by the non-member and a session (2) is thereby started; thereafter, again, for a while, an interval is left; and thereafter, bills are inserted by the non-member and a session (3) is thereby started.

In this case, it cannot be determined whether the session (1), the session (2), and the session (3) constitute one session or are separate sessions. Therefore, based on the above-described statistical information such as the average playing time period of one session and the average number of played games of one session, which are previously calculated, sectioning of sessions can be estimated. In addition, each interval among the session (1), the session (2), and the session (3), an interval in games in the session (1), an interval in games in the session (2), and an interval in games in the session (3) are compared with an average playing interval in games in one session, which is previously calculated, it is estimated whether each of the session (1), the session (2), and the session (3) constitutes one session (or whether there is other sectioning of sessions).

In a pattern shown in FIG. 130B, on one slot machine 2014, bills are inserted by a non-member and a session (1) is thereby started; thereafter, cashout is conducted (for example, by pressing down a CASHOUT button 1038 of a slot machine 1010 shown in FIG. 4); thereafter, bills are inserted by the non-member and a session (2) is thereby started; thereafter, for a while, an interval is left; and thereafter, bills are inserted by the non-member and a session (3) is thereby started.

In this case, since the cashout is conducted for the session (1), basically, it is determined that the session (1) is terminated as one independent session. In addition, since the session (2) and the session (3) are likely to constitute one session, based on the above-described statistical information such as the average playing time period of one session and the average number of played games of one session, which are previously calculated, sectioning of sessions can be estimated. In addition, an interval between the session (2) and the session (3), an interval in games in the session (2), and an interval in games in the session (3) are compared with an average playing interval in games in one session, which is previously calculated, it is estimated whether each of the session (2) and the session (3) constitutes one session (or whether there is other sectioning of sessions).

As described above, although the determination of sessions is conducted by employing a variety of methods with respect to a member and a non-member, each of the above-described methods is merely one example. In addition, in the game information analysis system 2001 according to the present invention, the sessions played by a member are associated with a member ID, and it is identified which member executes which session. However, as for the sessions played by a non-member, a non-member executing sessions cannot be identified. However, by totalizing pieces of information related to individual sessions played by each non-member who can also be said as being "anonymous", based on indices according to player attributes, such as a playing time period in a session played by a non-member, a number of games, and a bet money amount per game, classification can be made, and a tendency or the like of a player of the classified session such as a psychological state in which the player is can be grasped. For example, among non-members, with respect to a group of non-members whose each number of games in one session is large, distribution of a customer satisfaction degree score can be analyzed.

[Candlestick Chart Representation of Game Attributes]

Next, with reference to FIG. 131 to FIG. 137, candlestick chart representation of game attributes on a slot machine 2014 will be described.

FIG. 131 is a table showing data which indicates transition of a game revenue and expenditure. The data related to game NOs, player investment money amounts, and the slot machine payout amounts therein is similar to the data shown in FIG. 123 used for displaying the graph showing the transition of the game revenue and expenditure in FIG. 122. This data is game information transmitted from the slot machine 2014 via a hall management server 2013 to an analysis server 2012.

In FIG. 131, in addition to the game NOs, the player investment money amounts, and the slot machine payout amounts, player investment money amounts and player revenue and expenditure money amounts are shown. These pieces of data are shown as the player investment money amounts (accumulation) and player revenue and expenditure money amounts in the graph shown in FIG. 122.

In addition, the first game to the 33th game shown in FIG. 131 are determined as one session by the above-described detection of the session. In this example, a player has played the first game to the 33th game and has finished gaming with a revenue and expenditure being −35 (a unit is, for example, HKD). As shown in FIG. 131, it is seen that with respect to the revenue and expenditure of a player in this session, a revenue and expenditure upon starting is 0, a revenue and expenditure upon termination is −35, a minimum revenue and expenditure is −40, and a maximum revenue and expenditure is 15.

FIG. 132 is a diagram showing game revenue and expenditure amounts of a player with respect to another session which is different from the session shown in FIG. 131. The session is constituted of the first game to the 200 games. With respect to the revenue and expenditure of a player, a revenue and expenditure upon starting the session is 0, a revenue and expenditure upon termination of the session is −1400, a minimum revenue and expenditure is −1900, and a maximum revenue and expenditure is 600.

Here, on a right side in FIG. 132, a revenue and expenditure course in a player's said session described above is shown as a candlestick chart. The candlestick chart is known as a chart clearly representing stock price fluctuation (with four sticks). A white bar represents that a closing price was higher than an opening price. The opening price is associated with the bottom edge of a real body and the closing price is associated with the top edge of the real body. The highest traded price is associated with the top edge of an upper shadow and the lowest traded price is associated with the bottom edge of a lower shadow. The real body of the white bar is depicted by a white rectangle. On the other hand, a black bar represents that a closing price was lower than an opening price. The closing price is associated with the bottom edge of a real body and the opening price is associated with the top edge of the real body. The highest traded price is associated with the top edge of an upper shadow and the lowest traded price is associated with the bottom edge of a lower shadow. The real body of the black bar is depicted by a black rectangle.

In addition, as kinds of the candlestick charts, depending on time periods, in each of which the four sticks are represented, there are a daily candlestick chart, a weekly candlestick chart, a monthly candlestick chart, a yearly candlestick chart, and the like. The daily candlestick chart represents an opening price, the highest traded price, the lowest traded price, and a closing price within one day in the candlestick chart. The weekly candlestick chart represents an opening price, the highest traded price, the lowest traded price, and a closing price within one week in the candlestick chart. The monthly candlestick chart represents an opening price, the highest traded price, the lowest traded price, and a closing price within one month in the candlestick chart. The yearly candlestick chart represents an opening price, the highest traded price, the lowest traded price, and a closing price within one year in the candlestick chart.

With reference back to the description of the candlestick chart on the right side in FIG. 132, a real body of this candlestick chart is a white bar, showing that a figure of a final revenue and expenditure of a player from starting of the session to termination of the session became negative. A revenue and expenditure (0) upon starting the session is associated with the bottom edge of the real body; a revenue and expenditure (−1400) upon terminating the session is associated with the top edge of the real body; a maximum revenue and expenditure (600) is associated with the bottom edge of a lower shadow; and a minimum revenue and expenditure (−1900) is associated with the top edge of an upper shadow.

In the candlestick chart shown in FIG. 132, a length of the real body, a length of the lower shadow, and a length of the upper shadow correspond to the above-described revenue and expenditure amounts in the session. In addition, by representing the candlestick chart as described above, the lower shadow shows that the won money amount was invested, and the length of the lower shadow shows the invested amount. On the other hand, the upper shadow shows that the lost money amount was regained, and the length of the upper shadow shows the regained amount.

FIG. 133 is a diagram in which the player revenue and expenditure amounts shown in FIG. 132 are further subdivided by each 50 games to be represented as candlestick charts. In FIG. 132, the revenue and expenditure course of the whole session is represented as one candlestick chart. In FIG. 133, however, this session is divided into four game sections, and for each of the sections, a candlestick chart is represented, respectively. Through the subdivision as described above, the revenue and expenditure course (fluctuation in winning or losing in the games) can be represented in a more detailed manner.

In a lower row in FIG. 133, a candlestick chat corresponding to a revenue and expenditure course of the first game to the 50th game is shown. A real body of this candlestick chart is a black bar. Four sticks (a revenue and expenditure upon starting the session, a maximum revenue and expenditure, a minimum revenue and expenditure, and a revenue and expenditure upon terminating the session) are values (0, 600, 0, and 450), respectively. In addition, in the lower row in FIG. 133, a candlestick chat corresponding to a revenue and expenditure course of the 51th game to the 100th game is shown. A real body of this candlestick is a white bar. Four sticks (a revenue and expenditure upon starting the session, a maximum revenue and expenditure, a minimum revenue and expenditure, and a revenue and expenditure upon terminating the session) are values (450, 450, −1900, and −1900), respectively.

Further, in the lower row in FIG. 133, a candlestick chat corresponding to a revenue and expenditure course of the 101th game to the 150th game is shown. A real body of this candlestick is a black bar. Four sticks (a revenue and expenditure upon starting the session, a maximum revenue and expenditure, a minimum revenue and expenditure, and a revenue and expenditure upon terminating the session) are values (−1900, −500, −1900, and −700), respectively. In addition, in the lower row in FIG. 133, a candlestick chat corresponding to a revenue and expenditure course of the 151th game to the 200th game is shown. A real body of this candlestick is a white bar. Four sticks (a revenue and expenditure upon starting the session, a maximum revenue and expenditure, a minimum revenue and expenditure, and a revenue and expenditure upon terminating the session) are values (−700, −600, −1400, and −1400), respectively.

FIG. 134 is a diagram exemplifying representation of candlestick charts related respective players. In this example, each of the candlestick charts is displayed so as to be associated with a player investment money amount (on a turnover basis), a wager which is the player investment money amount can be easily grasped.

For example, a real body of a candlestick chart of a player 1 is a black bar. Four sticks (a turnover upon staring a session, a maximum turnover, a minimum turnover, and a turnover upon terminating the session) are values (420, 110, 550, and 260), respectively. This candlestick chart shows that the player invested 420 upon staring the session; in the middle of the course, the player went through a phase in which an investment amount increased up to 550 and a phase in which the investment amount decreased up to 110; and finally, 260 was left in this player's hand.

A real body of a candlestick chart of a player 2 is a white bar. Four sticks (a turnover upon staring a session, a maximum turnover, a minimum turnover, and a turnover upon terminating the session) are values (260, 110, 550, and 370), respectively. This candlestick chart shows that the player invested 260 upon staring the session; in the middle of the course, the player went through a phase in which an investment amount increased up to 550 and a phase in which the investment amount decreased up to 110; and finally, 370 was left in this player's hand.

A real body of a candlestick chart of a player 3 is a white bar. Four sticks (a turnover upon staring a session, a maximum turnover, a minimum turnover, and a turnover upon terminating the session) are values (370, 110, 550, and 495), respectively. This candlestick chart shows that the player invested 370 upon staring the session; in the middle of the course, the player went through a phase in which an investment amount increased up to 550 and a phase in which the investment amount decreased up to 110; and finally, 495 was left in this player's hand.

A real body of a candlestick chart of a player 4 is a black bar. Four sticks (a turnover upon staring a session, a maximum turnover, a minimum turnover, and a turnover upon terminating the session) are values (495, 110, 550, and 330), respectively. This candlestick chart shows that the player invested 495 upon staring the session; in the middle of the course, the player went through a phase in which an investment amount increased up to 550 and a phase in which the investment amount decreased up to 110; and finally, 330 was left in this player's hand.

A real body of a candlestick chart of a player 5 is a black bar. Four sticks (a turnover upon staring a session, a maximum turnover, a minimum turnover, and a turnover upon terminating the session) are values (330, 60, 370, and 160), respectively. This candlestick chart shows that the player invested 330 upon staring the session; in the middle of the course, the player went through a phase in which an investment amount increased up to 370 and a phase in which the investment amount decreased up to 60; and finally, 160 was left in this player's hand.

[Estimation of Player Psychological State by Candlestick Chart]

A candlestick chart as described above allows a psychological state of a player to be estimated through an individual shape or arrangement of a plurality of shapes (combination) thereof. An outcome of one gaming (one session) is not simply represented with won or lost money, but through representation by the candlestick charts, it is estimated what sort of a course a player game revenue and expenditure amount followed and the session led to final winning or losing, and the psychological state of a player is represented as a score.

Thus, game outcomes per session are classified, such as a case where a game outcome was one-sided winning, a case where a game outcome was one-sided losing, a case where a game outcome was initially winning but finally losing, a case where a game outcome was initially losing but finally winning, and a case where a game outcome was finally even though there were winning and losing, thereby allowing a player's psychological state in details to be grasped.

FIG. 135 is a diagram showing representative patterns with respect to a candlestick chart (black bar) and explaining criteria of pattern recognition to determine the above-mentioned patterns.

A "black bar marubozu" shown in FIG. 135 is a pattern in which a course of game transition is comparatively monotonous and a final game outcome is losing. A candlestick chart is of a shape having a real body whose length is a predetermined length (L) or more. In addition, a pattern which has upper and lower shadows each having a short length (L1) or less is also included in this pattern, the length (L1) being at a predetermined ratio to the length of the real body.

A "black bar hammer" shown therein is a pattern which is a losing pattern as game transition in which in the middle of a course, a game outcome is losing and thereafter, the loss is regained, but the initial state is not returned. A candlestick chart is of a shape having a real body whose length is a predetermined length (L) or less. In addition, the candlestick chart has a lower shadow having a length (L2) or more, the length (L2) being at a predetermined ratio to the length of the real body.

A "black bar inverted hammer" shown therein is a pattern which is a losing pattern as game transition in which in the middle of a course, a game outcome is winning and thereafter, a game outcome is losing, and a final game outcome is losing, with a larger loss than that in an initial state. A candlestick chart is of a shape having a real body whose length is a predetermined length (L) or less. In addition, the candlestick chart has an upper shadow having a length (L2) or more, the length (L2) being at a predetermined ratio to the length of the real body.

A "black bar doji" shown therein is a pattern which is a losing pattern as game transition in which in the middle of a course, game outcomes are winning and losing, and a final game outcome is losing, with a little larger loss than that in an initial state. A candlestick chart is of a shape having a real body whose length is a predetermined length (L3) or less, which is extremely short. In addition, the candlestick chart has upper and lower shadows each having a predetermined length (L4) or more.

FIG. 136 is a diagram showing representative patterns with respect to a candlestick chart (white bar) and explaining criteria of pattern recognition to determine the above-mentioned patterns.

A "white bar marubozu" in FIG. 136 is a pattern in which a course of game transition is comparatively monotonous and a final game outcome is winning. A candlestick chart is of a shape having a real body whose length is a predetermined length (L) or more. In addition, a pattern which has upper and lower shadows each having a short length (L1) or less is also included in this pattern, the length (L1) being at a predetermined ratio to the length of the real body.

A "white bar hammer" shown therein is a pattern which is a winning pattern as game transition in which in the middle of a course, a game outcome is losing and thereafter, the loss is regained, and a final game outcome is winning, with a larger win than that in an initial state. A candlestick chart is of a shape having a real body whose length is a predetermined length (L) or less. In addition, the candlestick chart has a lower shadow having a length (L2) or more, the length (L2) being at a predetermined ratio to the length of the real body.

A "white bar inverted hammer" is a pattern which is a winning pattern as game transition in which in the middle of a course, a game outcome is winning and thereafter, a game outcome is losing, and a final game outcome is winning, with a larger win than that in an initial state. A candlestick chart is of a shape having a real body whose length is a predetermined length (L) or less. In addition, the candlestick chart has an upper shadow having a length (L2) or more, the length (L2) being at a predetermined ratio to the length of the real body.

A "white bar doji" shown therein is a pattern which is a winning pattern as game transition in which in the middle of a course, game outcomes are winning and losing, and a final game outcome is winning, with a little larger win than that in an initial state. A candlestick chart is of a shape having a real body whose length is a predetermined length (L3) or less, which is extremely short. In addition, the candlestick chart has upper and lower shadows each having a predetermined length (L4) or more.

In addition, in FIG. 136, a pattern of a "doji cross" and criteria to determine this pattern are described. The "doji cross" is a pattern which is an even pattern in which in the middle of a course, game outcomes are winning and losing, and a final game outcome is returned to an initial state. A candlestick chart is of a shape having a real body whose length is substantially zero and having upper and lower shadows each having a predetermined length (L5) or more.

With reference to FIG. 135 and FIG. 136, the representative patterns of the candlestick charts and the criteria to determine these patterns are described. However, these are merely examples, and other various patterns can be set, and in accordance therewith, criteria to determine these patterns can be set in a various manner. In addition, here, in the described examples of the patterns of the candlestick charts, the shapes according to shapes used for a stock price analysis are cited. However, shapes which are unique to a game attribute analysis also can be set.

As described hereinabove, each of the candlestick charts represents the fluctuation of the game progress viewed basically while a player conducts one gaming (in other words, a session). However, for example, organized in various units such as each player, each machine, each bank having machines installed thereon, and each time zone, candlestick charts also can be represented.

[Calculation of Customer Satisfaction Degrees Based on Estimation of Player Psychological State by Candlestick Charts]

As described above, in accordance with transition of a game revenue and expenditure amount in a session, candlestick charts can be prepared. A score in accordance with a pattern, a shape, and the like of each of the candlestick charts is calculated, thereby allowing a psychological state of a player to be represented as a score.

FIG. 137 is a flowchart showing a procedure of a candlestick chart related psychology score calculation process in which based on a candlestick chart, a psychological state of a player is represented as a score. The above-mentioned process is conducted by a game information analysis part 2255 of an analysis server 2012.

First, at step S141, with respect to a time period targeted for an analysis and a player targeted for the analysis, game history data in one session is obtained. Next, at step S142, from a bet amount (player investment money amount) and a slot machine payout amount, a player's revenue and expenditure money amount in each game is calculated in a time-series manner.

At step S143, based on transition of the player's revenue and expenditure money amounts calculated at step S142, a game history of said session is represented by a candlestick chart, a pattern of the candlestick chart is determined, and the determined pattern is assigned. Here, the candlestick chart is subdivided into units of a plurality of games which constitute a session, and the subdivided units are represented as candlestick charts (in other words, one session is represented as a plurality of candlestick charts). In this case, it is determined whether arrangement or a combination of the plurality of candlestick charts correspond to a predetermined pattern, and the determined pattern also can be assigned.

At step S144, based on an assignment state (assignment ratio) of the candlestick chart, a winning and losing pattern psychology score in said session is calculated (refer to FIG. 109).

Next, at step S145, based on a shape of the assigned candlestick chart, a shape psychology score in said session is calculated. In addition, based on a standard deviation or the like, the shape psychology score can be classified into low, normal, and high stages (refer to FIG. 107). Further, at step S146, based on a length of a shadow of the assigned candlestick chart, a shadow psychology score in said session is calculated. In addition, based on a standard deviation or the like, the shadow psychology score can be classified into low, normal, and high stages. (refer to FIG. 107).

Next, at step S147, the respective psychology scores calculated at step S144 to step S146 are added to a candlestick chart related psychology score.

At step S148, when there is other session by said player (YES at step S148), for that other session, processes at and after step S141 are repeated. When there is no other session (NO at step S148), the processing is finished.

FIG. 138 is a diagram showing an outline of processing in which based on the candlestick chart related psychology scores calculated as shown in the flowchart in FIG. 137, the customer satisfaction degree scores for respective players are calculated and further, the scores are synthesized and a customer satisfaction degree score (the whole) is obtained.

The customer satisfaction degree score for each player is calculated by synthesizing a "psychology degree" and a "satisfaction degree" for that player through a predetermined method. Based on the candlestick chart related psychology score, a revenue and expenditure psychology score, and a volume psychology score calculated as shown in the flowchart in FIG. 137, the psychology degree of a player is calculated.

The revenue and expenditure psychology score is obtained by compiling a player's income values for each session, and based on a standard deviation or the like, can be classified into low, normal, and high stages (refer to FIG. 107). In addition, the volume psychology score is obtained by compiling a number of games for each session and based on a standard deviation or the like, can be classified into low, normal, and high stages (refer to FIG. 107).

Based on a winning session expected value or the like, the player's s satisfaction degree is calculated. The winning session expected value is an average money amount in winning sessions for one month and based on a standard deviation or the like, can be classified into low, normal, and high stages (refer to FIG. 107).

The player's customer satisfaction degree scores obtained as described above are complied with respect to all players or predetermined players (for example, members), and a customer satisfaction degree score with respect to the whole of customers is generated.

Each of the customer satisfaction degree scores, which is obtained for each player, is associated with each member ID to be managed when each of the scores is related to each of the members. Through the above-described mechanism according to the present invention, member management including management related to the player's psychological state is enabled. The members are not categorized simply based on won or lost money, but the management can be conducted by representing, by scores, in what psychological state a player was able to enjoy games.

In addition, a store visiting frequency and a psychological state (for example, a customer satisfaction degree score) of each of the members are grasped, and in an early stage, a candidate of each less frequently store visiting member can be estimated. In addition, further, each member whose won money amount was small but was able to enjoy games (whose customer satisfaction degree is high) is grasped, and such members can be classified in details, viewed from various aspects.

In addition, by totalizing the customer satisfaction degree score for each machine, machine attributes and types can be grasped. So far, as for machines, only information provided by catalogs has been available. However, psychological influence exerted on a player as a result of games which a player has executed is taken into consideration and thus, individual machines can be evaluated.

[Fraudulent Act Analysis Based on Short-Term PO Discrepancy]

In the conventional game information analysis system, it has been difficult to detect a fraudulent act in real time. However, in the game information analysis system 2001 according to the present invention, as described above, the "detection of the bonus game state" and the "detection of a session (one gaming)" are enabled, and in addition, the "representation of game attributes by candlestick charts" is conducted, thereby enabling effective fraudulent act detection using these new functions with a higher accuracy and less maldetection.

In the game information analysis system 2001 according to the present invention, the fraudulent act analysis is conducted by the game information analysis part 2255 of the analysis server 2012. When a fraudulent act is detected or a possibility of the fraudulent act is detected, an alert process such as an alert display on a display of a client terminal 2011 can be conducted.

For example, with respect to the "detection of the bonus game state", in the game information analysis system 2001 according to the present invention, the normal-time PO over a predetermined time period is previously calculated, and an average behavior in the normal section is grasped. When a discrepancy with the normal-time PO is at a predetermined degree or more, said game is determined as being in the bonus game state. In the above-described example, when the normal-time PO is calculated to be 79.2 (refer to FIG. 124), a game whose game PO (a moving average of three games including the preceding one game and the succeeding one game) is 792 or more is detected as a bonus game (refer to FIG. 126).

Therefore, for the fraudulent act analysis, here, in a case where the normal-time PO is assumed to be 79.2, for example, a game having a game PO (the moving average of three games including the preceding one game and the succeeding one game) of 792 (10 times of 79.2) up to 38,600 (500 times of 79.2) is detected as a bonus game. When a value of PO is equal to or greater than it, it is deemed that the fraudulent act is committed (or there is the possibility that the fraudulent act is committed), the alert process can be conducted.

In addition, with respect to the "detection of a session (one gaming)", in the game information analysis system 2001 according to the present invention, based on the insertion and ejection of a membership card, sectioning of sessions can be detected, and from the statistical information or the like such as an average playing time period of one session and an average number of played games of one session, which are obtained based on the past insertion and ejection of a membership card, sectioning of sessions can be estimated with a high accuracy.

Therefore, for the fraudulent act analysis, here, in a case where values of a number of games, a playing time period, PO, Winloss, Bet, Winloss/Bet, and other values pertinent to game information in the detected or estimated one session are compared with average values or the like obtained with respect to the above-mentioned values in the past session, and there are marked discrepancies therebetween, it is deemed that the fraudulent act is committed (or there is the possibility that the fraudulent act is committed), the alert process can be conducted.

For example, in the report (fraudulent act summary) displayed when displaying of the fraudulent act analysis displayed by the specialized analysis display part 2560 of the menu screen 2500 shown in the above-described FIG. 89 is instructed, the "caution-needed session list" which lists the sessions, in each of which there is a possibility that the fraudulent act was committed, is provided. In this caution-needed session list, the sessions in which values of Winloss calculated in respective sessions as units indicate abnormal values are listed and displayed in the ascending order of values of Winloss.

In addition, with respect to the "representation of game attributes by the candlestick charts", in the game information analysis system 2001 according to the present invention, in accordance with a game progress in one session, the candlestick charts are generated, and based on a pattern of a shape of each of the candlestick charts, the psychological state of a player can be represented as a score.

Therefore, for the fraudulent act analysis, here, in a case where the candlestick charts generated in accordance with the game progress in one session do not correspond to any of the previously prepared patterns or the real body and the shadow or shadows of each of the candlestick charts have abnormal shapes, it is deemed that the fraudulent act is committed (or there is the possibility that the fraudulent act is committed), the alert process can be conducted.

It is to be noted that the above-described methods and conditions for the fraudulent act analysis are merely examples, and by applying the respective functions of the "detection of the bonus game state", the "detection of a session (one gaming)", and the "representation of game attributes by candlestick charts" in the game information analysis system 2001 according to the present invention, the fraudulent act analysis can be conducted in various methods.

[Game Information Analysis System in Consideration of Customer Psychology]

In administration of a hall store, investment money amounts are received as revenues from players who are customers, whereas payout amounts by slot machines are required as expenditures. Therefore, unlike in other categories of business, a game information analysis system which pursues only a profit on an administration side is insufficient.

Therefore, in the game information analysis system 2001 according to the present invention, an analysis can be made such that a psychological state of a customer is associated with administration data which can be obtained from a hall store (for example, game information including machine operation state data), thereby representing the degree of satisfaction of customers as a score. In addition, a hall store satisfaction degree score is also calculated, and the degree of satisfaction of customers and the degree of satisfaction of a hall store are compared with each other, and a balance between both sides is thereby displayed, thus allowing an owner of a hall store or the like to easily conduct an administration balance diagnosis.

As a report which displays the balance between the degrees of satisfaction obtained by comparing the degree of satisfaction of customers and the degree of satisfaction of a hall store, for example, there is the transition of a balance between degrees of satisfaction (monthly) shown in FIG. 84. Here, with reference to FIG. 139 and FIG. 140, a graph which is similar to the graph of the transition of a balance between degrees of satisfaction (monthly) shown in FIG. 84 will be described in details. A user issues an instruction from a menu screen 2500 displayed on a display of a client terminal 2011, and an analysis process is conducted by an analysis server 2012, thereby outputting also these graphs onto the display or the like of the client terminal 2011.

FIG. 139 is a graph 2600 whose horizontal axis indicates a hall store satisfaction degree score and vertical axis indicates a customer satisfaction degree score, as in FIG. 84 and shows satisfaction degree ranks for which the satisfaction degree scores of a hall store and customers are synthesized. When in accordance with the hall store satisfaction degree score and the customer satisfaction degree score, points are plotted, a distance (radius size) from the point to the origin indicates each degree of satisfaction (satisfaction degree rank) of the whole.

Here, the hall store satisfaction degree score is, for example, a score for which values of Winloss/day/machine are compiled with respect to all machines on a monthly basis. Of course, as the hall store satisfaction degree score, other indices can be added. In addition, the customer satisfaction degree score is, for example, a customer satisfaction degree score for which values of a customer satisfaction degree score obtained from a psychology degree and a degree of satisfaction of each player are compiled with respect to all players (or all members) on a monthly basis as shown in FIG. 138. The above-described hall store satisfaction degree score and customer satisfaction degree score are standardized scores so as to achieve a minimum value=0 and a maximum value=100. In addition, the above-described hall store satisfaction degree score and customer satisfaction degree score can be classified into three levels (Low, Normal, and High) by using a standard deviation (refer to FIG. 106).

For example, satisfaction degree ranks are evaluated in the following five stages in accordance with threshold values of radius sizes (refer to FIG. 106).

(1) $0 \leq$ very dissatisfied $\leq 30\times(2)^{1/2}$ (2) $30\times(2)^{1/2} \leq$ dissatisfied $< 40\times(2)^{1/2}$ (3) $40\times(2)^{1/2} \leq$ medium $< 60\times(2)^{1/2}$ (4) $60\times(2)^{1/2} \leq$ satisfied $< 70\times(2)^{1/2}$ (5) $70\times(2)^{1/2} \leq$ very satisfied $\leq 100\times(2)^{1/2}$ In FIG. 139, an area corresponding to (1) a satisfaction degree rank "very dissatisfied" is an area formed from an origin so as to be of a fan shape having radii being distances (each radius size=$30\times(2)^{1/2}$) between points (30, 30) of a hall store satisfaction degree score=30 on the horizontal axis and a customer satisfaction degree score=30 on the vertical axis and the origin (0, 0) (in other words, an inside of a circular arc 2601).

In addition, an area corresponding to (2) a satisfaction degree rank "dissatisfied" is an area formed from the origin so as to be of a fan shape (excluding the area corresponding to (1) the satisfaction degree rank "very dissatisfied") having radii being distances (each radius size=$40\times(2)^{1/2}$) between points (40, 40) of a hall store satisfaction degree score=40 on the horizontal axis and a customer satisfaction degree score=40 on the vertical axis and the origin (0, 0) (in other words, an inside of a circular arc 2602 and an outside of the circular arc 2601).

In addition, an area corresponding to (3) a satisfaction degree rank "normal" is an area formed from the origin so as to be of a fan shape (excluding the area corresponding to (1) the satisfaction degree rank "very dissatisfied" and the area corresponding to (2) the satisfaction degree rank "dissatisfied") having radii being distances (each radius size=$60\times(2)^{1/2}$) between points (60, 60) of a hall store satisfaction degree score=60 on the horizontal axis and a customer satisfaction degree score=60 on the vertical axis and the origin (0, 0) (in other words, an inside of a circular arc 2603 and an outside of the circular arc 2602).

Further, an area corresponding to (4) a satisfaction degree rank "satisfied" is an area formed from the origin so as to be of a fan shape (excluding the area corresponding to (1) the satisfaction degree rank "very dissatisfied", the area corresponding to (2) the satisfaction degree rank "dissatisfied", and the area corresponding to (3) the satisfaction degree rank "normal") having radii being distances (each radius size=$70\times(2)^{1/2}$) between points (70, 70) of a hall store satisfaction degree score=70 on the horizontal axis and a customer satisfaction degree score=70 on the vertical axis and the origin (0, 0) (in other words, an inside of a circular arc 2604 and an outside of the circular arc 2603).

In addition, further, an area corresponding to (5) a satisfaction degree rank "very satisfied" is an area formed from the origin so as to be of a fan shape (excluding the area corresponding to (1) the satisfaction degree rank "very dissatisfied", the area corresponding to (2) the satisfaction degree rank "dissatisfied", the area corresponding to (3) the satisfaction degree rank "normal", and the area corresponding to (4) the satisfaction degree rank "satisfied") having radii being distances (each radius size=$100\times(2)^{1/2}$) between points (100, 100) of a hall store satisfaction degree score=100 on the horizontal axis and a customer satisfaction degree score=100 on the vertical axis and the origin (0, 0) (in other words, an inside of a rectangle 2605 formed by the hall store satisfaction degree score=100 on the horizontal axis and the customer satisfaction degree score=100 on the vertical axis and an outside of the circular arc 2604).

In the example shown in FIG. 139, the areas corresponding to the satisfaction degree ranks are respectively not configured with the even radius sizes and with even areas of the corresponding areas. As described above, the satisfaction degree ranks can be evaluated by employing an arbitrary determination method.

Here, when in the graph 2600 shown in FIG. 139, a point 2611 which is a point (70, 30) of a hall store satisfaction degree score=70 and a customer satisfaction degree score=30 is plotted, this point 2611 is located in the area corresponding to (3) the satisfaction degree rank "normal", and the satisfaction degree rank="normal" is evaluated.

In addition, when a point 2612 which is a point (60, 70) of a hall store satisfaction degree score=60 and a customer satisfaction degree score=70 is plotted, this point 2612 is located in the area corresponding to (4) the satisfaction degree rank "satisfied", and the satisfaction degree rank="satisfied" is evaluated.

Further, when a point 2613 which is a point (10, 30) of a hall store satisfaction degree score=10 and a customer satisfaction degree score=30 is plotted, this point 2613 is located in the area corresponding to (1) the satisfaction degree rank "very dissatisfied", and the satisfaction degree rank="very dissatisfied" is evaluated.

In the example shown in FIG. 139, as described above, the three points (the point 2611, the point 2612, and the point 2613) in accordance with the hall store satisfaction degree scores and the customer satisfaction degree scores are plotted in the graph 2600. By concurrently plotting points as described above on the graph as points in accordance with monthly hall store satisfaction degree scores and customer satisfaction degree scores, monthly transition related to the satisfaction degree ranks can be easily grasped.

Although FIG. 140 is a graph 2620 having the same configuration as in FIG. 139, a viewpoint of the graph 2026 in FIG. 140 is different from that of the graph 2600 in FIG. 139. The graph 2620 shown in FIG. 140 indicates a balance between degrees of satisfaction of a hall store and customers. When points are plotted in accordance with a hall store satisfaction degree score and a customer satisfaction degree score, according to an angle which a position of a point among the points forms between a vertical axis and a horizontal axis of the graph 2620, the balance between degrees of satisfaction between a hall store and customers is determined.

For example, in the graph 2620, the balance between degrees of satisfaction is evaluated in the following five stages in accordance with threshold values of angles formed between the horizontal axis and the vertical axis of the graph (refer to FIG. 106).

(1) 0≤a degree of satisfaction of a hall store is stronger (hall store stronger).<15
(2) 15≤a degree of satisfaction of a hall store is strong (biased in favor of a hall store).<45
(3) 45≤medium<55
(4) 55≤a degree of satisfaction of customers is strong (biased in favor of customers).<75
(5) 75≤a degree of satisfaction of customers is stronger (customers stronger).≤90

In FIG. 140, an area corresponding to (1) a balance between degrees of satisfaction "a degree of satisfaction of a hall store is stronger" is an area between the horizontal axis of the graph 2620 and a line 2624, the line 2624 and the horizontal axis forming an angle of 15 degrees.

In addition, an area corresponding to (2) a balance between degrees of satisfaction "a degree of satisfaction of a hall store is strong" is an area between the above-described line 2624 and a line 2623, the line 2623 and the horizontal axis forming an angle of 45 degrees.

In addition, an area corresponding to (3) a balance between degrees of satisfaction "normal" is an area between the above-described line 2623 and a line 2622, the line 2622 and the horizontal axis forming an angle of 55 degrees.

Further, an area corresponding to (4) a balance between degrees of satisfaction "a degree of satisfaction of customers is strong" is an area between the above-described line 2622 and a line 2621, the line 2621 and the horizontal axis forming an angle of 75 degrees.

In addition, further, an area corresponding to (5) a balance between degrees of satisfaction "a degree of satisfaction of customers is stronger" is an area between the above-described line 2621 and the vertical axis.

In the example shown in FIG. 140, the areas corresponding to the balances between degrees of satisfaction are respectively not configured as areas having even angles and areas corresponding to the areas are also not even. For example, as the above-described area corresponding to (3) the balance between degrees of satisfaction "normal", an area in which the customer satisfaction degree score is relatively higher than the hall store satisfaction degree score is set. As described above, the balance between degrees of satisfaction can be evaluated by employing an arbitrary determination method.

Here, when in the graph 2620 shown in FIG. 140, a point 2631 (a point at the same position where the point 2611 shown in FIG. 139 is located) which is a point (70, 30) of a hall store satisfaction degree score=70 and a customer satisfaction degree score=30 is plotted, this point 2631 is located in the area corresponding to (2) the balance between degrees of satisfaction "a degree of satisfaction of a hall store is strong, biased in favor of a hall store", and the balance between degrees of satisfaction="a degree of satisfaction of a hall store is strong, biased in favor of a hall store" is evaluated.

In addition, when a point 2632 (a point at the same position where the point 2612 shown in FIG. 139 is located) which is a point (60, 70) of a hall store satisfaction degree score=60 and a customer satisfaction degree score=70 is plotted, this point 2632 is located in the area corresponding to (3) the balance between degrees of satisfaction "normal", and the balance between degrees of satisfaction="normal" is evaluated.

Further, when a point 2633 (a point at the same position where the point 2613 shown in FIG. 139 is located) which is a point (10, 30) of a hall store satisfaction degree score=10 and a customer satisfaction degree score=30 is plotted, this point 2633 is located in the area corresponding to (4) the balance between degrees of satisfaction "a degree of satisfaction of customers is strong, biased in favor of customers", and the balance between degrees of satisfaction="a degree of satisfaction of customers is strong, biased in favor of customers" is evaluated.

In the example shown in FIG. 140, as described above, the three points (the point 2631, the point 2632, and the point 2633) in accordance with the hall store satisfaction degree scores and the customer satisfaction degree scores are plotted in the graph 2620. By concurrently plotting points as described above on the graph as points in accordance with monthly hall store satisfaction degree scores and customer satisfaction degree scores, monthly transition related to the balances between degrees of satisfaction can be easily grasped.

In addition, by combining the respective points in the graph 2600 shown in FIG. 139 and the graph 2620 shown in FIG. 140, from viewpoints of the satisfaction degree ranks and the balances between degrees of satisfaction, comprehensive evaluation also can be made. For example, the point 2631 in FIG. 140 (the point 2611 in FIG. 139) is evaluated as being the satisfaction degree rank="normal" and the balance between degrees of satisfaction="a degree of satisfaction of a hall store is strong, biased in favor of a hall store". The point 2632 in FIG. 140 (the point 2612 in FIG. 139) is evaluated as being the satisfaction degree rank="satisfied" and the balance between degrees of satisfaction="normal". The point 2633 in FIG. 140 (the point 2613 in FIG. 139) is evaluated as being the satisfaction degree rank="very dissatisfied" and the balance between degrees of satisfaction="a degree of satisfaction of customers is strong, biased in favor of customers".

[Game Information Analysis System Enabling Connection with the Existing Game System]

As described above, the game information analysis system 2001 according to the one embodiment of the present invention is connected to a game system, obtains game information including machine operation data and the like (for example, IN/OUT information in each game and the like) from said game system, and conducts game analyses from said game information so as to determine not only a money amount of revenue and expenditure (simple winning or losing) but also a psychological state of a player as a customer in games.

There is a case where the game system connected to the game information analysis system 2001 is designed and developed, independently of the game information analysis system 2001. For example, it is a case where the game information analysis system 2001 newly receives game information in the existing game system manufactured by other company, thereby conducting analyses.

The analysis server 2012 of the game information analysis system 2001 receives the game information from a hall management server 2013 and slot machines 2014 already operating in the existing game system as mentioned above. In such a case, the analysis server 2012 can be configured to grasp a protocol and a format of data transmitted from the hall management server 2013 of the game system and to receive the data so as to correspond thereto.

As described above, the game information analysis system 2001 according to the present invention detects each game in a bonus game state based on an investment money amount of a player and a payout amount of each of the slot machines 2014 without using any information to identify a bonus game and further, can detect each session and can realize representation or the like using candlestick charts of game attributes. Therefore, also from the existing game system connected, basically, by using the game information related to IN/OUT, effective analyses of the game information can be conducted. In addition, by using the past game information (for example, machine operation data) accumulated by the existing game system, analyses of the same game information can be conducted.

By using the past game information accumulated by the existing game system, player attributes including a psychological state of a player, machine attributes, and the like can be analyzed. Thus, for example, even in a case where the game information analysis system 2001 according to the present invention is introduced halfway to said existing game system, for a while, without obtaining the game information from each of the slot machines and conducting the analysis, player attributes and machine attributes at the present time can be immediately grasped (by the past accumulated data), and from the moment at which the use of the game information analysis system 2001 according to the present invention is started, outputting or the like of effective analysis reports is enabled.

[Machine Analysis and Classification Using Candlestick Charts]

As described above, the game information analysis system 2001 according to the one embodiment of the present invention is connected to a game system, obtains game information including machine operation data and the like (for example, IN/OUT information in each game and the like) from said game system, and conducts game analyses from said game information so as to determine not only a money amount of revenue and expenditure (simple winning or losing) but also a psychological state of a player as a customer in games.

As a result, in the game information analysis system 2001, from the IN/OUT information in each game for each machine, respective functions of the "detection of the bonus game state", the "detection of a session (one gaming)", and the "representation of game attributes by candlestick charts" can be provided. By using these functions, machines (slot machines) are classified, thereby enabling machine analyses. It is difficult to conduct these machine analyses based on current data related to operation ratios and sales, catalogs and specifications, and the like.

From the analysis of sessions for each machine, candlestick chart related psychology scores are calculated through the above-described "detection of the bonus game state" and "detection of a session (one gaming)", and customer satisfaction degree scores are obtained (refer to FIG. 138). Here, these customer satisfaction degree scores are obtained for each machine on a monthly basis. On the other hand, the hall store satisfaction degree scores are compiled on a monthly basis, for example, by collecting data related to Winloss/day/machine for each machine.

Here, as in FIG. 140, a graph whose horizontal axis indicates the hall store satisfaction degree score and vertical axis indicate the customer satisfaction degree score is displayed, and on each of the machines, distribution of the balance between degrees of satisfaction of a hall store and customers can be grasped. In this graph, points corresponding to one machine are respectively plotted, and a state of the balance between degrees of satisfaction for each machine is shown. In accordance with states of the balances, machines can be classified (categorized). In addition, as in FIG. 139, the satisfaction degree ranks can be grasped. It is to be noted that when a user issues an instruction from the menu screen 2500 displayed on the display of the client terminal 2011, the analysis process is conducted by the analysis server 2012, and this graph is also outputted onto the display or the like of the client terminal 2011.

In addition, in the game information analysis system 2001, for each machine, a big hit game-number-interval (an interval of a number of games, at which a big hit of Win/Bet×100 or more occurs) which indicates an interval of a number of games, at which a game in which an amount of a payout corresponding to a big hit, which is a predetermined amount or more, occurs is calculated. A big hit average multiplier (an average value of values of Win/Bet which are values of Win/Bet×100 or more) in a game having a payout amount which is the predetermined amount or more corresponding to a big hit can be calculated (refer to FIG. 113).

In the calculation of each of the big hit game-number-interval and the big hit average multiplier for each machine, a step of determining which game is a bonus game by the above-described "detection of a bonus game state" is included. The big hit game-number-interval and the big hit average multiplier for each machine, calculated as described above, can be displayed singly or displayed so as to be associated with the above-described balance between degrees of satisfaction for each machine. In addition, with respect to each of the machines classified by the big hit game-number-interval and the big hit average multiplier, a balance between degrees of satisfaction can be displayed so as to correspond thereto.

In addition, in the game information analysis system 2001, from a machine ID or the like, a vendor (maker) and a theme of an individual machine can be obtained. Therefore, such machine attributes are associated with a customer satisfaction degree score for each machine, and with respect to said machine, a degree of satisfaction of customers of each maker and a degree of satisfaction of customers of each theme can be displayed.

In addition, the customer satisfaction degree score of each machine is associated with the big hit game-number-interval and the big hit average multiplier, and for said machine, attributes related to a big hit and a degree of satisfaction of customers are compared to be displayed. For example, in the above-described FIG. 30, a "rough-wave machine" whose big hit average multiplier (volatility) is high and a "small-wave machine" whose big hit average multiplier is low are classified. In this classification, respective degrees of satisfaction of customers can be shown.

It is to be noted that in addition to the above-described candlestick chart related psychology score and customer satisfaction degree score, a popularity degree of each machine can be grasped also by a Bet money amount (an amount and a ratio invested to each machine), a Bet money amount/game, a playing time period, a number of played games, and the like. In FIG. 87, machines are classified by makers, and the report (by-maker Bet ratio (monthly)) which allows a popularity degree to be grasped by the Bet ratio of each of the classified makers is shown.

Through these analyses of machines and the classification in accordance with each of the analysis results, information of the machines which cannot be grasped by catalogs and specifications or the like can be obtained, and trends of machines also can be estimated.

In FIG. 141, representative machine attributes are shown. Among these, pieces of information such as the candlestick chart related psychology score, the customer satisfaction degree score, the hall store satisfaction degree score, the balance between degrees of satisfaction, the satisfaction degree ranks, the big hit game-number-interval, the big hit average multiplier, the Bet money amount, the Bet money amount/game, the playing time period, the number of played games, the Winloss/Bet (all sections), the Winloss/Bet (normal section), and the Winloss/Bet (discharge section) can be obtained from the game information which is constituted of the information related to the IN/OUT received from each of the slot machines. In addition, pieces of information such as a machine ID, a theme (game content), a vendor (maker) can be obtained from registration data. In addition thereto, there are a variety of machine attributes, which are also included in the indices shown in FIG. 103 to FIG. 120.

[Player Analysis and Classification Using Candlestick Charts]

As described above, the game information analysis system 2001 according to the one embodiment of the present invention is connected to a game system, obtains game information including machine operation data and the like (for example, IN/OUT information in each game and the like) from said game system, and conducts game analyses from said game information so as to determine not only a money amount of revenue and expenditure (simple winning or losing) but also a psychological state of a player as a customer in games.

As a result, in the game information analysis system 2001, from the IN/OUT information in each game for each player, respective functions of the "detection of the bonus game state", the "detection of a session (one gaming)", and the "representation of game attributes by candlestick charts" can be provided. By using these functions, players are classified, thereby enabling player analyses such as a play style. It is to be noted that although players whose game contents in each game can be grasped are normally "members" since each of the members uses a membership card upon gaming and is thereby identified, game contents of players including non-members are grasped in each session as a unit, attributes of these sessions are classified to be analyzed, thereby allowing trends of games played as anonymous players to be grasped.

From the analysis of sessions for each player, candlestick chart related psychology scores are calculated through the above-described "detection of the bonus game state" and "detection of a session (one gaming)" and customer satisfaction degree scores are obtained (refer to FIG. 138). Here, these customer satisfaction degree scores are obtained for each player on a monthly basis. On the other hand, the hall store satisfaction degree scores are compiled on a monthly basis, for example, by collecting data related to the Winloss of each player.

Here, as in FIG. 140, a graph whose horizontal axis indicates the hall store satisfaction degree score and vertical axis indicate the customer satisfaction degree score is displayed, and for each of the players, distribution of the balance between degrees of satisfaction of a hall store and customers can be grasped. In this graph, points corresponding to one member are respectively plotted, and a state of the balance between degrees of satisfaction for each member is shown. In accordance with states of the balances, players can be classified (categorized). In addition, as in FIG. 139, the satisfaction degree ranks can be grasped. It is to be noted that when a user issues an instruction from the menu screen 2500 displayed on the display of the client terminal 2011, the analysis process is thereby conducted by the analysis server 2012, and this graph is also outputted onto the display or the like of the client terminal 2011.

In FIG. 142, representative player attributes are shown. Among these, pieces of information such as the candlestick chart related psychology score, the customer satisfaction degree score, the hall store satisfaction degree score, the balance between degrees of satisfaction, the satisfaction degree ranks, the Bet money amount, the Bet money amount/game, the playing time period, and the number of played games can be obtained from the game information which is constituted of the information related to the IN/OUT received from each of the slot machines. In addition, pieces of information such as a member ID, a member nationality, a member age, and a member sex can be obtained from registration data. Further, classification of members (active members, dormant members, ghost members, and the like) and gaming types (good members, highly betting members, highly frequently store visiting members, estranged members, new members, and the like) can be obtained from the registration data or game information (information obtained by evaluating a game history). In addition thereto, there are a variety of player attributes, which are also included in the indices shown in FIG. 103 to FIG. 120.

[Matching Between Classified Machine Attributes and Player Attributes]

In the game information analysis system 2001 according to the present invention, through the above-described analyses, matching between classified machine attributes and classified player attributes can be made, and an analysis on whether a machine attribute is an attribute matching a player attribute is enabled.

Here, with reference to FIG. 143, as pieces of machine use history data, a plurality of records including a player investment money amount, a slot machine payout money amount, a game start date and time, a game termination date and time, a member identification code (member ID), and a machine identification code (machine ID) are shown. This data is an example of game information transmitted from each of the slot machines to the game information analysis system 2001 according to the present invention for each game.

Histories of the above-mentioned game information are accumulated and are totalized for a predetermined time period (for example, one day, one week, one month, and the like), and a member-machine correspondence table as shown in FIG. 144 can be prepared. By using this table, it can be grasped on which machine each of the members played games for a predetermined time period.

In addition, from the machine use history data shown in FIG. 143, a use machine management table (not shown) classified by values of Bet money amount/game for each member can be prepared. In this table, for each member ID, machine IDs of machines which that member used are stored. For example, the machine IDs of machines which that member having that member ID used are stored in the descending order of average amounts of values of invested Bet money amount/game.

In addition, from the machine use history data shown in FIG. 143, a used machine management table (not shown) arranged in the order of use frequencies can be prepared. In this table, for each member ID, machine IDs of machines which that member having that member ID are stored in the descending order of use frequencies.

For example, by providing the tables as described above, the above-mentioned matching between machine attributes and player attributes can be conducted. It is to be noted that the example of the matching shown here is merely one example. By employing other various methods, machine attributes and player attributes are associated with each other, and the matching can be conducted.

For example, a member ID of a player whose value of Bet money amount/game is classified as being large as a player attribute is extracted, machines which a member having that member ID used can be identified by using the member-machine correspondence table shown in FIG. 144 or the use machine management table classified by values of Bet money amount/game. It is to be noted that here, all machines which each player used or one machine or a plurality of machines selected based on predetermined criteria may be associated with each player.

With respect to all players whose values of Bet money amount/game are classified as being large, the above-mentioned use machines are identified, and a group of the machines is thereby extracted. Therefore, with respect to the group of the machines, predetermined machine attributes are viewed, and thus, trends of the machines used by the players whose values of Bet money amount/game are classified as being large can be grasped. For example, distribution of the customer satisfaction degree scores of those machines, distribution of the playing time periods thereof, and the like can be grasped.

Conversely, as machine attributes, machines subjected to predetermined classification are extracted, and through actual machine use conditions of players (for example, with reference to the member-machine correspondence table shown in FIG. 144 or the like), related member IDs are extracted. With respect to a group of the players having those member IDs, predetermined player attributes are viewed, and thus, trends of players related to the machines having predetermined machine attributes can be grasped.

Further, through the matching between player attributes and machine attributes, popular machines classified by ages of members can be displayed, and machines popular among respective ages are displayed for each theme, and various analyses can be conducted.

In addition, in a case where analyses targeted for non-members and all members including the non-members are conducted, matching may be conducted by using sessions, instead of the players. In other words, from the machine use history data shown in FIG. 143, sessions each constituting a series of a plurality of games, which a player played in a predetermined time period are obtained, and machines respectively corresponding to these sessions are identified. The relationship is shown in the session-machine correspondence table shown in FIG. 145. It is to be noted that the sessions are detected by employing the above-described method of the detection of a session and the like.

Here, with respect to sessions, a variety of attributes can be obtained. For example, customer satisfaction degree scores related to the sessions, a total time of the sessions, an average value of Bet/game of the sessions, member ratios of the sessions, and the like can be obtained. These session attributes can be considered as those equivalent to player attributes since the sessions are played by one player.

Therefore, the session attributes and the machine attributes are associated with each other, and matching can be conducted.

For example, as the session attributes, sessions whose customer satisfaction degree scores are classified as being large are extracted, and machines used in the sessions can be identified by using the session-machine correspondence table shown in FIG. 145.

With respect to all sessions whose customer satisfaction degree scores are classified as being large, the above-mentioned use machines are identified, and a group of the machines used in the sessions is thereby extracted. Therefore, with respect to the group of the machines, predetermined machine attributes are viewed, and thus, trends of the machines used in the sessions whose customer satisfaction degree scores are classified as being large can be grasped. For example, distribution of makers of the machines, distribution of operation ratios thereof, distribution of playing time periods thereof, and the like can be grasped.

[Popularity Analysis by Time Ratios of Classified Machines and Players]

By using the above-described machine attributes and player attributes, an analysis by time ratios is conducted based on said attributes, and thus, player attribute ratios of popular machines, machine attribute ratios of preference of target customers, and the like can be analyzed.

A report shown in FIG. 146 shows, for example, game theme attributes (monthly) of members in their 40s which are a part of a report displayed when displaying of a monthly member attribute report displayed by a member report display part 2540 of a menu screen 2500 shown in FIG. 46 is instructed. Visiting frequencies and game theme attributes (monthly) of members in their 40s shown in FIG. 146 are related to games played by the members in their 40s and indicate playing time ratios classified by game themes on a monthly basis in a bar graph whose vertical axis indicates playing time ratios and horizontal axis indicates months from December in 2013 to October in 2014.

Here, by the graph shown in FIG. 146, shares of respective game themes viewed by the playing time ratios in each of the months can be grasped. For example, as shown in a rectangular area drawn by a dotted line, it can be grasped that in said time period, playing time period composition ratios of a game theme A and a game theme B were largely changed. This shows that with respect to the members in their 40s, trends of popular game themes were dramatically changed at this timing. In such a case, marketers or the like can examine and implement actions for the target customers whose customer trends are grasped, such as introduction of machines with popular game themes and machines whose types are similar thereto.

In order to display the graph shown in FIG. 146, the game information analysis system 2001 grasps machines used by the members classified as being in their 40s as player attributes and playing time periods of the machines in a predetermined table (which is not shown, is similar to the used machine management table shown in FIG. 142, and is obtained from accumulated pieces of game information (the machine use history data shown in FIG. 142)) on a monthly basis. Thereafter, the game information analysis system 2001 obtains game themes (game contents) from the machine attributes of the corresponding machines, totalizes playing time periods for respective game themes and for respective months, standardizes these, and displays these as the playing time ratios.

Although in the example shown in FIG. 146, based on the player attributes and the machine attributes, the analysis by the time ratios (playing time ratios) is conducted, an analysis by Bet ratios may be conducted. For example, in the report of the vendor attributes (monthly) shown in FIG. 87 and the report of the by-store-visiting-frequency and by-bet-amount attributes (monthly) shown in FIG. 92, the standardized Bet ratios for the classified machine attributes and for the classified player attributes are shown in the bar graphs.

In addition, in addition to the time ratios and the Bet ratios, an analysis may be conducted based on other criteria such as a number of users and a number of machines.

[Failure Risk Analysis Based on Machine Failure Analysis and Fraudulent Act Analysis]

In the game information analysis system 2001 according to the one embodiment of the present invention, when failure has occurred, data or the like indicating the occurrence of the failure and a failure part of each machine is received as game information (from each of the slot machines 2014) and these pieces of data are accumulated in time series. For the machine failure, there is a case where the failure is detected by a sensor or a failure detection circuit inside of each machine and an event (failure notification event) is generated or a case where in the form of a response to a predetermined keep-alive signal, data (for example, which notifies normality) is transmitted.

In a part of hall stores, 24-hour-business is operated, and when machines are stopped by the failure or the like, it directly leads to a reduction in a machine operation ratio, causing losses. In the game information analysis system 2001, respective machine failure histories are accumulated and managed, and thus, machine failure parts of respective machines and respective machine parts (function parts) are quickly grasped, thereby enabling displaying and alerting. Moreover, machines which had the failure and machines related to the parts which had the failure (for example, machines manufactured by makers whose products often cause the failure, machines in which function parts or components often causing the failure are commonly used, and the like) can be previously managed as machines which are highly likely to cause the failure. Thus, the machine failure can be quickly addressed, and before the failure of machines, by taking appropriate countermeasures such as inspection and replacement, the failure can be prevented from occurring. This sort of failure risk analysis is, as described above, particularly important in an environment in which machines operate for 24 hours.

In addition, normally, upon the occurrence of the failure, an event signal is transmitted from each of the slot machines 2014, and as such a signal, an event signal (failure occurrence signal) showing the occurrence of the failure and an event signal (non-failure signal) not showing the failure are included. Further, the non-failure signal includes a signal which is substantially notification related to the failure. In the game information analysis system 2001 according to the present invention, all of these event signals can be grasped, and in consideration of occurrence ratios of these event signals, the machine failure risk can be managed.

In addition, in machines from which the event signals are often transmitted, it is suspected that fraudulent acts are likely to be committed. With respect to a fraudulent act analysis, the game information analysis system 2001 according to the present invention determines the possibility of the fraudulent act based on a relationship of frequencies of event signals (for example, a failure occurrence ratio) and values of IN/OUT of the corresponding machines, enabling displaying and alerting.

Further, for the fraudulent act analysis, a radical change in the failure occurrence ratios is determined, and in accordance with the change ratios, the possibility of the fraudulent act can also be notified in several levels.

It is to be noted that although the game information analysis system 2001 according to the present invention conducts the above-described failure risk analysis and fraudulent act analysis based on the event signals from each of the slot machines 2014, the event signals (transmitted data) from each of the slot machines 2014 are taken into the analysis server 2012 in real time and notification related to the failure risk and the fraudulent act can also be conducted in real time, or the data transmitted from each of the slot machines 2014 is accumulated on the hall management server 2013 or the analysis server 2012, and afterward, based on the data accumulated for a predetermined time period, analyses related to the failure risk and the fraudulent act can also be conducted.

FIG. 147 is a diagram showing a report related to a machine failure risk analysis in the game information analysis system 2001 according to the present invention. In this report, for example, shown is a machine failure analysis (in real time) which is a part of the report displayed when displaying of the failure analysis displayed by the specialized analysis display part 2560 of the menu screen 2500 shown in FIG. 47 is instructed. In FIG. 147, data, for example, totalized with respect to the machine failure analysis is shown on a monthly basis, and items related to the failure (for example, items analyzed from information or the like obtained from the event signals) for each machine are displayed.

In FIG. 147, for each machine, a machine ID, a status, a vendor, a theme, a number of sessions, a number of games, a playing time period (h), a failure occurrence signal, a non-failure signal, and a total stopping time (h) are shown.

The machine ID is a code for identifying a machine; the status shows a signal display indicating machine states in three phases; the vendor is a maker of the machine; the theme is the content of a game executed on the machine; the number of sessions is a unit of a series of games (one gaming) played by a player, calculated by the game information analysis system 2001 according to the present invention; the number of games is a number of games executed on the machine; the playing time period (h) is a time during which a player played; the failure occurrence signal indicates a number of event signals (failure occurrence signals) transmitted from the machine and showing the occurrence of the failure; the non-failure signal indicates a number of event signals (non-failure signals) transmitted from the machine and not showing the failure; and the total stopping time (h) is a time during which the machine was stopping for some reason and normally, does not includes a time during which a player is simply not playing and the machine is in a normal state.

Here, for the status, in accordance with the statuses in the three phases ranked according to machine states, the signal display is conducted. For example, as a result of the failure analysis, when the machine state is favorable, a round shape part on a left end of the signal display having a traffic light style is displayed in green color (when the machine state is not favorable, this part is displayed in black color). When there is some risk (small risk) in the machine state, a round shape part in the middle of the signal display having the traffic light style is displayed in yellow color (when there is not some risk (the small risk) in the machine state, this part is displayed in black color). When there is a risk (great risk) in the machine state, a round shape part in the middle of the signal display having the traffic light style is displayed in red color (when there is not the risk (great risk) in the machine state, this part is displayed in black color).

For the above-described machine states, the failure risks are evaluated based on, for example, the number of the event signals (the failure signal and the non-failure signal) or the like transmitted from the machine in a predetermined time period, intervals of the transmission, failure ratios, failure parts, change ratios of these in a predetermined time period, the total stopping time, and the like. Based on magnitudes of the failure risks, ranks in the three phases are determined. It is to be noted that although in the example shown in FIG. 147, when a machine has newly come into the state of the risk (great risk), alert displaying, sound alert notification, and the like can be conducted in real time on the client terminal 2011, machine states related to the past predetermined time period may be displayed by using the event signals or the like accumulated for a predetermined time period.

In the machine failure analysis (in real time) shown in FIG. 147, when a row of a machine listed and displayed is selected by using a mouse, a touch panel, or the like, a number of event signals related to the failure parts (function parts) are shown in a histogram (not shown). In this example, the event signals are divided into the above-described failure signals and the non-failure signals to be displayed.

For example, for each of the function parts of the machine such as a bill validator, a card dispenser a cabinet, and a communication controller, the number of event signals is shown in the histogram. In addition, with respect to each of the function parts, the number of the failure signals and the number of the non-failure signals are separately displayed in the histogram.

In addition, with respect to the machine failure analysis, as described above with reference to FIG. 88, for example, by displaying the stopping time ranking (monthly) which is a part of the report displayed when displaying of the monthly machine operation report displayed by the machine report display part 2520 of the menu screen 2500 shown in FIG. 46 is instructed, the stopping time ranking (monthly) of a machine can be grasped. In addition, when displaying of the daily machine operation report displayed by the machine report display part 2520 is instructed, the stopping time ranking (daily) can be displayed.

In addition, with respect to the fraudulent act analysis, as described above with reference to FIG. 89, for example, by displaying the fraudulent act summary (in other words, statistics of caution-needed sessions, a list of abnormal sessions (a list of caution-needed sessions and a list of caution-needed machines), and the like) which is a part of the report displayed when displaying of the fraudulence analysis displayed by the specialized analysis display part 2560 of the menu screen 2500 shown in FIG. 47 is instructed, suspected machines which are determined based on suspected sessions can be grasped.

[Promotion Analysis]

In a hall store, for example, in order to promote an increase in store visiting frequencies of members, an increase in playing time periods thereof, an increase in Bet money amounts thereof, and the like, coupons are distributed to players having specific player attributes. As forms of distributing the coupons, there are a variety of forms such as provision of coupons of IC cards, provision of points to membership cards, and provision of meal tickets or shopping tickets. As with the coupons of the IC cards, the coupons provided by electronic media different from the membership cards are normally managed such that simple refunding (CASHOUT) cannot be made. The provision of the coupons as described above is a representative example of the promotion. In a hall store, in addition thereto, a variety of promotion can be conducted.

In the game information analysis system 2001 according to the one embodiment of the present invention, expenditure amounts expended for the promotion and money amounts used by players, who are provided with profits by this promotion, in games or the like after the provision can be managed. In view of the relationship between the expenditure amounts and the used money amounts, whether said promotion was successful is analyzed.

In addition, with respect to players and members who are provided with the profits by the promotion as described above, the above-described candlestick chart related psychology scores and degrees of satisfaction of customers are calculated, and how these indices were changed, for example, degrees of effect of the promotion conducted by distributing the coupons can be analyzed. In addition, whether or not the distributed coupons were used can be analyzed so as to be classified by player attributes.

In addition, the above-described candlestick chart related psychology scores and degrees of satisfaction of customers are calculated, and promotion such as the distribution of the coupons to players whose degrees of satisfaction are low can be implemented.

Moreover, before and after the promotion, a balance between degrees of satisfaction of the hall store satisfaction degree score and the customer satisfaction degree score is analyzed (refer to FIG. 139 and FIG. 140), and thus, from a point of view of the balance between degrees of satisfaction, effect of the promotion can also be analyzed and evaluated.

In addition, in the game information analysis system 2001 according to the one embodiment of the present invention, effect of the promotion can be analyzed by a simulation tool. For example, by instructing displaying of the simulation tool displayed by the tool display part 2570 of the menu screen 2500 shown in FIG. 47 and designating the implementation of the promotion for players having a predetermined player attribute (player category) (contents of the promotion are previously set in the tool), effect of the promotion is shown by money amounts and a simulation result is displayed in a graph. The calculation of the above-mentioned simulation is performed by using, for example, the past data of accumulated game information including IN/OUT information, transmitted from each of the slot machines 2014.

In the simulation described above with reference to FIG. 38, the simulation result A is indicated when predetermined promotion targeted for players of a player category=a “store visiting frequency (high)” was implemented and it is shown that effect of the promotion was low. In other words, after six months, as the effect of the promotion, a sales value of +10,000 resulted (the simulation value slightly exceeded a sales predicted value).

In addition, in the simulation described above with reference to FIG. 39, the simulation result B is indicated when predetermined promotion targeted for players of a player category=a “store visiting frequency (middle)” and players of a player category=a “store visiting frequency (low)” was implemented and it is shown that effect of the promotion was high. In other words, after six months, as the effect of the promotion, a sales value of +100,000 resulted (the simulation value largely exceeded a sales predicted value).

In addition, in the simulation described above with reference to FIG. 93, a previous simulation result upon implementing promotion is shown. By this simulation, before implementing the promotion, specific numerical values can be grasped. In the graphs shown in FIG. 93, the Winloss prediction (accumulation and monthly) from February in 2014 to December in 2014 and the Winloss simulation (accumulation and monthly) are shown, and thus, degrees of differences between the prediction and the simulation can be grasped.

[Ad Hoc Report Tool]

The game information analysis system 2001 according to the one embodiment of the present invention includes an ad hoc report tool which allows a user himself or herself of a client terminal 2011 to select display items or the like of a report. For the ad hoc tool, when the displaying of the ad hoc report tool displayed by the tool display part 2570 of the menu screen 2500 shown in FIG. 47 is instructed, a report output instruction screen is displayed (refer to FIG. 94).

Here, a user selects one index or a plurality of indices targeted to output data from an index area displaying indices and specifies it or theme in a "VALUE" section. As these indices, there are a total of Bets, a total of payouts, and the like, and in addition thereto, a number of sessions, normal POs, normal section Winloss/Bet by-multiplier big hit intervals, a candlestick chart related psychology degree score, a customer satisfaction degree score, a balance between degrees of satisfaction, and the like, and the items calculated uniquely in the present invention can be specified. These items are calculated based on game information including IN/OUT information, transmitted from each of the slot machines 2014.

In a dimension area, a daily dimension, a weekly dimension, a monthly dimension, a quarter term dimension, a yearly dimension, and the like are displayed.

A user issues instructions by using this ad hoc report tool, and thus, for example, a summary related to the number of games and a report showing counts (frequencies) for each of the numbers of games (refer to FIG. 95); a summary related to Bet amounts and a report showing popularity degrees (Bet amounts) for each theme and each age (refer to FIG. 96); and a summary related to Bet amounts and a report showing days of the week of operation classified by member types (important members, new members, and the like) (refer to FIG. 97) can be displayed on a display of the client terminal 2011. It is to be noted that although in this example, basically, the data is two-dimensionally developed to be displayed, a three-dimension graph can also be displayed.

At least one of machine attributes and player attributes displayed in a graph is classified into a plurality of categories, and for each of the categories, the ad hoc report tool can display a corresponding count value, a time period, and other attributes (or a count value, a time period, and other attribute ratios).

In addition, the above-described specifying of the items (by a user) to the ad hoc report tool can be registered as a template. For example, as a histogram analysis, a machine analysis, and a member analysis, display items and patterns of display modes can be registered, and at arbitrary timing, it or they can be called up and executed, thereby allowing reports to be displayed.

Although the above-described embodiment is described by citing the game facility as the example, the present invention is not limited thereto. The present invention is applicable to other facilities other than an amusement facility such as the game facility. For example, the present invention is applicable to commercial facilities such as shopping centers including a department store and an outlet mall and in addition to the above-mentioned commercial facilities and the game facility, the present invention is applicable to a commercial complex which is a building or a region in which a plurality of facilities such as restaurants and movie theaters are concentrated. In addition, for example, the present invention is applicable to facilities such as hotels, airports, and stations.

The present invention is not limited to the above-described game information analysis system and also discloses the below-described inventions.

The invention of each of the first to fifth game information analysis systems provides an analysis server and game information analysis methods, as described below.

An analysis server according to an aspect of the first invention has the below-described configuration.

The analysis server includes:

a game information reception part for receiving, from a gaming machine, game information including pieces of information pertinent to an investment money amount and a payout money amount; and a game information analysis part for conducting an analysis process based on the game information, the game information analysis part, in response to an instruction issued by a user, generating data for displaying correspondence relationship between player attributes indicating attributes of a player and gaming machine attributes indicating attributes of the gaming machine by matching the player and the gaming machine, the matching being conducted by associating based on predetermined relationship between the player and the gaming machine, the predetermined relationship being obtained from the game information.

By employing the above-described configuration of the present invention, based on operation data of gaming machines, attributes of players and attributes of gaming machines are analyzed, and the matching based on the player attributes and the machine attributes is conducted, thereby allowing the correspondence relationship between the player attributes and the machine attributes to be grasped.

In addition, a game information analysis method according to the aspect of the first invention has the below-described configuration.

The game information analysis method is executed in a game information analysis system including an analysis server, the method including:

a game information reception step at which on the analysis server, game information including pieces of information pertinent to an investment money amount and a payout money amount is received from a gaming machine; and a game information analysis step at which on the analysis server, based on the game information, an analysis process is conducted, at the game information analysis step, in response to an instruction issued by a user, generated is data for displaying correspondence relationship between player attributes indicating attributes of a player and gaming machine attributes indicating attributes of the gaming machine by matching the player and the gaming machine, and the matching is conducted by associating based on predetermined relationship between the player and the gaming machine, the predetermined relationship being obtained from the game information.

By employing the above-described configuration of the present invention, based on operation data of gaming machines, attributes of players and attributes of gaming machines are analyzed, and the matching based on the player attributes and the machine attributes is conducted, thereby allowing the correspondence relationship between the player attributes and the machine attributes to be grasped.

Further, a game information analysis method according to another aspect of the first invention has the below-described configuration.

The game information analysis method is executed on an analysis server, the method including:

a game information reception step at which game information including pieces of information pertinent to an investment money amount and a payout money amount is received from a gaming machine; and a game information analysis step at which based on the game information, an analysis process is conducted, at the game information analysis step, in response to an instruction issued by a user, generated is data for displaying correspondence relationship between player attributes indicating attributes of a player and gaming machine attributes indicating attributes of the gaming machine by matching the player and the gaming machine, and the matching is conducted by associating based on predetermined relationship between the player and the gaming machine, the predetermined relationship being obtained from the game information.

By employing the above-described configuration of the present invention, based on operation data of gaming machines, attributes of players and attributes of gaming machines are analyzed, and the matching based on the player attributes and the machine attributes is conducted, thereby allowing the correspondence relationship between the player attributes and the machine attributes to be grasped.

In addition, the present invention provides an analysis server and game information analysis methods as described below.

The analysis server according to an aspect of the second invention has the below-described configuration.

The analysis server includes:

a game information reception part for receiving, from a gaming machine, game information including pieces of information pertinent to an investment money amount and a payout money amount; and a game information analysis part for conducting an analysis process based on the game information, the game information analysis part, in response to an instruction issued by a user, generating data for conducting correspondence display in which player attributes indicating attributes of a player and gaming machine attributes indicating attributes of the gaming machine are associated with each other, the correspondence display being conducted by displaying, in accordance with the attributes of one of the player attributes and the gaming machine attributes, a totalized value of values of the attributes of the other of the player attributes and the gaming machine attributes.

By employing the above-described configuration of the present invention, based on operation data of gaming machines, associating between the player attributes and the machine attributes is displayed, thereby allowing the correspondence relationship related to the attributes of the players and the gaming machines to be grasped.

In addition, a game information analysis method according to the aspect of the second invention has the below-described configuration.

The game information analysis method is executed in a game information analysis system including an analysis server, the method including:

a game information reception step at which on the analysis server, game information including pieces of information pertinent to an investment money amount and a payout money amount is received from a gaming machine; and a game information analysis step at which on the analysis server, an analysis process is conducted based on the game information, at the game information analysis step, in response to an instruction issued by a user, generated is data for conducting correspondence display in which player attributes indicating attributes of a player and gaming machine attributes indicating attributes of the gaming machine are associated with each other, and the correspondence display is conducted by displaying, in accordance with the attributes of one of the player attributes and the gaming machine attributes, a totalized value of values of the attributes of the other of the player attributes and the gaming machine attributes.

By employing the above-described configuration of the present invention, based on operation data of gaming machines, associating between the player attributes and the machine attributes is displayed, thereby allowing the correspondence relationship related to the attributes of the players and the gaming machines to be grasped.

Further, a game information analysis method according to another aspect of the second invention has the below-described configuration.

The game information analysis method is executed on an analysis server, the method including:

a game information reception step at which game information including pieces of information pertinent to an investment money amount and a payout money amount is received from a gaming machine; and a game information analysis step at which an analysis process is conducted based on the game information, at the game information analysis step, in response to an instruction issued by a user, generated is data for conducting correspondence display in which player attributes indicating attributes of a player and gaming machine attributes indicating attributes of the gaming machine are associated with each other, and the correspondence display is conducted by displaying, in accordance with the attributes of one of the player attributes and the gaming machine attributes, a totalized value of values of the attributes of the other of the player attributes and the gaming machine attributes.

By employing the above-described configuration of the present invention, based on operation data of gaming machines, associating between the player attributes and the machine attributes is displayed, thereby allowing the correspondence relationship related to the attributes of the players and the gaming machines to be grasped.

In addition, the present invention provides an analysis server and game information analysis methods as described below.

An analysis server according to an aspect of the third invention has the below-described configuration.

The analysis server includes:

a game information reception part for receiving, from a gaming machine, game information including pieces of information pertinent to an investment money amount and a payout money amount; and a game information analysis part for conducting an analysis process based on the game information, the game information including a failure signal indicating occurrence of failure of each gaming machine, the game information analysis part totalizing values of machine attributes indicating attributes of the gaming machine from the game information, the game information analysis part determining a failure risk indicating possibility of the occurrence of failure related to the gaming machine based on the failure signal and the values of the attributes, the game information analysis part determining a phased-sign based on the failure risk and generating data for displaying a report showing said determined sign so as to be associated with the corresponding gaming machine.

By employing the above-described configuration of the present invention, based on operation data of gaming machines or the like, the failure risks related to the gaming machines are displayed, thereby allowing the possibility of failure of the gaming machines to be early and effectively grasped.

In addition, a game information analysis method according to the aspect of the third invention has the below-described configuration.

The game information analysis method is executed in a game information analysis system including an analysis server, the method including:

a game information reception step at which on the analysis server, game information including pieces of information pertinent to an investment money amount and a payout money amount is received from a gaming machine; and a game information analysis step at which on the analysis server, based on the game information, an analysis process is conducted, the game information includes a failure signal indicating occurrence of failure of each gaming machine, at the game information analysis step, totalized are values of machine attributes indicating attributes of the gaming machine from the game information, determined is a failure risk indicating possibility of the occurrence of failure related to the gaming machine based on the failure signal and the values of the attributes, and determined is a phased-sign based on the failure risk and generating data for displaying a report showing said determined sign so as to be associated with the corresponding gaming machine.

By employing the above-described configuration of the present invention, based on operation data of gaming machines or the like, the failure risks related to the gaming machines are displayed, thereby allowing the possibility of failure of the gaming machines to be early and effectively grasped.

Further, a game information analysis method according to another aspect of the third invention has the below-described configuration.

The game information analysis method is executed on an analysis server, the method including:

a game information reception step at which game information including pieces of information pertinent to an investment money amount and a payout money amount is received from a gaming machine; and a game information analysis step at which based on the game information, an analysis process is conducted, the game information includes a failure signal indicating occurrence of failure of each gaming machine, at the game information analysis step, totalized are values of machine attributes indicating attributes of the gaming machine from the game information, determined is a failure risk indicating possibility of the occurrence of failure related to the gaming machine based on the failure signal and the values of the attributes, and determined is a phased-sign based on the failure risk and generating data for displaying a report showing said determined sign so as to be associated with the corresponding gaming machine.

By employing the above-described configuration of the present invention, based on operation data of gaming machines or the like, the failure risks related to the gaming machines are displayed, thereby allowing the possibility of failure of the gaming machines to be early and effectively grasped.

In addition, the present invention provides an analysis server and game information analysis methods as described below.

The analysis server according to an aspect of the fourth invention has the below-described configuration.

The analysis server includes:

a game information reception part for receiving, from a gaming machine, game information including pieces of information pertinent to an investment money amount and a payout money amount; and a game information analysis part for conducting an analysis process based on the game information, the game information analysis part totalizing values of player attributes indicating attributes of a player from the game information, the game information analysis part determining a target for promotion in accordance with the values of the player attributes, the game information analysis part simulating a result of the promotion.

By employing the above-described configuration of the present invention, with respect to the promotion in accordance with the attributes of players, the previous simulation can be conducted, thereby allowing the effect of the promotion to be predicted.

In addition, a game information analysis method according to the aspect of the fourth invention has the below-described configuration.

The game information analysis method is executed in a game information analysis system including an analysis server, the method including:

a game information reception step at which on the analysis server, game information including pieces of information pertinent to an investment money amount and a payout money amount is received from a gaming machine; and a game information analysis step at which on the analysis server, based on the game information, an analysis process is conducted, at the game information analysis step, totalized are values of player attributes indicating attributes of a player from the game information, and determined is a target for promotion in accordance with the values of the player attributes, and a result of the promotion is simulated.

By employing the above-described configuration of the present invention, with respect to the promotion in accordance with the attributes of players, the previous simulation can be conducted, thereby allowing the effect of the promotion to be predicted.

Further, a game information analysis method according to another aspect of the fourth invention has the below-described configuration.

The game information analysis method is executed on an analysis server, the method including:

a game information reception step at which game information including pieces of information pertinent to an investment money amount and a payout money amount is received from a gaming machine; and a game information analysis step at which based on the game information, an analysis process is conducted, at the game information analysis step, totalized are values of player attributes indicating attributes of a player from the game information, and determined is a target for promotion in accordance with the values of the player attributes, and a result of the promotion is simulated.

By employing the above-described configuration of the present invention, with respect to the promotion in accordance with the attributes of players, the previous simulation can be conducted, thereby allowing the effect of the promotion to be predicted.

Further, the present invention provides an analysis server and game information analysis methods as described below.

The analysis server according to an aspect of the fifth invention has the below-described configuration.

The analysis server includes:

a game information reception part for receiving, from a gaming machine, game information including pieces of information pertinent to an investment money amount and a payout money amount; and a game information analysis part for conducting an analysis process based on the game information, the game information analysis part totalizing, from the game information, values of attributes including player attributes indicating attributes of a player and gaming machine attributes indicating attributes of the gaming machine, upon specifying an output item from among the attributes by a user, the game information analysis part developing a graph so as to associate the output item with other attributes specified by the user, the game information analysis part generating data for displaying a report including the graph.

By employing the above-described configuration of the present invention, in accordance with the specifying by a user, the attributes of players and the attributes of gaming machines can be displayed in the graph so as to be associated with each other, thereby allowing the game information to be analyzed from viewpoints which a user desires.

In addition, a game information analysis method according to the aspect of the fifth invention has the below-described configuration.

The game information analysis method is executed in a game information analysis system including an analysis server, the method including:

a game information reception step at which on the analysis server, game information including pieces of information pertinent to an investment money amount and a payout money amount is received from a gaming machine; and a game information analysis step at which on the analysis server, based on the game information, an analysis process is conducted, at the game information analysis step, from the game information, totalized are values of attributes including player attributes indicating attributes of a player and gaming machine attributes indicating attributes of the gaming machine, upon specifying an output item from among the attributes by a user, developed is a graph so as to associate the output item with other attributes specified by the user, and generated is data for displaying a report including the graph.

By employing the above-described configuration of the present invention, in accordance with the specifying by a user, the attributes of players and the attributes of gaming machines can be displayed in the graph so as to be associated with each other, thereby allowing the game information to be analyzed from viewpoints which a user desires.

Further, a game information analysis method according to another aspect of the fifth invention has the below-described configuration.

The game information analysis method is executed on an analysis server, the method including:

a game information reception step at which game information including pieces of information pertinent to an investment money amount and a payout money amount is received from a gaming machine; and a game information analysis step at which based on the game information, an analysis process is conducted, at the game information analysis step, from the game information, totalized are values of attributes including player attributes indicating attributes of a player and gaming machine attributes indicating attributes of the gaming machine, upon specifying an output item from among the attributes by a user, developed is a graph so as to associate the output item with other attributes specified by the user, and generated is data for displaying a report including the graph.

By employing the above-described configuration of the present invention, in accordance with the specifying by a user, the attributes of players and the attributes of gaming machines can be displayed in the graph so as to be associated with each other, thereby allowing the game information to be analyzed from viewpoints which a user desires.

REFERENCE SIGNS LIST

1 game system
1010, 2014 slot machine
1011 cabinet
1030 control panel
1131 upper image display panel
1135 symbol display window
1141 lower image display panel
1700 PTS terminal
1700A PTS front unit
1700B PTS main body
2001 game information analysis system
2011 client terminal
2012 analysis server
2013 hall management server

What is claimed is:

1. A game information analysis system comprising an analysis server, the analysis server including:

a game information reception part for receiving, from a gaming machine, sets of game information including pieces of information pertinent to an investment money amount and a payout money amount;

a memory configured to store sets of the game information sent from the game information reception part and targeted for analysis; and a CPU connected to the memory and that reads the sets of game information, the CPU being configured to perform processes including:

setting the game machine and a player of the game machine as objects for analysis;

extracting sets of first objects for analysis and target for the game from the memory in accordance with a first attribute indicating attributes of first object for analysis, the first object for analysis being one of said player and said game machine;

extracting sets of second object for analysis associated with the extracted set of the first object for analysis based on the game information, the set of second object for analysis being the other of said player and said game machine;

classifying the extracted sets of the second object for analysis in accordance with second attributes indicating attributes of the second object for analysis;

generating data information related to the classified second object for analysis, each of the data information being standardized information that is standardized index identified based on the game information, wherein the standardized information is standardized to the index identified for the entire extracted second object for analysis, and the classified information related to the second object for analysis is based on the information identified at least more than one time points; and controlling to display the plurality of information, wherein a correspondence display is conducted by displaying a totalized value by a time ratio.

2. A game information analysis system comprising an analysis server, the analysis server including:

a game information reception part for receiving, from a gaming machine, sets of game information including pieces of information pertinent to an investment money amount and a payout money amount;

a memory configured to store sets of the game information sent from the game information reception part and targeted for analysis; and a CPU connected to the memory and that reads the sets of game information, the CPU being configured to perform processes including:

setting the game machine and a player of the game machine as objects for analysis;

extracting sets of first objects for analysis and target for the game from the memory in accordance with a first attribute indicating attributes of first object for analysis, the first object for analysis being one of said player and said game machine;

extracting sets of second object for analysis associated with the extracted set of the first object for analysis based on the game information, the set of second object for analysis being the other of said player and said game machine;

classifying the extracted sets of the second object for analysis in accordance with second attributes indicating attributes of the second object for analysis;

generating data information related to the classified second object for analysis, each of the data information being standardized information that is standardized index identified based on the game information, wherein the standardized information is standardized to the index identified for the entire extracted second object for analysis, and the classified information related to the second object for analysis is based on the information identified at least more than one time points; and controlling to display the plurality of information, wherein a correspondence display is conducted by displaying a totalized value in a time-series manner.

3. A game information analysis system comprising an interface component allowing for user's operation to make inputs, a display, and an analysis server, the analysis server including:

a game information reception part for receiving, from a gaming machine, game information including pieces of information pertinent to an investment money amount and a payout money amount; and a memory configured to store sets of the game information sent from the game information reception part and targeted for analysis; and a CPU connected to the memory and that reads the sets of game information, the CPU being configured to perform processes including:

aggregating from the game information stored in the memory a plurality of values of attributes, including player attributes indicating attributes of a player and gaming machine attributes indicating attributes of the gaming machine, wherein the values of attributes are aggregated attribute-by-attribute; and upon specifying an output item from the attributes by a user's operation on the interface component, generating data for output by extracting the plurality kinds of attribute values from the memory for developing a graph corresponding to the output item to be displayed on the display, and associating the values with the output items, while evaluating data for report from the aggregated value of each attribute values, the data for report being included in the graph to be displayed on the display;

wherein in the player attributes, a customer satisfaction degree score is included, the game information analysis part evaluates a psychological state of the player based on a transition pattern of the investment money amount and the payout money amount, the game information analysis part calculates the customer satisfaction degree score based on the psychological state of the player, and the game information analysis part stores the calculated customer satisfaction degree score so as to be associated with the player, the storing being conducted so as to be associated with each player.

* * * * *